(12) United States Patent
Takahashi et al.

(10) Patent No.: US 10,158,877 B2
(45) Date of Patent: *Dec. 18, 2018

(54) HIGH EFFICIENCY VIDEO CODING DEVICE AND METHOD BASED ON REFERENCE PICTURE TYPE OF CO-LOCATED BLOCK

(71) Applicant: Sony Corporation, Tokyo (JP)

(72) Inventors: Yoshitomo Takahashi, Kanagawa (JP); Shinobu Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,632

(22) Filed: Oct. 20, 2016

(65) Prior Publication Data

US 2017/0041631 A1 Feb. 9, 2017

Related U.S. Application Data

(63) Continuation of application No. 14/128,091, filed as application No. PCT/JP2012/066582 on Jun. 28, 2012, now Pat. No. 9,491,462.

(30) Foreign Application Priority Data

Jun. 30, 2011 (JP) .................. 2011-145564
Jan. 19, 2012 (JP) .................. 2012-009223
Apr. 24, 2012 (JP) .................. 2012-099056

(51) Int. Cl.
*H04N 11/02* (2006.01)
*H04N 19/52* (2014.01)
(Continued)

(52) U.S. Cl.
CPC .......... *H04N 19/52* (2014.11); *H04N 19/105* (2014.11); *H04N 19/117* (2014.11);
(Continued)

(58) Field of Classification Search
CPC ..................................................... H04N 19/52
(Continued)

(56) References Cited

U.S. PATENT DOCUMENTS 5,337,086 A * 8/1994 Fujinami .............. H04N 19/517
375/240.16
8,625,918 B2 1/2014 Takahashi et al.
(Continued)

FOREIGN PATENT DOCUMENTS

CN 1801946 A 7/2006
CN 101248671 A 8/2008
(Continued)

OTHER PUBLICATIONS

U.S. Appl. No. 15/298,564, filed Oct. 20, 2016, Takahashi et al.
(Continued)

*Primary Examiner* — Leron Beck
(74) *Attorney, Agent, or Firm* — Wolf, Greenfield & Sacks, P.C.

(57) ABSTRACT

The present technique relates to an image processing device and method capable of suppressing a decrease in encoding efficiency. The image processing device includes: a predictive vector generating unit that generates a predictive vector of a current parallax vector of a current block used in prediction using correlation in a parallax direction using a reference parallax vector referred when generating a predictive motion vector, when encoding the current parallax vector; and a difference vector generating unit that generates a difference vector between the current parallax vector and the predictive vector generated by the predictive vector generating unit. The present disclosure can be applied to an image processing device.

15 Claims, 93 Drawing Sheets

(51) Int. Cl.

| | |
|---|---|
| *H04N 19/597* | (2014.01) |
| *H04N 19/513* | (2014.01) |
| *H04N 19/593* | (2014.01) |
| *H04N 19/503* | (2014.01) |
| *H04N 19/176* | (2014.01) |
| *H04N 19/105* | (2014.01) |
| *H04N 19/117* | (2014.01) |
| *H04N 19/124* | (2014.01) |
| *H04N 19/15* | (2014.01) |
| *H04N 19/159* | (2014.01) |
| *H04N 19/30* | (2014.01) |
| *H04N 19/61* | (2014.01) |
| *H04N 19/172* | (2014.01) |

(52) U.S. Cl.
CPC ........... *H04N 19/124* (2014.11); *H04N 19/15* (2014.11); *H04N 19/159* (2014.11); *H04N 19/176* (2014.11); *H04N 19/30* (2014.11); *H04N 19/503* (2014.11); *H04N 19/513* (2014.11); *H04N 19/593* (2014.11); *H04N 19/597* (2014.11); *H04N 19/61* (2014.11); *H04N 19/172* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 9,148,666 B2* | 9/2015 | Park | H04N 19/52 |
| 9,204,163 B2* | 12/2015 | Kim | H04N 19/56 |
| 9,491,462 B2 | 11/2016 | Takahashi et al. | |
| 9,560,375 B2 | 1/2017 | Takahashi et al. | |
| 9,615,079 B2 | 4/2017 | Takahashi et al. | |
| 9,648,344 B2 | 5/2017 | Takahashi et al. | |
| 9,712,802 B2 | 7/2017 | Takahashi et al. | |
| 9,788,008 B2 | 10/2017 | Takahashi et al. | |
| 9,900,595 B2 | 2/2018 | Takahashi | |
| 2004/0008784 A1* | 1/2004 | Kikuchi | H04N 19/573 375/240.16 |
| 2005/0053134 A1 | 3/2005 | Holcomb | |
| 2007/0071107 A1 | 3/2007 | Ha | |
| 2008/0089416 A1 | 4/2008 | Jeon | |
| 2009/0022222 A1 | 1/2009 | He et al. | |
| 2009/0238269 A1* | 9/2009 | Pandit | H04N 19/597 375/240.12 |
| 2010/0021072 A1* | 1/2010 | Shimizu | H04N 19/527 382/233 |
| 2010/0086222 A1* | 4/2010 | Shimizu | H04N 19/597 382/232 |
| 2010/0158129 A1 | 6/2010 | Lai et al. | |
| 2010/0284469 A1* | 11/2010 | Sato | H04N 19/176 375/240.16 |
| 2011/0169820 A1* | 7/2011 | Saito | G03B 35/08 345/419 |
| 2012/0014614 A1 | 1/2012 | Takahashi et al. | |
| 2012/0134415 A1 | 5/2012 | Lin et al. | |
| 2012/0134416 A1* | 5/2012 | Lin | H04N 19/52 375/240.16 |
| 2012/0224637 A1* | 9/2012 | Sugio | H04N 19/52 375/240.16 |
| 2013/0088570 A1 | 4/2013 | Takahashi et al. | |
| 2013/0107964 A1* | 5/2013 | Wahadaniah | H04N 19/52 375/240.16 |
| 2013/0336407 A1 | 12/2013 | Chen et al. | |
| 2013/0342647 A1 | 12/2013 | Takahashi et al. | |
| 2014/0002592 A1 | 1/2014 | Takahashi et al. | |
| 2014/0085418 A1 | 3/2014 | Takahashi et al. | |
| 2014/0104383 A1 | 4/2014 | Takahashi et al. | |
| 2014/0126641 A1 | 5/2014 | Takahashi et al. | |
| 2014/0126642 A1 | 5/2014 | Takahashi et al. | |
| 2014/0198847 A1 | 7/2014 | Takahashi | |
| 2014/0321546 A1 | 10/2014 | Sakurai et al. | |
| 2014/0341285 A1 | 11/2014 | Sakurai et al. | |
| 2015/0326876 A1* | 11/2015 | Tsai | H04N 19/52 375/240.16 |
| 2016/0205410 A1 | 7/2016 | Lin et al. | |
| 2016/0295228 A1 | 10/2016 | Takahashi et al. | |
| 2016/0295229 A1 | 10/2016 | Takahashi et al. | |
| 2016/0295230 A1 | 10/2016 | Takahashi et al. | |
| 2017/0041630 A1 | 2/2017 | Takahashi et al. | |
| 2017/0064283 A1 | 3/2017 | Takahashi et al. | |
| 2017/0280127 A1 | 9/2017 | Takahashi et al. | |
| 2017/0280128 A1 | 9/2017 | Takahashi et al. | |

FOREIGN PATENT DOCUMENTS

| | | |
|---|---|---|
| CN | 101785317 A | 7/2010 |
| EP | 1 359 767 A1 | 11/2003 |
| JP | 09-009300 A | 1/1997 |
| JP | 2009-510892 A | 3/2009 |
| JP | 2009-522986 A | 6/2009 |
| JP | 2009-543508 A | 12/2009 |
| JP | 2010-537484 A | 12/2010 |
| JP | 2011-077722 A | 4/2011 |
| JP | 2014-535239 A | 12/2014 |
| JP | 6238090 B2 | 11/2017 |
| KR | 10-2007-0036611 A | 4/2007 |
| KR | 10-2009-0053820 A | 5/2009 |
| KR | 10-0901178 B1 | 6/2009 |
| WO | WO 2006/073116 A1 | 7/2006 |
| WO | WO 2007/011147 A1 | 1/2007 |
| WO | WO 2007/035354 A2 | 3/2007 |
| WO | WO 2007/081756 A1 | 7/2007 |
| WO | WO 2009/023091 A1 | 2/2009 |
| WO | WO 2013/069990 A1 | 5/2013 |

OTHER PUBLICATIONS

U.S. Appl. No. 15/352,348, filed Nov. 15, 2016, Takahashi et al.

Adikari et al., A new motion and disparity vector prediction technique for h.264 based stereoscopic video coding. Proceedings of IEEE International Symposium on Circuits and Systems 2006, ISCAS 2006, May 21-24, 2006, May 24, 2006, pp. 927-930.

Jung et al., Competition-Based Scheme for Motion Vector Selection and Coding. Telecommunications Standardization Sector. Study Group 16 Question 6. Video Coding Experts Group (VCEG). Document VCEG-AC06. 29$^{th}$ Meeting: Jul. 2006. 7 pages.

No Author Listed, Editor Schwarz et al, "Test Model under Consideration for HEVC based 3D video coding v3.0", International Organisation for Standardisation, Apr. 2012, Geneva Switzerland, 46p.

Schwarz et al., "Test Model under Consideration for HEVC based 3D video coding", International Organisation for Standardisation, Feb. 2012, URL:http://new.owieczka.net/wp-content/publication/2012/w12559.pdf.

Wiegand et al., WD1: Working Draft 1 of High-Efficiency Video Coding. Joint Collaborative Team on Video Coding (JCT-VC) of ITU-T SG16 WP3 and ISO/IEC JTC1/SC29/WG11. Document JCTVC-C403. 3$^{rd}$ Meeting: Oct. 2010. 137 pages.

Winken et al., Description of video coding technology proposal by Fraunhofer HHI. Joint Collaborative Team on Video Coding (JCT-VC) of ITU-T SG16 WP3 and ISO/IEC JTC1/SC29/WG11. 1$^{st}$ Meeting: Apr. 2010. 44 pages.

Korean Office Action dated Feb. 13, 2018 in connection with Korean Application No. 102013-7033599, and English translation thereof.

Yusuke Itani, Improvement to AMVP/Merge process. Joint Collaborative Team on Video Coding (JCT-VC) of ITU-T SG16 WP3 and ISO/IEC JTC1/SC29/WG11, JCTVC-E064. Fifth meeting: Geneva, CH Mar. 16-23, 2011; 8 pages.

[No Author Listed], Series H: Audiovisual and Multimedia systems. Infrastructure of audiovisual services—coding of Moving video. High efficiency video coding. ITU-T H.265 (Dec. 2016). 664 Pages.

(56) References Cited

OTHER PUBLICATIONS

Takahashi et al., Motion vector prediction issue for long-term reference picture. Joint Collaborative Team on Video Coding (JCT-VC) of ITU-T SG WP 3 and ISO/IEC JTC 1/SC 29/WG 11. 10th Meeting: Stockholm, SE, Jul. 11-20, 2012. Presentation.

Takahashi et al., High-level Syntax: Motion vector prediction issue for long-term reference picture. Joint Collaborative Team on Video Coding (JCT-VC) of ITU-T SG WP 3 and ISO/IEC JTC 1/SC 29/WG 11. 10th Meeting: Stockholm, SE, Jul. 11-20, 2012.

Takahashi et al., 3D-HEVC-CE3: Proposal on motion Parameter Prediction m23639. Sony Corporation. Jan. 5, 2015. Presentation.

Takahashi et al., 3D-HEVC-CE3: Results on motion Parameter Prediction by Sony. ISO/IEC JTC 1/SC 29/WG 11, MPEG2012/M23639. Feb. 2012, San Jose, CA, USA.

Korean Office Action dated Sep. 14, 2018 in connection with Korean Application No. 10-2017-7015848, and English translation thereof.

Korean Office Action dated Sep. 14, 2018 in connection with Korean Application No. 10-2017-7015849, and English translation thereof.

\* cited by examiner

FIG. 3

| refIdxLX | refIdxLA | refIdxLB | refIdxLC |
|---|---|---|---|
| refIdxLA | x | −1 | −1 |
| refIdxLB | −1 | x | −1 |
| refIdxLC | x | −1 | −1 |
| refIdxLA | x | x | −1 |
| refIdxLA | −1 | −1 | x |
| refIdxLB | −1 | x | x |
| 0 | −1 | −1 | −1 |
| min(refIdxLB,refIdxLC) | −1 | x | y |
| min(refIdxLA,refIdxLC) | x | −1 | y |
| min(refIdxLA,refIdxLB) | x | −1 | y |
| min(min(refIdxLA,refIdxLB),refIdxLC) | x | y | z |

FIG. 14

| TARGET REGION | | REFERENCE IMAGE OF TARGET REGION | | CORRELATION REGION | | REFERENCE IMAGE OF CORRELATION REGION | | |
|---|---|---|---|---|---|---|---|---|
| VIEW ID | POC | VIEW ID | POC | VIEW ID | POC | VIEW ID | POC | |
| A | E | C | E | B | E | D | E | SCHEME 1 |
| A | D | B | D | A | E | C | E | SCHEME 2 |
| A | C | A | D | B | C | B | E | SCHEME 3 |
| A | B | A | C | A | D | A | E | SCHEME 4 |

FIG. 15

- Availability decision using POC 1. (CurrPOC! = CurrRefPOC) && (ColPOC! = ColRefPOC)
   ⇒Both coding vector and co-located vector are motion vector.

2. (CurrPOC == CurrRefPOC) && (ColPOC == ColRefPOC)
   ⇒Both coding vector and co-located vector are Inter-view vector.

CurrPOC:POC of current picture
ColPOC:POC of co-located picture
CurrRefPOC:POC of picture referred from current picture
ColRefPOC:POC of picture referred from co-located picture

| Availability of co-located vector | Coding vector | Co-located vector |
|---|---|---|
| Available | Motion vector | Motion vector |
| Not-available | Motion vector | Inter-view vector |
| Not-available | Inter-view vector | Motion vector |
| Available | Inter-view vector | Inter-view vector |

FIG. 17

| | |
|---|---|
| seq_parameter_set_rbsp() { | Descriptor |
| profile_idc | u(8) |
| reserved_zero_8bits /* equal to0 */ | u(8) |
| level_idc | u(8) |
| seq_parameter_set_id | ue(v) |
| pic_width_in_luma_samples | u(16) |
| pic_height_in_luma_samples | u(16) |
| bit_depth_luma_minus8 | ue(v) |
| bit_depth_chroma_minus8 | ue(v) |
| log2_max_frame_num_minus4 | ue(v) |
| pic_order_cnt_type | ue(v) |
| if(pic_order_cnt_type== 0 ) | |
|    log2_max_pic_order_cnt_lsb_minus4 | ue(v) |
| else if(pic_order_cnt_type == 1 ) { | |
|    delta_pic_order_always_zero_flag | u(1) |
|    offset_for_non_ref_pic | se(v) |
|    num_ref_frames_in_pic_order_cnt_cycle | ue(v) |
|    for( i = 0; i <num_ref_frames_in_pic_order_cnt_cycle; i++ ) | |
|      offset_for_ref_frame[ i ] | se(v) |
| } | |
| max_num_ref_frames | ue(v) |
| gaps_in_frame_num_value_allowed_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| max_transform_hierarchy_depth_intra | ue(v) |
| adaptive_loop_filter_enabled_flag | u(1) |
| cu_qp_delta_enabled_flag | u(1) |
| num_views | ← TOTAL NUMBER OF VIEWS |
| for(i=0;i< num_views ;i++){ | |
|    view_id [ i ] | ← ID FOR IDENTIFYING VIEWS |
|    num_ref_views_l0[ i ] | ← NUMBER OF PARALLAX PREDICTIONS IN LIST L0 |
|    for(j=0;j<num_ref_views_l0[ i ];j++) | |
|      ref_view_id_l0[ i ][ j ] | ← ID OF VIEW REFERRED TO IN PARALLAX PREDICTION IN LIST L0 |
|    num_ref_views_l1[ i ] | ← NUMBER OF PARALLAX PREDICTIONS IN LIST L1 |
|    for(j=0;j<num_ref_views_l1[ i ];j++) | |
|      ref_view_id_l1[ i ][ j ] | ← ID OF VIEW REFERRED TO IN PARALLAX PREDICTION IN LIST L1 |
| } | |
| rbsp_trailing_bits () | |
| } | |

*FIG. 18*

| slice_header( ) { | Descriptor |
|---|---|
| first_tb_in_slice | ue(v) |
| entropy_slice_flag | u(1) |
| if( !entropy_slice_flag) { | |
| slice_type | ue(v) |
| pic_parameter_set_id | ue(v) |
| frame_num | u(v) |
| view_id | u(v) |
| if( IdrPicFlag) | |
| idr_pic_id | ue(v) |
| if( pic_order_cnt_type = = 0 ) | |
| pic_order_cnt_lsb  /* | u(v) |
| if(slice_type= = P  \|\|slice_type= = B ) { | |
| num_ref_idx_active_override_flag | u(1) |
| if(num_ref_idx_active_override_flag) { | |
| num_ref_idx_l0_active_minus1 | ue(v) |
| if(slice_type= = B ) | |
| num_ref_idx_l1_active_minus1 | ue(v) |
| } | |
| } | |
| ref_pic_list_modification( ) | |
| ref_pic_list_combination( ) | |
| if(nal_ref_idc!= 0 ) | |
| dec_ref_pic_marking() | |
| if(entropy_coding_mode_flag&&slice_type!= I) | |
| cabac_init_idc | ue(v) |
| slice_qp_delta | se(v) |
| if( adaptive_loop_filter_enabled_flag) | |
| alf_param() | |
| if(deblocking_filter_control_present_flag) { | |
| disable_deblocking_filter_idc | |
| if(disable_deblocking_filter_idc!= 1 ) { | |
| slice_alpha_c0_offset_div2 | |
| slice_beta_offset_div2 | |
| } | |
| } | |
| if(slice_type= = B ) | |
| collocated_from_l0_flag | u(1) |
| } else | |
| if(entropy_coding_mode_flag&&slice_type!= I) | |
| cabac_init_idc | ue(v) |
| } | | view_id — ID FOR IDENTIFYING VIEWS

*FIG. 19*

| prediction_unit( x0,y0,log2PUWidth,log2PUHeight, PartIdx, InferredMergeFlag ) { | Descriptor | |
|---|---|---|
| if( skip_flag[ x0 ][ y0 ] ) { | | |
|   if( NumMergeCand > 1 ) | | EXPAND TYPE OF SYNTAX OR CHANGE PROCESSING CONTENT |
|     merge_idx[ x0 ][ y0 ] | ue(v) \| ae(v) | |
| } else if( PredMode = = MODE_INTRA ) { | | |
|   prev_intra_luma_pred_flag[ x0 ][ y0 ] | u(1) \| ae(v) | |
|   if( !prev_intra_luma_pred_flag[ x0 ][ y0 ] ) | | |
|     if( NumMPMCand > 1 ) | | |
|       mpm_idx[ x0 ][ y0 ] | u(1) \| ae(v) | |
|     else | | |
|       rem_intra_luma_pred_mode[ x0 ][ y0 ] | ue(v) \| ae(v) | |
|   intra_chroma_pred_mode[ x0 ][ y0 ] | ue(v) \| ae(v) | |
| } else { /* MODE_INTER*/ | | |
|   if( !InferredMergeFlag ) | | |
|     merge_flag[ x0 ][ y0 ] | u(1) \| ae(v) | |
|   if( merge_flag[ x0 ][ y0 ] && NumMergeCand > 1 ) { | | EXPAND TYPE OF SYNTAX OR CHANGE PROCESSING CONTENT |
|     merge_idx[ x0 ][ y0 ] | ue(v) \| ae(v) | |
|   } else { | | |
|     if( slice_type = = B ) | | |
|       inter_pred_flag[ x0 ][ y0 ] | ue(v) \| ae(v) | |
|     if( inter_pred_flag[ x0 ][ y0 ] = = Pred_LC ) { | | |
|       if( num_ref_idx_lc_active_minus1 > 0 ) | | |
|         ref_idx_lc[ x0 ][ y0 ] | ue(v) \| ae(v) | |
|       mvd_lc[ x0 ][ y0 ][ 0 ] | se(v) \| ae(v) | |
|       mvd_lc[ x0 ][ y0 ][ 1 ] | se(v) \| ae(v) | |
|       if( NumMVPCand( LcToLx ) > 1) | | EXPAND TYPE OF SYNTAX OR CHANGE PROCESSING CONTENT |
|         mvp_idx_lc[ x0 ][ y0 ] | ue(v) \| ae(v) | |
|     } | | |
|     else { /* Pred_L0 or Pred_BI */ | | |
|       if( num_ref_idx_lc_active_minus1 > 0 ) | | |
|         ref_idx_l0[ x0 ][ y0 ] | ue(v) \| ae(v) | |
|       mvd_l0[ x0 ][ y0 ][ 0 ] | se(v) \| ae(v) | |
|       mvd_l0[ x0 ][ y0 ][ 1 ] | se(v) \| ae(v) | |
|       if( NumMVPCand( L0 ) > 1) | | EXPAND TYPE OF SYNTAX OR CHANGE PROCESSING CONTENT |
|         mvp_idx_l0[ x0 ][ y0 ] | ue(v) \| ae(v) | |
|     } | | |
|     if( inter_pred_flag[ x0 ][ y0 ] = = Pred_BI ) { | | |
|       if( num_ref_idx_l1_active_minus1 > 0 ) | | |
|         ref_idx_l1[ x0 ][ y0 ] | ue(v) \| ae(v) | |
|       mvd_l1[ x0 ][ y0 ][ 0 ] | se(v) \| ae(v) | |
|       mvd_l1[ x0 ][ y0 ][ 1 ] | se(v) \| ae(v) | |
|       if( NumMVPCand( L1 ) > 1) | | EXPAND TYPE OF SYNTAX OR CHANGE PROCESSING CONTENT |
|         mvp_idx_l1[ x0 ][ y0 ] | ue(v) \| ae(v) | |
|     } | | |
|   } | | |
| } | | |
| } | | |

FIG. 58

| CODING VECTOR | Co-located VECTOR | PROCESS |
|---|---|---|
| Motion vector | Motion vector | USE Co-located VECTOR AS PREDICTIVE VECTOR CANDIDATE. |
| Motion vector | Inter-view vector | USE MOTION VECTOR OF Base View OF BLOCK SHIFTED BY Co-located VECTOR AS PREDICTIVE VECTOR CANDIDATE. |
| Motion vector | Intra mode | USE MOTION VECTOR OF Base View OF BLOCK SHIFTED BY GLOBAL PARALLAX VECTOR AS PREDICTIVE VECTOR CANDIDATE. |
| Inter-view vector | Motion vector | USE GLOBAL PARALLAX VECTOR AS PREDICTIVE VECTOR CANDIDATE. |
| Inter-view vector | Inter-view vector | USE Co-located VECTOR AS PREDICTIVE VECTOR CANDIDATE. |
| Inter-view vector | Intra mode | USE GLOBAL PARALLAX VECTOR AS PREDICTIVE VECTOR CANDIDATE. |

FIG. 64

FIXED BACKGROUND APPLICATION

| TYPE OF REFERENCE IMAGE | VECTOR PROPERTY |
|---|---|
| SHORT REFERENCE PICTURE | MOTION VECTOR OCCURS (IS LONG) BECAUSE IT IS MAINLY REFERRED TO FOR MOVING OBJECT |
| LONG REFERENCE PICTURE | MOTION VECTOR IS 0 (IS SHORT) BECAUSE IT IS MAINLY REFERRED TO FOR FIXED REGION (IN PARTICULAR, OCCLUSION REGION) |

A

STEREO APPLICATION

| TYPE OF REFERENCE IMAGE | VECTOR PROPERTY |
|---|---|
| SHORT REFERENCE PICTURE | MOTION VECTOR OCCURS BECAUSE IT IS REFERRED TO FOR TEMPORAL PREDICTION |
| LONG REFERENCE PICTURE | PARALLAX VECTOR OCCURS BECAUSE IT IS REFERRED TO FOR PARALLAX PREDICTION |

| Index | REFERENCE IMAGE OF ENCODING BLOCK | REFERENCE IMAGE OF TEMPORAL CORRELATION BLOCK | PRESENCE OF CANDIDATE MOTION (PARALLAX) VECTOR OF TEMPORAL CORRELATION BLOCK | SCALING OF MOTION (PARALLAX) VECTOR OF TEMPORAL CORRELATION BLOCK |
|---|---|---|---|---|
| 1 | SHORT REFERENCE PICTURE | SHORT REFERENCE PICTURE | INCLUDED IN CANDIDATE | YES |
| 2 | SHORT REFERENCE PICTURE | LONG REFERENCE PICTURE | EXCLUDED FROM CANDIDATE | — |
| 3 | LONG REFERENCE PICTURE | LONG REFERENCE PICTURE | INCLUDED IN CANDIDATE | NO |
| 4 | LONG REFERENCE PICTURE | SHORT REFERENCE PICTURE | EXCLUDED FROM CANDIDATE | — |

A

| Index | REFERENCE IMAGE OF ENCODING BLOCK | REFERENCE IMAGE OF NEIGHBORING BLOCK | PRESENCE OF CANDIDATE MOTION (PARALLAX) VECTOR OF NEIGHBORING BLOCK | SCALING OF MOTION (PARALLAX) VECTOR OF NEIGHBORING BLOCK |
|---|---|---|---|---|
| 1 | SHORT REFERENCE PICTURE | SHORT REFERENCE PICTURE | INCLUDED IN CANDIDATE | YES |
| 2 | SHORT REFERENCE PICTURE | LONG REFERENCE PICTURE | EXCLUDED FROM CANDIDATE | — |
| 3 | LONG REFERENCE PICTURE | LONG REFERENCE PICTURE | INCLUDED IN CANDIDATE | NO |
| 4 | LONG REFERENCE PICTURE | SHORT REFERENCE PICTURE | EXCLUDED FROM CANDIDATE | — |

| Index | REFERENCE IMAGE OF ENCODING BLOCK | REFERENCE IMAGE OF NEIGHBORING BLOCK | PRESENCE OF CANDIDATE MOTION (PARALLAX) VECTOR OF NEIGHBORING BLOCK |
|---|---|---|---|
| 1 | SHORT REFERENCE PICTURE | SHORT REFERENCE PICTURE | INCLUDED IN CANDIDATE |
| 2 | SHORT REFERENCE PICTURE | LONG REFERENCE PICTURE | EXCLUDED FROM CANDIDATE |
| 3 | LONG REFERENCE PICTURE | LONG REFERENCE PICTURE | INCLUDED IN CANDIDATE |
| 4 | LONG REFERENCE PICTURE | SHORT REFERENCE PICTURE | EXCLUDED FROM CANDIDATE |

B

| Index | REFERENCE IMAGE OF ENCODING BLOCK | REFERENCE IMAGE OF NEIGHBORING BLOCK | SCALING OF MOTION (PARALLAX) VECTOR OF NEIGHBORING BLOCK |
|---|---|---|---|
| 1 | SHORT REFERENCE PICTURE | SHORT REFERENCE PICTURE | YES |
| 2 | SHORT REFERENCE PICTURE | LONG REFERENCE PICTURE | NO |
| 3 | LONG REFERENCE PICTURE | LONG REFERENCE PICTURE | NO |
| 4 | LONG REFERENCE PICTURE | SHORT REFERENCE PICTURE | NO |

| Index | REFERENCE IMAGE OF ENCODING BLOCK | REFERENCE IMAGE OF TEMPORAL CORRELATION BLOCK | PRESENCE OF CANDIDATE MOTION (PARALLAX) VECTOR OF TEMPORAL CORRELATION BLOCK | SCALING OF MOTION (PARALLAX) VECTOR OF TEMPORAL CORRELATION BLOCK |
|---|---|---|---|---|
| 1 | SHORT REFERENCE PICTURE | SHORT REFERENCE PICTURE | INCLUDED IN CANDIDATE | YES |
| 2 | SHORT REFERENCE PICTURE | LONG REFERENCE PICTURE | EXCLUDED FROM CANDIDATE | — |
| 3 | LONG REFERENCE PICTURE | LONG REFERENCE PICTURE | INCLUDED IN CANDIDATE | NO |
| 4 | LONG REFERENCE PICTURE | SHORT REFERENCE PICTURE | EXCLUDED FROM CANDIDATE | — |

B

| Index | REFERENCE IMAGE OF ENCODING BLOCK | REFERENCE IMAGE OF NEIGHBORING BLOCK | PRESENCE OF CANDIDATE MOTION (PARALLAX) VECTOR OF NEIGHBORING BLOCK | SCALING OF MOTION (PARALLAX) VECTOR OF NEIGHBORING BLOCK |
|---|---|---|---|---|
| 1 | SHORT REFERENCE PICTURE | SHORT REFERENCE PICTURE | INCLUDED IN CANDIDATE | YES |
| 2 | SHORT REFERENCE PICTURE | LONG REFERENCE PICTURE | EXCLUDED FROM CANDIDATE | — |
| 3 | LONG REFERENCE PICTURE | LONG REFERENCE PICTURE | INCLUDED IN CANDIDATE (ONLY WHEN REFERENCE IMAGES ARE IDENTICAL) | NO |
| 4 | LONG REFERENCE PICTURE | SHORT REFERENCE PICTURE | EXCLUDED FROM CANDIDATE | — |

HIGH EFFICIENCY VIDEO CODING DEVICE AND METHOD BASED ON REFERENCE PICTURE TYPE OF CO-LOCATED BLOCK

CROSS REFERENCE TO RELATED APPLICATIONS

This is a continuation of and claims the benefit under 35 U.S.C. § 120 of U.S. patent application Ser. No. 14/128,091, titled "HIGH EFFICIENCY VIDEO CODING DEVICE AND METHOD BASED ON REFERENCE PICTURE TYPE," filed on Dec. 20, 2013, which is a U.S. National Stage Application under 35 U.S.C. § 371, based on International Application No. PCT/JP2012/066582, filed Jun. 28, 2012, which claims priority to Japanese Patent Applications JP 2012-099056, filed Apr. 24, 2012, JP 2012-009223, filed Jan. 19, 2012, and JP 2011-145564, filed on Jun. 30, 2011, each of which is hereby incorporated by reference in its entirety.

TECHNICAL FIELD

The present disclosure relates to an image processing device and an image processing method. Specifically, the present disclosure relates to an image processing device and an image processing method capable of improving encoding efficiency.

BACKGROUND ART

In recent years, devices, which handle image information as digital data, which, in such a case, aim to transmit and store information with a high efficiency, and which conform to a scheme such as MPEG (Moving Picture Experts Group), for compressing image information using orthogonal transformation, such as discrete cosine transformation, and using motion compensation by utilizing redundancy that is unique to the image information have become widespread in both information distribution in broadcasting stations and information reception in ordinary homes.

In particular, MPEG2 (International Organization for Standardization and International Electrotechnical Commission (ISO/IEC) 13818-2) is defined as a general-purpose image encoding scheme and is presently widely used in a wide range of applications for professional use and consumer use as standards for both interlaced-scanning images and sequential scanning images and standard and high-definition images. By employing the MPEG2 compression scheme, for example, a coding rate (bit rate) of 4 to 8 Mbps is allocated for an interlaced-scanning image of a standard resolution with 720×480 pixels, and a coding rate (bit rate) of 18 to 22 Mbps is allocated for an interlaced-scanning image of a high resolution with 1920×1088 pixels. As a result, a high compression ratio and a good image quality can be realized.

The MPEG2 has been mainly intended for high-image-quality encoding appropriate for broadcasting, but was not compatible with an encoding scheme for realizing a lower coding rate (bit rate) (a higher compression ratio) than that of MPEG1. With the popularity of mobile terminals, the demand for such an encoding scheme is expected to increase in the future. To respond this, standardization of MPEG4 encoding schemes have been confirmed. With regard to an image encoding scheme, the specification thereof was confirmed as the international standard ISO/IEC 14496-2 in December in 1998.

In addition, in recent years, originally for the purpose of video coding for television conferencing, standardization of specifications of a standard called H.26L (ITU-T (International Telecommunication Union Telecommunication Standardization Sector) Q6/16 VCEG (Video Coding Expert Group)) has progressed. H.26L is known to achieve higher encoding efficiency although it requires a greater amount of computations for encoding and decoding than conventional encoding schemes such as MPEG2 and MPEG4. Moreover, currently, as part of the activity of MPEG4, standardization for incorporating functions, which are not supported by H.26L, into the H.26L is performed as Joint Model of Enhanced-Compression Video Coding to realize high encoding efficiency.

The schedule of standardization showed that, it became an international standard under the name of H.264 and MPEG-4 Part 10 (Advanced Video Coding, hereinafter referred to as AVC) in March, 2003.

However, setting the size of a macroblock to 16×16 pixels is not optimal for a large image frame named UHD (Ultra High Definition; 4000×2000 pixels) that will become an object of the next generation encoding scheme.

Thus, the standardization of an encoding system called HEVC (High Efficiency Video Coding) has been currently developed by JCTVC (Joint Collaboration Team-Video Coding), which is a joint standardization organization of ITU-T and ISO/IEC, for the purpose of further improving the encoding efficiency compared to AVC (for example, see Non-Patent Document 1).

In the HEVC encoding scheme, a coding unit (CU) is defined as the same processing unit as the macroblock in the AVC scheme. The size of CU is not fixed to 16×16 pixels unlike the macroblock of the AVC scheme but is designated in image compression information in respective sequences.

However, in order to improve encoding of motion vectors using median prediction defined in the AVC scheme, a method that allows "temporal predictor" and "spatio-temporal predictor" as well as "spatial predictor" to be used as candidates for predictive motion vectors has been taken into consideration (for example, see Non-Patent Document 2).

Moreover, a method called motion partition merging in which merge_flag and merge_left_flag are transmitted is proposed as one of encoding schemes for motion information (for example, see Non-Patent Document 3).

CITATION LIST

Non-Patent Document

Non-Patent Document 1: Thomas Wiegand, Woo-Jin Han, Benjamin Bross, Jens-Rainer Ohm, Gary J. Sullivan, "Working Draft 1 of High-Efficiency Video Coding", JCTVC-C403, Joint Collaborative Team on Video Coding (JCT-VC) of ITU-T SG16 WP3 and ISO/IEC JTC1/SC29/WG11 3rd Meeting: Guangzhou, CN, 7-15 Oct. 2010

Non-Patent Document 2: Joel Jung, Guillaume Laroche, "Competition-Based Scheme for Motion Vector Selection and Coding," VCEG-AC06, ITU-Telecommunications Standardization Sector STUDY GROUP 16 Question 6, Video Coding Experts Group (VCEG) 29th Meeting: Klagenfurt, Austria, 17-18 Jul. 2006

Non-Patent Document 3: Martin Winken, Sebastian Bosse, Benjamin Bross, Philipp Helle, Tobias Hinz, Heiner Kirchhoffer, Haricharan Lakshman, Detlev Marpe, Simon Oudin, Matthias Preiss, Heiko Schwarz, Mischa Siekmann, Karsten Suehring, and Thomas Wiegand, "Description of video coding technology proposed by Fraunhofer HHI," JCTVC-A116, April, 2010

SUMMARY OF THE INVENTION

Problems to be Solved by the Invention

However, these techniques illustrate processes in the same view only and cannot perform inter-view vector prediction in the case of multi-view encoding. Thus, encoding efficiency may decrease.

The present disclosure is made in view of the situations, and aims to suppress a decrease in the encoding efficiency.

Solutions to Problems

According to an aspect of the present disclosure, there is provided an image processing device including: a predictive vector generating unit that generates a predictive vector of a current parallax vector of a current block used in prediction using correlation in a parallax direction using a reference parallax vector referred when generating a predictive motion vector, when encoding the current parallax vector; and a difference vector generating unit that generates a difference vector between the current parallax vector and the predictive vector generated by the predictive vector generating unit.

The predictive vector generating unit may generate a predictive vector of the current parallax vector using a parallax vector of a co-located block included in a co-located picture of a time different from a current picture of the same view as a current view.

The predictive vector generating unit may set the co-located block to be available when a property of a vector of the current block is identical to a property of a vector of the co-located block.

The property of the vector is a type of a vector, and the predictive vector generating unit may set the co-located block to be available when the property of the vector of the current block is a parallax vector and the property of the vector of the co-located block is a parallax vector.

The predictive motion vector generating unit may determine the property of the vector of the current block and the property of the vector of the co-located block using POC (Picture Order Count) that indicates an output order of pictures.

The predictive motion vector generating unit may determine the property of the vector of the current block and the property of the vector of the co-located block using the POC of the current picture, the POC of a current reference picture referred from the current picture, the POC of the co-located picture, and the POC of a co-located reference picture referred from the co-located picture.

The predictive motion vector generating unit may determine that the property of the vector of the current block and the property of the vector of the co-located block are parallax vectors when the POC of the current picture is identical to the POC of the current reference picture referred from the current picture and the POC of the co-located picture is identical to the POC of the co-located reference picture referred from the co-located picture.

The predictive vector generating unit may set the co-located block to be not available when the property of the vector of the current block is different from the property of the vector of the co-located block.

The property of the vector is a type of a reference picture, and the predictive vector generating unit may set the co-located block to be not available when the type of the reference picture of the current block is different from the type of the reference picture of the co-located block.

The property of the vector is a type of a reference picture, and the predictive vector generating unit may skip a process of searching a reference index when the type of the reference picture of the current block is a long reference type and the type of the reference picture of the co-located block is a long reference type.

The predictive vector generating unit may generate a predictive vector of the current parallax vector using a parallax vector of a reference block included in a picture of the same time as a current picture of a view different from the current view.

The predictive vector generating unit may scale the reference parallax vector based on a positional relationship between a current picture and a reference picture referred when generating a predictive motion vector to generate a predictive vector of the current parallax vector.

The predictive vector generating unit may generate a predictive vector of the current motion vector using a reference motion vector referred when generating a predictive motion vector, when encoding the current motion vector of the current block used in prediction using correlation in a temporal direction, and the difference vector generating unit may generate a difference vector between the current motion vector and the predictive vector generated by the predictive vector generating unit.

The predictive vector generating unit may generate the predictive vector of the current motion vector using a motion vector of the reference block included in a picture of the same time as the current picture of a view different from the current view.

The predictive vector generating unit may generate a predictive vector of the current motion vector using a motion vector of a reference block included in a picture of a time different from the current picture of the same view as the current view.

The predictive vector generating unit may scale the reference motion vector based on a positional relationship between the current picture and a reference picture referred when generating a predictive motion vector to generate a predictive vector of the current motion vector.

The predictive vector generating unit may generate the predictive vector using a vector of a block located at the same position as the current block in a state where a position of a pixel of a picture of the same time as the current picture of a view different from the current view is shifted.

The predictive vector generating unit may set a shift amount of the image according to a parallax vector of a neighboring region of the current block.

The predictive vector generating unit may use a parallax vector in an X-direction, of the neighboring block in which the value of a parallax vector in a Y-direction is not zero as the shift amount.

The predictive vector generating unit may use a value calculated from parallax vectors in an X-direction, of a plurality of the neighboring blocks in which the value of a parallax vector in a Y-direction is not zero as the shift amount.

The predictive vector generating unit may use an average value or a median value of the parallax vectors in the X-direction, of the plurality of the neighboring blocks in which the value of the parallax vector in the Y-direction is not zero as the shift amount of the image.

The predictive vector generating unit may set the shift amount of the image according to a global parallax vector.

Further, according to an aspect of the present disclosure, there is provided an image processing method of an image processing device, for allowing the image processing device to execute: generating a predictive vector of a current parallax vector of a current block used in prediction using correlation in a parallax direction using a reference parallax vector referred when generating a predictive motion vector, when encoding the current parallax vector; and generating a difference vector between the current parallax vector and the generated predictive vector.

According to another aspect of the present disclosure, there is provided an image processing device including: a predictive vector generating unit that generates a predictive vector of a current parallax vector of a current block used in prediction using correlation in a parallax direction using a reference parallax vector referred when generating a predictive motion vector, when decoding the current parallax vector; and an arithmetic unit that performs an operation of adding the predictive vector generated by the predictive vector generating unit to a difference vector between the current parallax vector and the predictive vector to reconstruct the current parallax vector.

Further, according to another aspect of the present disclosure, there is provided an image processing method of an image processing device, for allowing the image processing device to execute: generating a predictive vector of a current parallax vector of a current block used in prediction using correlation in a parallax direction using a reference parallax vector referred when generating a predictive motion vector, when decoding the current parallax vector; and performing an operation of adding the generated predictive vector to a difference vector between the current parallax vector and the predictive vector to reconstruct the current parallax vector.

According to still another aspect of the present disclosure, there is provided an image processing device including: a predictive vector generating unit that sets a co-located block to be not available when a type of a reference picture of a current block is different from a type of the reference picture of a co-located block included in a co-located picture of a different time from a current picture when encoding a current motion vector of the current block used in prediction using correlation in a temporal direction and generates a predictive vector of the current motion vector using a reference motion vector referred when generating a predictive motion vector; and a difference vector generating unit that generates a difference vector between the current motion vector and the predictive vector generated by the predictive vector generating unit.

Further, according to still another aspect of the present disclosure, there is provided an image processing method of an image processing device, for allowing the image processing device to execute: setting a co-located block to be not available when a type of a reference picture of a current block is different from a type of the reference picture of a co-located block included in a co-located picture of a different time from a current picture when encoding a current motion vector of the current block used in prediction using correlation in a temporal direction, and generating a predictive vector of the current motion vector using a reference motion vector referred when generating a predictive motion vector; and generating a difference vector between the current motion vector and the generated predictive vector.

In one aspect of the present disclosure, a predictive vector of a current parallax vector of a current block used in prediction using correlation in a parallax direction is generated using a reference parallax vector referred when generating a predictive motion vector, when encoding the current parallax vector; and a difference vector between the current parallax vector and the generated predictive vector is generated.

According to another aspect of the present disclosure, a predictive vector of a current parallax vector of a current block used in prediction using correlation in a parallax direction is generated using a reference parallax vector referred when generating a predictive motion vector, when decoding the current parallax vector; and an operation of adding the generated predictive vector to a difference vector between the current parallax vector and the predictive vector to reconstruct the current parallax vector is performed.

According to a still another aspect of the present disclosure, a co-located block is set to be not available when a type of a reference picture of a current block is different from a type of the reference picture of a co-located block included in a co-located picture of a different time from a current picture when encoding a current motion vector of the current block used in prediction using correlation in a temporal direction; a predictive vector of the current motion vector is generated using a reference motion vector referred when generating a predictive motion vector; and a difference vector between the current motion vector and the generated predictive vector is generated.

Effects of the Invention

According to the present disclosure, it is possible to process images. In particular, it is possible to suppress a decrease in encoding efficiency.

BRIEF DESCRIPTION OF THE DRAWINGS

FIG. 3 is a diagram for describing an example of reference image index determination conditions in a merge mode temporal correlation region.

FIG. 14 is a diagram for describing an example of scheme selection.

FIG. 15 is a diagram for describing the way of determining availability of a co-located vector.

FIG. 17 is a diagram illustrating an example of syntax of a sequence parameter set.

FIG. 18 is a diagram illustrating an example of syntax of a slice header.

FIG. 19 is a diagram illustrating an example of syntax of a prediction unit.

FIG. 58 is a diagram for describing an example of a predictive vector generating method.

FIG. 64 is a diagram for comparing examples of reference image types and vector properties.

FIG. 66 is a diagram for describing an example of handling of a temporal correlation block and a neighboring block.

FIG. 82 is a diagram for describing an example of handling of a neighboring block.

FIG. 90 is a diagram for describing still another example of handling of a temporal correlation block and a neighboring block.

MODE FOR CARRYING OUT THE INVENTION

Hereinafter, modes (hereinafter referred to as embodiments) for carrying out the present disclosure will be described. The description will be given in the following order:
1. First Embodiment (Image encoding device)
2. Second Embodiment (Image Decoding Device)
3. Third Embodiment (Image encoding device)
4. Fourth Embodiment (Image Decoding Device)
5. Fifth embodiment (Image encoding device and Image decoding device)
6. Sixth embodiment (Image encoding device and Image decoding device)
7. Seventh Embodiment (Computer)
8. Eighth Embodiment (Application example)

1. First Embodiment

[Motion Prediction]
In image encoding such as AVC (Advanced Video Coding) or HEVC (High Efficiency Video Coding), motion prediction using correlation in the temporal direction (between frames) is performed.

The AVC defines layered blocks such as macroblocks or sub-macroblocks as processing units of such a prediction process, and the HEVC defines coding units (CUs).

The CU which is also called a coding tree block (CTB) is a partial region of a picture-base image, which plays the same role as the macroblock in the AVC. The size of the macroblock is fixed to 16×16 pixels whereas the size of the CU is not fixed but is designated in image compression information in respective sequences.

For example, the largest size (LCU: Largest Coding Unit) and the smallest size (SCU: Smallest Coding Unit) of the CU are defined in a sequence parameter set (SPS) included in output encoded data.

Each LCU can be split into CUs of the smaller size that is not smaller than the size of SCU by setting split_flag=1. A CU having the size of 2N×2N is split into CUs having the size of N×N which is one layer below when the value of split_flag is "1."

Further, the CU is split into prediction units (PUs) which are regions (partial regions of a picture-base image) serving as processing units of intra or inter-prediction. Moreover, the CU is split into transform units (TUs) which are regions (partial regions of a picture-base image) serving as processing units of orthogonal transform. Presently, the HEVC can use 16×16 and 32×32 orthogonal transform in addition to 4×4 and 8×8 orthogonal transform.

In encoding schemes in which CUs are defined and various processes are performed in units of CUs as in the HEVC, it can be regarded that macroblocks in the AVC correspond to LCUs. However, the CUs have a layer structure, the size of LCUs on the uppermost layer is generally set to 128×128 pixels, for example, that is larger than the size of macroblocks of the AVC.

In the following description, the "region" includes all of the various types of regions described above (for example, macroblocks, sub-macroblocks, LCUs, CUs, SCUs, PUs, TUs, and the like) (and may be any one of the regions). The "region" may naturally include units other than the above-described units, and units that are not usable depending on the content of description are appropriately excluded.

Figure 1:
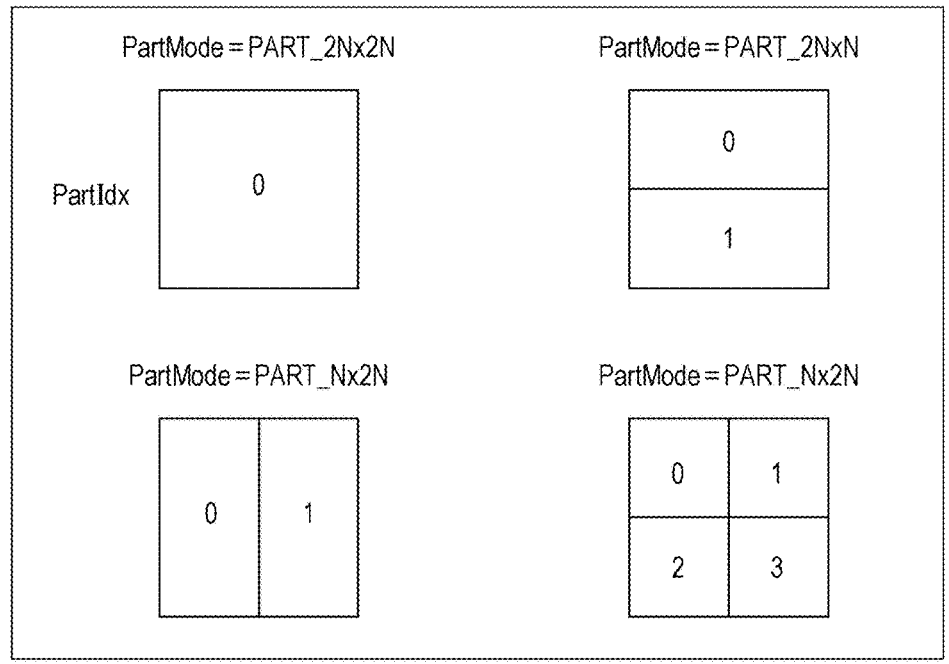
FIG. 1 is a diagram for describing an example of the types of prediction units.

FIG. 1 illustrates a configuration example of prediction units (PUs) which are the units of prediction process for CUs which are the units of encoding process. As illustrated in FIG. 1, four types of PUs can be formed for one CU. The four large squares illustrated in FIG. 1 indicate CUs, and rectangles or squares inside the large square indicate PUs. Numbers indicate the index of each PU but do not indicate the content of an image.

As illustrated in FIG. 1, in the example on the top-left corner, a CU includes one PU (2N×2N). That is, in this case, the CU is equivalent to the PU. Moreover, in the example on the top-right corner, the CU is vertically split into two regions and includes two horizontally long PUs (2N×N). Further, in the example on the bottom-left corner, the CU is horizontally divided into two regions and includes two vertically long PUs (N×2N). Moreover, in the example on the bottom-right corner, the CU is vertically and horizontally split into two regions (four regions in total) and includes four square PUs (N×N). A pattern that is to be used among these patterns is determined according to the content (the cost function value of prediction results) of an image.

Non-Patent Document 3 proposes a method (merge mode) called Motion Partition Merging as one motion information encoding scheme. In this method, two flags, that is, MergeFlag and MergeLeftFlag, are transmitted as merge information which is the information on the merge mode. MergeFlag=1 indicates that motion information of a current region (also referred to as a target region) X which is a processing target is the same as motion information of an upper neighboring region T adjacent to the current region or a left neighboring region L adjacent to the current region. In this case, MergeLeftFlag is included in the merge information and is transmitted. MergeFlag=0 indicates that the motion information of a current region X is different from the motion information of any one of the neighboring region T and the neighboring region L. In this case, the motion information of the current region X is transmitted.

When the motion information of the current region X is the same as the motion information of the neighboring region L, MergeFlag=1 and MergeLeftFlag=1 are satisfied. When the motion information of the current region X is the same as the motion information of the neighboring region T, MergeFlag=1 and MergeLeftFlag=0 are satisfied.

In such a merge mode, a temporally neighboring region (temporal correlation region) as well as the spatially neighboring regions L and T is considered to be used as a candidate region to be merged with the current region X.

Figure 2:
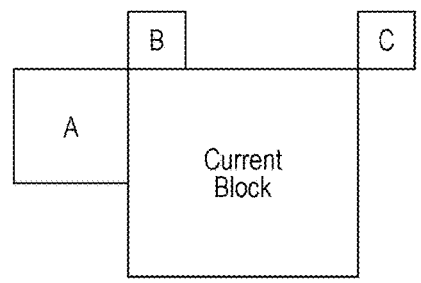
FIG. 2 is a diagram for describing an example of neighboring regions used for reference image index determination in a merge mode temporal correlation region.

As illustrated in FIG. 2, the reference image indexes are determined as in the table illustrated in FIG. 3 based on the reference image indexes of a left neighboring region A, an upper neighboring region B, a top-right neighboring region C adjacent to a current region (current block) which is a target to be processed.

In the table illustrated in FIG. 3, the second to fourth columns from the left respectively indicate the states of the reference image indexes of the neighboring regions A to C. The first column from the left is the determined reference image index. "x," "y," and "z" indicate optional natural numbers and "−1" indicates that the neighboring region cannot be referred to.

When there is only one region that can be referred to among the neighboring regions A to C, the reference image index of that block is used. Moreover, when there are two regions that can be referred to among the neighboring regions A to C, the smallest reference image index is used. Further, when all of the neighboring regions A to C cannot be referred to, the reference image index is set to 0.

Figure 4:
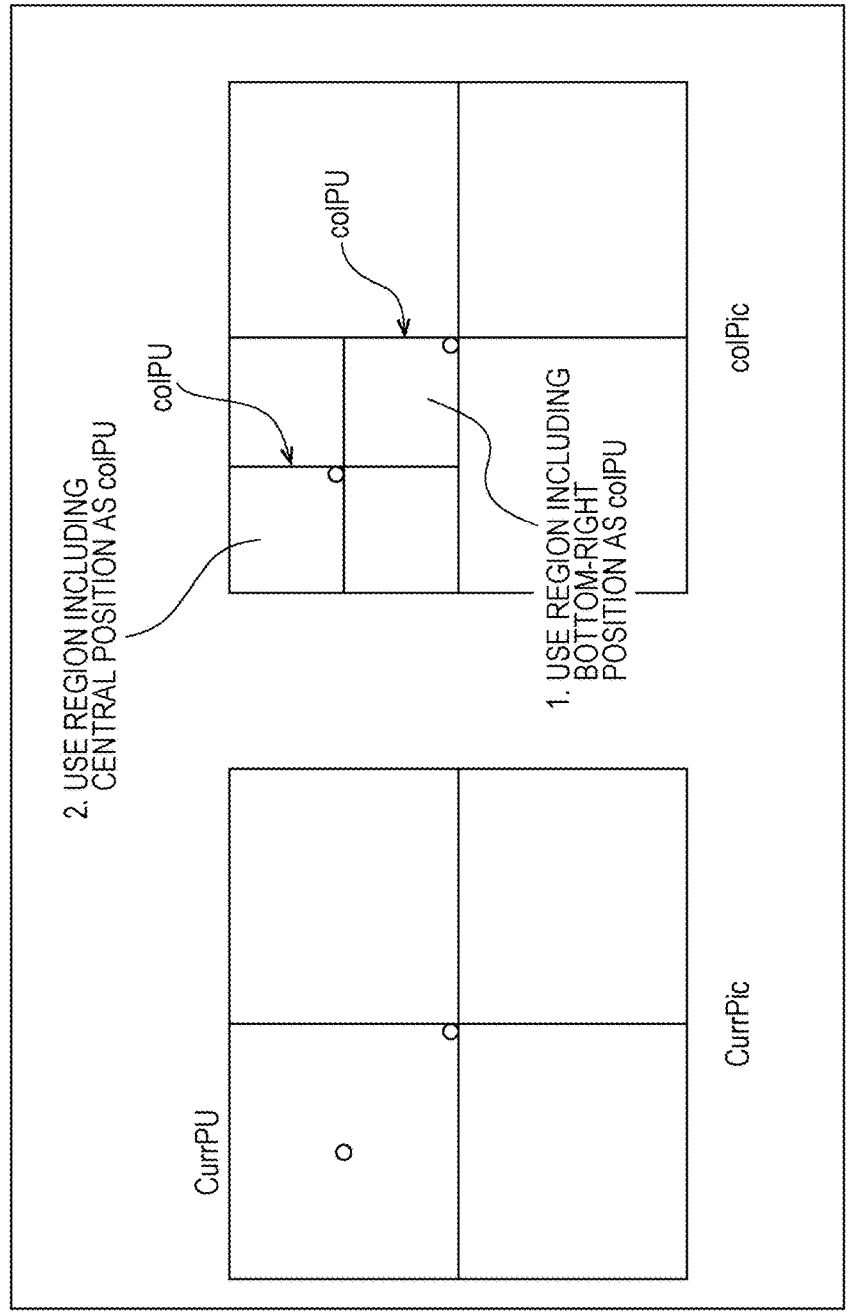
FIG. 4 is a diagram for describing an example of a temporal correlation region determination method.

The temporal correlation region, located temporally around the current region which is a processing target, is determined as illustrated in FIG. 4. In FIG. 4, the left regions indicate partial regions of a current picture (CurrPic) (also referred to as a target picture) which is a target to be processed, and a top-left rectangle among the regions is a current region (CurrPU). Moreover, the right regions in FIG. 4 indicate partial regions of a temporal correlation picture (colPic) located temporally around the current picture. In this temporal correlation picture, a region including a pixel at the same position as the bottom-right pixel of the current region is a temporal correlation region (colPU). When this region is not referable, a region including a pixel at the same position as the central pixel of a decoding region is set as the temporal correlation region (colPU).

Figure 5:
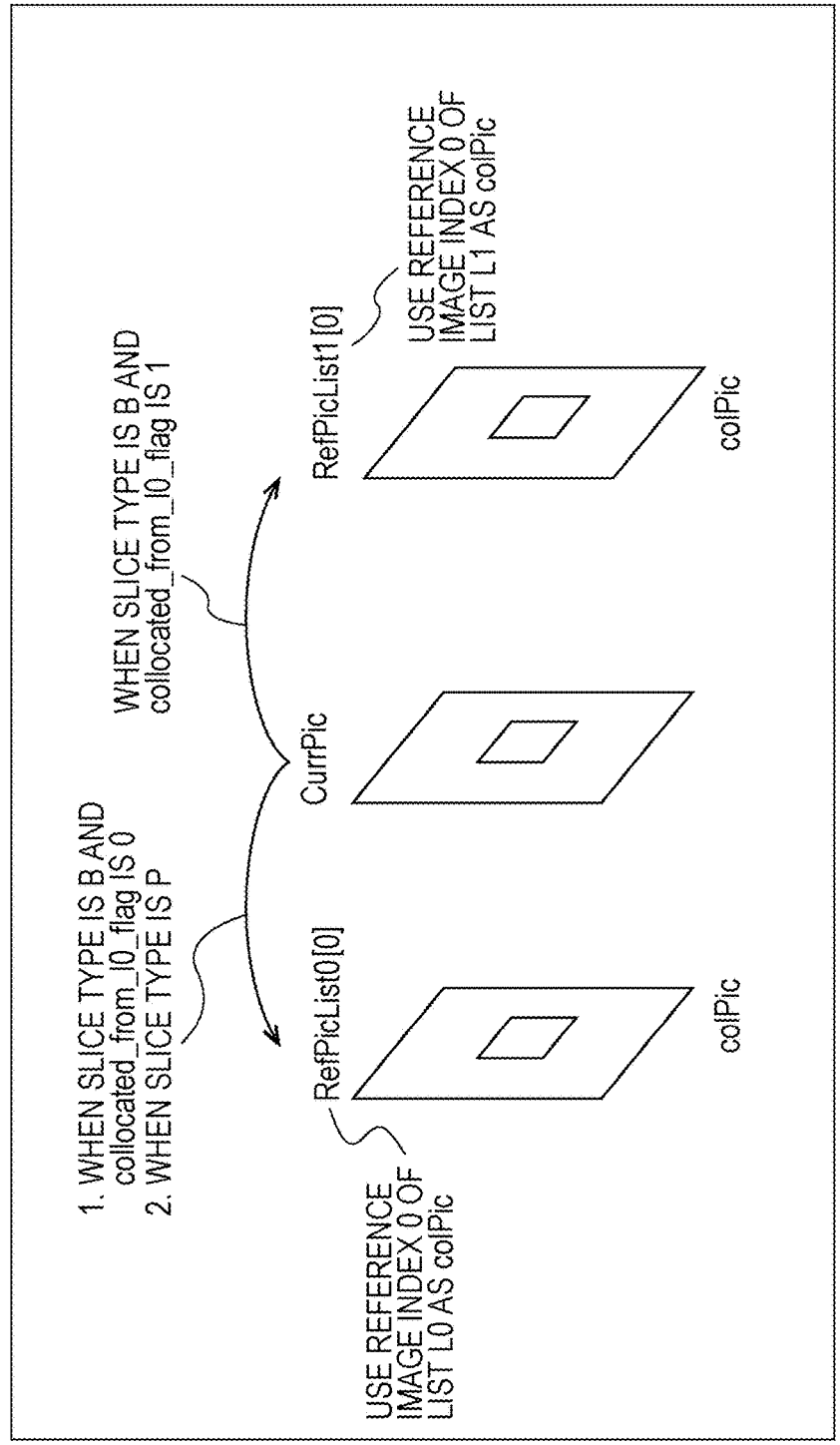
FIG. 5 is a diagram for describing an example of a method of determining an image that includes a temporal correlation region.

Moreover, the temporal correlation picture is determined as illustrated in FIG. 5. For example, when a current picture is a B-picture and collocated_from_l0_flag is "1," a picture indicated by a reference image index "0" of List L1 is used as a temporal correlation picture. Moreover, when a current picture is a P-picture or a B-picture and collocated_from_l0_flag is "0," a picture indicated by a reference image index "0" of List L0 is used as a temporal correlation picture.

Figure 6:
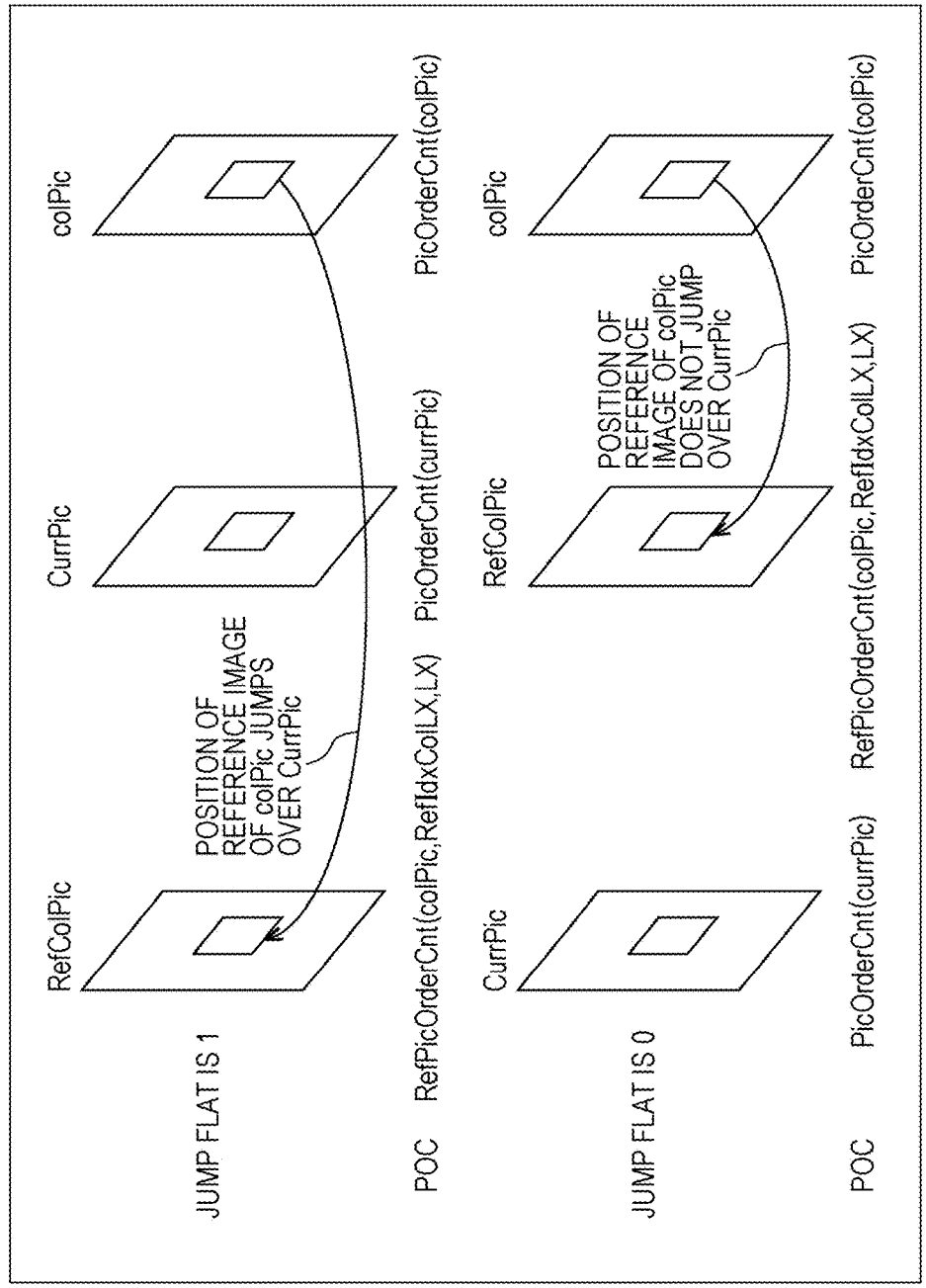
FIG. 6 is a diagram for describing an example of positional relationship between a current region and a temporal correlation region.

Further, a jump flag is set as illustrated in FIG. 6 according to a positional relationship between a current picture and a temporal correlation picture. For example, as illustrated on the upper side of FIG. 6, a temporal position of a temporal correlation picture in a reference image jumps over the current picture (the current picture is present between the temporal correlation picture and the reference image), the jump flag is set to "1."

Moreover, a temporal position of a temporal correlation picture in a reference image does not jump over the current picture (the current picture is not present between the temporal correlation picture and the reference image), the jump flag is set to "0." When the jump flag is "1," since the current region becomes an interpolation between the temporal correlation region and the reference image of the temporal correlation region, the reliability of the predictive vector is high.

Figure 7:
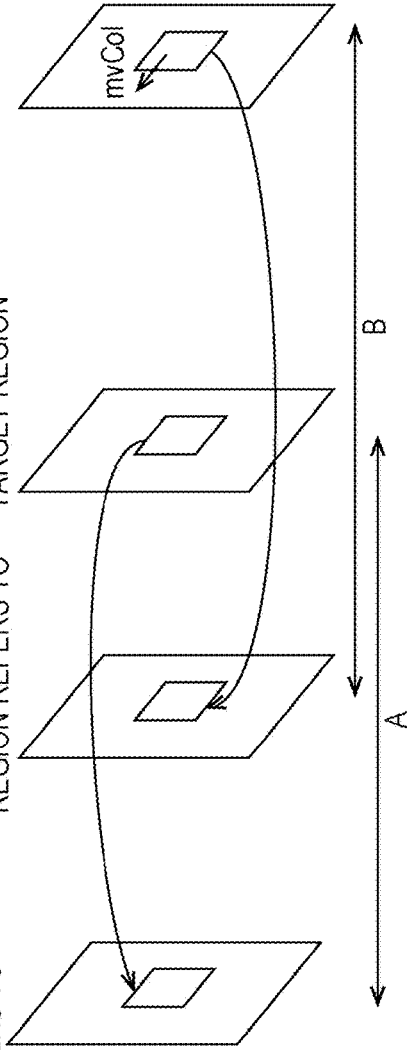
FIG. 7 is a diagram illustrating an example of scaling of a motion vector of a temporal correlation region.

Moreover, although a motion vector mvCol of the temporal correlation region is used when generating a predictive vector pmv, in this case, the motion vector of the temporal correlation region is scaled similarly to the example illustrated in FIG. 7. That is, scaling is performed as in the following expressions (1) and (2) based on a temporal distance A between a current region and a reference image of the current region and a temporal distance B between a temporal correlation region and a reference image of the temporal correlation region.

If $A$ and $B$ are identical, $pmv=mvCol$ (1)

If $A$ and $B$ are not identical, $pmv=mvCol\times(A/B)$ (2)

Figure 8:
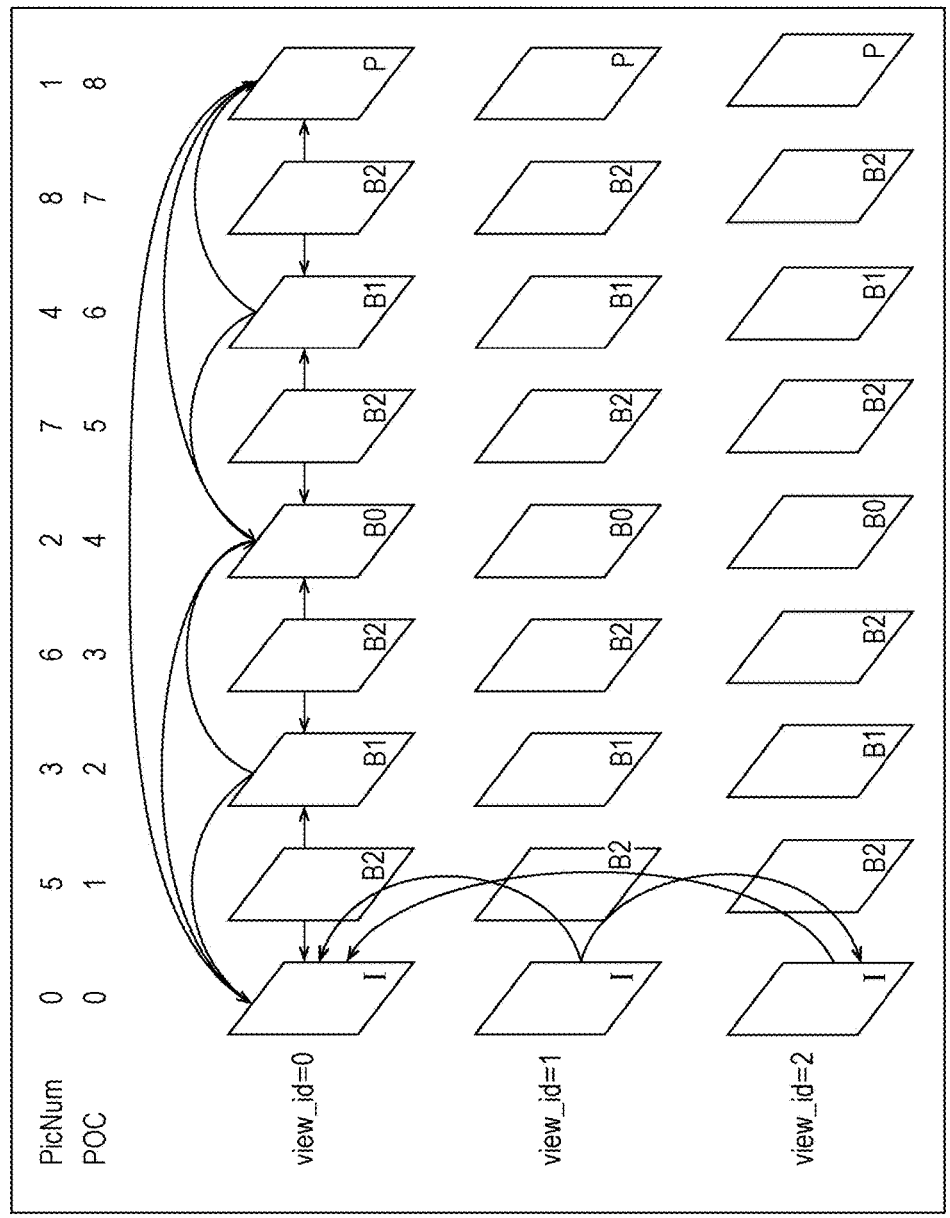
FIG. 8 is a diagram illustrating an example of a reference relationship of a 3-view image.

However, in the case of multi-view images, an image includes a plurality of views, and parallax prediction using correlation between views (in the parallax direction) is also performed. FIG. 8 illustrates an example of a reference relationship of a 3-view image.

The 3-view image illustrated in FIG. 8 includes images of three views 0, 1, and 2. In FIG. 8, POC indicates the index of time. Moreover, PicNum indicates the index of decoding order.

View 0 is called a base view and is encoded using temporal prediction that performs prediction using temporal correlation. View 1 is called a non-base view and is encoded using temporal prediction and parallax prediction. In the parallax prediction, an encoded view 0 and a view 2 can be referred to. View 2 is called a non-base view and is encoded using temporal prediction and parallax prediction. In the parallax prediction, the encoded view 0 can be referred to.

However, as described above, the conventional predictive vector relates to motion vectors only and encoding (prediction) of a parallax vector indicating a positional relationship between partial images that are the same or most similar between views, generated in parallax prediction across views has not been taken into consideration. The parallax vector is information that corresponds to a motion vector of temporal prediction and is used for temporal prediction that generates a predicted image of a current region using different images of different views of the same time. Thus, it may be not possible to predict parallax vectors appropriately and the encoding efficiency may decrease.

Therefore, in the present technique, as described below, prediction of parallax vectors and motion vectors (motion parallax vectors) of a multi-view image is performed.

Figure 9:
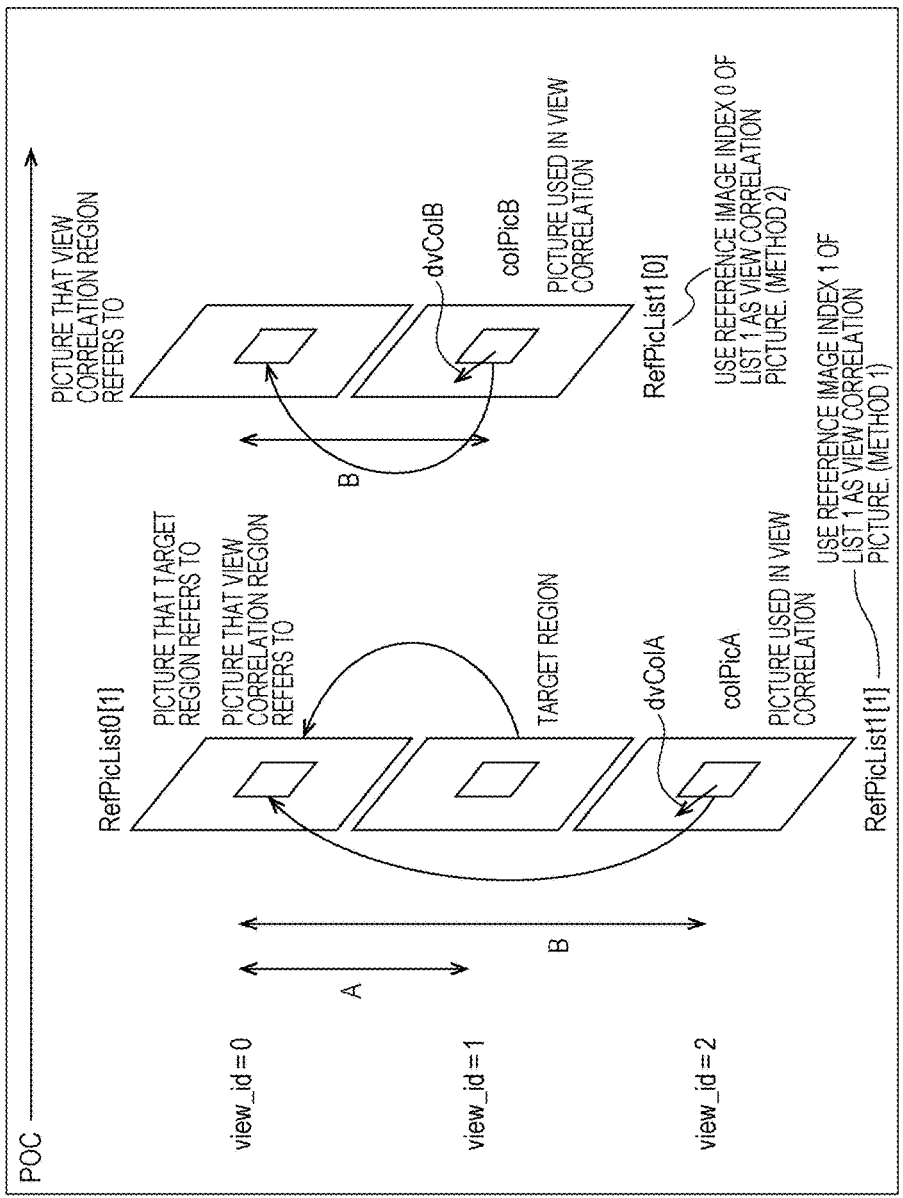
FIG. 9 is a diagram for describing an example of allocation of a reference image when predicting a parallax vector with respect to a current region.

For example, prediction of a parallax vector (also referred to as a current parallax vector) of a current region is performed similarly to the example illustrated in FIG. 9. In this example, a reference image of the same view (view_id=1) is allocated to a reference image index 0 of List 1, and a reference image of a different view (view_id=2) is allocated to a reference image index 1.

When the reference image index 0 (RefPicList[0]) of List 1 is used for a temporal correlation picture, the vector of a temporal correlation region (colPicB) included in the temporal correlation picture is employed as a predictive vector during a parallax vector that refers to different views of the same time.

Moreover, when a reference image index 1 (RefPicList [1]) of List 1 is used for a view correlation picture, the vector of a view correlation region (colPicA) included in the view correlation picture is employed as a predictive vector during a parallax vector that refers to different view of the same time.

That is, in the present technique, in order to predict a current parallax vector, all reference image indexes are used as candidates for a correlation picture. Moreover, it is determined whether the vector of each correlation region is a parallax vector similarly to the vector of the current region.

Figure 10:
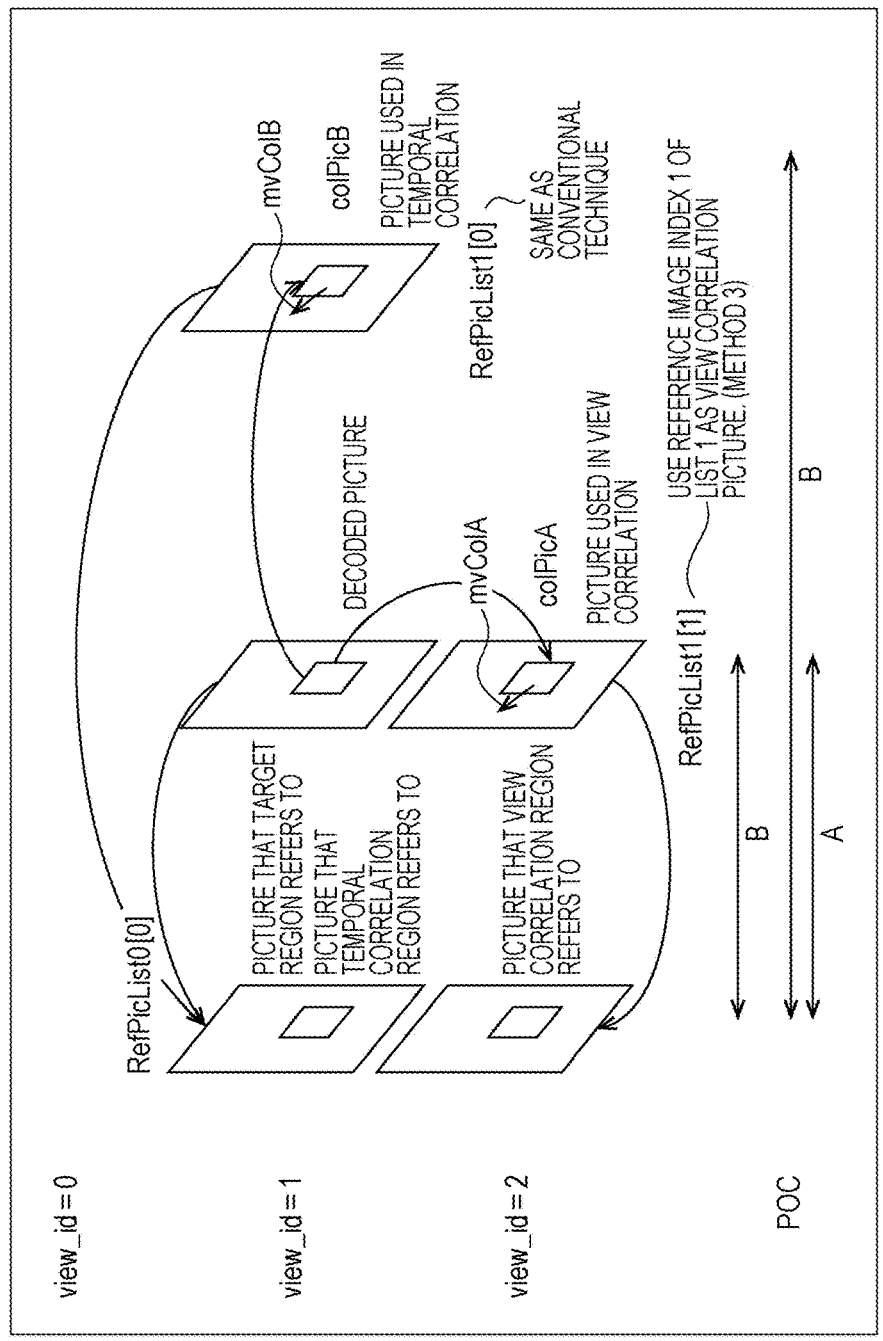
FIG. 10 is a diagram for describing an example of allocation of a reference image when predicting a motion vector with respect to a current region.

Moreover, prediction of a motion vector (also referred to as a current motion vector) of a current region is performed similarly to the example illustrated in FIG. 10. In this example, a reference image of the same view (view_id=1) is allocated to a reference image index 0 of List 1, and a reference image of a different view (view_id=2) is allocated to a reference image index 1.

When the reference image index 0 (RefPicList[0]) of List 1 is used for a temporal correlation picture, the vector of a temporal correlation region (colPicB) included in the temporal correlation picture is employed as a predictive vector during a motion vector that refers to different times of the same view.

Moreover, when a reference image index 1 (RefPicList [1]) of List 1 is used for a view correlation picture, the vector of a view correlation region (colPicA) included in the view correlation picture is employed as a predictive vector during a motion vector that refers to different times of the same view.

That is, in the present technique, in order to predict a current motion vector, all reference image indexes are used as candidates for a correlation picture. Moreover, it is determined whether the vector of each correlation region is a motion vector similarly to the vector of the current region.

Moreover, a scaling process when a parallax vector is used as a predictive vector is performed as follows. That is, the predictive vector is scaled based on an inter-view distance between the current region and the reference image thereof and an inter-view distance between the correlation region and the reference image thereof.

In the conventional technique, since only the motion vector is predicted, only a temporal distance is used. However, in the case of multi-view images, it is necessary to predict the parallax vector and thus the present technique also uses the inter-view distance. Accordingly, it is possible to improve the encoding efficiency.

[Image Encoding Device]

Figure 11:
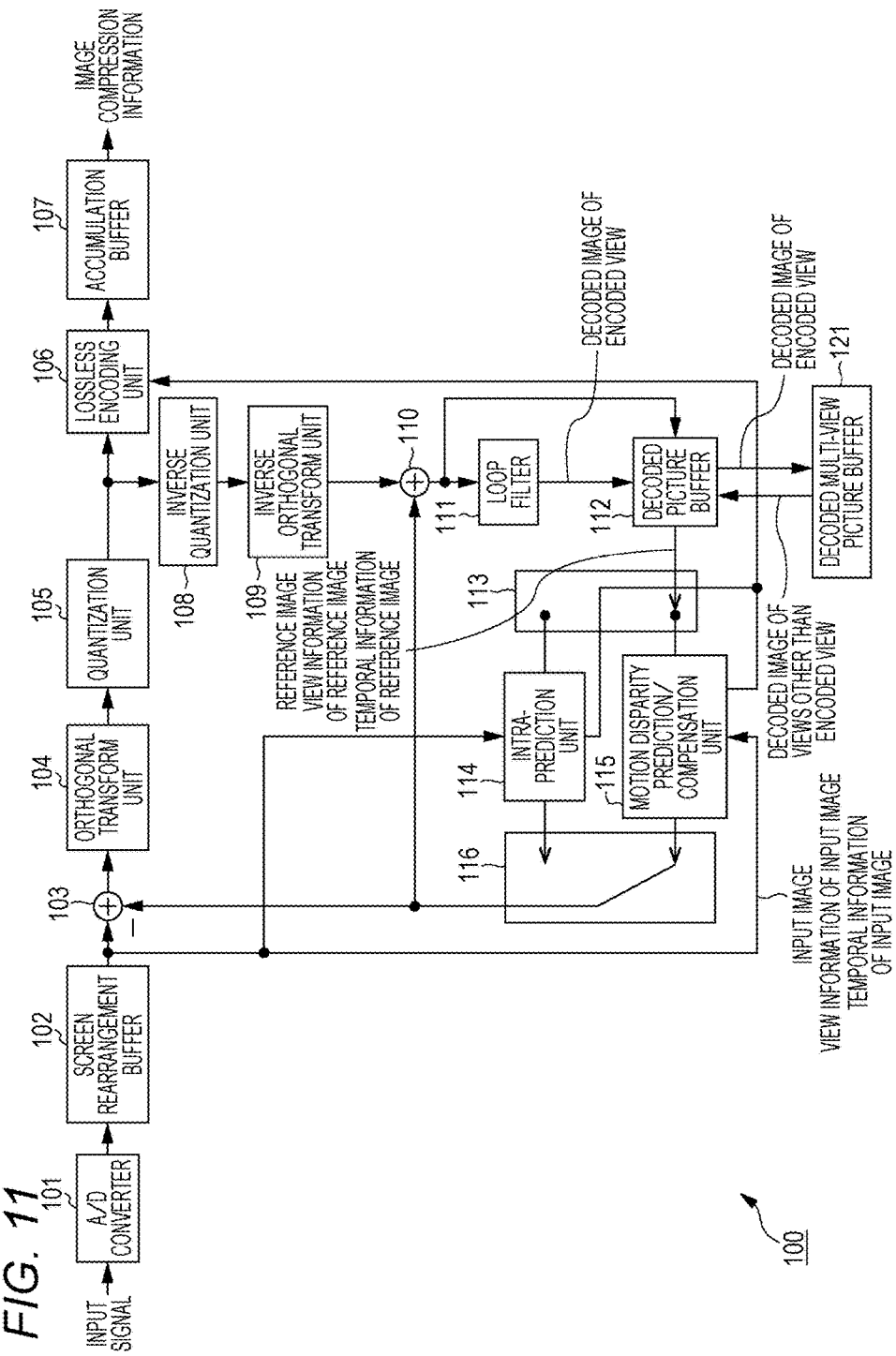
FIG. 11 is a block diagram illustrating a main configuration example of an image encoding device.

FIG. 11 is a block diagram illustrating a main configuration example of an image encoding device which is an image processing device.

An image encoding device 100 illustrated in FIG. 11 encodes image data using a prediction process similarly to the encoding scheme such as AVC or HEVC. However, the image encoding device 100 encodes a multi-view image including a plurality of view images. In the following description, a case where a 3-view image including three view images is processed as an example of a multi-view image will be described. However, actually, the image encoding device 100 can encode a multi-view image including an optional number of view points (views).

As illustrated in FIG. 11, the image encoding device 100 includes an A/D converter 101, a screen rearrangement buffer 102, an arithmetic unit 103, an orthogonal transform unit 104, a quantization unit 105, a lossless encoding unit 106, and an accumulation buffer 107. Moreover, the image encoding device 100 includes an inverse quantization unit 108, an inverse orthogonal transform unit 109, an arithmetic unit 110, a loop filter 111, a decoded picture buffer 112, a selector 113, an intra-prediction unit 114, a motion parallax prediction/compensation unit 115, a predicted image selector 116, and a decoded multi-view picture buffer 121.

The A/D converter 101 performs A/D conversion on input image data and supplies the converted image data (digital data) to the screen rearrangement buffer 102 which stores the image data. The screen rearrangement buffer 102 rearranges the frames of an image arranged in the stored order according to a GOP (Group Of Picture) so that the frames are rearranged in the order for encoding to obtain an image in which the frame order is rearranged and supplies the image to the arithmetic unit 103 together with the view ID and POC of the image.

The screen rearrangement buffer 102 supplies the image in which the frame order is rearranged to the intra-prediction unit 114 and the motion parallax prediction/compensation unit 115 together with the view ID and POC of the image. The view ID is information for identifying a viewpoint and the POC is information for identifying the time.

The arithmetic unit 103 subtracts a predicted image supplied from the intra-prediction unit 114 or the motion parallax prediction/compensation unit 115 via the predicted image selector 116 from the image read from the screen rearrangement buffer 102 to obtain difference information thereof and outputs the difference information to the orthogonal transform unit 104.

For example, in the case of an image which is subjected to intra-encoding, the arithmetic unit 103 subtracts the predicted image supplied from the intra-prediction unit 114 from the image read from the screen rearrangement buffer 102. Moreover, for example, in the case of an image which is subjected to inter-encoding, the arithmetic unit 103 subtracts the predicted image supplied from the motion parallax prediction/compensation unit 115 from the image read from the screen rearrangement buffer 102.

The orthogonal transform unit 104 performs orthogonal transform such as a discrete cosine transform or a Karhunen-Loeve transform with respect to the difference information supplied from the arithmetic unit 103. The orthogonal transform method is optional. The orthogonal transform unit 104 supplies the transform coefficients to the quantization unit 105.

The quantization unit 105 quantizes the transform coefficients supplied from the orthogonal transform unit 104. The quantization unit 105 sets quantization parameters based on the information on a target coding rate and performs quantization. The quantization method is optional. The quantization unit 105 supplies the quantized transform coefficients to the lossless encoding unit 106.

The lossless encoding unit 106 encodes the transform coefficients quantized by the quantization unit 105 according to an optional encoding scheme. Moreover, the lossless encoding unit 106 acquires intra-prediction information including information or the like that indicates an intra-prediction mode from the intra-prediction unit 114 and acquires inter-prediction information including information that indicates an inter-prediction mode, motion parallax vector information, and the like from the motion parallax prediction/compensation unit 115. Further, the lossless encoding unit 106 acquires filter coefficients and the like used in the loop filter 111.

The lossless encoding unit 106 encodes these various types of information according to an optional encoding scheme and incorporates (multiplexes) the information as part of the header information of the encoded data. The lossless encoding unit 106 supplies the encoded data obtained by encoding to the accumulation buffer 107 which accumulates the encoded data.

Examples of the encoding scheme of the lossless encoding unit 106 include a variable-length encoding and an arithmetic encoding. An example of the variable-length encoding includes context-adaptive variable length coding (CAVLC) which is defined in the H.264/AVC scheme. An example of the arithmetic encoding includes context-adaptive binary arithmetic coding (CABAC).

The accumulation buffer 107 temporarily stores the encoded data supplied from the lossless encoding unit 106. The accumulation buffer 107 outputs the encoded data stored therein to a recording device (recording medium) (not illustrated), a transmission line, and the like in the subsequent stage, for example, at a predetermined timing as a bit stream. That is, various items of encoded information are supplied to the decoding side.

Moreover, the transform coefficients quantized in the quantization unit 105 are also supplied to the inverse quantization unit 108. The inverse quantization unit 108 performs inverse quantization on the quantized transform coefficients according to a method corresponding to the quantization of the quantization unit 105. The inverse quantization method is optional as long as the method corresponds to the quantization process of the quantization unit 105. The inverse quantization unit 108 supplies the obtained transform coefficients to the inverse orthogonal transform unit 109.

The inverse orthogonal transform unit 109 performs inverse orthogonal transform on the transform coefficients supplied from the inverse quantization unit 108 according to a method corresponding to the orthogonal transform process of the orthogonal transform unit 104. The inverse orthogonal transform method is optional as long as the method corresponds to the orthogonal transform process of the orthogonal transform unit 104. The output (locally reconstructed difference information) obtained through the inverse orthogonal transform is supplied to the arithmetic unit 110.

The arithmetic unit 110 adds the predicted image supplied from the intra-prediction unit 114 or the motion parallax prediction/compensation unit 115 via the predicted image selector 116 to the inverse orthogonal transform result, that is, the locally reconstructed difference information, supplied from the inverse orthogonal transform unit 109 to obtain a locally reconstructed image (hereinafter referred to as a reconstructed image). The reconstructed image is supplied to the loop filter 111 or the decoded picture buffer 112.

The loop filter 111 includes a deblocking filter, an adaptive loop filter, or the like and performs a filtering process appropriately with respect to the decoded image supplied from the arithmetic unit 110. For example, the loop filter 111 removes a block distortion of the decoded image by performing a deblocking filtering process on the decoded image. Moreover, for example, the loop filter 111 improves image quality by performing a loop filtering process using a Wiener filter on the deblocking filtering results (the decoded image in which the block distortion is removed).

The loop filter 111 may perform an optional filtering process on the decoded image. Moreover, the loop filter 111 supplies information such as filter coefficients used for the filtering process to the lossless encoding unit 106 as necessary so that the information is encoded.

The loop filter 111 supplies the filtering result (hereinafter referred to as the decoded image) to the decoded picture buffer 112.

The decoded picture buffer 112 stores the reconstructed image supplied from the arithmetic unit 110 and the decoded image supplied from the loop filter 111. Moreover, the decoded picture buffer 112 stores the view ID and POC of the image.

The decoded picture buffer 112 supplies the reconstructed image (with the view ID and POC of the image) stored therein to the intra-prediction unit 114 via the selector 113 at a predetermined timing or based on a request from an external unit such as the intra-prediction unit 114. Moreover, the decoded picture buffer 112 supplies the decoded image (with the view ID and POC of the image) stored therein to the motion parallax prediction/compensation unit 115 via the selector 113 at a predetermined timing or based on a request from an external unit such as the motion parallax prediction/compensation unit 115.

The selector 113 indicates a supply destination of the image output from the decoded picture buffer 112. For example, in the case of intra-prediction, the selector 113 reads the image (reconstructed image) that is not filtered from the decoded picture buffer 112 and supplies the image to the intra-prediction unit 114 as neighboring pixels.

Moreover, for example, in the case of inter-prediction, the selector 113 reads the filtered image (decoded image) from the decoded picture buffer 112 and supplies the image to the motion parallax prediction/compensation unit 115 as a reference image.

Upon acquiring images (neighboring images) of neighboring regions located around a processing target region from the decoded picture buffer 112, the intra-prediction unit 114 performs intra-prediction (intra-field prediction) that generates a predicted image basically using a prediction unit (PU) as a processing unit, using the pixel values of the neighboring images. The intra-prediction unit 114 performs the intra-prediction in a plurality of modes (intra-prediction modes) prepared in advance.

The intra-prediction unit 114 generates predicted images in all candidate intra-prediction modes, evaluates the cost function values of the respective predicted images using the input image supplied from the screen rearrangement buffer 102, and selects an optimal mode. When the optimal intra-prediction mode is selected, the intra-prediction unit 114 supplies the predicted image generated in the optimal mode to the predicted image selector 116.

Moreover, the intra-prediction unit 114 supplies intra-prediction information including the information on intra-prediction such as the optimal intra-prediction mode appropriately to the lossless encoding unit 106 which encodes the intra-prediction information.

The motion parallax prediction/compensation unit 115 performs motion prediction and parallax prediction (inter-prediction) basically using PU as a processing unit, using the input image supplied from the screen rearrangement buffer 102 and the reference image supplied from the decoded picture buffer 112, performs a compensating process according to the detected motion parallax vector, and generates a predicted image (inter-prediction image information). The motion parallax prediction/compensation unit 115 performs such inter-prediction (inter-frame prediction) in a plurality of modes (inter-prediction modes) prepared in advance.

The motion parallax prediction/compensation unit 115 generates predicted images in all candidate inter-prediction modes, evaluates cost function values of the respective predicted images, and selects an optimal mode. When an optimal inter-prediction mode is selected, the motion parallax prediction/compensation unit 115 supplies the predicted image generated in the optimal mode to the predicted image selector 116.

Moreover, the motion parallax prediction/compensation unit 115 supplies inter-prediction information including the information on inter-prediction such as the optimal inter-prediction mode to the lossless encoding unit 106 which encodes the inter-prediction information.

The predicted image selector 116 selects a supplying source of the predicted image supplied to the arithmetic unit 103 and the arithmetic unit 110. For example, in the case of intra-encoding, the predicted image selector 116 selects the intra-prediction unit 114 as the supplying source of the predicted image and supplies the predicted image supplied from the intra-prediction unit 114 to the arithmetic unit 103 and the arithmetic unit 110. Moreover, for example, in the case of inter-encoding, the predicted image selector 116 selects the motion parallax prediction/compensation unit 115 as the supplying source of the predicted image and supplies the predicted image supplied from the motion parallax prediction/compensation unit 115 to the arithmetic unit 103 and the arithmetic unit 110.

Although the decoded picture buffer 112 stores the image of a processing target view (with the view ID and POC of the image) only, the decoded multi-view picture buffer 121 stores the images of respective viewpoints (views) (with the view IDs and POCs of the images). That is, the decoded multi-view picture buffer 121 acquires the decoded image (with the view ID and POC of the image) supplied to the decoded picture buffer 112 and stores the decoded image (with the view ID and POC of the image) together with the decoded picture buffer 112.

Although the decoded picture buffer 112 erases the decoded image when a processing target view changes, the decoded multi-view picture buffer 121 stores the decoded image as it was. Moreover, the decoded multi-view picture buffer 121 supplies the stored decoded image (with the view ID and POC of the image) to the decoded picture buffer 112 as a "decoded image of a non-processing target view" according to a request of the decoded picture buffer 112 or the like. The decoded picture buffer 112 supplies the "decoded image of the non-processing target view (with the view ID and POC of the image)" read from the decoded multi-view picture buffer 121 to the motion parallax prediction/compensation unit 115 via the selector 113.

[Motion Parallax Prediction/Compensation Unit]

Figure 12:
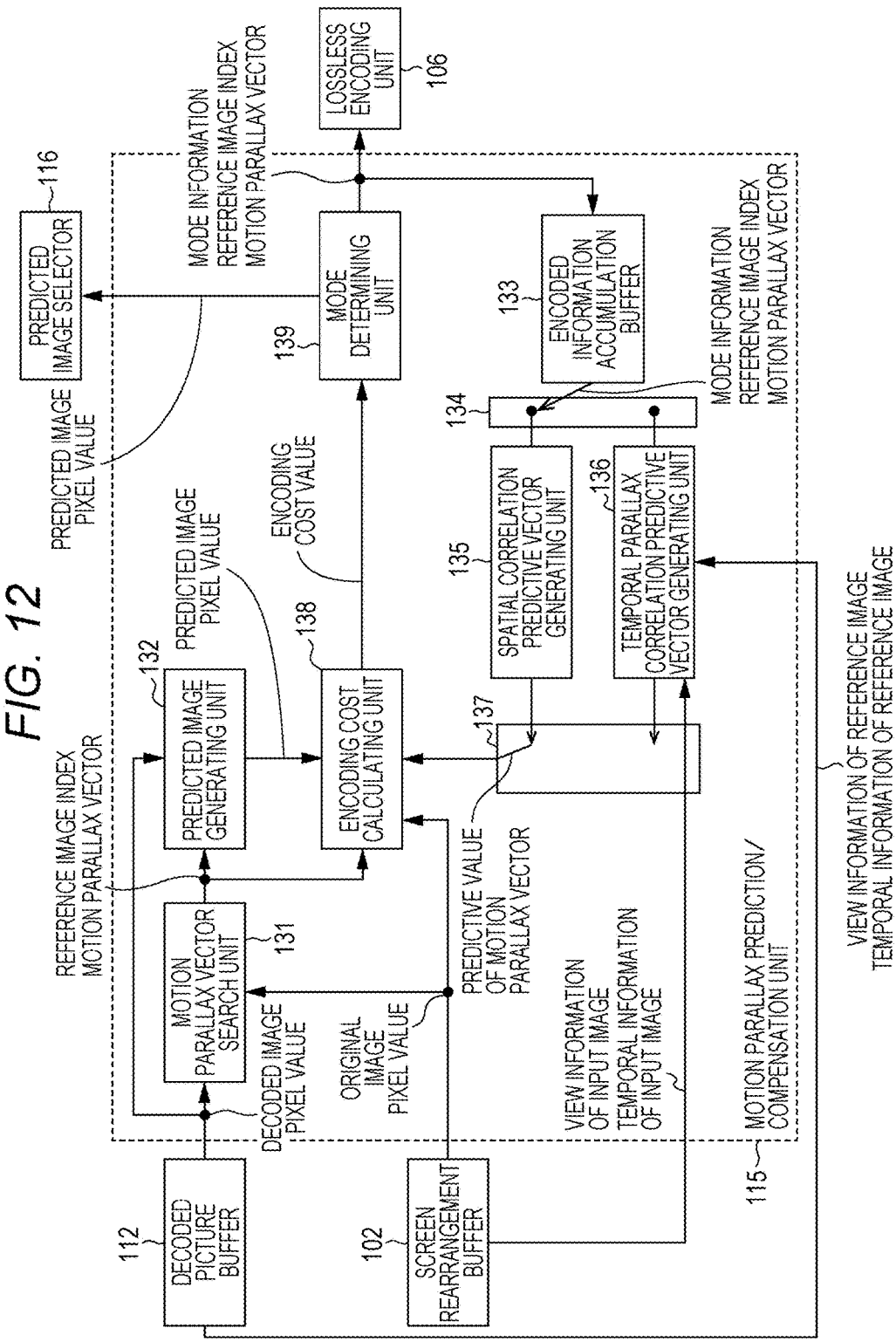
FIG. 12 is a block diagram illustrating a main configuration example of a motion parallax prediction/compensation unit.

FIG. 12 is a block diagram illustrating a main configuration example of the motion parallax prediction/compensation unit of FIG. 11.

As illustrated in FIG. 12, the motion parallax prediction/compensation unit 115 includes a motion parallax vector search unit 131, a predicted image generating unit 132, an encoded information accumulation buffer 133, and a selector 134. Moreover, the motion parallax prediction/compensation unit 115 includes a spatial correlation predictive vector generating unit 135, a temporal parallax correlation predictive vector generating unit 136, a selector 137, an encoding cost calculating unit 138, and a mode determining unit 139.

The motion parallax vector search unit 131 acquires a decoded image pixel value from the decoded picture buffer 112 and acquires an original image pixel value from the screen rearrangement buffer 102. The motion parallax vector search unit 131 determines a reference image index of a current region which is a processing target using these values, performs motion search in the temporal direction and the parallax direction, and generates a current motion vector and a current parallax vector.

In the following description, when it is not necessary to distinguish a motion vector indicating motion in the temporal direction (that is, between frames (pictures)) and a parallax vector indicating motion in the parallax direction (that is, between views) or both vectors are indicated, the vector(s) will be referred to as a motion parallax vector. A motion parallax vector of a current region is also referred to as a current motion parallax vector.

The motion parallax vector search unit 131 supplies the reference image index and the motion parallax vector to the predicted image generating unit 132 and the encoding cost calculating unit 138.

The predicted image generating unit 132 acquires the reference image index and the motion parallax vector from the motion parallax vector search unit 131 and acquires the decoded image pixel value from the decoded picture buffer 112. The predicted image generating unit 132 generates a predicted image of the current region using these values. The predicted image generating unit 132 supplies the predicted image pixel value to the encoding cost calculating unit 138.

The encoded information accumulation buffer 133 stores mode information indicating the mode selected as the optimal mode in the mode determining unit 139 and the reference image index and the motion parallax vector of the mode. The encoded information accumulation buffer 133 supplies the stored information to the selector 134 at a predetermined timing or according to a request from an external unit.

The selector 134 supplies the mode information, the reference image index, and the motion parallax vector supplied from the encoded information accumulation buffer 133 to the spatial correlation predictive vector generating unit 135 or the temporal parallax correlation predictive vector generating unit 136.

The spatial correlation predictive vector generating unit 135 and the temporal parallax correlation predictive vector generating unit 136 generate a predictive value (predictive vector) of the motion vector (current motion vector) of the current region which is a processing target.

The spatial correlation predictive vector generating unit 135 generates a predictive vector (spatial correlation predictive vector) using spatial correlation. More specifically, the spatial correlation predictive vector generating unit 135 acquires information (the mode information, the reference image index, the motion parallax vector, and the like) on the motion information of a neighboring region (spatially neighboring region) located spatially around the current region, of the same frame (current frame (also referred to as a target frame)) as the current region from the encoded information accumulation buffer 133 via the selector 134.

For example, the spatial correlation predictive vector generating unit 135 performs a median operation using the motion vectors (spatially neighboring motion vectors) of a plurality of spatially neighboring regions to generate a spatial correlation predictive vector. The spatial correlation predictive vector generating unit 135 supplies the generated spatial correlation predictive vector to the selector 137.

The temporal parallax correlation predictive vector generating unit 136 generates a predictive vector (temporal parallax correlation predictive vector (temporal correlation predictive vector or parallax correlation predictive vector)) using temporal correlation or parallax correlation. More specifically, for example, the temporal parallax correlation predictive vector generating unit 136 acquires information on motion information of a neighboring region (temporally neighboring region) located temporally around the current region from the encoded information accumulation buffer 133 via the selector 134. The temporally neighboring region indicates a region (or the surrounding regions thereof) located at the position corresponding to the current region of a frame (picture) different from the current frame, of the same view (current view (also referred to as a target view)) as the current region.

Moreover, for example, the temporal parallax correlation predictive vector generating unit 136 acquires information on motion information of a neighboring region (parallactically neighboring region) located parallactically around the current region from the encoded information accumulation buffer 133 via the selector 134. The parallactically neighboring region indicates a region (or the surrounding regions thereof) located at the position corresponding to the current region of a frame (picture) of the same time as the current frame, of a view different from the view (current view) of the current region.

For example, the temporal parallax correlation predictive vector generating unit 136 performs a median operation using the motion vectors (temporally neighboring motion vectors) of a plurality of temporally neighboring regions to generate a temporal correlation predictive vector. Moreover, for example, the temporal parallax correlation predictive vector generating unit 136 performs a median operation using the motion vectors (parallactically neighboring motion vectors) of a plurality of parallactically neighboring regions to generate a parallax correlation predictive vector.

The temporal parallax correlation predictive vector generating unit 136 supplies the temporal parallax correlation predictive vector, generated in this manner, to the selector 137.

The spatial correlation predictive vector generating unit 135 and the temporal parallax correlation predictive vector generating unit 136 respectively generate the predictive vector in each inter-prediction mode.

The selector 137 supplies the spatial correlation predictive vector supplied from the spatial correlation predictive vector generating unit 135 and the temporal parallax correlation predictive vector supplied from the temporal parallax correlation predictive vector generating unit 136 to the encoding cost calculating unit 138.

The encoding cost calculating unit 138 calculates a difference value (difference image) between the predicted image and the original image in each inter-prediction mode using the predicted image pixel value supplied from the predicted image generating unit 132 and the original image pixel value supplied from the screen rearrangement buffer 102. Moreover, the encoding cost calculating unit 138 calculates a cost function value (also referred to as an encoding cost value) in each inter-prediction mode using the difference image pixel value.

Further, the encoding cost calculating unit 138 selects a predictive vector that is closer to the motion parallax vector of the current region supplied from the motion parallax vector search unit 131 among the spatial correlation predictive vector and the temporal parallax correlation predictive vector supplied from the selector 137 as the predictive vector of the current region. Moreover, the encoding cost calculating unit 138 generates a difference motion parallax vector which is a difference between the predictive vector and the motion parallax vector of the current region. The encoding cost calculating unit 138 generates the difference motion parallax vector in each inter-prediction mode.

The encoding cost calculating unit 138 supplies the encoding cost value, the predicted image pixel value, and the difference motion parallax information including the difference motion parallax vector, of each inter-prediction mode, and prediction information including the predictive vector and the reference image index to the mode determining unit 139.

The mode determining unit 139 selects an inter-prediction mode in which the encoding cost value is minimized as the optimal mode. The mode determining unit 139 supplies the predicted image pixel value of the inter-prediction mode, selected as the optimal mode, to the predicted image selector 116.

When the inter-prediction is selected by the predicted image selector 116, the mode determining unit 139 supplies the mode information which is the information on the inter-prediction mode selected as the optimal mode, the difference motion parallax information and the prediction information in the inter-prediction mode to the lossless encoding unit 106 which encodes the information. These items of information are encoded and transmitted to the decoding side.

Moreover, the mode determining unit 139 supplies the mode information, the difference motion parallax information, and the prediction information in the inter-prediction mode selected as the optimal mode to the encoded information accumulation buffer 133 which stores the information. These items of information are used as information on the neighboring regions in a process for another region processed later than the current region.

[Temporal Parallax Correlation Predictive Vector Generating Unit]

Figure 13:
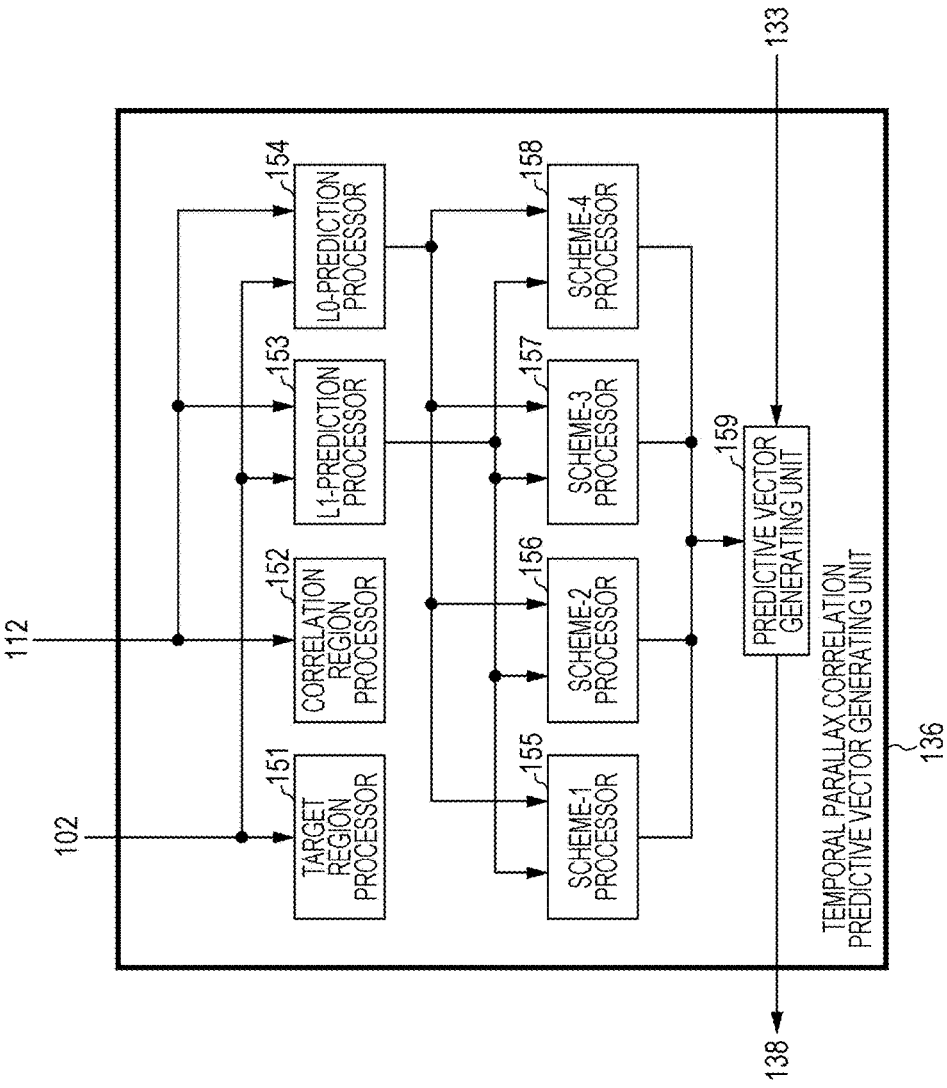
FIG. 13 is a block diagram illustrating a main configuration example of a temporal parallax correlation predictive vector generating unit.

FIG. 13 is a block diagram illustrating a main configuration example of the temporal parallax correlation predictive vector generating unit 136.

As illustrated in FIG. 13, the temporal parallax correlation predictive vector generating unit 136 includes a current region processor (target region processor) 151, a correlation region processor 152, an L1-prediction processor 153, an L0-prediction processor 154, a scheme-1 processor 155, a scheme-2 processor 156, a scheme-3 processor 157, a scheme-4 processor 158, and a predictive vector generating unit 159.

The current region processor 151 performs a process of acquiring the information on the current region. The current region processor 151 supplies the acquired information on the current region to the respective units ranging from the correlation region processor 152 to the L0-prediction processor 154. The correlation region processor 152 performs a process of acquiring the information on the correlation region.

The correlation region is a region that is referred to in order to use correlation with the current region. For example, the temporal correlation region is a region that is referred to in order to use temporal correlation with the current region and is a temporally neighboring region having a motion vector used for generating the temporal correlation predictive vector. Moreover, the parallax correlation region is a region that is referred to in order to use parallax correlation with the current region and is a parallactically neighboring region having a motion vector used for generating the parallax correlation predictive vector. The correlation region includes these regions.

The correlation region processor 152 supplies the information on the correlation region to the L1-prediction processor 153 and the L0-prediction processor 154.

The L1-prediction processor 153 performs a prediction process in the L1 direction. The L1-prediction processor 153 acquires necessary information from the screen rearrangement buffer 102 and the decoded picture buffer 112. Moreover, the L1-prediction processor 153 acquires the information supplied from the current region processor 151 and the correlation region processor 152. The L1-prediction processor 153 performs a prediction process in the L1 direction using these items of information.

Four methods of schemes 1 to 4 are prepared as the prediction process. The L1-prediction processor selects any one of the methods and provides information to a processor corresponding to the method selected among the scheme-1 processor 155 to the scheme-4 processor 158.

The L0-prediction processor 154 performs a prediction process in the L0 direction similarly to the L1-prediction processor 153.

Scheme 1 is a scheme in which a frame (reference image) of the same time as the current frame, of a view different from the current view, allocated to the reference image index 1 of List 1 is used as a correlation image, and when the vector of the correlation region is a parallax vector, the parallax vector (reference parallax vector) is employed as a predictive vector. The scheme-1 processor 155 performs a process for generating the predictive vector according to such a scheme. The scheme-1 processor 155 supplies various parameters obtained through the process to the predictive vector generating unit 159.

Scheme 2 is a scheme in which a frame (reference image) of the time different from the current frame, of the same view as the current view, allocated to the reference image index 0 of List 1 is used as a correlation image, and when the vector of the correlation region is a parallax vector, the parallax vector (reference parallax vector) is employed as a predictive vector. The scheme-2 processor 156 performs a process for generating the predictive vector according to such a scheme. The scheme-2 processor 156 supplies various parameters obtained through the process to the predictive vector generating unit 159.

Scheme 3 is a scheme in which a frame (reference image) of the time different from the current frame, of the same view as the current view, allocated to the reference image index 1 of List 1 is used as a correlation image, and when the vector of the correlation region is a motion vector, the motion vector (reference parallax vector) is employed as a predictive vector. The scheme-3 processor 157 performs a process for generating the predictive vector according to such a scheme. The scheme-3 processor 157 supplies various parameters obtained through the process to the predictive vector generating unit 159.

Scheme 4 is a scheme in which a frame (reference image) of the time different from the current frame, of the same view as the current view, allocated to the reference image index 0 of List 1 is used as a correlation image, and when the vector of the correlation region is a motion vector, the motion vector (reference parallax vector) is employed as a predictive vector. The scheme-4 processor 158 performs a process for generating the predictive vector according to such a scheme. The scheme-4 processor 158 supplies various parameters obtained through the process to the predictive vector generating unit 159.

The predictive vector generating unit 159 generates a temporal parallax correlation predictive vector using the information supplied from the scheme-1 processor 155 to the scheme-4 processor 158 and the view information, the time information, and the like of the reference image acquired from the decoded picture buffer 112. In this case, the predictive vector generating unit 159 performs a scaling process using the information supplied from the scheme-1 processor 155 to the scheme-4 processor 158. In this case, the predictive vector generating unit 159 performs scaling in the temporal direction for the motion correlation predictive vector and performs scaling in the parallax direction for the parallax correlation predictive vector. The predictive vector generating unit 159 supplies the generated temporal parallax correlation predictive vector to the encoding cost calculating unit 138 via the selector 137.

By doing so, the temporal parallax correlation predictive vector generating unit 136 can generate the parallax correlation predictive vector as well as the motion correlation predictive vector. Thus, the motion parallax prediction/compensation unit 115 can generate the predictive vector with high prediction accuracy even when the vector of the current region is the parallax vector. Accordingly, the image encoding device 100 can suppress a decrease in the encoding efficiency.

[Scheme Selection Example]

FIG. 14 illustrates examples in which each scheme is selected. As illustrated in FIG. 14, a region of which the positional relationship (whether a reference image is present in the temporal direction or in the parallax prediction) with the reference image is the same as the current region (target region) is selected as the correlation region. That is, the positional relationship between a current region and a reference image of the current region is identical to the positional relationship between the correlation region and a reference image of the correlation region. Moreover, the scheme is determined based on the positional relationship between the current region and the reference image of the current region and the positional relationship between the current region and the correlation region.

In the table of FIG. 14, the first to fourth rows from the bottom indicate the example of the positional relationship of the respective images, and A to E indicate the example of the value of the view ID or the POC of each row. That is, what is important here is not how much the value is but whether the view ID or the POC of the image is identical to those of the other image.

In the example of the fourth row from the bottom, both the current region and the correlation region have different reference images and view IDs but have identical POCs. That is, the vectors of the current region and the correlation region are parallax vectors. Moreover, the current region and the correlation region have different view IDs and have identical POCs. That is, the correlation region is an image of a view of a different frame, of the same time as the current region. Thus, Scheme 1 is selected as illustrated in the table of FIG. 14. Scheme 1 is effective in a region in which a variation in the parallax between viewpoints is constant.

In the example of the third row from the bottom, both the current region and the correlation region have different reference images and view IDs but have identical POCs. That is, the vectors of the current region and the correlation region are parallax vectors. Moreover, the current region and the correlation region have identical view IDs and have different POCs. That is, the correlation region is an image of a frame of a different time, of the same view as the current region. Thus, Scheme 2 is selected as illustrated in the table of FIG. 14. Scheme 2 is effective when a change in temporal motion is small.

In the example of the second row from the bottom, both the current region and the correlation regions have identical reference images and view IDs but have different POCs. That is, the vectors of the current region and the correlation region are motion vectors. Moreover, the current region and the correlation region have different view IDs and have identical POCs. That is, the correlation region is an image of a view of a different frame, of the same time as the current region. Scheme 3 is selected as illustrated in the table of FIG. 14. Scheme 3 is effective when a change in the parallax amount between viewpoints is small.

In the example of the first row from the bottom, both the current region and the correlation region have identical reference images and view IDs but have different POCs. That is, the vectors of the current region and the correlation region are motion vectors. Moreover, the current region and the correlation region have identical view IDs and different POCs. That is, the correlation region is an image of a frame of a different time, of the same view as the current region. Thus, Scheme 4 is selected as illustrated in the table of FIG. 14.

That is, for example, when any one (for example, the left-eye image) of the left and right images of a 3D image is a base view and the other (for example, the right-eye image) is a dependent view, and in the dependent view, the property of a vector (coding vector) of the current region is identical to the property of a vector (co-located vector) of a correlation region (co-located block) of a frame of a different time of the same view, the co-located block is set to be available. In other words, in the dependent view, when the properties of the coding vector and the co-located vector are not identical, the co-located block is set to be not available. Naturally, the same can be applied to the base view.

For example, the L1-prediction processor 153 and the L0-prediction processor 154 of FIG. 13 perform such setting.

Whether or not the properties of the coding vector and the co-located vector are identical can be determined, for example, by comparing the POCs of the current region and the co-located block with the POCs of the respective reference images as illustrated in FIG. 15. For example, the L1-prediction processor 153 and the L0-prediction processor 154 of FIG. 13 perform such determination.

Figure 16:
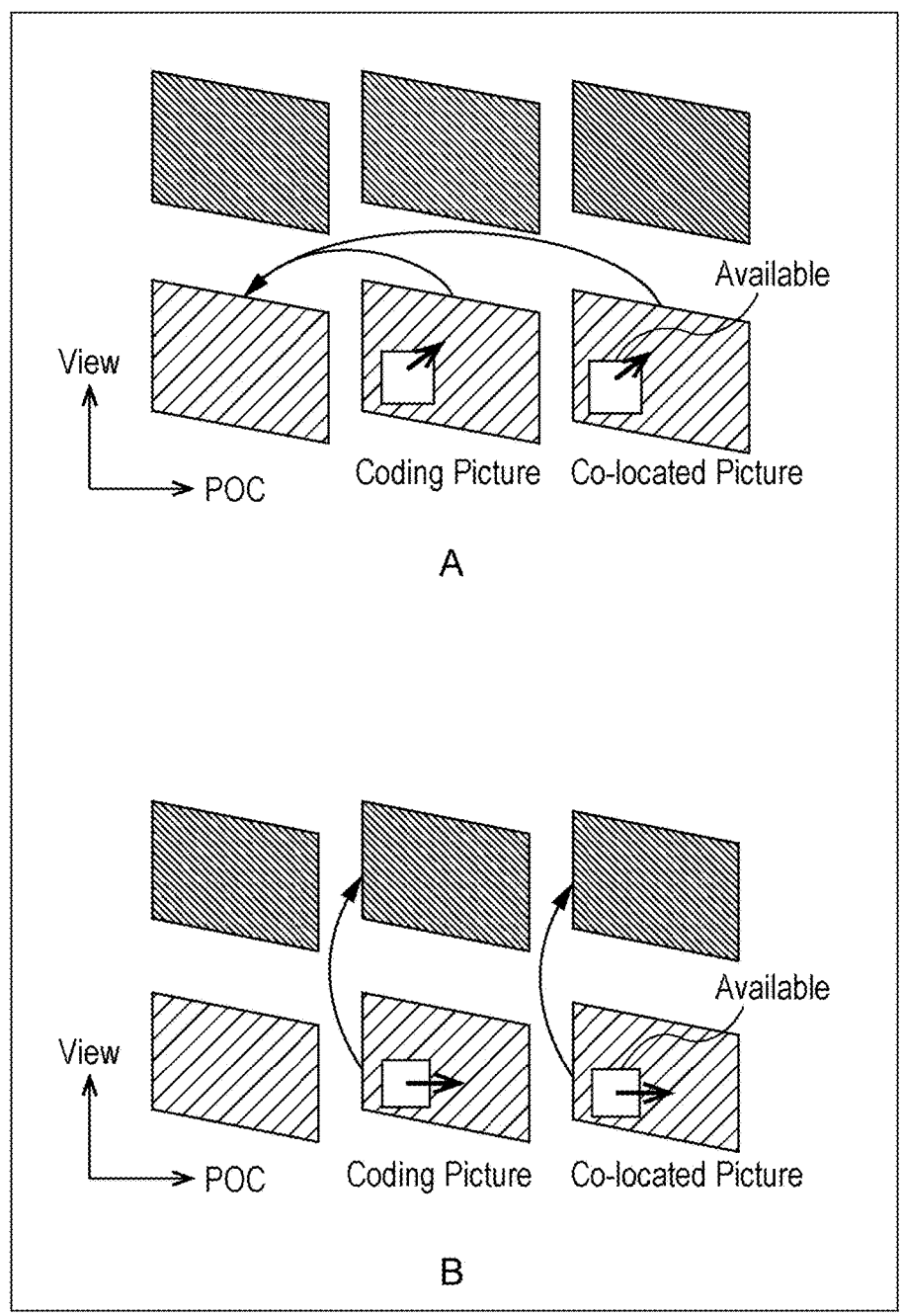
FIG. 16 is a diagram for describing an example in which a co-located vector is available.

For example, when the POC (CurrPOC) of the current region and the POC (CurrRefPOC) of the reference image of the current region are not identical and the POC (ColPOC) of the co-located block and the POC (ColRefPOC) of the reference image of the co-located block are not identical ((CurrPOC !=CurrRefPOC)&&(ColPOC !=ColRefPOC)), the L1-prediction processor 153 and the L0-prediction processor 154 determine that both the coding vector and the co-located block are motion vectors (A of FIG. 16).

Moreover, for example, when the POC (CurrPOC) of the current region and the POC (CurrRefPOC) of the reference image of the current region are identical and the POC (ColPOC) of the co-located block and the POC (ColRefPOC) of the reference image of the co-located block are identical ((CurrPOC==CurrRefPOC)&&(ColPOC==ColRefPOC)), the L1-prediction processor 153 and the L0-prediction processor 154 determine that both the coding vector and the co-located block are parallax vectors (inter-view vectors) (B of FIG. 16).

The L1-prediction processor 153 and the L0-prediction processor 154 set the availability of the co-located vector as illustrated in the table on the lower side of FIG. 15 based on the determination results.

For example, when both the coding vector and the co-located block are determined to be motion vectors or parallax vectors (inter-view vectors), the co-located vector is set to be available (A of FIG. 16 or B of FIG. 16).

Conversely, when one of the coding vector and the co-located block is determined to be the motion vector and the other is determined to be the parallax vector (inter-view vector), the co-located vector is set to be not available.

[Syntax]

FIG. 17 illustrates an example of the syntax of the sequence parameter set of this case. As illustrated on the tenth row to the third row from the bottom of FIG. 17, information such as a total number of views, an ID for identifying views, the number of parallax predictions in List L0, an ID of a view referred to in the parallax prediction in List L0, the number of parallax predictions in List L1, and an ID of a view referred to in the parallax prediction in List L1 is included in the sequence parameter set. These items of information are information necessary for multi-view images. In other words, the present technique can be applied without adding new syntax to the sequence parameter set.

FIG. 18 illustrates an example of the syntax of a slice header of this case. As illustrated on the eighth row from the bottom of FIG. 18, an ID for identifying views is included in the slice header. This information is information necessary for multi-view images. In other words, the present technique can be applied without adding new syntax to the slice header.

FIG. 19 illustrates an example of the syntax of a prediction unit of this case. As illustrated in FIG. 19, the present technique can be applied without adding new syntax to the prediction unit. However, since the application of the present technique increases the number of candidate correlation regions as compared to the conventional technique, it is necessary to expand the type of the syntax or change the content of the process for the merge mode ID and predictive vector ID.

[Flow of Encoding Process]

Next, the flow of the respective processes executed by the image encoding device 100 having such a configuration will be described. First, an example of the flow of the encoding process will be described with reference to the flowchart of FIG. 20.

In step S101, the A/D converter 101 performs A/D conversion on an input image. In step S102, the screen rearrangement buffer 102 stores the A/D-converted image and rearranges the respective pictures so that the pictures arranged in the display order is rearranged in the encoding order.

In step S103, the intra-prediction unit 114 performs an intra-prediction process. In step S104, the motion parallax prediction/compensation unit 115 performs an inter-motion prediction process. In step S105, the predicted image selector 116 selects any one of the predicted image generated by the intra-prediction and the predicted image generated by the inter-prediction.

In step S106, the arithmetic unit 103 calculates (generates a difference image) a difference between the image rearranged by the process of step S102 and the predicted image selected by the process of step S105. The generated difference image has a smaller data amount than the original image. Thus, it is possible to compress the data amount as compared to when the image is encoded as it is.

In step S107, the orthogonal transform unit 104 performs orthogonal transform on the difference image generated by the process of step S106. Specifically, orthogonal transform such as a discrete cosine transform or a Karhunen-Loeve transform is performed, and orthogonal transform coefficients are output. In step S108, the quantization unit 105 quantizes the orthogonal transform coefficients obtained by the process of step S107.

The difference image quantized by the process of step S108 is locally decoded in the following manner. That is, in step S109, the inverse quantization unit 108 performs inverse quantization on the quantized orthogonal transform coefficients (also referred to as quantization coefficients) generated by the process of step S108 according to a property corresponding to the property of the quantization unit 105. In step S110, the inverse orthogonal transform unit 109 performs inverse orthogonal transform on the orthogonal transform coefficient obtained by the process of step S109 according to a property corresponding to the property of the orthogonal transform unit 104. In this manner, the difference image is reconstructed.

In step S111, the arithmetic unit 110 adds the predicted image selected in step S105 to the difference image generated in step S110 to generate a locally decoded image (reconstructed image). In step S112, the loop filter 111 performs a loop filtering process including a deblocking filtering process or an adaptive loop filtering process appropriately with respect to the reconstructed image obtained by the process of step S111 to generate a decoded image.

In step S113, the decoded picture buffer 112 and the decoded multi-view picture buffer 121 store the decoded image generated by the process of step S112 and the reconstructed image generated by the process of step S111.

In step S114, the lossless encoding unit 106 encodes the orthogonal transform coefficients quantized by the process of step S108. That is, lossless encoding such as variable-length encoding or arithmetic encoding is performed with respect to the difference image. The lossless encoding unit 106 encodes information on prediction, information on quantization, information on the filtering process, and the like and adds the encoded information to a bit stream.

In step S115, the accumulation buffer 107 accumulates the bit stream obtained by the process of step S114. The encoded data accumulated in the accumulation buffer 107 is appropriately read and is transmitted to the decoding side via a transmission line or a recording medium.

In step S116, the quantization unit 105 controls the rate of the quantization operation based on the coding rate (occurrence coding rate) of the encoded data accumulated in the accumulation buffer 107 by the process of step S115 so that an overflow or an underflow does not occur.

When the process of step S116 ends, the encoding process ends.

[Flow of Inter-Motion Prediction Process]

Next, an example of the flow of an inter-motion prediction process executed in step S104 of FIG. 20 will be described with reference to the flowchart of FIG. 21.

In step S131, the motion parallax vector search unit 131 performs motion search with respect to the inter-prediction mode of a processing target to generate a motion parallax vector (motion vector or parallax vector) of the current region which is the processing target. In step S132, the predicted image generating unit 132 performs a compensation process using the motion parallax vector generated in step S131 to generate a predicted image. In step S133, the encoding cost calculating unit 138 generates a difference image between the predicted image generated in step S132 and the original image (input image).

In step S134, the encoding cost calculating unit 138 performs a merge mode process using the spatial correlation predictive vector generating unit 135, the temporal parallax correlation predictive vector generating unit 136, and the like.

In step S135, the encoding cost calculating unit 138 compares the motion parallax vector of the current region generated in step S131 and the predictive vector of the current region generated by the process of step S134 to determine whether a merge mode is to be applied to the current region.

When it is determined that both are not identical and the merge mode is not to be applied, the encoding cost calculating unit 138 proceeds to the process of step S136 and performs the parallax motion vector prediction process using the spatial correlation predictive vector generating unit 135, the temporal parallax correlation predictive vector generating unit 136, and the like. When the process of step S136 ends, the encoding cost calculating unit 138 proceeds to the process of step S137.

Moreover, in step S135, when it is determined that the motion parallax vector and the predictive vector of the current region are identical and the merge mode is to be applied to the current region, the encoding cost calculating unit 138 skips the process of step S136 and proceeds to step S137.

In step S137, the encoding cost calculating unit 138 determines whether the above process has been performed in all inter-prediction modes. When it is determined that a non-processed inter-prediction mode is present, the flow returns to step S131, and control is performed so that the subsequent processes are repeatedly performed with respect to the non-processed inter-prediction mode. That is, the processes of steps S131 to S137 are executed in the respective inter-prediction modes.

When it is determined that the process has been performed in all inter-prediction modes in step S137, the encoding cost calculating unit 138 proceeds to the process of step S138. In step S138, the encoding cost calculating unit 138 calculates the cost function value of each inter-prediction mode.

In step S139, the mode determining unit 139 determines an inter-prediction mode in which the cost function value (encoding cost value) calculated in step S138 is the smallest as an optimal mode (optimal inter-prediction mode).

In step S140, the predicted image generating unit 132 generates the predicted image in the optimal inter-prediction mode. The predicted image is supplied to the predicted image selector 116.

Figure 20:
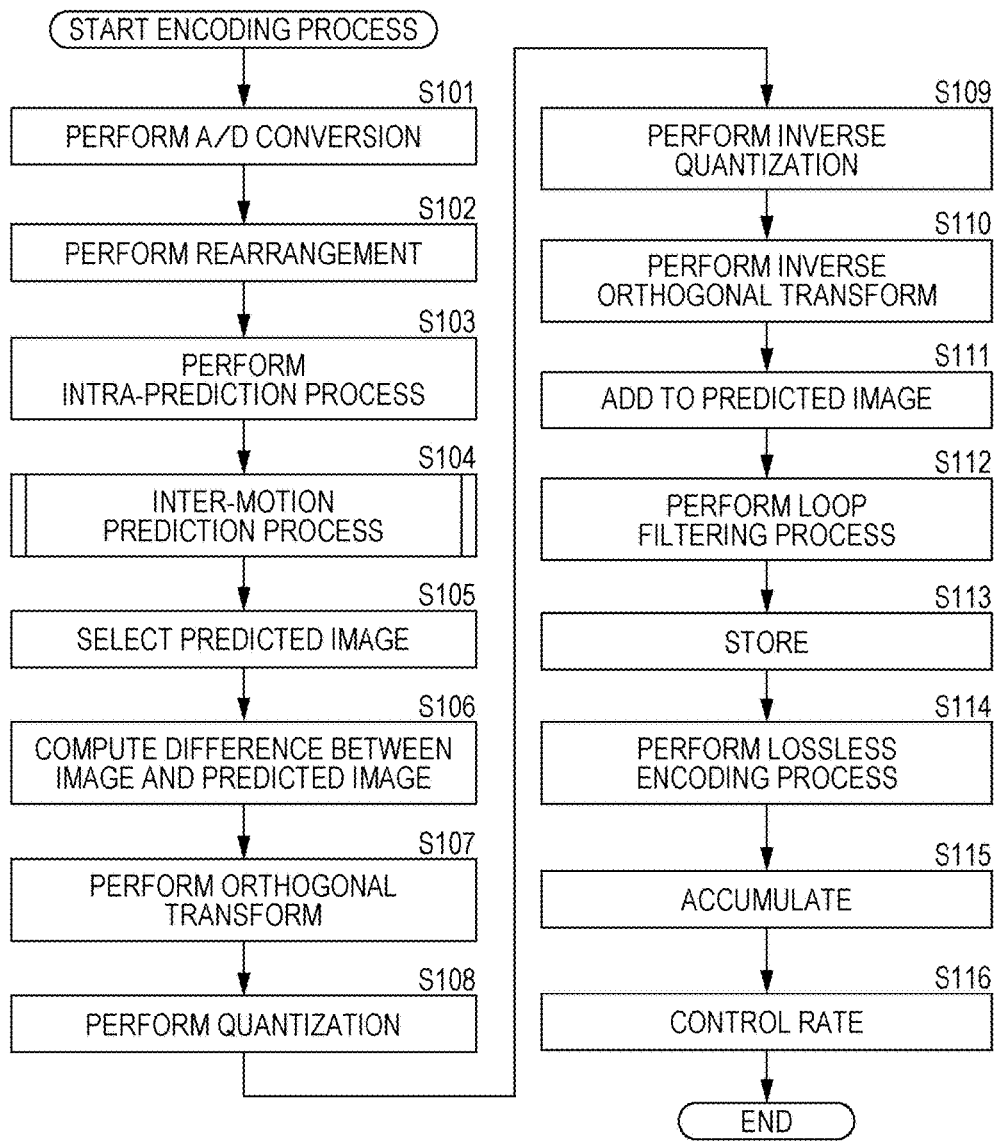
FIG. 20 is a flowchart for describing an example of the flow of an encoding process.

In step S141, the encoded information accumulation buffer 133 stores the mode information and the motion information (the motion parallax vector, the reference image index, and the like) of the optimal inter-prediction mode when the inter-prediction is selected in step S105 of FIG. 20. When the intra-prediction mode is selected, a zero vector is stored as the motion parallax vector. When the inter-prediction is selected in step S105 of FIG. 20, these items of information are supplied to and encoded by the lossless encoding unit 106 and the encoded information is transmitted to the decoding side.

When the process of step S141 ends, the encoded information accumulation buffer 133 ends the inter-motion prediction process and the flow proceeds to the flowchart of FIG. 20.

[Flow of Merge Mode Process]

Next, an example of the flow of the merge mode process executed in step S134 of FIG. 21 will be described with reference to the flowchart of FIG. 22.

When the merge mode process starts, in step S161, the spatial correlation predictive vector generating unit 135 performs a spatial correlation prediction process of generating a spatial correlation predictive vector using the correlation with a spatially neighboring region. In step S162, the temporal parallax correlation predictive vector generating unit 136 performs a temporal correlation prediction process of generating a temporal parallax correlation predictive vector using the correlation with a temporally neighboring region or a parallactically neighboring region.

In step S163, the encoding cost calculating unit 138 removes an overlapping vector from the spatial correlation predictive vector generated in step S161 and the temporal parallax predictive vector generated in step S162.

In step S164, the encoding cost calculating unit 138 determines whether a vector is present. When it is determined that there is at least one spatial correlation predictive vector or temporal parallax correlation predictive vector, the encoding cost calculating unit 138 proceeds to the process of step S165.

In step S165, the encoding cost calculating unit 138 determines whether a plurality of vectors is present. When it is determined that a plurality of vectors is present, the encoding cost calculating unit 138 proceeds to the process of step S166 to acquire a merge index. When it is determined that a plurality of vectors is not present, the encoding cost calculating unit 138 skips the process of step S166.

When a spatial correlation predictive vector or a temporal parallax correlation predictive vector identical to the motion vector of the current region is present, the encoding cost calculating unit 138 acquires the identical vector as a predictive vector in step S167 and acquires the reference image index in step S168.

Figure 21:
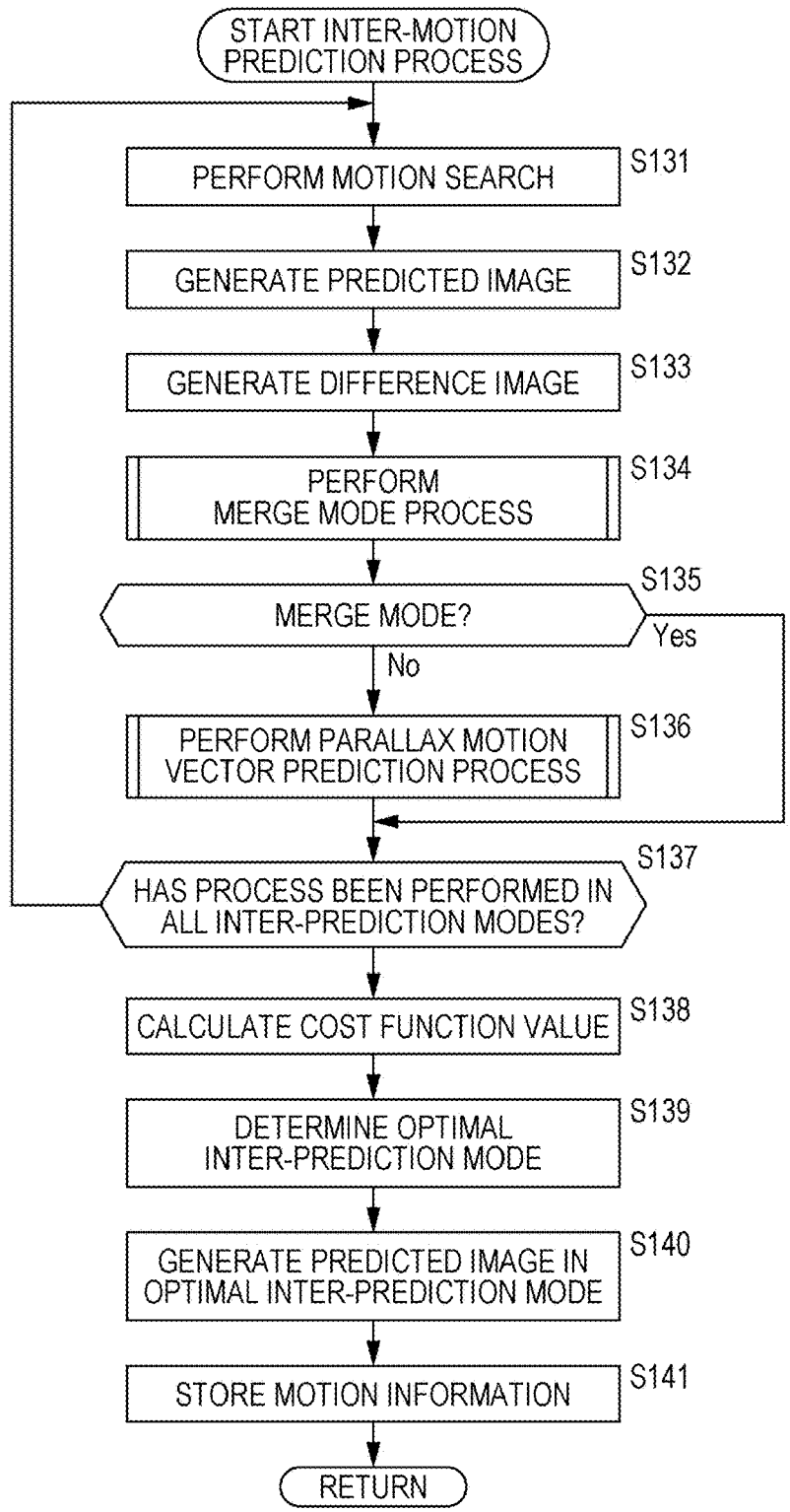
FIG. 21 is a flowchart for describing an example of the flowchart of an inter-motion prediction process.

When the process of step S168 ends, the encoding cost calculating unit 138 ends the merge mode process and the flow returns to the flowchart of FIG. 21.

Moreover, when it is determined that neither the spatial correlation predictive vector nor the temporal parallax correlation predictive vector is present in step S164, the encoding cost calculating unit 138 proceeds to the process of step S169.

In step S169, the encoding cost calculating unit 138 assigns an initial value (for example, a zero vector) to the predictive vector. Moreover, in step S170, the encoding cost calculating unit 138 assigns an initial value (for example, 0) to the reference image index.

When the process of step S170 ends, the encoding cost calculating unit 138 ends the merge mode process and the flow returns to the flowchart of FIG. 21.

[Flow of Parallax Motion Vector Prediction Process]

Next, an example of the flow of the parallax motion vector prediction process executed in step S136 of FIG. 21 will be described with reference to the flowchart of FIG. 23.

When the parallax motion vector prediction process starts, in step S191, the spatial correlation predictive vector generating unit 135 performs a spatial correlation prediction process to generate a spatial correlation predictive vector. In step S192, the temporal parallax correlation predictive vector generating unit 136 performs a temporal parallax correlation prediction process to generate a temporal parallax correlation predictive vector.

In step S193, the encoding cost calculating unit 138 removes an overlapping vector from the spatial correlation predictive vector generated in step S191 and the temporal parallax predictive vector generated in step S192.

The encoding cost calculating unit 138 selects a vector closest to the motion vector of the current region among the remaining vectors, creates a predictive vector index indicating the vector in step S194, and uses the vector as a predictive vector in step S195. When the process of step S195 ends, the encoding cost calculating unit 138 ends the parallax motion vector prediction process and the flow returns to the flowchart of FIG. 21.

[Flow of Temporal Parallax Correlation Prediction Process]

Next, an example of the flow of the temporal parallax correlation prediction process executed in step S162 of FIG. 22 or step S192 of FIG. 23 will be described with reference to the flowchart of FIGS. 24 to 27.

Figure 24:
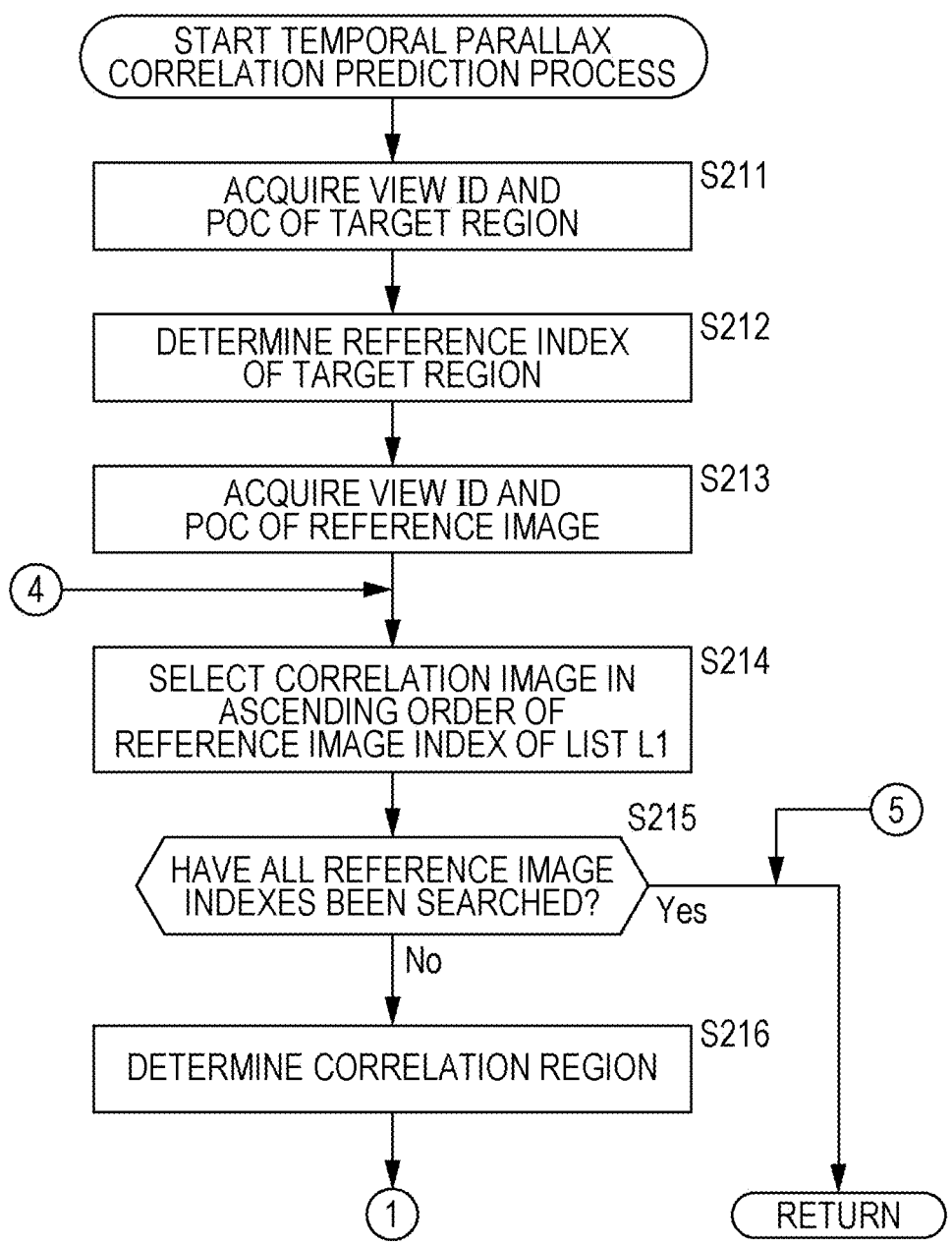
FIG. 24 is a flowchart for describing an example of the flow of a temporal parallax correlation prediction process.

When the temporal parallax correlation prediction process starts, the current region processor 151 acquires the view ID and POC of the current region in step S211 of FIG. 24. In step S212, the current region processor 151 determines a reference index of the current region. In step S213, the current region processor 151 acquires the view ID and POC of the reference image.

In step S214, the correlation region processor 152 selects the correlation image in ascending order of the reference image indexes of List L1. In step S215, the correlation region processor 152 determines whether all reference image indexes have been searched. When it is determined that all reference image indexes have been searched, the temporal parallax correlation prediction process ends, and the flow returns to the flowchart of FIG. 22 or FIG. 23.

Moreover, when it is determined in step S215 that a non-processed reference image index is present, the correlation region processor 152 proceeds to the process of step S216. In step S216, the correlation region processor 152 determines a correlation region and the flow proceeds to the flowchart of FIG. 25.

Figure 25:
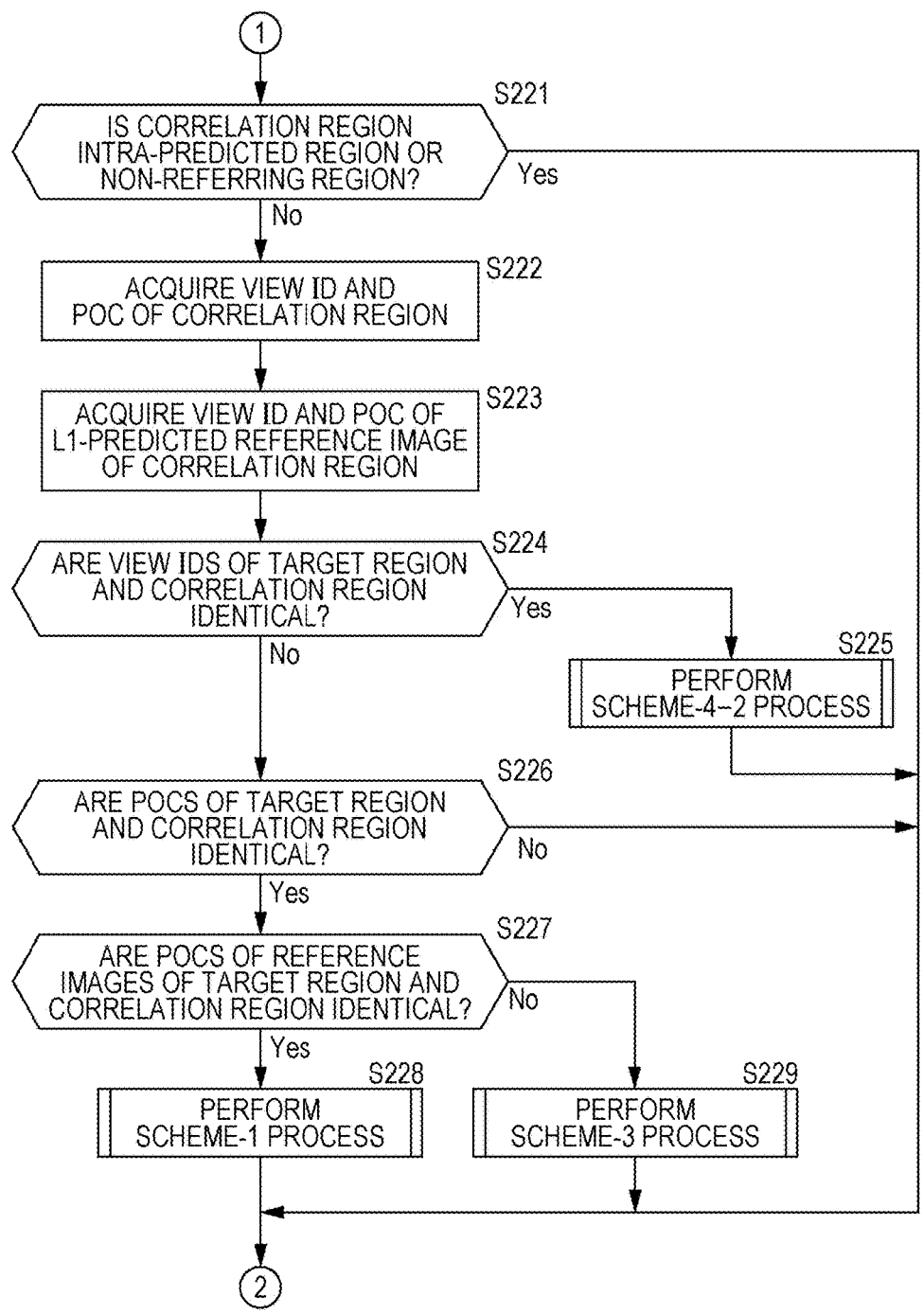
FIG. 25 is a flowchart continued from FIG. 22, for describing an example of the flow of the temporal parallax correlation prediction process.

In step S221 of FIG. 25, the correlation region processor 152 determines whether the correlation region is an intra-predicted region or a region that does not refer to another region. When it is determined that the correlation region is the intra-predicted region or the region that does not refer to another region, the correlation region processor 152 proceeds to the flowchart of FIG. 26.

Moreover, when it is determined in step S221 of FIG. 25 that the correlation region is the inter-predicted region and the region that does not refer to another region, the correlation region processor 152 proceeds to the process of step S222.

In step S222, the L1-prediction processor 153 acquires the view ID and POC of the correlation region. In step S223, the L1-prediction processor 153 acquires the view ID and POC of the L1-prediction reference image of the correlation region.

In step S224, the L1-prediction processor 153 determines whether the current region and the correlation region have identical view IDs. When both are identical, the correlation region is a co-located block. When it is determined that the current region and the correlation region have identical view IDs, the L1-prediction processor 153 proceeds to the process of step S225 to perform a scheme-4-2 process so that the predictive vector is generated according to Scheme 4 or 2. When the process of step S225 ends, the flow proceeds to the flowchart of FIG. 26.

Moreover, when it is determined in step S224 of FIG. 25 that the current region and the correlation region do not have identical view IDs, the L1-prediction processor 153 proceeds to the process of step S226.

In step S226, the L1-prediction processor 153 determines whether the current region and the correlation region have identical POCs. When it is determined that the current region and the correlation region do not have identical POCs, the L1-prediction processor 153 proceeds to the flowchart of FIG. 26.

Moreover, when it is determined in step S226 of FIG. 25 that the current region and the correlation region have identical POCs, the L1-prediction processor 153 proceeds to the process of step S227.

In step S227, the L1-prediction processor 153 determines whether the reference image of the current region and the reference image of the correlation region have identical POCs. When it is determined that the reference image of the current region and the reference image of the correlation region have identical POCs, the L1-prediction processor 153 proceeds to the process of step S228 to perform a scheme-1 process so that the predictive vector is generated according to Scheme 1. When the process of step S228 ends, the L1-prediction processor 153 proceeds to the flowchart of FIG. 26.

Moreover, when it is determined in step S227 of FIG. 25 that the reference image of the current region and the reference image of the correlation region do not have identical POCs, the L1-prediction processor 153 proceeds to the process of step S229 to perform a scheme-3 process so that the predictive vector is generated according to Scheme 3. When the process of step S229 ends, the L1-prediction processor 153 proceeds to the flowchart of FIG. 26.

Figure 26:
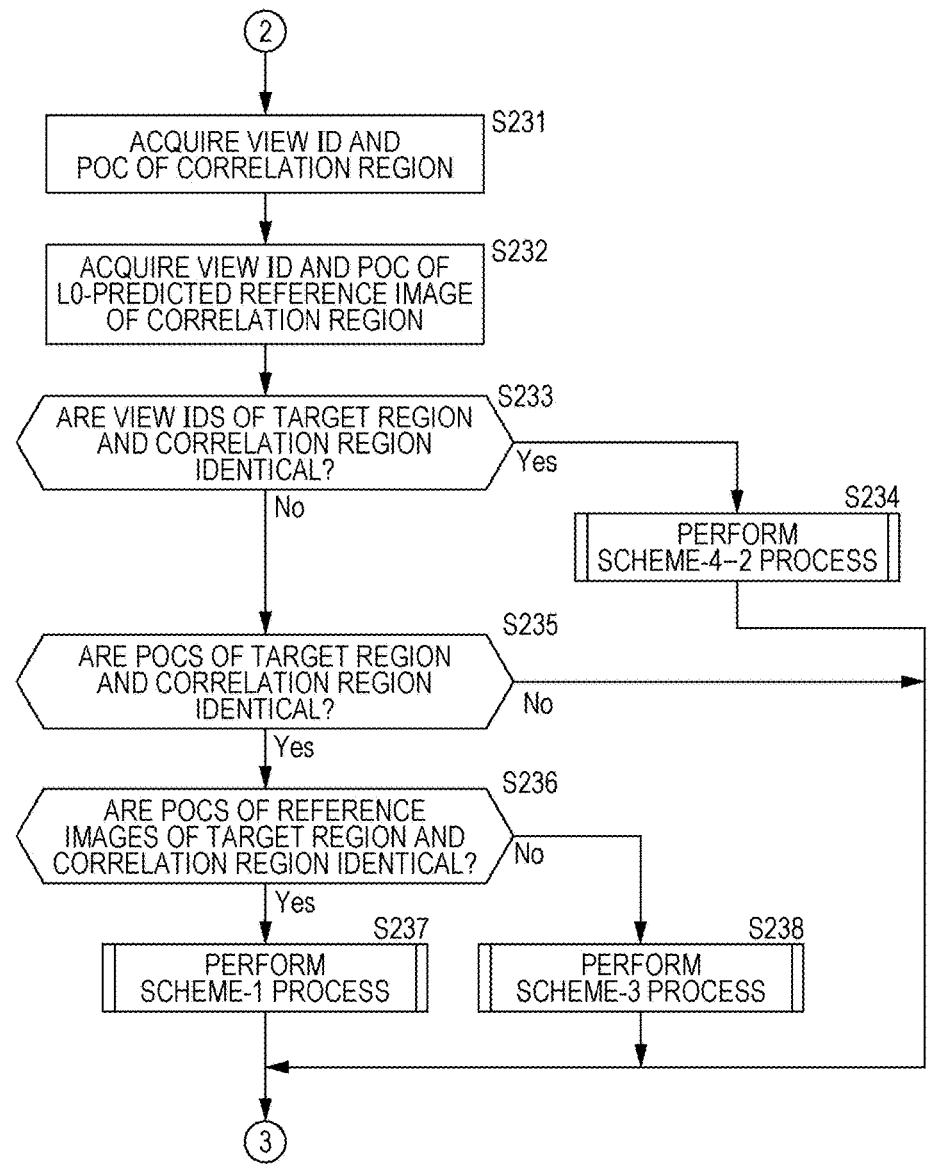
FIG. 26 is a flowchart continued from FIG. 23, for describing an example of the flow of the temporal parallax correlation prediction process.

In FIG. 26, the L0-prediction processor 154 performs the same process as the L1 prediction of FIG. 25 with respect to the L0 prediction of the correlation region. That is, the L0-prediction processor 154 performs the same processes of steps S231 to S238 as the processes of steps S222 to S229 of FIG. 25.

However, in the case of FIG. 26, the reference image of the correlation region is a L0-prediction reference image. Moreover, when the process of step S234, S237, or S238 ends, or when it is determined in step S235 that the current region and the correlation region do not have identical POCs, the L0-prediction processor 154 proceeds to the flowchart of FIG. 27.

Figure 27:
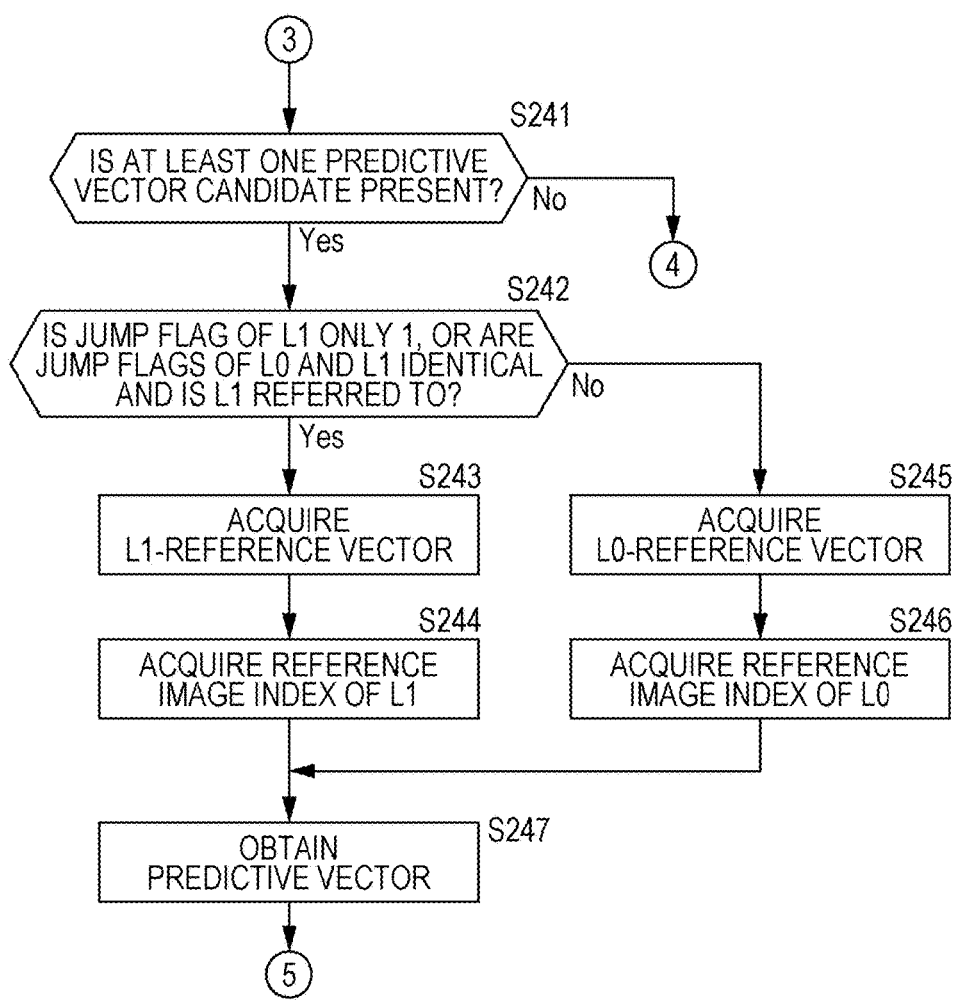
FIG. 27 is a flowchart continued from FIG. 24, for describing an example of the flow of the temporal parallax correlation prediction process.

In step S241 of FIG. 27, the predictive vector generating unit 159 determines whether at least one predictive vector candidate is present. When it is determined that no predictive vector candidate is present, the predictive vector generating unit 159 returns to the process of step S214 of FIG. 24.

Moreover, when it is determined in step S241 of FIG. 27 that at least one predictive vector candidate is present, the predictive vector generating unit 159 proceeds to the process of step S242. In step S242, the predictive vector generating unit 159 determines whether the jump flag of L1 only is 1 or whether the jump flags of L0 or L1 are identical, and L1 is referred to.

When it is determined that the jump flag of L1 only is 1 or that the jump flags of L0 and L1 are identical, and L1 is referred to, the predictive vector generating unit 159 proceeds to the process of step S243.

In step S243, the predictive vector generating unit 159 acquires an L1-reference vector. In step S244, the predictive vector generating unit 159 acquires a reference image index of L1 reference and the flow proceeds to step S247.

Moreover, when it is determined in step S242 that the jump flag of L1 is not 1 or the jump flag of L0 is 0, and that the jump flags of L0 and L1 are not identical or L1 is not referred to, the predictive vector generating unit 159 proceeds to the process of step S245.

In step S245, the predictive vector generating unit 159 acquires an L0-reference vector. In step S246, the predictive vector generating unit 159 acquires a reference image index of L0 reference and the flow proceeds to step S247.

In step S247, the predictive vector generating unit 159 uses the L1-reference vector or L0-reference vector acquired as the predictive vector. In this case, the predictive vector generating unit 159 scales the vector using the distance to the reference image in the current region or the correlation region and uses the scaling result as the predictive vector.

Figure 22:
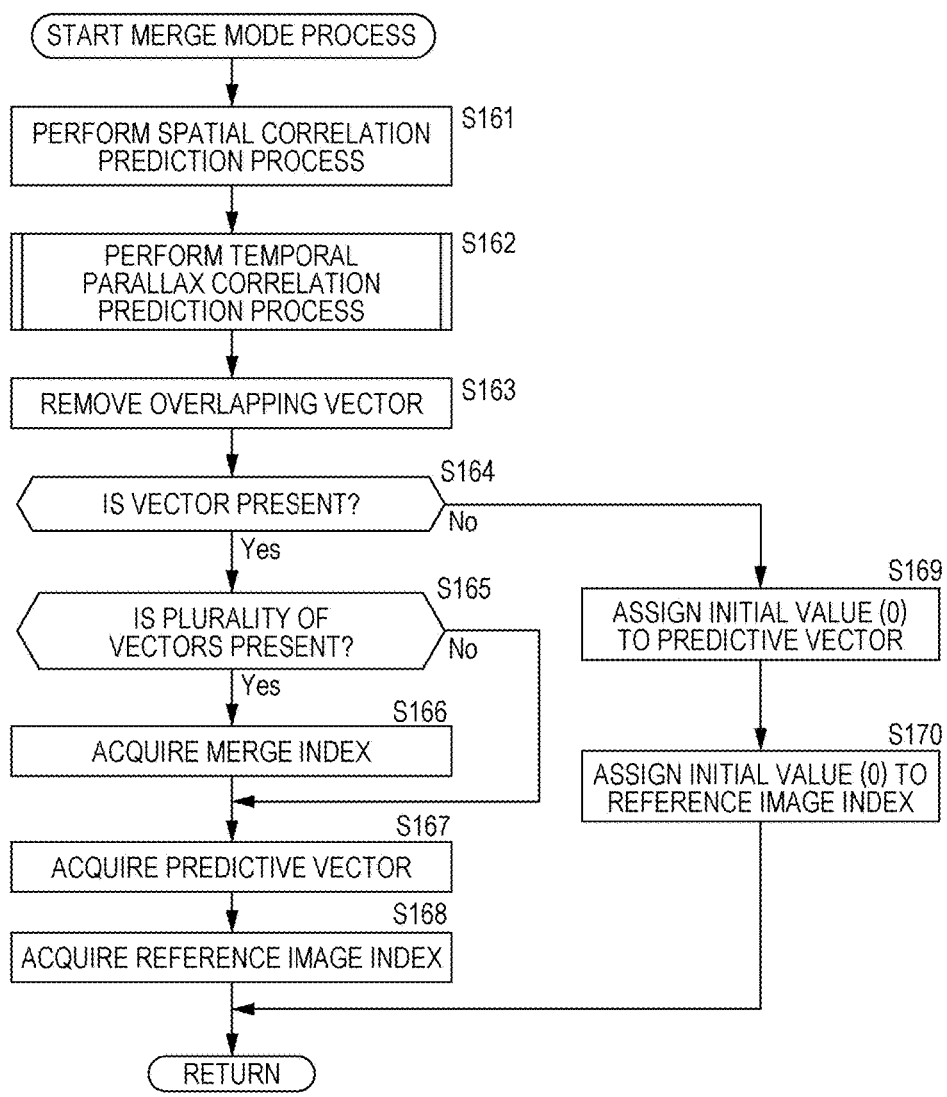
FIG. 22 is a flowchart for describing an example of the flow of a merge mode process.
Figure 23:
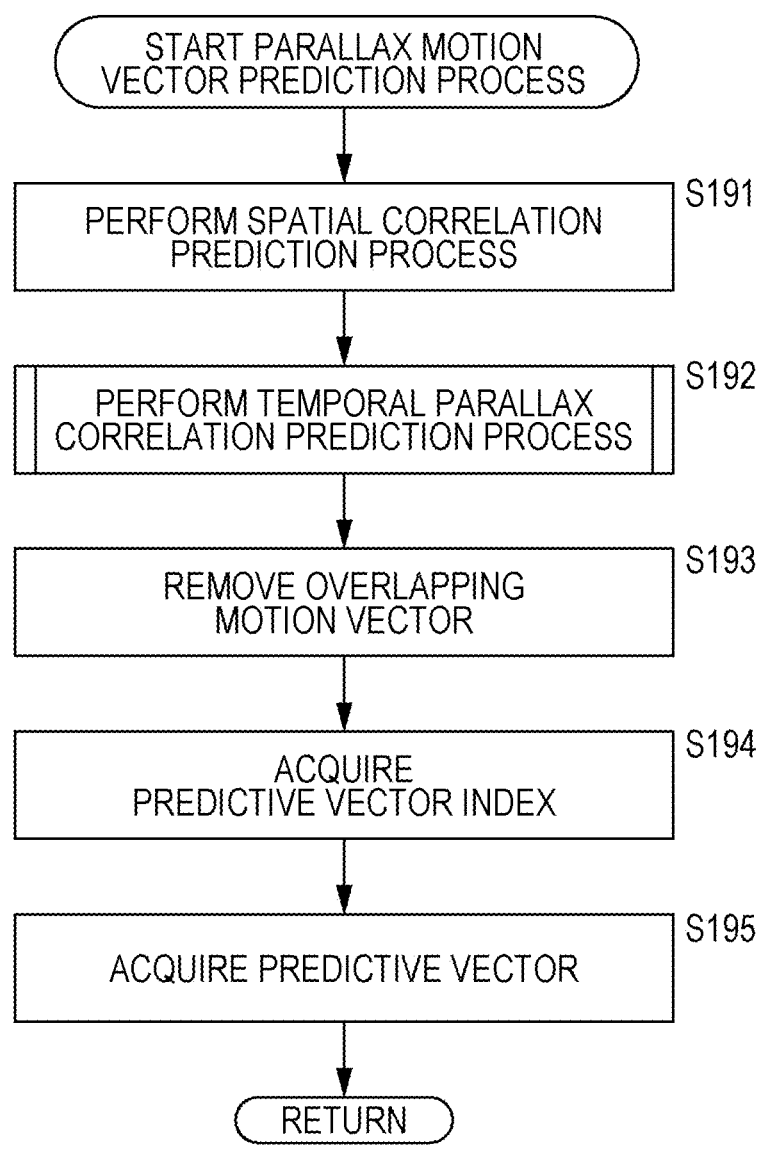
FIG. 23 is a flowchart for describing an example of the flow of a parallax motion vector prediction process.

When the process of step S247 ends, the predictive vector generating unit 159 returns to the flowchart of FIG. 24 to end the temporal parallax correlation prediction process, and the flow returns to the flowchart of FIG. 22 or FIG. 23.

[Flow of Scheme-1 Process]

Figure 28:
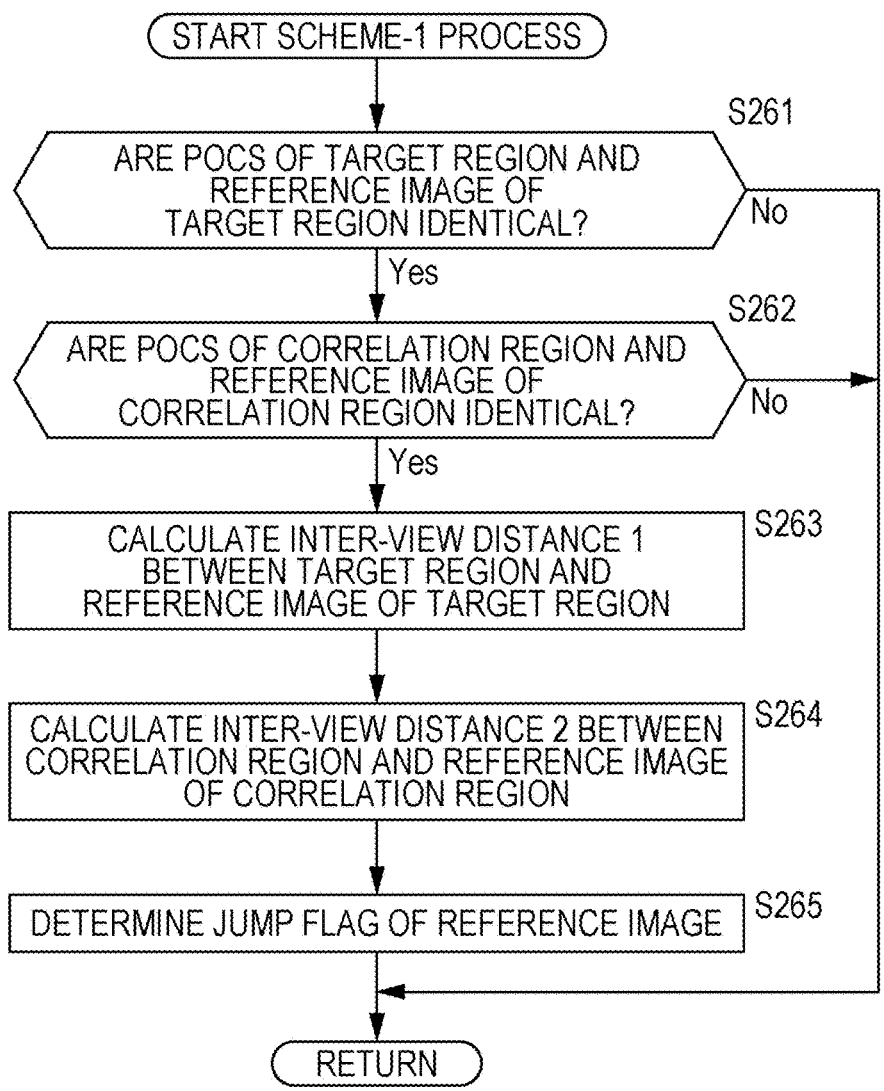
FIG. 28 is a flowchart for describing an example of the flow of a scheme-1 process.

Next, an example of the flow of the scheme-1 process executed in FIG. 25 or FIG. 26 will be described with reference to the flowchart of FIG. 28.

When the scheme-1 process starts, in step S261, the scheme-1 processor 155 determines whether the POCs of the current region and the reference image of the current region are identical. When it is determined that the POCs of the current region and the reference image of the current region are not identical, the scheme-1 processor 155 ends the scheme-1 process and the flow returns to the flowchart of FIG. 25 or FIG. 26.

Moreover, when it is determined in step S261 that the POCs of the current region and the reference image of the current region are identical, the scheme-1 processor 155 proceeds to the process of step S262.

In step S262, the scheme-1 processor 155 determines whether the POCs of the correlation region and the reference image of the correlation region are identical. When it is determined that the POCs of the correlation region and the reference image of the correlation region are not identical, the scheme-1 processor 155 ends the scheme-1 process and the flow returns to the flowchart of FIG. 25 or FIG. 26.

Moreover, when it is determined in step S262 that the POCs of the correlation region and the reference image of the correlation region are identical, the scheme-1 processor 155 proceeds to the process of step S263.

In step S263, the scheme-1 processor 155 calculates an inter-view distance 1 between the current region and the reference image of the current region. In step S264, the scheme-1 processor 155 calculates an inter-view distance 2 between the correlation region and the reference image of the correlation region. In step S265, the scheme-1 processor 155 determines the jump flag of the reference image, and the flow returns to the flowchart of FIG. 25 or FIG. 26. These parameters (the inter-view distance 1, the inter-view distance 2, and the jump flag) are used in the process of FIG. 27.

[Flow of Scheme-3 Process]

Figure 29:
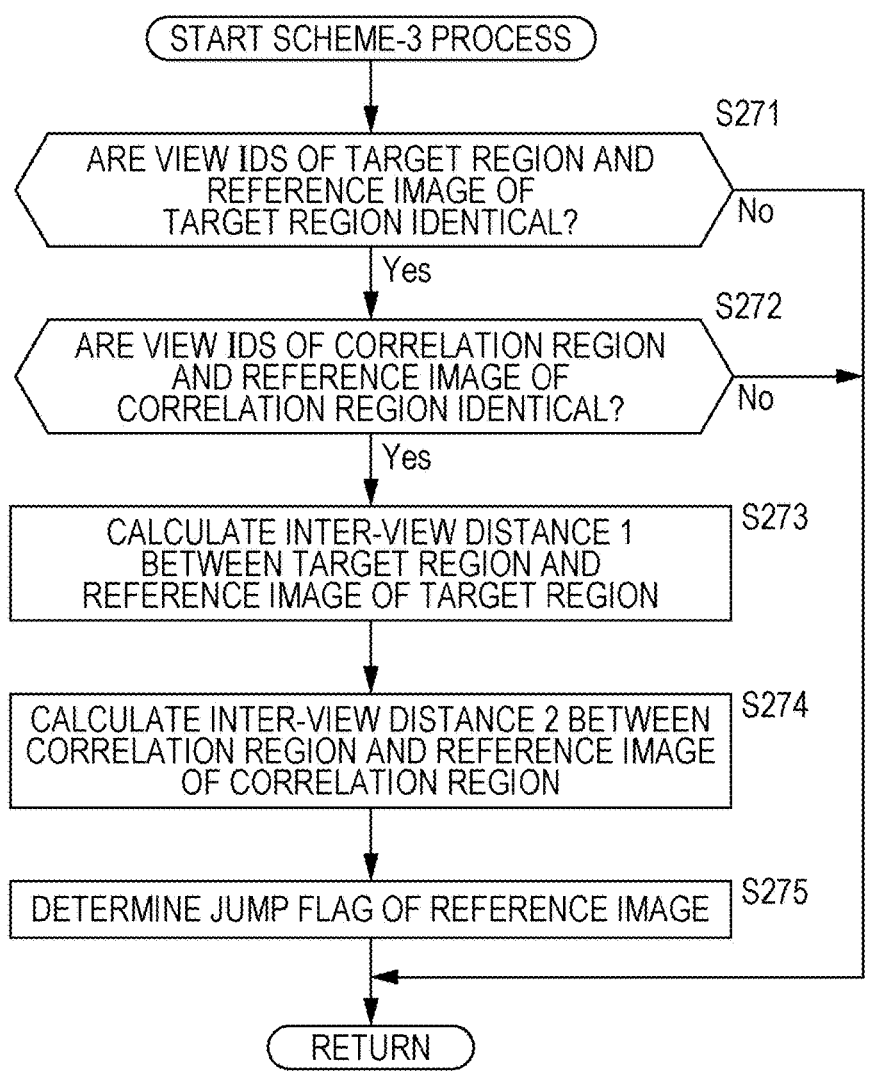
FIG. 29 is a flowchart for describing an example of the flow of a scheme-3 process.

Next, an example of the flow of the scheme-3 process executed in FIG. 25 or FIG. 26 will be described with reference to the flowchart of FIG. 29.

When the scheme-3 process starts, in step S271, the scheme-3 processor 157 determines whether the view IDs of the current region and the reference image of the current region are identical. When the view IDs of the current region and the reference image of the current region are not identical, the scheme-3 processor 157 ends the scheme-3 process, and the flow returns to the flowchart of FIG. 25 or FIG. 26.

Moreover, when it is determined in step S271 that the view IDs of the current region and the reference image of the current region are identical, the scheme-3 processor 157 proceeds to the process of step S272.

In step S272, the scheme-3 processor 157 determines whether the view IDs of the correlation region and the reference image of the correlation region are identical. When it is determined that the view IDs of the correlation region and the reference image of the correlation region are not identical, the scheme-3 processor 157 ends the scheme-3 process, and the flow returns to the flowchart of FIG. 25 or FIG. 26.

Moreover, when it is determined in step S272 that the view IDs of the correlation region and the reference image of the correlation region are identical, the scheme-3 processor 157 proceeds to the process of step S273.

In step S273, the scheme-3 processor 157 calculates the inter-view distance 1 between the current region and the reference image of the current region. In step S274, the scheme-3 processor 157 calculates the inter-view distance 2 between the correlation region and the reference image of the correlation region. In step S275, the scheme-3 processor 157 determines the jump flag of the reference image and the flow returns to the flowchart of FIG. 25 or FIG. 26. These parameters (the inter-view distance 1, the inter-view distance 2, and the jump flag) are used in the process of FIG. 27.

[Flow of Scheme-4-2 Process]

Figure 30:
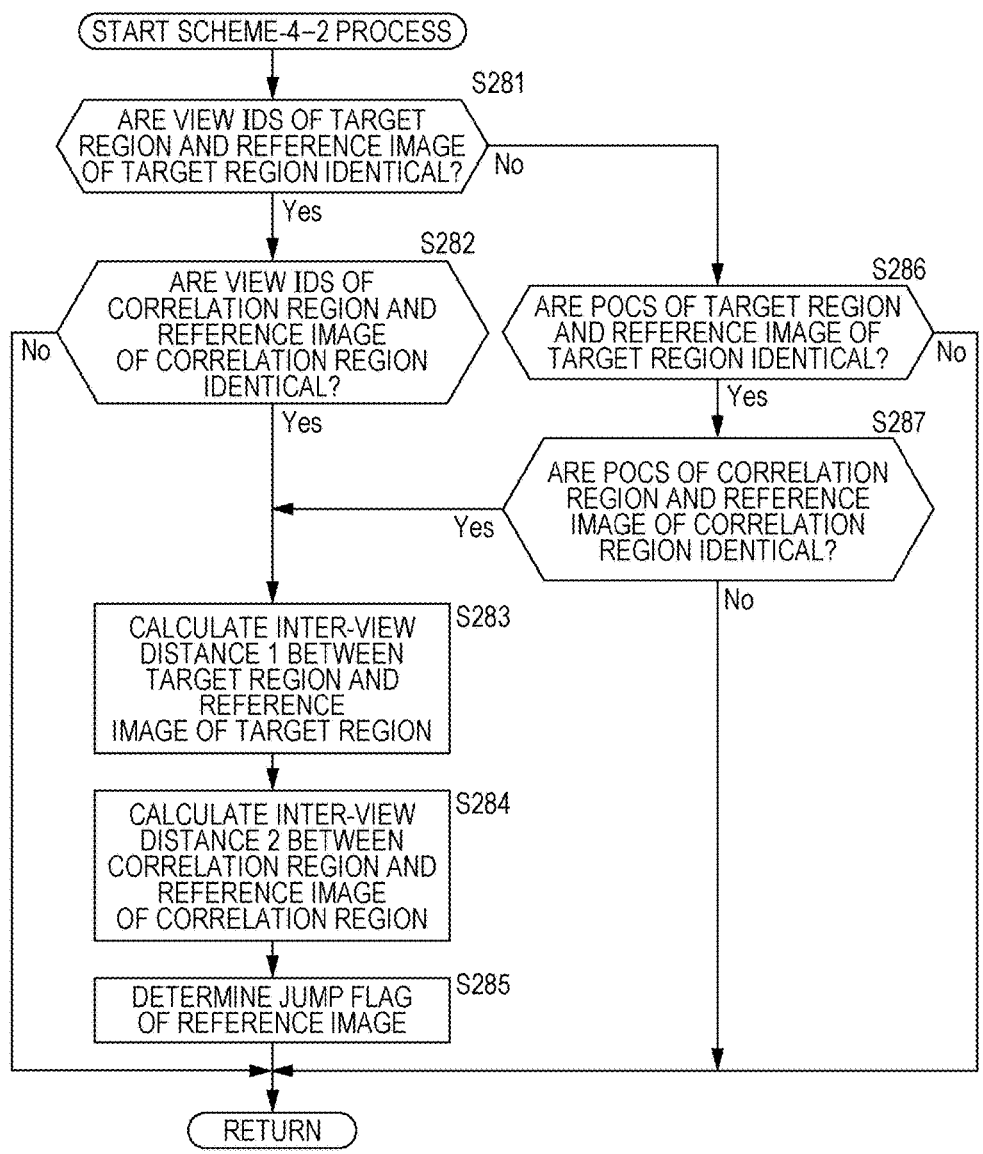
FIG. 30 is a flowchart for describing an example of the flow of a scheme-4-2 process.

Next, an example of the flow of the scheme-4-2 process executed in FIG. 25 or FIG. 26 will be described with reference to the flowchart of FIG. 30.

When the scheme-4-2 process starts, in step S281, the L1-prediction processor 153 or the L0-prediction processor 154 determines whether the view IDs of the current region and the reference image of the current region are identical. When both are identical, a coding vector is a motion vector. When it is determined that the view IDs of the current region and the reference image of the current region are identical, the flow proceeds to step S282.

In step S282, the L1-prediction processor 153 or the L0-prediction processor 154 determines whether the view IDs of the correlation region (co-located block) and the reference image of the correlation region are identical. When both are not identical, a co-located vector is a parallax vector. When it is determined that the view IDs of the correlation region and the reference image of the correlation region are not identical, the L1-prediction processor 153 or the L0-prediction processor 154 ends the scheme-4-2 process and the flow returns to the flowchart of FIG. 25 or FIG. 26.

That is, in this case, since the coding vector is the motion vector and the co-located vector is the parallax vector, the property of the coding vector is not identical to the property of the co-located vector. Thus, the co-located block is set to be not available, and the scheme-4-2 process ends.

Moreover, when it is determined in step S282 that the view IDs of the correlation region and the reference image of the correlation region are identical, the L1-prediction processor 153 or the L0-prediction processor 154 proceeds to the process of step S283. When both are identical, the co-located vector is the motion vector. That is, in this case, both the encoding vector and the co-located vector are the motion vector, and the properties of both vectors are identical. Thus, in this case, the co-located vector is set to be available.

In step S283, the scheme-4 processor 158 calculates the inter-view distance 1 between the current region and the reference image of the current region. In step S284, the scheme-4 processor 158 calculates the inter-view distance 2 between the correlation region and the reference image of the correlation region. In step S285, the scheme-4 processor 158 determines the jump flag of the reference image, and the flow returns to the flowchart of FIG. 25 or FIG. 26. These parameters (the inter-view distance 1, the inter-view distance 2, and the jump flag) are used in the process of FIG. 27.

Moreover, when it is determined in step S281 that the view IDs of the current region and the reference image of the current region are not identical, the L1-prediction processor 153 or the L0-prediction processor 154 proceeds to the process of step S286.

In step S286, the prediction processor 153 or the L0-prediction processor 154 determines whether the POCs of the current region and the reference image of the current region are identical. When it is determined that the POCs of the current region and the reference image of the current region are not identical, the prediction processor 153 or the L0-prediction processor 154 ends the scheme-4-2 process, and the flow returns to the flowchart of FIG. 25 or FIG. 26.

Moreover, when it is determined in step S286 that the POCs of the current region and the reference image of the current region are identical, the prediction processor 153 or the L0-prediction processor 154 proceeds to the process of step S287. When both are identical, a coding vector is a parallax vector.

In step S287, the prediction processor 153 or the L0-prediction processor 154 determines whether the POCs of the correlation region and the reference image of the correlation region are identical. When both are not identical, a co-located vector is a motion vector. When it is determined that the POCs of the correlation region and the reference image of the correlation region are not identical, the prediction processor 153 or the L0-prediction processor 154 ends the scheme-4-2 process, and the flow returns to the flowchart of FIG. 25 or FIG. 26.

That is, in this case, since the coding vector is the parallax vector and the co-located vector is the motion vector, the property of the coding vector is not identical to the property of the co-located vector. Thus, the co-located block is set to be not available, and the scheme-4-2 process ends.

Moreover, when it is determined in step S287 that the POCs of the correlation region and the reference image of the correlation region are identical, the L1-prediction processor 153 or the L0-prediction processor 154 returns to the process of step S283. When both are identical, the co-located vector is the parallax vector. That is, in this case, both the coding vector and the co-located vector are parallax vectors, and the properties of both vectors are identical. Thus, in this case, the co-located vector is set to be available.

In this case, the scheme-2 processor 156 performs the processes of steps S283 to S285 similarly to the scheme-4 processor 158. When the process of step S285 ends, the scheme-2 processor 156 ends the scheme-4-2 process, and the flow returns to the flowchart of FIG. 25 or FIG. 26.

By performing the respective processes in this manner, the temporal parallax correlation predictive vector generating unit 136 can generate the parallax correlation predictive vector as well as the motion correlation predictive vector. Thus, the motion parallax prediction/compensation unit 115 can generate the predictive vector with high prediction accuracy even when the vector of the current region is the parallax vector. Due to this, the image encoding device 100 can suppress a decrease in the encoding efficiency.

2. Second Embodiment

[Image Decoding Device]

Figure 31:
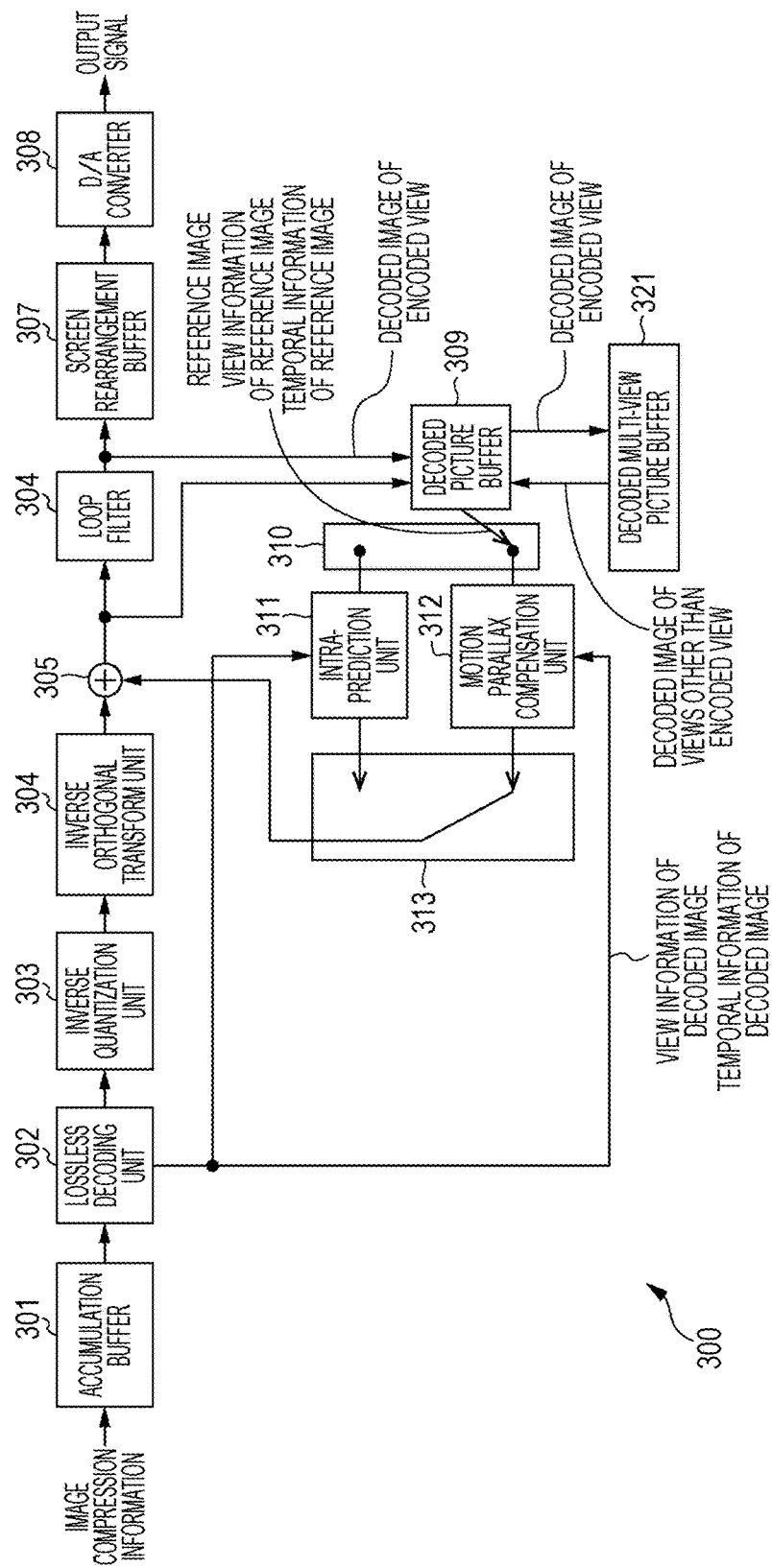
FIG. 31 is a block diagram illustrating a main configuration example of an image decoding device.

FIG. 31 is a block diagram illustrating a main configuration example of an image decoding device which is an image processing device. An image decoding device 300 illustrated in FIG. 31 is a device that corresponds to the image encoding device 100 of FIG. 11. That is, the image decoding device 300 decodes the encoded data (bit stream), which is generated through encoding a multi-view image by the image encoding device 100, according to a decoding method corresponding to the encoding method of the image encoding device 100 to obtain a decoded multi-view image.

As illustrated in FIG. 31, the image decoding device 300 includes an accumulation buffer 301, a lossless decoding unit 302, an inverse quantization unit 303, an inverse orthogonal transform unit 304, an arithmetic unit 305, a loop filter 306, a screen rearrangement buffer 307, and a D/A converter 308. Moreover, the image decoding device 300 includes a decoded picture buffer 309, a selector 310, an intra-prediction unit 311, a motion parallax compensation unit 312, and a selector 313.

Further, the image decoding device 300 includes a decoded multi-view picture buffer 321.

The accumulation buffer 301 accumulates the encoded data transmitted thereto and supplies the encoded data to the lossless decoding unit 302 at a predetermined timing. The lossless decoding unit 302 decodes the information encoded by the lossless encoding unit 106 of FIG. 11, which is supplied from the accumulation buffer 301, according to a scheme corresponding to the encoding scheme of the lossless encoding unit 106. The lossless decoding unit 302 supplies quantized coefficient data of the difference image obtained by decoding to the inverse quantization unit 303.

Moreover, the lossless decoding unit 302 refers to the information on the optimal prediction mode obtained by decoding the encoded data to determine whether the intra-prediction mode or the inter-prediction mode is selected as the optimal prediction mode. The lossless decoding unit 302 supplies the information on the optimal prediction mode to the intra-prediction unit 311 or the motion parallax compensation unit 312 based on the determination result. That is, for example, when the image encoding device 100 selected the intra-prediction mode as the optimal prediction mode, the intra-prediction information which is the information on the optimal prediction mode or the like is supplied to the intra-prediction unit 311. Moreover, for example, when the image encoding device 100 selected the inter-prediction mode as the optimal prediction mode, the inter-prediction information which is the information on the optimal prediction mode or the like is supplied to the motion parallax compensation unit 312.

The inverse quantization unit 303 performs inverse quantization on the quantized coefficient data, which is obtained through decoding by the lossless decoding unit 302, according to a scheme corresponding to the quantization scheme of the quantization unit 105 of FIG. 11 and supplies the obtained coefficient data to the inverse orthogonal transform unit 304. The inverse orthogonal transform unit 304 performs inverse orthogonal transform on the coefficient data supplied from the inverse quantization unit 303 according to a scheme corresponding to the orthogonal transform scheme of the orthogonal transform unit 104 of FIG. 11. The inverse orthogonal transform unit 304 obtains the difference image corresponding to the difference image before being subjected to the orthogonal transform in the image encoding device 100 by the inverse orthogonal transform process.

The difference image obtained through inverse orthogonal transform is supplied to the arithmetic unit 305. Moreover, the predicted image from the intra-prediction unit 311 or the motion parallax compensation unit 312 is supplied to the arithmetic unit 305 via the selector 313.

The arithmetic unit 305 adds the difference image and the predicted image to obtain a reconstructed image corresponding to the image before subtraction of the predicted image by the arithmetic unit 103 of the image encoding device 100. The arithmetic unit 305 supplies the reconstructed image to the loop filter 306.

The loop filter 306 performs a loop filtering process including a deblocking filtering process, an adaptive loop pressure filter, and the like with respect to the supplied reconstructed image to generate a decoded image. For example, the loop filter 306 removes a block distortion by performing a deblocking filtering process on the reconstructed image. Moreover, for example, the loop filter 306 improves image quality by performing a loop filtering process using a Wiener filter with respect to the deblocking filtering process results (the reconstructed image in which the block distortion is removed).

The type of the filtering process performed by the loop filter 306 is optional, and a filtering process other than the above-described processes may be performed. Moreover, the loop filter 306 may perform the filtering process using the filter coefficients supplied from the image encoding device 100 of FIG. 11.

The loop filter 306 supplies the decoded image which is the filtering process result to the screen rearrangement buffer 307 and the decoded picture buffer 309. The filtering process of the loop filter 306 may be omitted. That is, the output of the arithmetic unit 305 may be stored in the decoded picture buffer 309 without being subjected to the filtering process. For example, the intra-prediction unit 311 uses the pixel values of pixels included in this image as the pixel values of the neighboring pixels.

The screen rearrangement buffer 307 rearranges the supplied decoded image. That is, the frame order rearranged for the encoding order by the screen rearrangement buffer 102 of FIG. 11 is rearranged in the original display order. The D/A converter 308 performs D/A conversion on the decoded image supplied from the screen rearrangement buffer 307, outputs the converted image to a display (not illustrated), and displays the image.

The decoded picture buffer 309 stores the supplied reconstructed image (and the view ID and POC of the image) and the decoded image (and the view ID and POC of the image). Moreover, the decoded picture buffer 309 supplies the stored reconstructed image (and the view ID and POC of the image) or decoded image (and the view ID and POC of the image) to the intra-prediction unit 311 and the motion parallax compensation unit 312 via the selector 310 at a predetermined timing or based on a request of an external unit such as the intra-prediction unit 311 or the motion parallax compensation unit 312.

The intra-prediction unit 311 performs basically the same process as the intra-prediction unit 114 of FIG. 11. However, the intra-prediction unit 311 performs intra-prediction only with respect to a region in which a predicted image is generated by intra-prediction during encoding.

The motion parallax compensation unit 312 performs motion parallax compensation based on the inter-prediction information supplied from the lossless decoding unit 302 to generate a predicted image. The motion parallax compensation unit 312 performs motion parallax compensation with respect to a region in which inter-prediction is performed during encoding only based on the inter-prediction information supplied from the lossless decoding unit 302.

The motion parallax compensation unit 312 supplies the generated predicted image to the arithmetic unit 305 via the selector 313 for every region of prediction process units.

The selector 313 supplies the predicted image supplied from the intra-prediction unit 311 or the predicted image supplied from the motion parallax compensation unit 312 to the arithmetic unit 305.

Although the decoded picture buffer 309 stores the image of a processing target view (and the view ID and POC of the image) only, the decoded multi-view picture buffer 321 stores the images of respective viewpoints (views) (and the view IDs and POCs of the images). That is, the decoded multi-view picture buffer 321 acquires the decoded image (and the view ID and POC of the image) supplied to the decoded picture buffer 309 and stores the decoded image (and the view ID and POC of the image) together with the decoded picture buffer 309.

Although the decoded picture buffer 309 erases the decoded image when a processing target view changes, the decoded multi-view picture buffer 321 stores the decoded image as it is. Moreover, the decoded multi-view picture buffer 321 supplies the stored decoded image (and the view ID and POC of the image) to the decoded picture buffer 309 as a "decoded image of a non-processing target view" according to a request of the decoded picture buffer 309 or the like. The decoded picture buffer 309 supplies the "decoded image of the non-processing target view (and the view ID and POC of the image)" read from the decoded multi-view picture buffer 321 to the motion parallax compensation unit 312 via the selector 310.

[Motion Parallax Compensation Unit]

Figure 32:
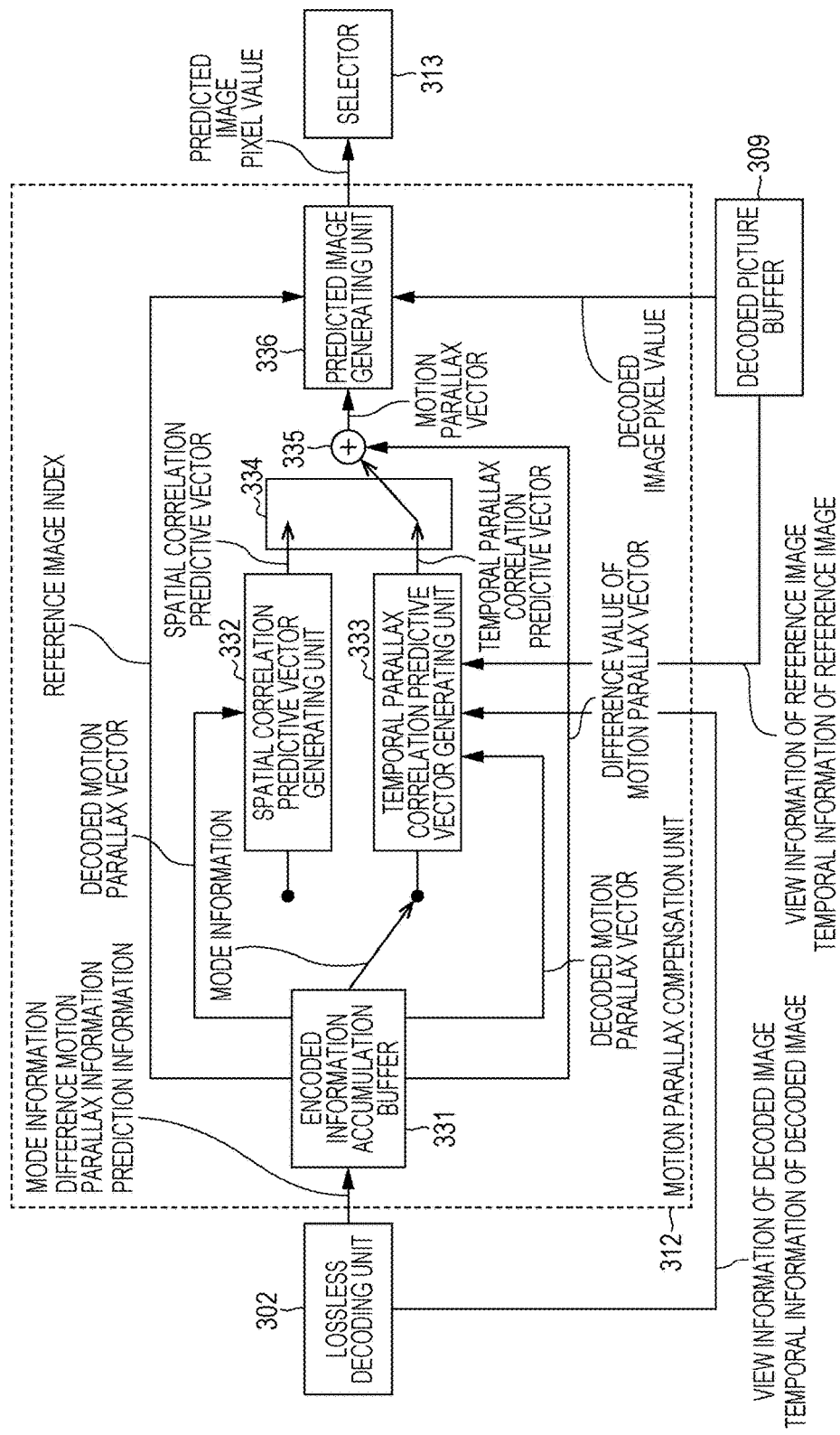
FIG. 32 is a block diagram illustrating a main configuration example of a motion parallax compensation unit.

FIG. 32 is a block diagram illustrating a main configuration example of the motion parallax compensation unit 312.

As illustrated in FIG. 32, the motion parallax compensation unit 312 includes an encoded information accumulation buffer 331, a spatial correlation predictive vector generating unit 332, a temporal parallax correlation predictive vector generating unit 333, a selector 334, an arithmetic unit 335, and a predicted image generating unit 336.

The encoded information accumulation buffer 331 acquires the mode information, difference motion parallax information, and prediction information obtained in the lossless decoding unit 302. Moreover, the encoded information accumulation buffer 331 stores the decoded motion parallax vector used in the predicted image generating unit 336. The motion parallax vector is used as a motion parallax vector of the neighboring region in the process for another region.

The encoded information accumulation buffer 331 supplies the mode information or the decoded motion parallax vector of the neighboring region to one of the spatial correlation predictive vector generating unit 332 and the temporal parallax correlation predictive vector generating unit 333 corresponding to the type (spatial correlation predictive vector or temporal parallax correlation predictive vector) of the predictive vector designated in the prediction information.

Moreover, the encoded information accumulation buffer 331 supplies the difference motion parallax vector included in the difference motion parallax information to the arithmetic unit 335. Further, the encoded information accumulation buffer 331 supplies the reference image index included in the prediction information to the predicted image generating unit 336.

The spatial correlation predictive vector generating unit 332 generates the spatial correlation predictive vector based on the information supplied from the encoded information accumulation buffer 331. The generation method is the same as that of the spatial correlation predictive vector generating unit 135. However, since the optimal inter-prediction mode is determined in advance, the spatial correlation predictive vector generating unit 332 may generate the spatial correlation predictive vector in the mode only. The spatial correlation predictive vector generating unit 332 supplies the generated spatial correlation predictive vector to the arithmetic unit 335 via the selector 334.

The temporal parallax correlation predictive vector generating unit 333 generates a temporal parallax correlation predictive vector based on the information such as the information supplied from the encoded information accumulation buffer 331, the information such as the view ID and POC of the current region supplied from the lossless decoding unit 302, and the information such as the view ID and POC of the reference image supplied from the decoded picture buffer 309. The generation method is the same as that of the temporal parallax correlation predictive vector generating unit 136. However, since the optimal inter-prediction mode is determined in advance, the temporal parallax correlation predictive vector generating unit 333 may generate the temporal parallax correlation predictive vector in the mode only. The temporal parallax correlation predictive vector generating unit 333 supplies the generated temporal parallax correlation predictive vector to the arithmetic unit 335 via the selector 334.

When the spatial correlation predictive vector is supplied from the spatial correlation predictive vector generating unit 332, the selector 334 supplies the vector to the arithmetic unit 335. Moreover, the temporal parallax correlation predictive vector is supplied from the temporal parallax correlation predictive vector generating unit 333, the selector 334 supplies the vector to the arithmetic unit 335.

The arithmetic unit 335 adds the difference motion parallax vector supplied from the encoded information accumulation buffer 331 to the spatial correlation predictive vector or the temporal parallax correlation predictive vector supplied from the selector 334 to reconstruct the motion parallax vector of the current region. The arithmetic unit 335 supplies the reconstructed motion parallax vector of the current region to the predicted image generating unit 336.

The predicted image generating unit 336 generates a predicted image using the reconstructed motion parallax vector of the current region supplied from the arithmetic unit 335, the reference image index supplied from the encoded information accumulation buffer 331, the pixel values of the neighboring images which are the images of the neighboring region supplied from the decoded picture buffer 309. The predicted image generating unit 336 supplies the generated predicted image pixel value to the selector 313.

By doing so, the temporal parallax correlation predictive vector generating unit 333 can generate the parallax correlation predictive vector as well as the motion correlation predictive vector similarly to the temporal parallax correlation predictive vector generating unit 136. Thus, the motion parallax compensation unit 312 can reconstruct the parallax correlation predictive vector even when the vector of the current region is the parallax vector. That is, the image decoding device 300 can improve the encoding efficiency since the image decoding device 300 can correctly decode the encoded data generated by the image encoding device 100.

[Flow of Decoding Process]

Next, the flow of the respective processes executed by the image decoding device 300 having such a configuration will be described. First, an example of the flow of the decoding process will be described with reference to the flowchart of FIG. 33.

When the decoding process starts, in step S301, the accumulation buffer 301 accumulates the bit stream transmitted thereto. In step S302, the lossless decoding unit 302 decodes the bit stream (encoded difference image information) supplied from the accumulation buffer 301. In this case, various types of information other than the difference image information included in the bit stream, such as intra-prediction information or inter-prediction information are also decoded.

In step S303, the inverse quantization unit 303 performs inverse quantization on the quantized orthogonal transform coefficients obtained by the process of step S302. In step S304, the inverse orthogonal transform unit 304 performs inverse orthogonal transform on the orthogonal transform coefficients having been subjected to inverse quantization in step S303.

In step S305, the intra-prediction unit 311 or the motion parallax compensation unit 312 performs a prediction process using the supplied information. In step S306, the arithmetic unit 305 adds the predicted image generated in step S305 to the difference image information obtained through inverse orthogonal transform in step S304. In this way, the reconstructed image is generated.

In step S307, the loop filter 306 appropriately performs a loop filtering process including a deblocking filtering process, an adaptive loop filtering process, and the like with respect to the reconstructed image obtained in step S306.

In step S308, the screen rearrangement buffer 307 rearranges the decoded image generated through the filtering process in step S307. That is, the frame order rearranged for encoding by the screen rearrangement buffer 102 of the image encoding device 100 is rearranged in the original display order.

In step S309, the D/A converter 308 performs D/A conversion on the decoded image in which the frame order is rearranged. The decoded image is output to a display (not illustrated) and is displayed.

In step S310, the decoded picture buffer 309 stores the decoded image obtained through the filtering process in step S307. This decoded image is used as a reference image in the inter-prediction process.

When the process of step S310 ends, the decoding process ends.

[Flow of Prediction Process]

Figure 33:
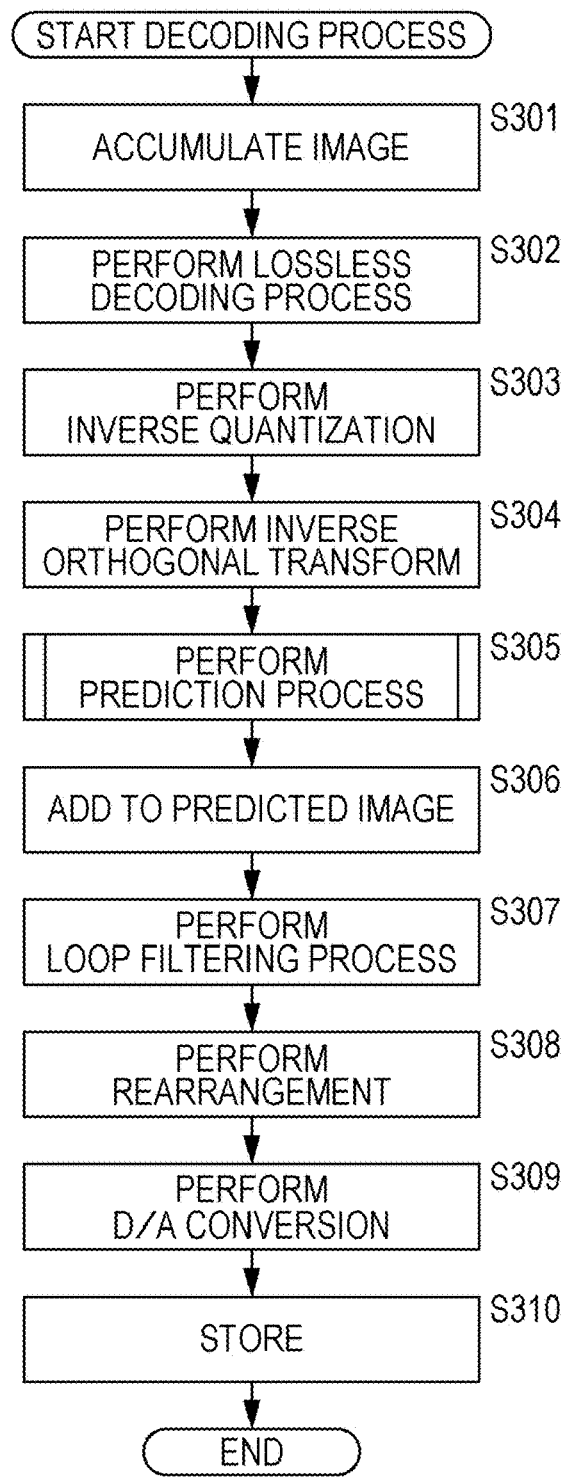
FIG. 33 is a flowchart for describing an example of the flow of a decoding process.

Next, an example of the flow of the prediction process executed in step S305 of FIG. 33 will be described with reference to the flowchart of FIG. 34.

When the prediction process starts, in step S331, the lossless decoding unit 302 determines whether the current region of a processing target has been subjected to intra-prediction during encoding. When it is determined that the current region has been subjected to intra-prediction, the lossless decoding unit 302 proceeds to the process of step S332.

In this case, the intra-prediction unit 311 acquires intra-prediction mode information from the lossless decoding unit 302 in step S332 and generates a predicted image by intra-prediction in step S333. When the predicted image is generated, the intra-prediction unit 311 ends the prediction process and the flow returns to the flowchart of FIG. 33.

Moreover, when it is determined in step S331 the current region is a region having been subjected to the inter-prediction, the lossless decoding unit 302 proceeds to the process of step S334. In step S334, the motion parallax compensation unit 312 performs a motion parallax compensation process. When the motion parallax compensation process ends, the motion parallax compensation unit 312 ends the prediction process and the flow returns to the flowchart of FIG. 33.

[Flow of Motion Parallax Compensation Process]

Next, an example of the flow of the motion parallax compensation process executed in step S334 of FIG. 34 will be described with reference to the flowchart of FIG. 35.

When the motion parallax compensation process starts, in step S351, the encoded information accumulation buffer 331 stores mode information, motion parallax information, and prediction information decoded in step S351.

In step S352, the spatial correlation predictive vector generating unit 332, the temporal parallax correlation predictive vector generating unit 333, the selector 334, and the arithmetic unit 335 perform a motion parallax vector generation process to reconstruct a motion parallax vector of the current region.

When the motion parallax vector is reconstructed, in step S353, the predicted image generating unit 336 generates a predicted image using the motion parallax vector.

Figure 34:
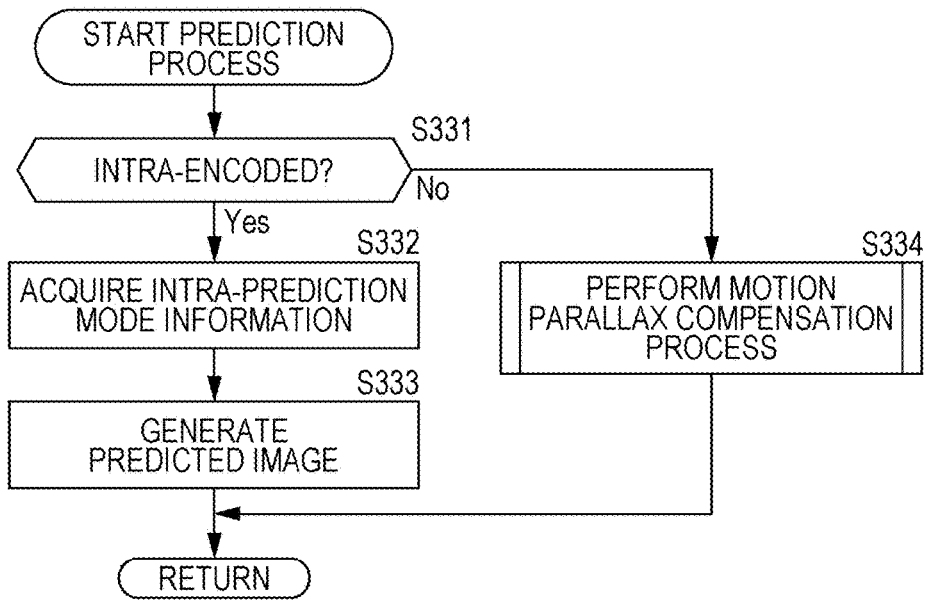
FIG. 34 is a flowchart for describing an example of the flow of a prediction process.

When the predicted image is generated, the predicted image generating unit 336 ends the motion parallax compensation process, and the flow returns to the flowchart of FIG. 34.

[Flow of Motion Parallax Vector Generation Process]

Next, an example of the flow of the motion parallax vector generation process executed in step S352 of FIG. 35 will be described with reference to the flowchart of FIG. 36.

When the motion parallax vector generation process starts, in step S371, the encoded information accumulation buffer 331 determines whether this mode is a skip mode from the prediction information. When it is determined that this mode is the skip mode, the encoded information accumulation buffer 331 proceeds to the process of step S372. In step S372, the spatial correlation predictive vector generating unit 332 to the arithmetic unit 335 performs a merge mode process to reconstruct the motion parallax vector in the merge mode. In the merge mode process, the same processes as the processes described with reference to the flowchart of FIG. 22 are performed. When the merge mode process ends, the arithmetic unit 335 ends the motion parallax vector generation process, and the flow returns to the flowchart of FIG. 35.

Figure 36:
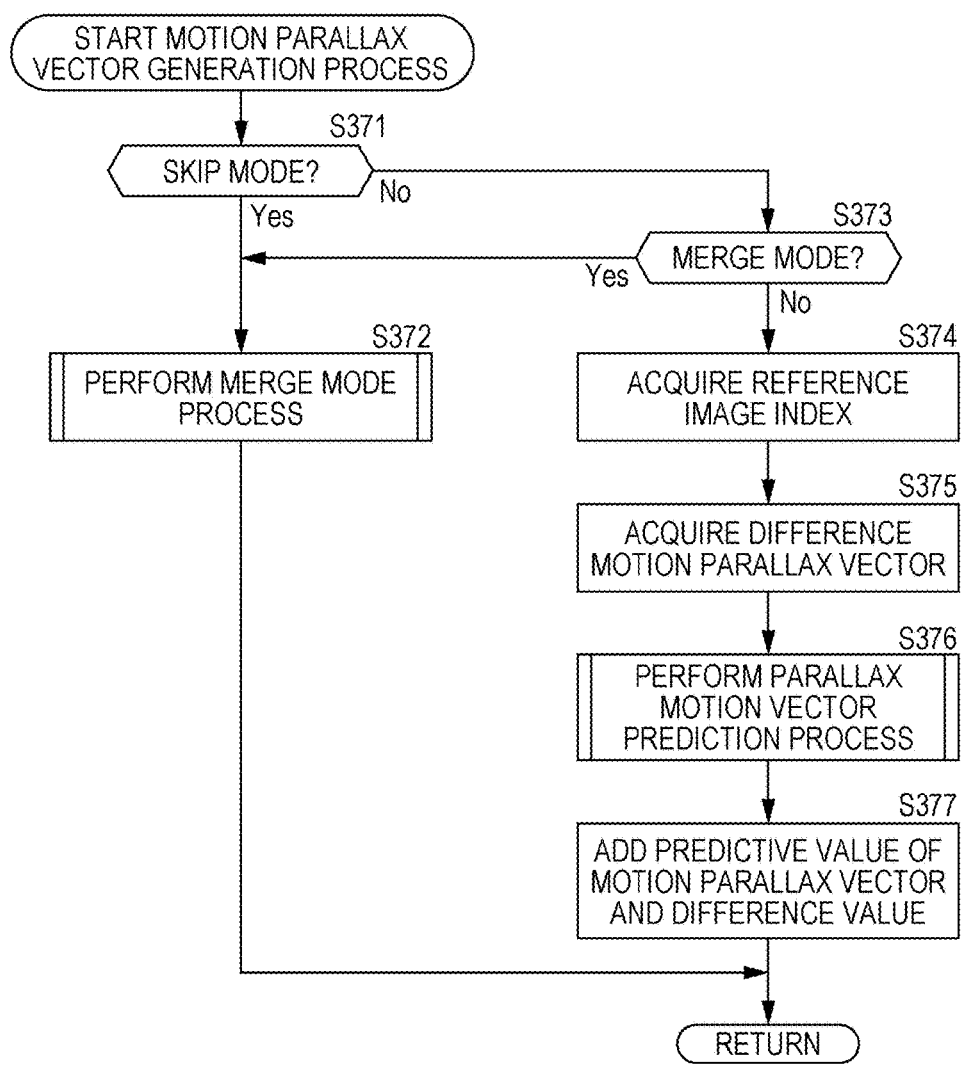
FIG. 36 is a flowchart for describing an example of the flow of a motion parallax vector generation process.

Moreover, when it is determined in step S371 of FIG. 36 that it is not the skip mode, the encoded information accumulation buffer 331 proceeds to the process of step S373. In step S373, the encoded information accumulation buffer 331 determines whether this mode is the merge mode from the prediction information. When it is determined that this mode is the merge mode, the encoded information accumulation buffer 331 returns to the process of step S372 to execute the merge mode process.

Moreover, when it is determined in step S373 that this mode is not the merge mode, the encoded information accumulation buffer 331 proceeds to the process of step S374.

In step S374, the encoded information accumulation buffer 331 acquires the index of the reference image. In step S375, the encoded information accumulation buffer 331 acquires the difference motion parallax vector.

In step S376, the spatial correlation predictive vector generating unit 332 or the temporal parallax correlation predictive vector generating unit 333 performs a parallax motion vector prediction process. This parallax motion vector prediction process is performed in the same manner as that described with reference to the flowchart of FIG. 23. However, in this case, since the prediction method is determined in advance, any one (one designated by the prediction information) of the spatial correlation prediction process and the temporal parallax correlation prediction process is performed.

In step S377, the arithmetic unit 335 adds the predictive vector reconstructed in step S376 and the difference motion parallax vector to reconstruct the motion parallax vector.

Figure 35:
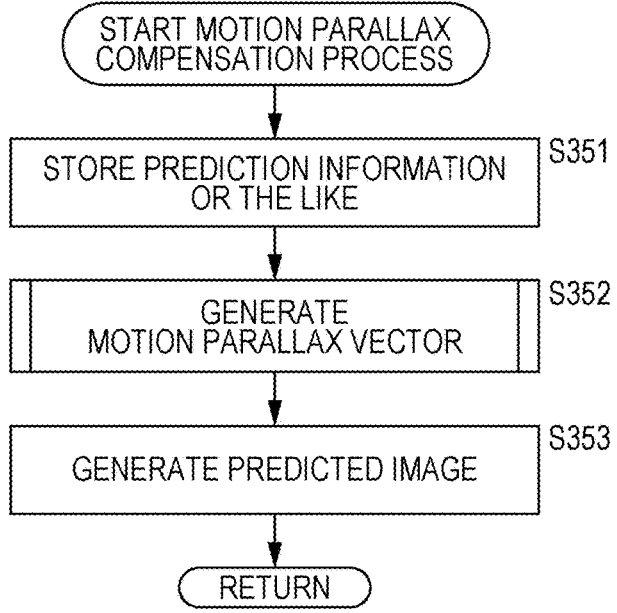
FIG. 35 is a flowchart for describing an example of the flow of a motion parallax compensation process.

When the process of step S377 ends, the arithmetic unit 335 ends the motion parallax vector generation process and the flow returns to the flowchart of FIG. 35.

By executing the respective processes in the above-described manner, the temporal parallax correlation predictive vector generating unit 333 can generate the parallax correlation predictive vector as well as the motion correlation predictive vector similarly to the temporal parallax correlation predictive vector generating unit 136. Thus, the motion parallax compensation unit 312 can reconstruct the parallax correlation predictive vector even when the vector of the current region is a parallax vector. That is, the image decoding device 300 can improve the encoding efficiency since the image decoding device 300 can correctly decode the encoded data generated by the image encoding device 100.

3. Third Embodiment

[Point]

In the case of multi-view images, the positions of images are offset between views so that a parallax occurs. Thus, when a block in the view direction is selected, even if a block at the same position is selected (referred to), the prediction accuracy of the predicted image may decrease and there is a possibility that it is not possible to create an appropriate predictive vector.

Thus, when a block in the view direction is selected in order to generate a predictive vector, a block at a shifted position is selected. That is, the predictive vector is generated using a vector of such a region that is located at the same position as the current region in a state where the position of an image of the same time as the current region is shifted.

The shift amount is calculated in a predetermined order from the parallax vector of the neighboring block. By using the same order in both an encoding-side device and a decoding-side device, the same prediction can be performed in both the encoding side and the decoding side.

A neighboring block for computing the shift amount may be explicitly designated, and the information thereof may be transmitted from the encoding side to the decoding side. Moreover, the information on a shift amount computing method may be transmitted from the encoding side to the decoding side.

By doing so, the image encoding device and the image decoding device can generate a predictive vector from blocks aligned between views. Therefore, it is possible to improve the prediction accuracy of the predicted image and to improve the encoding efficiency.

This will be described in detail below.

[Image Encoding Device]

Figure 37:
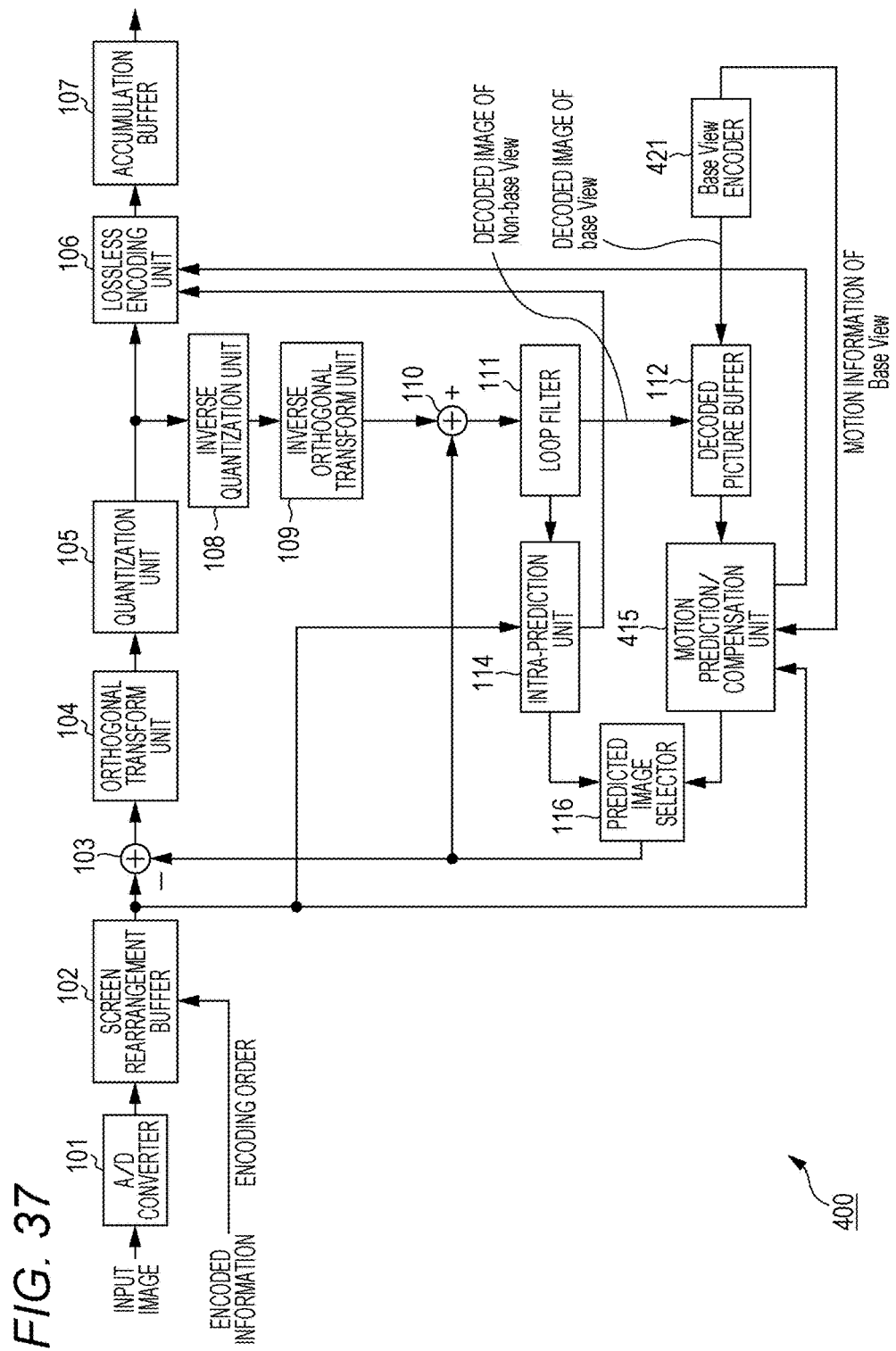
FIG. 37 is a block diagram illustrating another configuration example of the image encoding device.

FIG. 37 is a block diagram illustrating another configuration example of an image encoding device to which the present technique is applied.

An image encoding device 400 illustrated in FIG. 37 is basically the same device as the image encoding device 100 described above. However, the image encoding device 400 generates the predictive vector from blocks aligned between views.

As illustrated in FIG. 37, the image encoding device 400 includes a motion prediction/compensation unit 415 and a base view encoder 421.

The motion prediction/compensation unit 412 generates a predictive vector that refers to blocks in the view direction using the decoded image acquired from the decoded picture buffer 112 and the motion information of the base view acquired from the base view encoder 421.

The base view encoder 421 encodes the base view. The base view encoder 421 supplies the decoded image of the base view to the decoded picture buffer 112 which stores the decoded image. The decoded picture buffer 112 also stores the decoded image of a non-base view supplied from the loop filter 111.

The base view encoder 421 supplies the motion information of the base view to the motion prediction/compensation unit 412.

[Motion Prediction/Compensation Unit]

Figure 38:
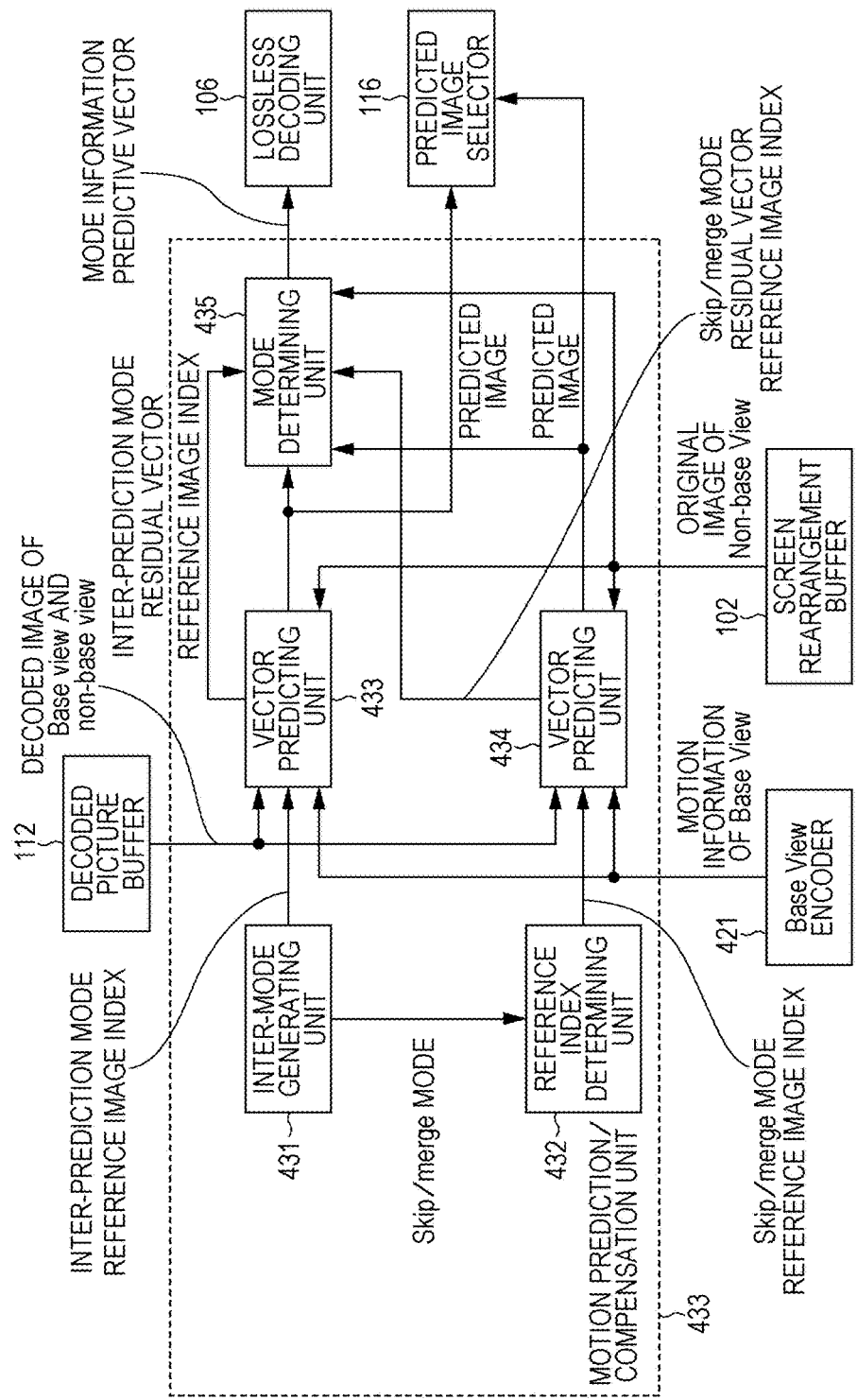
FIG. 38 is a block diagram illustrating a main configuration example of a motion prediction/compensation unit.

FIG. 38 is a block diagram illustrating a main configuration example of the motion prediction/compensation unit 412 of FIG. 37.

As illustrated in FIG. 38, the motion prediction/compensation unit 412 includes an inter-mode generating unit 431, a reference index determining unit 432, a vector predicting unit 433, a vector predicting unit 434, and a mode determining unit 435. The information illustrated in FIG. 38 is exchanged between the respective processing units.

In the case of the inter-prediction mode, the vector predicting unit 433 generates a predictive vector to generate the predicted image thereof. In the case of the skip mode, the merge mode, or the like, the vector predicting unit 434 generates the predictive vector to generate the predicted image thereof. The predictive vector and the predicted image generated in these vector predicting units are supplied to the mode determining unit 435.

The mode determining unit 435 determines a mode based on these items of information and supplies mode information indicating the selected mode and the predictive vector of the mode to the lossless encoding unit 106. Moreover, the predicted image of the selected mode is supplied to the predicted image selector 116.

[Vector Predicting Unit]

Figure 39:
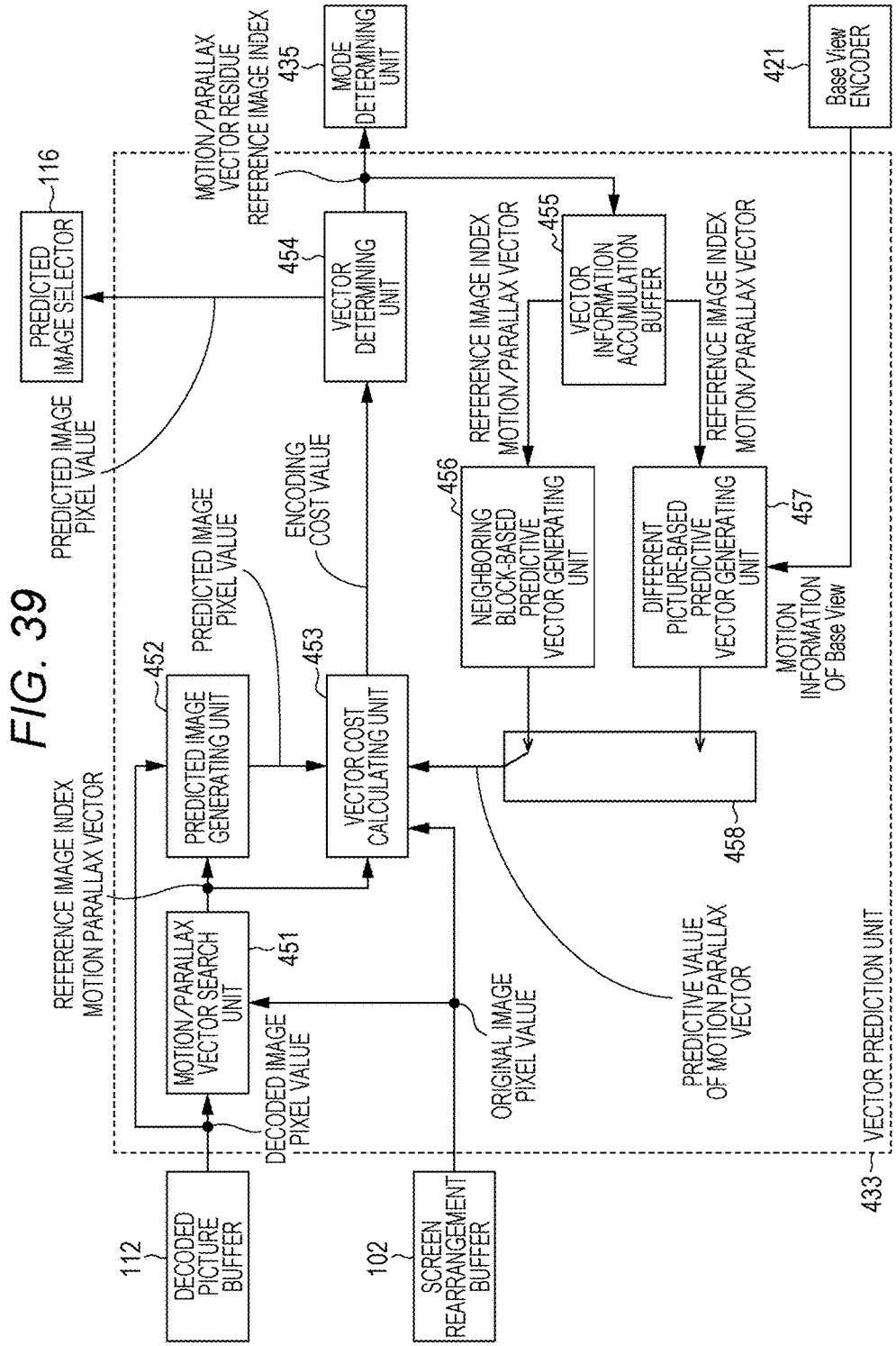
FIG. 39 is a block diagram illustrating a main configuration example of a vector predicting unit.

FIG. 39 is a block diagram illustrating a main configuration example of the vector predicting unit 433.

As illustrated in FIG. 39, the vector predicting unit 433 includes a motion/parallax vector search unit 451, a predicted image generating unit 452, a vector cost calculating unit 453, a vector determining unit 454, a vector information accumulation buffer 455, a neighboring block-based predictive vector generating unit 456, a different picture-based predictive vector generating unit 457, and a selector 458. The information illustrated in FIG. 39 is exchanged between the respective processing units.

The different picture-based predictive vector generating unit 457 generates a predictive vector that refers to different pictures. That is, the different picture-based predictive vector generating unit 457 refers to different pictures in the temporal direction and the view direction to generate the predictive vector. When generating the predictive vector that refers to different pictures in the view direction, the different picture-based predictive vector generating unit 457 acquires the motion information of the base view from the base view encoder 421 and generates a predictive vector using the motion information.

The predictive vector generated by the different picture-based predictive vector generating unit 457 is supplied to the vector cost calculating unit 453 via the selector 458, and the cost function value used for the mode determination is calculated.

[Different Picture-Based Predictive Vector Generating Unit]

Figure 40:
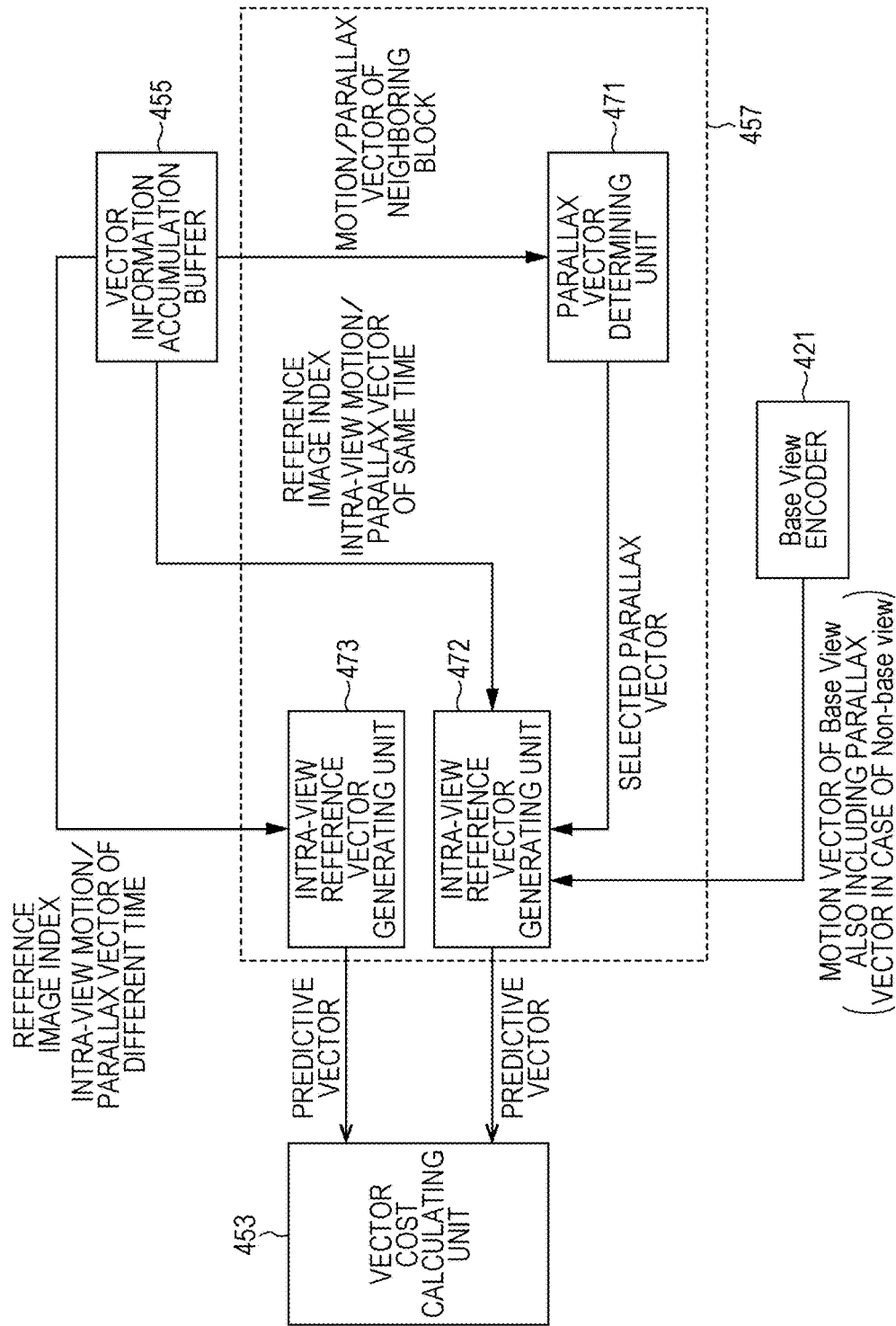
FIG. 40 is a block diagram illustrating a main configuration example of a different picture-based predictive vector generating unit.

FIG. 40 is a block diagram illustrating a main configuration example of the different picture-based predictive vector generating unit 457.

As illustrated in FIG. 40, the different picture-based predictive vector generating unit 457 includes a parallax vector determining unit 471, an inter-view reference vector generating unit 472, and an intra-view reference vector generating unit 473.

The parallax vector determining unit 471 calculates a shift amount of the reference image from the parallax vector of the neighboring block. The shift amount calculating method is optional. For example, any one of the parallax vectors of the neighboring blocks may be selected and may be used as the shift amount. Moreover, for example, an average value or a median value of the parallax vectors of the neighboring blocks may be used as the shift amount.

The parallax vector determining unit 471 supplies the shift amount obtained in this manner to the inter-view reference vector generating unit 472 as the parallax vector.

The inter-view reference vector generating unit 472 generates a predictive vector that refers to different pictures in the view direction.

The inter-view reference vector generating unit 472 generates the predictive vector by taking the parallax vector into consideration using the parallax vector (shift amount) selected by the parallax vector determining unit 471, the motion vector (also including the parallax vector in the case of the non-base view) of the base view supplied from the base view encoder 421, and information such as the reference image index or the inter-view motion/parallax vector of the same time, which is read from the vector information accumulation buffer 455.

That is, the inter-view reference vector generating unit 472 aligns (shifts) the images of the view referring to using the shift amount calculated by the parallax vector determining unit 471. Moreover, the inter-view reference vector generating unit 472 generates the predictive vector from the aligned blocks.

The inter-view reference vector generating unit 472 supplies the generated predictive vector to the vector cost calculating unit 453 via the selector 458 (not illustrated in FIG. 40).

The intra-view reference vector generating unit 473 generates the predictive vector that refers to different pictures in the temporal direction.

By doing so, the inter-view reference vector generating unit 472 can create an appropriate predictive vector with high prediction accuracy. In this way, the image encoding device 400 can improve the encoding efficiency.

[Flow of Motion Prediction/Compensation Process]

An example of the flow of the motion prediction/compensation process will be described with reference to the flowchart of FIG. 41.

When the motion prediction/compensation process starts, in step S401, the inter-mode generating unit 431 selects any one of an inter-prediction mode, a skip mode, a merge mode, and the like and generates an inter mode which is information designating the selected mode.

In step S402, the inter-mode generating unit 431 determines whether the generated inter mode is the inter-prediction mode.

When the inter mode is the inter-prediction mode, the inter-mode generating unit 431 determines the reference image in step S403, and the vector predicting unit 433 executes the vector prediction process in step S404.

Moreover, when the inter mode is not the inter-prediction mode, in step S404, the vector predicting unit 434 performs a vector prediction process.

In step S405, the mode determining unit 435 determines the mode based on the predictive vector or the like generated in step S404. This mode is used in the process of step S401.

In step S405, the lossless encoding unit 106 encodes the information of the mode determined in step S405.

[Flow of Vector Prediction Process]

An example of the flow of the vector prediction process executed by the vector predicting unit 433 in step S404 of FIG. 41 will be described with reference to the flowchart of FIG. 42.

When the vector prediction process starts, the motion/parallax vector search unit 451 searches vectors in step S421.

In step S422, the predicted image generating unit 452 generates a predicted image.

In step S423, the vector cost calculating unit 453 generates a residual image.

In step S424, the neighboring block-based predictive vector generating unit 456 and the different picture-based predictive vector generating unit 457 generates a predictive vector from the encoded vector.

In step S425, the vector cost calculating unit 453 calculates the residue of the vector.

In step S426, the vector determining unit 454 determines a predictive vector having the smallest cost. This processing result is reflected on the process of step S424.

Figure 41:
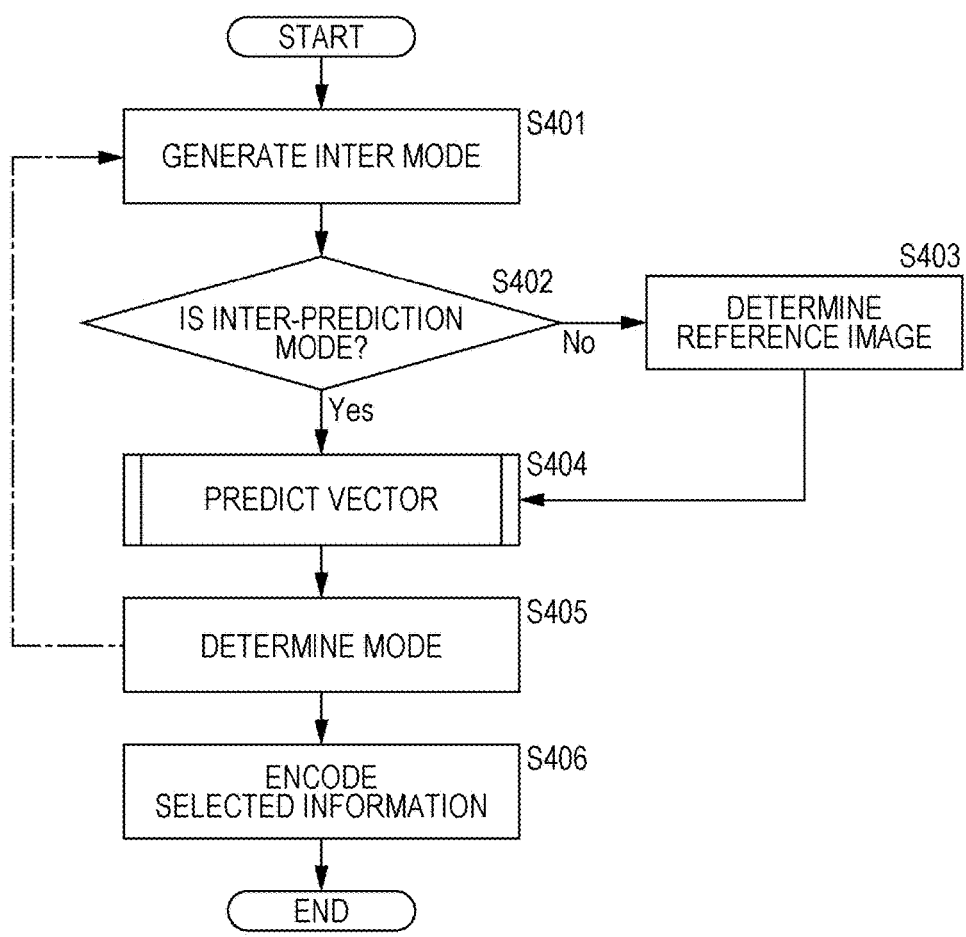
FIG. 41 is a flowchart for describing an example of the flow of a motion prediction/compensation process.

In step S427, the vector information accumulation buffer 455 accumulates the vector information and the flow returns to the flowchart of FIG. 41.

[Flow of Predictive Vector Generation Process]

Next, an example of the flow of the predictive vector generation process executed in step S424 of FIG. 42 will be described with reference to the flowchart of FIG. 43.

When the predictive vector generation process starts, in step S441, the selector 458 determines which block is to be referred to.

Figure 42:
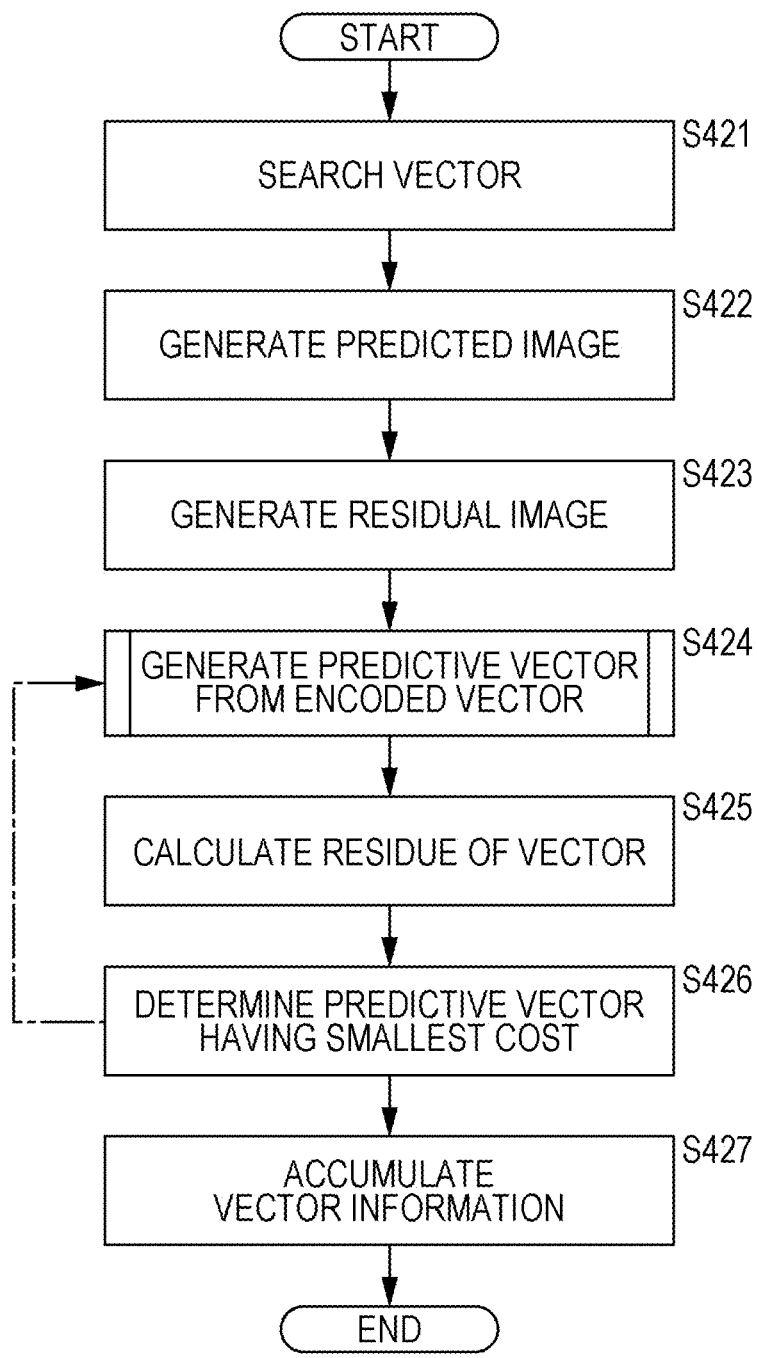
FIG. 42 is a flowchart for describing an example of the flow of a vector prediction process.

When it is determined that the neighboring block of the picture is to be referred to, in step S442, the neighboring block-based predictive vector generating unit 456 sets the encoded vector of the neighboring block to the predictive vector and the flow returns to the flowchart of FIG. 42.

Moreover, when it is determined in step S441 that the block of a different picture is to be referred to, the selector 458 proceeds to the process of step S443 to determine a view of which the picture is to be referred to.

When it is determined that the picture of a different view is to be referred to, in step S444, the different picture-based predictive vector generating unit 457 generates a predictive vector of the view direction from a encoded co-located block that is expanded in the view direction and the flow returns to the flowchart of FIG. 42.

Moreover, when it is determined in step S443 that the picture of the same view is to be referred to, in step S445, the different picture-based predictive vector generating unit 457 generates the predictive vector of the temporal direction from the encoded co-located block and the flow returns to the flowchart of FIG. 42.

[Flow of Different Picture-Based Predictive Vector Generation Process]

Next, an example of the flow of the different picture-based predictive vector generation process executed in step S444 of FIG. 43 will be described with reference to the flowchart of FIG. 44.

When the different picture-based predictive vector generation process starts, in step S461, the parallax vector determining unit 471 determines a shift amount from the parallax vector of the neighboring block.

In step S462, the inter-view reference vector generating unit 472 selects a co-located block at a shifted position.

Figure 43:
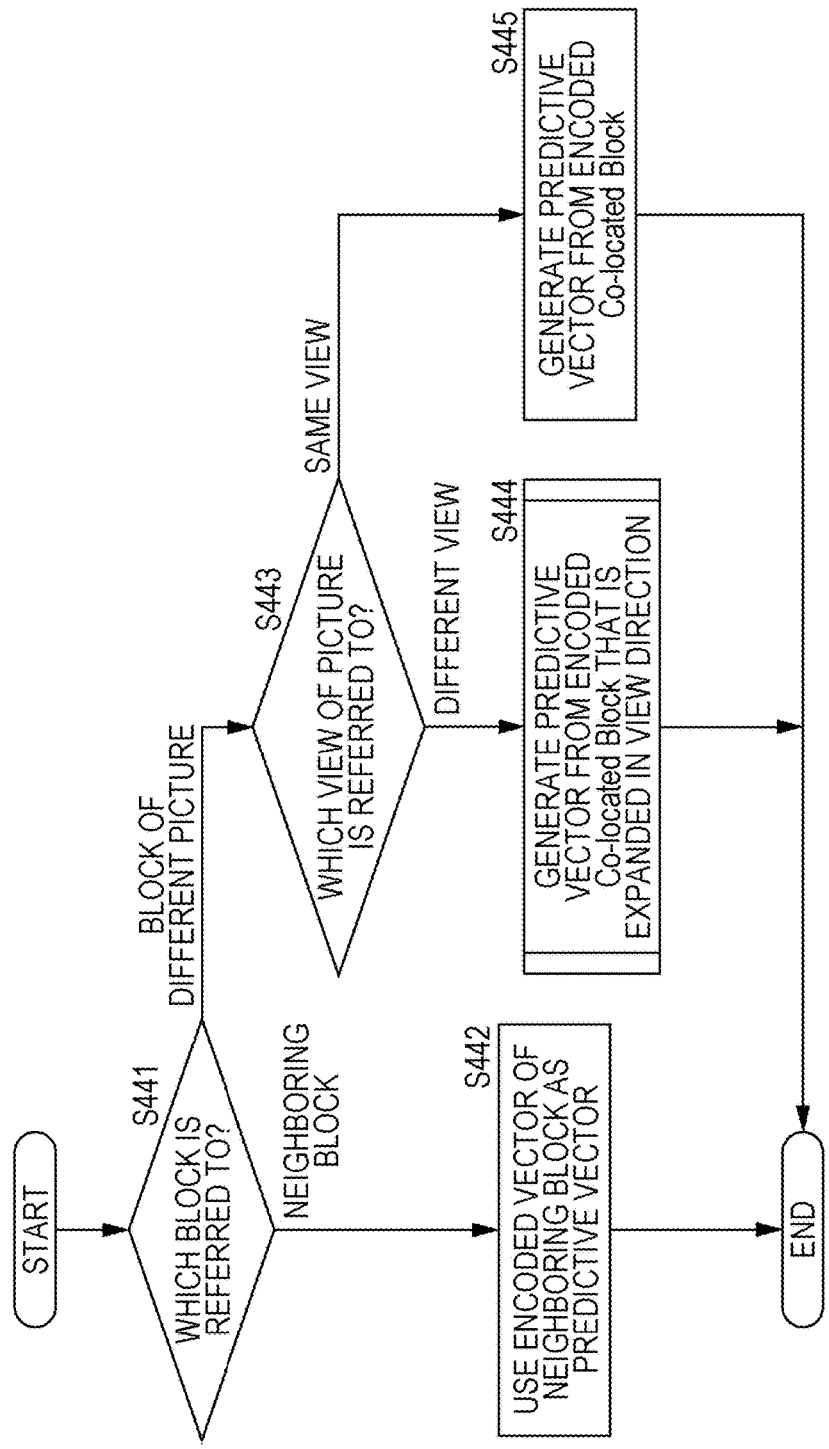
FIG. 43 is a flowchart for describing an example of the flow of a predictive vector generation process.

In step S463, the inter-view reference vector generating unit 472 generates the predictive vector from the co-located block and the flow returns to the flowchart of FIG. 43.

[Flow of Shift Amount Determining Process]

Next, an example of the flow of the shift amount determining process executed in step S461 of FIG. 44 will be described with reference to the flowchart of FIG. 45.

In step S481, the parallax vector determining unit 471 determines whether there is a plurality of blocks in which the value of the Y-direction vector of the parallax vector of the neighboring block is not zero.

Figure 46:
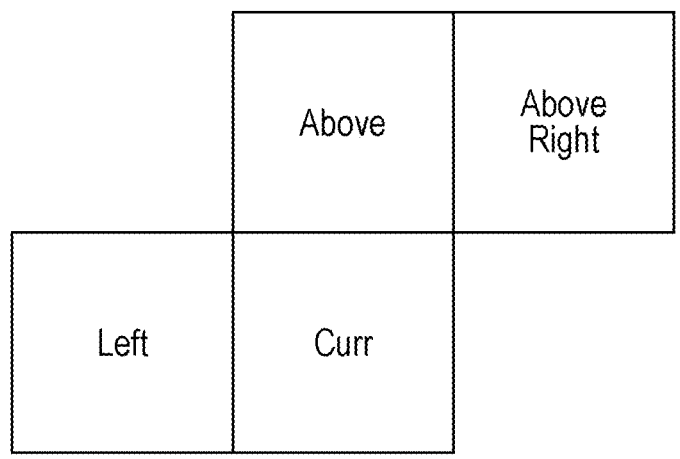
FIG. 46 is a diagram illustrating an example of an arrangement of a current block and neighboring blocks.

The neighboring block is a block located near (including "adjacent") a current block (current block) of a processing target. For example, as illustrated in FIG. 46, a block (Left) adjacent to the left of a current block (Curr), a block (Above) adjacent above the current block, and a block (Above Right) adjacent to the top right corner of the current block are used as the neighboring blocks. Naturally, a block other than these blocks may be included in the neighboring block, and part or all of these blocks may not be used as the neighboring block.

The positions of the neighboring blocks may be the same for all blocks and may be different from block to block. For example, when a block adjacent to a screen end or a slice boundary are used as the current block, part of the neighboring blocks may be set to be not usable.

Figure 44:
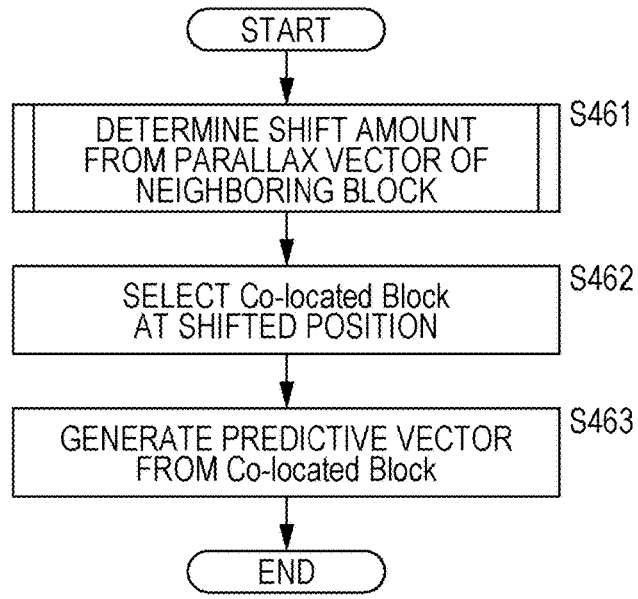
FIG. 44 is a flowchart for describing an example of the flow of a different picture-based predictive vector generation process.

When it is determined in step S481 that there is not a plurality of blocks in which the value of the Y-direction vector is non-zero, the parallax vector determining unit 471 proceeds to the process of step S482 to use the parallax vector in the X-direction of the target as the shift amount, and the flow returns to the flowchart of FIG. 44.

Moreover, when it is determined in step S481 that there is a plurality of blocks in which the value of the Y-direction vector is non-zero, the parallax vector determining unit 471 proceeds to the process of step S483 to set the average value of the parallax vectors in the X-direction of the target as the shift amount, and the flow returns to the flowchart of FIG. 44.

By executing the processes in the above-described manner, the motion prediction/compensation unit 415 can create an appropriate predictive vector with high prediction accuracy. In this way, the image encoding device 400 can improve the encoding efficiency.

4. Fourth Embodiment

[Image Decoding Device]

Figure 47:
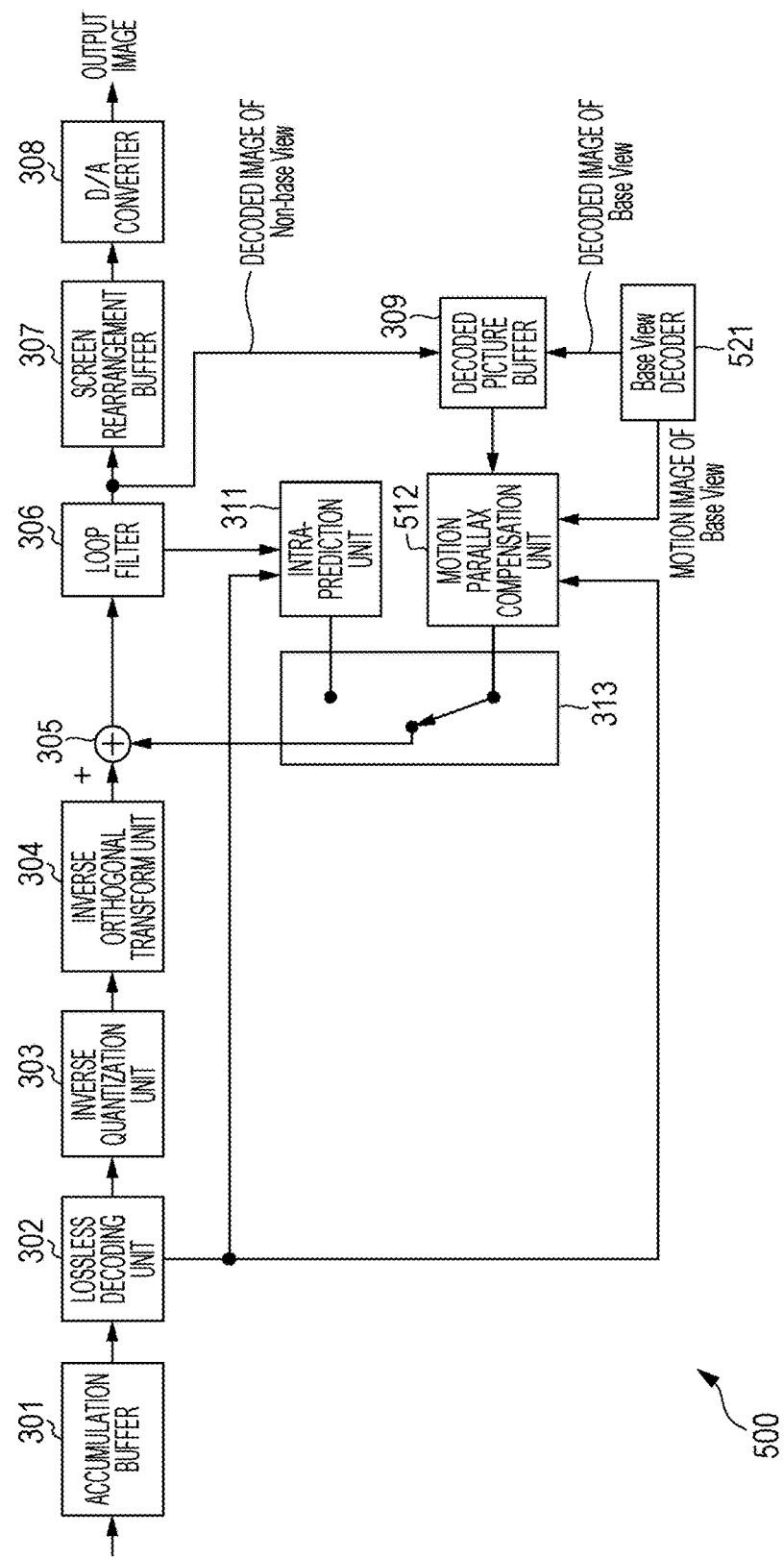
FIG. 47 is a block diagram illustrating another configuration example of an image decoding device.

FIG. 47 is a block diagram illustrating another configuration example of an image decoding device to which the present technique is applied.

An image decoding device 500 illustrated in FIG. 47 is basically the same device as the image decoding device 300 described above. However, the image decoding device 500 generates a predictive vector from blocks aligned between views similarly to the image encoding device 400.

As illustrated in FIG. 47, the image decoding device 500 includes a motion compensation unit 512 and a base view decoder 521.

The motion compensation unit 512 generates a predictive vector that refers to blocks in the view direction using the decoded image acquired from the decoded picture buffer 309 and the motion information of the base view acquired from the base view decoder 521.

The base view decoder 521 encodes the base view. The base view decoder 521 supplies the decoded image of the base view to the decoded picture buffer 309 which stores the decoded image. The decoded picture buffer 309 also stores the decoded image of the non-base view supplied from the loop filter 306.

The base view decoder 521 supplies the motion information of the base view to the motion compensation unit 512.

[Motion Compensation Unit]

Figure 48:
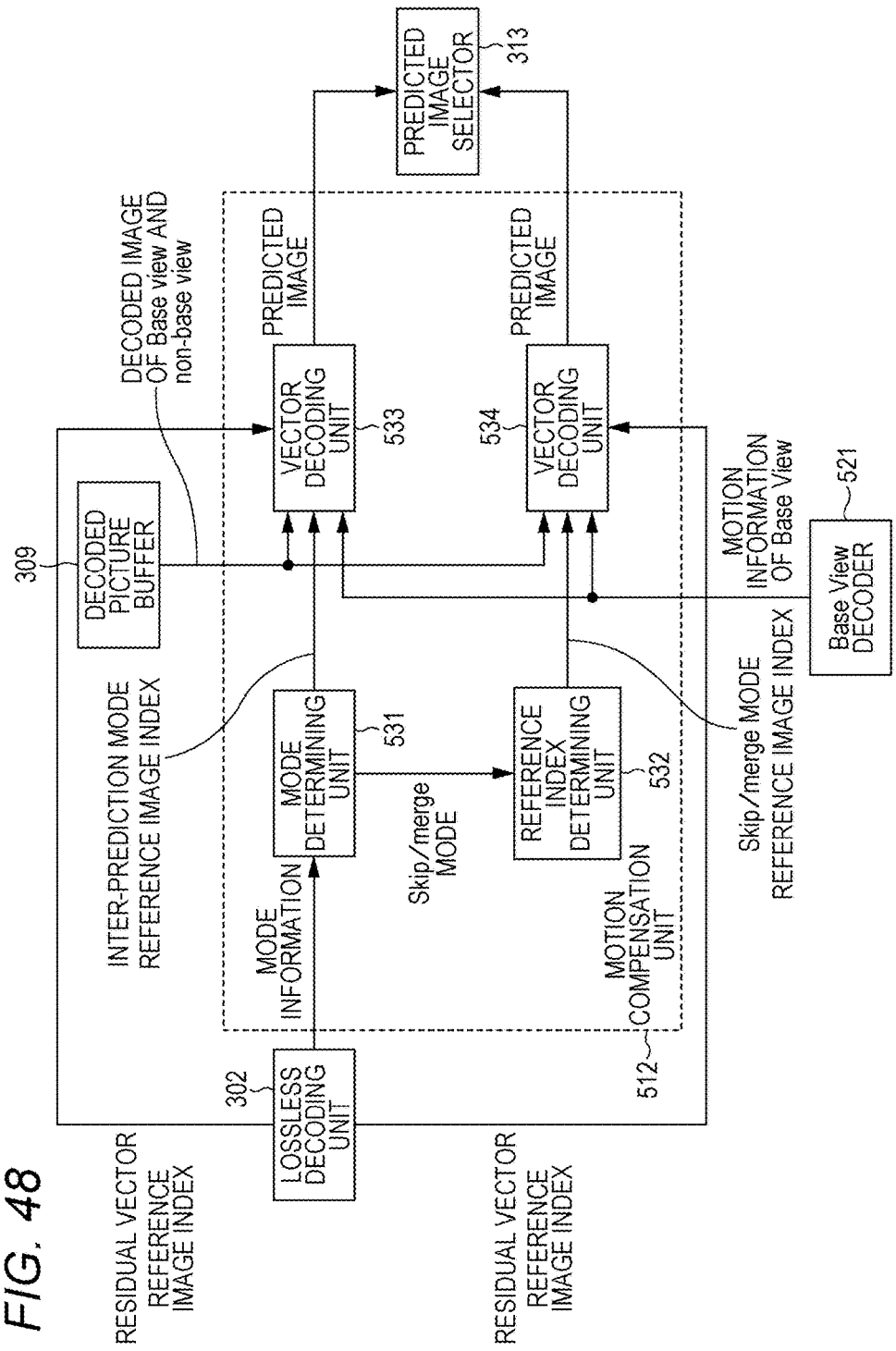
FIG. 48 is a block diagram illustrating a main configuration example of a motion compensation unit.

FIG. 48 is a block diagram illustrating a main configuration example of the motion compensation unit 512 of FIG. 47.

As illustrated in FIG. 48, the motion compensation unit 512 includes a mode determining unit 531, a reference index determining unit 532, a vector decoding unit 533, and a vector decoding unit 534. The information illustrated in FIG. 48 is exchanged between the respective processing units.

In the case of the inter-prediction mode, the vector decoding unit 533 decodes a residual vector transmitted from the image encoding device 400 to generate a predictive vector. Moreover, the vector decoding unit 533 generates a predicted image using the predictive vector. The predicted image is supplied to the predicted image selector 313.

In the case of the skip mode or the merge mode, the vector decoding unit 534 decodes the residual vector transmitted from the image encoding device 400 to generate the predictive vector. Moreover, the vector decoding unit 534 generates a predicted image using the predictive vector. The predicted image is supplied to the predicted image selector 313.

[Vector Decoding Unit]

Figure 49:
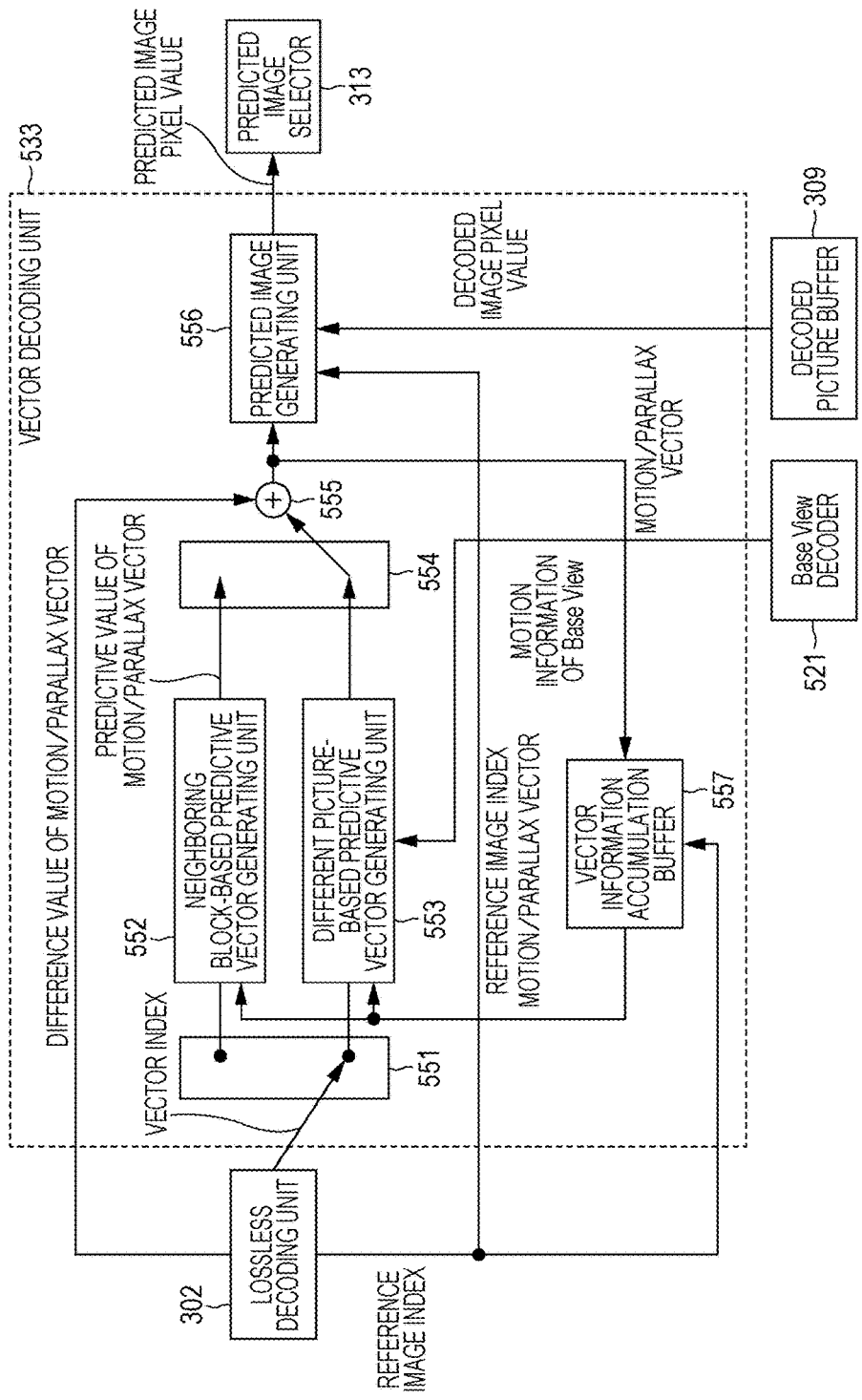
FIG. 49 is a block diagram illustrating a main configuration example of a vector decoding unit.

FIG. 49 is a block diagram illustrating a main configuration example of the vector decoding unit 533.

As illustrated in FIG. 49, the vector decoding unit 533 includes a selector 551, a neighboring block-based predictive vector generating unit 552, a different picture-based predictive vector generating unit 553, a selector 554, an arithmetic unit 555, a predicted image generating unit 556, and a vector information accumulation buffer 557. The information illustrated in FIG. 49 is exchanged between the respective processing units.

The selector 551 supplies the vector index supplied from the lossless decoding unit 302 to the neighboring block-based predictive vector generating unit 552 (in the case of the skip mode, the merge mode, or the like) or to the different picture-based predictive vector generating unit 553 (in the case of the inter-prediction mode) according to the inter mode.

The neighboring block-based predictive vector generating unit 552 supplied with the vector index generates a predictive vector from the neighboring blocks in the current picture using the vector information acquired from the vector information accumulation buffer 557.

The different picture-based predictive vector generating unit 553 supplied with the vector index generates a predictive vector from different pictures in the current view using the vector information acquired from the vector information accumulation buffer 557. Moreover, the different picture-based predictive vector generating unit 553 generates the predictive vector from different pictures of different views using the vector information acquired from the vector information accumulation buffer 557 or the motion information of the base view supplied from the base view decoder 521.

The different picture-based predictive vector generating unit 553 is the same processing unit as the parallax vector determining unit 471 of the different picture-based predictive vector generating unit 457 and generates the predictive vector according to the same method.

The selector 554 supplies the predictive vector generated by the neighboring block-based predictive vector generating unit 552 or the predictive vector generated by the different picture-based predictive vector generating unit 553 to the arithmetic unit 555.

The arithmetic unit 555 adds the difference value (residue vector) of the motion/parallax vector supplied from the lossless decoding unit 302 and the predictive vector to generate a motion/parallax vector of the current region. The arithmetic unit 555 supplies the motion/parallax vector to the predicted image generating unit 556. Moreover, the arithmetic unit 555 supplies the motion/parallax vector to the vector information accumulation buffer 557 which stores the motion/parallax vector.

The predicted image generating unit 556 generates a predicted image using the motion/parallax vector of the current region supplied from the arithmetic unit 555, the reference image index supplied from the lossless decoding unit 302, and the decoded image pixel value supplied from the decoded picture buffer 309. The predicted image generating unit 556 supplies the generated predicted image pixel value to the predicted image selector 313.

[Different Picture-Based Predictive Vector Generating Unit]

Figure 50:
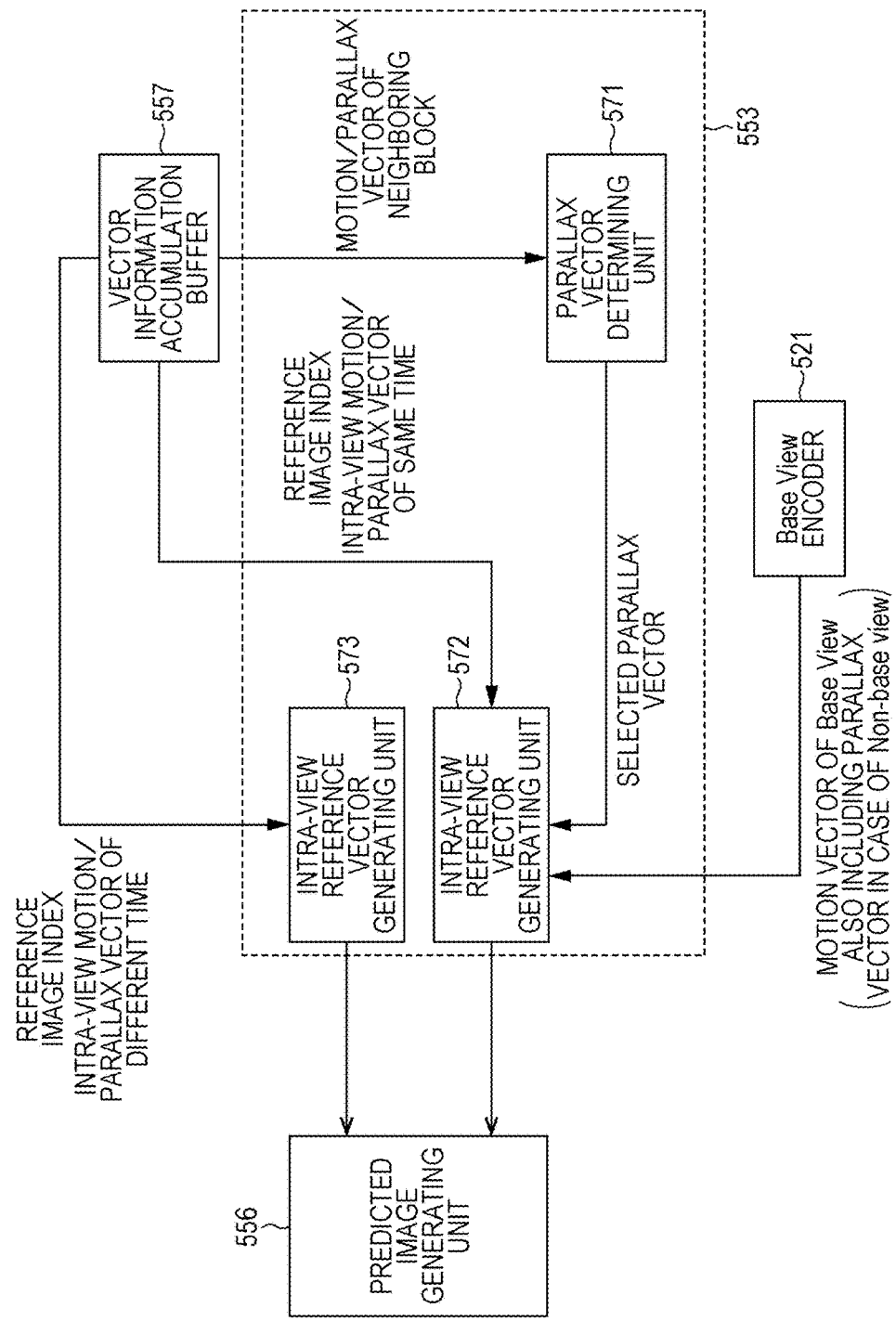
FIG. 50 is a block diagram illustrating a main configuration example of a different picture-based predictive vector generating unit.

FIG. 50 is a block diagram illustrating a main configuration example of the different picture-based predictive vector generating unit 553.

As illustrated in FIG. 50, the different picture-based predictive vector generating unit 553 includes a parallax vector determining unit 571, an inter-view reference vector generating unit 572, and an intra-view reference vector generating unit 573.

The parallax vector determining unit 571, the inter-view reference vector generating unit 572, and the intra-view reference vector generating unit 573 are the same processing units and perform the same processes as the parallax vector determining unit 471, the inter-view reference vector generating unit 472, and the intra-view reference vector generating unit 473 of the different picture-based predictive vector generating unit 457, respectively.

That is, the parallax vector determining unit 571 calculates a shift amount of an image of a view of a reference destination according to the same method as the parallax vector determining unit 471 and shifts the image.

Thus, the different picture-based predictive vector generating unit 553 can correctly decode the residual vector to generate the same appropriate predictive vector with high prediction accuracy as the predictive vector generated by the different picture-based predictive vector generating unit 457. That is, the vector decoding unit 533 can generate the same predicted image as the predicted image generated by the vector predicting unit 433. Therefore, the image decoding device 500 can improve the encoding efficiency since the image decoding device 500 can correctly decode the encoded data generated by the image encoding device 400.

The shift amount calculating method of the parallax vector determining unit 571 is not limited as long as it is the same as the parallax vector determining unit 471 but the method is optional. For example, any one of the parallax vectors of the neighboring blocks may be selected and the selected parallax vector may be used as the shift amount. Moreover, for example, an average value or a median value of the parallax vectors of the neighboring blocks may be used as the shift amount.

[Flow of Motion Compensation Process]

An example of the flow of the motion compensation process will be described with reference to the flowchart of FIG. 51.

When the motion prediction/compensation process starts, the mode determining unit 531 decodes the inter mode in step S501 and determines whether the inter mode is an inter-prediction mode in step S502.

When the inter mode is the inter-prediction mode, the vector decoding unit 533 determines a reference image in step S503 and performs a vector decoding process to decode the residual vector to generate a predicted image in step S504.

Moreover, when the inter mode is not the inter-prediction mode, the vector decoding unit 534 performs a vector decoding process to decode the residual vector to generate a predicted image in step S504.

[Flow of Vector Decoding Process]

An example of the flow of the vector decoding process executed by the vector decoding unit 533 in step S504 of FIG. 51 will be described with reference to the flowchart of FIG. 52.

When the vector decoding process starts, in step S521, the lossless decoding unit 302 decodes the residual vector (difference vector).

In step S522, the lossless decoding unit 302 decodes the reference image index.

In step S523, the lossless decoding unit 302 decodes the vector index.

In step S524, the neighboring block-based predictive vector generating unit 552 and the different picture-based predictive vector generating unit 553 generate a predictive vector from the encoded vector. The arithmetic unit 555 adds the predictive vector to the residual vector to generate the motion/parallax vector of the current region.

In step S525, the predicted image generating unit 556 generates the predicted image using the motion/parallax vector generated in step S524.

Figure 51:
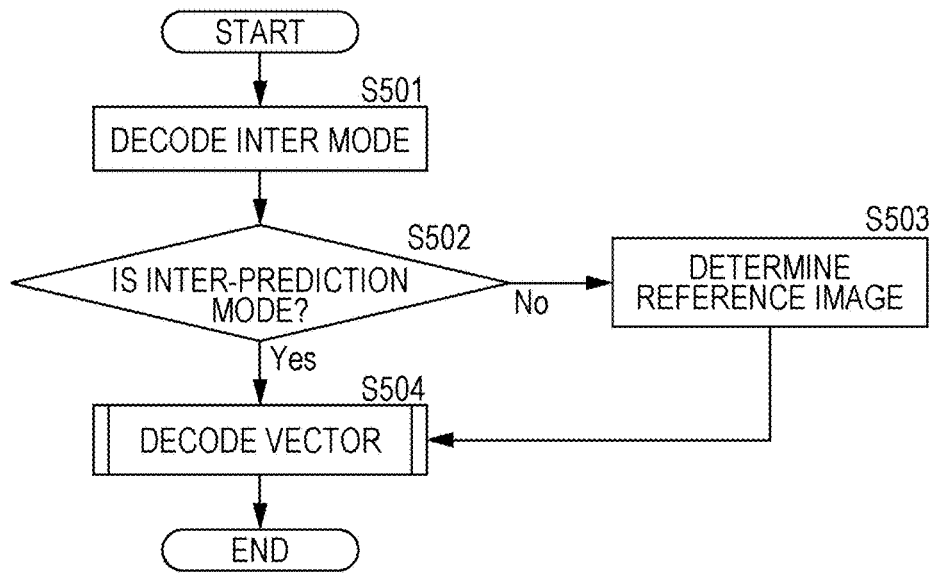
FIG. 51 is a flowchart for describing an example of the flow of a motion compensation process.

In step S526, the vector information accumulation buffer 455 accumulates the vector information and the flow returns to the flowchart of FIG. 51.

[Flow of Predictive Vector Generation Process]

Next, an example of the flow of the predictive vector generation process executed in step S524 of FIG. 52 will be described with reference to the flowchart of FIG. 53.

When the predictive vector generation process starts, in step S541, the selector 554 determines a block that is to be referred to.

Figure 52:
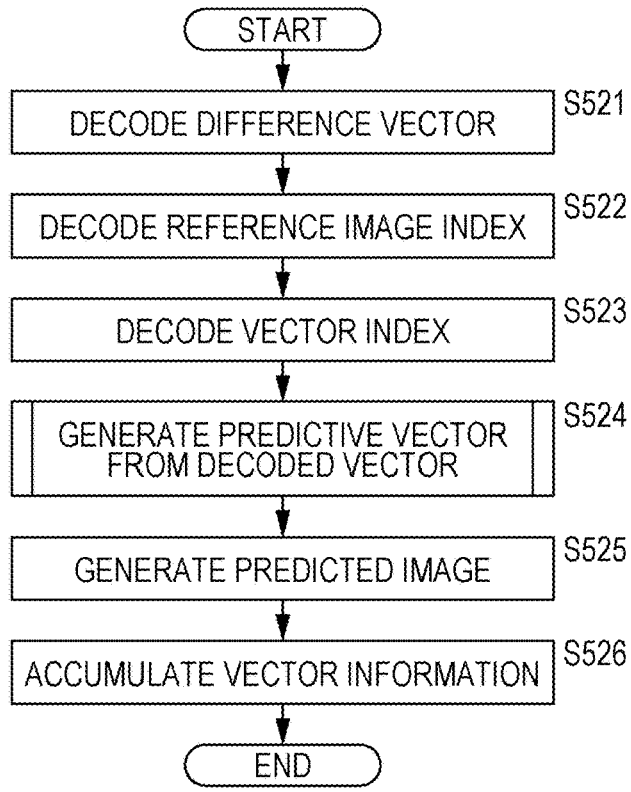
FIG. 52 is a flowchart for describing an example of the flow of a vector decoding process.

When it is determined that a neighboring block of a current picture is to be referred to, in step S542, the neighboring block-based predictive vector generating unit 552 uses the encoded vector of the neighboring block as the predictive vector and the flow returns to the flowchart of FIG. 52.

Moreover, when it is determined in step S541 that the block of a different picture is to be referred to, the selector 554 proceeds to the process of step S543 to determine a view of which the picture is to be referred to.

When it is determined that the picture of a different view is to be referred to, in step S544, the different picture-based predictive vector generating unit 553 generates a predictive vector of the view direction from a encoded co-located block that is expanded in the view direction and the flow returns to the flowchart of FIG. 52.

Moreover, when it is determined in step S543 that the picture of the same view is to be referred to, in step S545, the different picture-based predictive vector generating unit 553 generates the predictive vector of the temporal direction from the encoded co-located block and the flow returns to the flowchart of FIG. 52.

[Flow of Different Picture-Based Predictive Vector Generation Process]

Next, an example of the flow of the different picture-based predictive vector generation process executed in step S544 of FIG. 53 will be described with reference to the flowchart of FIG. 54.

When the different picture-based predictive vector generation process starts, in step S561, the parallax vector determining unit 571 determines a shift amount from the parallax vector of the neighboring block.

In step S562, the inter-view reference vector generating unit 572 selects a co-located block at a shifted position.

Figure 53:
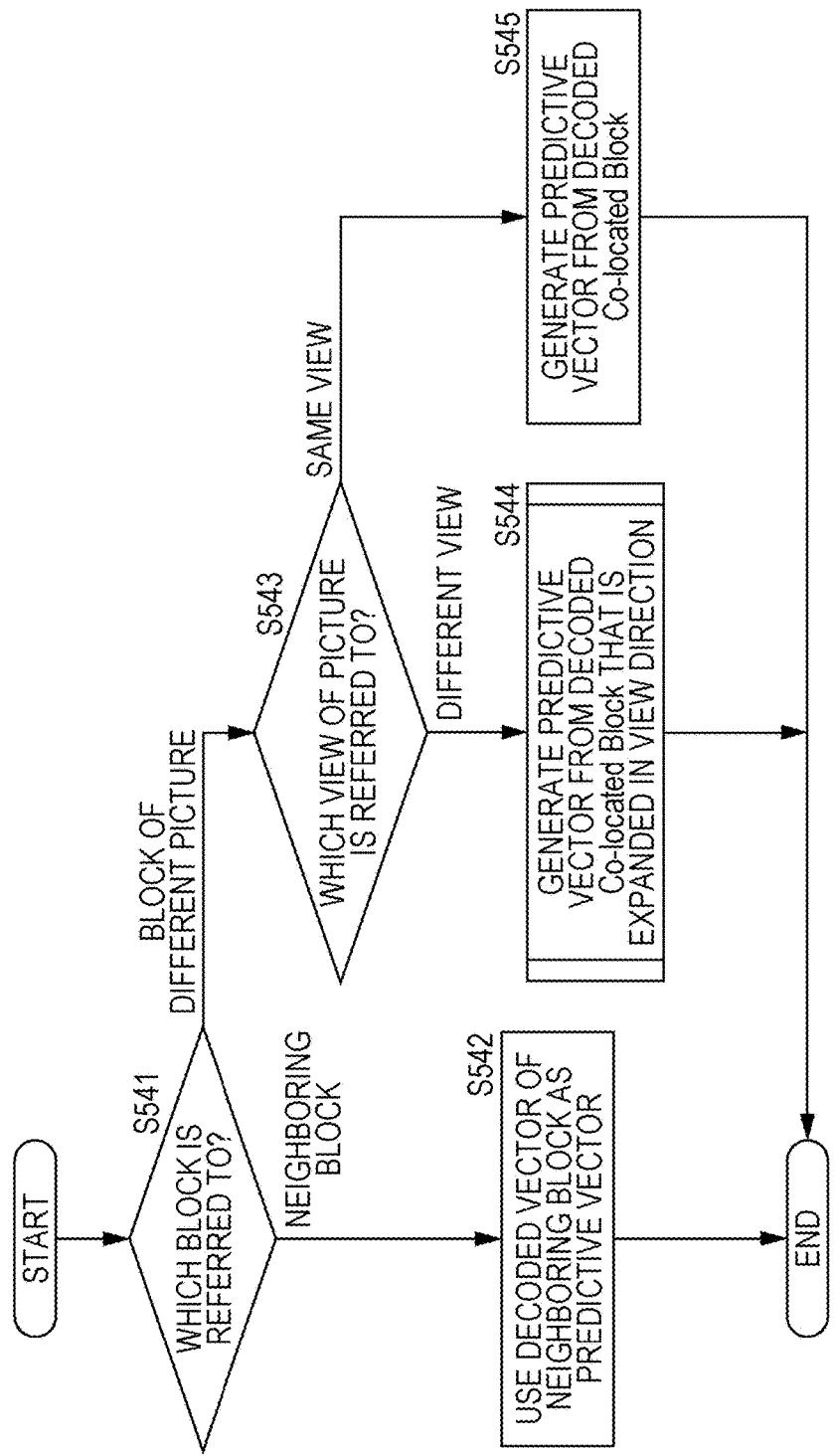
FIG. 53 is a flowchart for describing an example of the flow of a predictive vector generation process.

In step S563, the inter-view reference vector generating unit 572 generates the predictive vector from the co-located block and the flow returns to the flowchart of FIG. 53.

That is, the process is performed in the same flow as the flowchart of FIG. 44.

[Flow of Shift Amount Determining Process]

Next, an example of the flow of the shift amount determining process executed in step S561 of FIG. 54 will be described with reference to the flowchart of FIG. 55.

In step S581, the parallax vector determining unit 571 determines whether there is a plurality of blocks in which the value of the Y-direction vector of the parallax vector of the neighboring block is non-zero.

Figure 54:
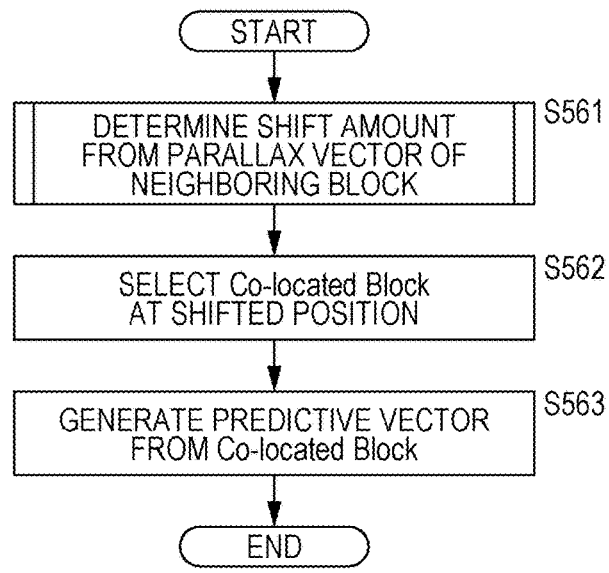
FIG. 54 is a flowchart for describing an example of the flow of a different picture-based predictive vector generation process.
Figure 55:
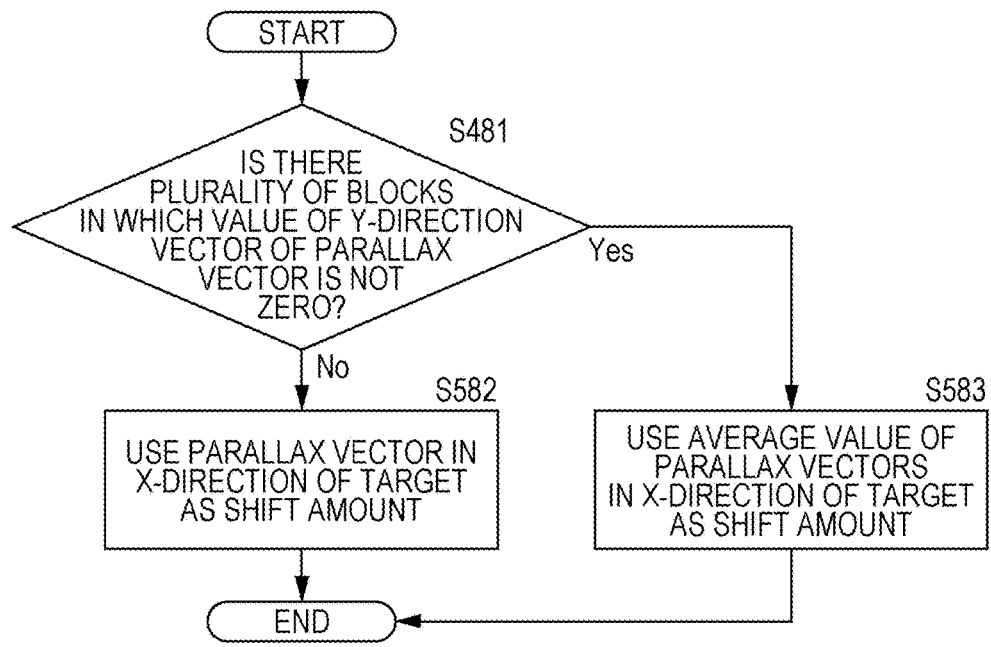
FIG. 55 is a flowchart for describing an example of the flow of a shift amount determining process.

When it is determined in step S581 that there is not a plurality of blocks in which the value of the Y-direction vector is non-zero, the parallax vector determining unit 571 proceeds to the process of step S582 to use the parallax vector in the X-direction of the target as the shift amount, and the flow returns to the flowchart of FIG. 54.

Moreover, when it is determined in step S581 that there is a plurality of blocks in which the value of the Y-direction vector is non-zero, the parallax vector determining unit 571 proceeds to the process of step S583 to use the average value of the parallax vectors in the X-direction of the target as the shift amount, and the flow returns to the flowchart of FIG. 54.

Figure 45:
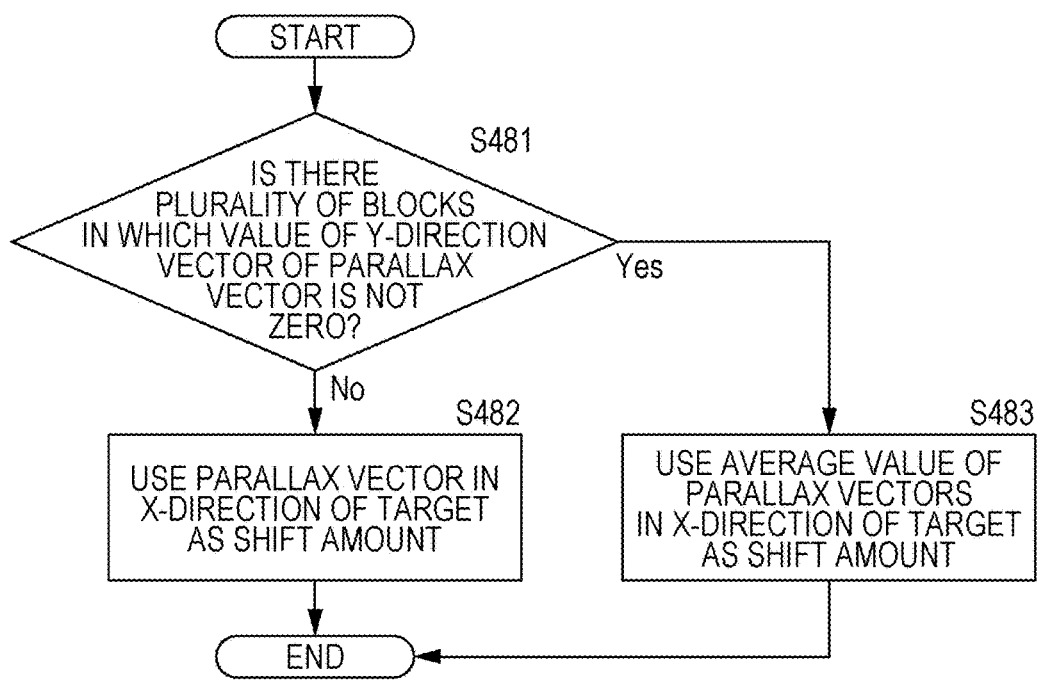
FIG. 45 is a flowchart for describing an example of the flow of a shift amount determining process.

That is, the process is performed in the same flow as the flowchart of FIG. 45. The same is true for the neighboring block.

By executing the processes in the above-described manner, the motion compensation unit 512 can create an appropriate predictive vector with high prediction accuracy. In this way, the image decoding device 500 can improve the encoding efficiency.

As described above, the information such as the neighboring block for calculating the shift amount and the shift amount computing method may be transmitted from the image encoding device 400 to the image decoding device 500.

5. Fifth Embodiment

[Predictive Vector]

As described in the third and fourth embodiments, a block at a shifted position can be selected when a block of a view direction is selected in order to generate a predictive vector.

Candidates for the predictive vector may be generated using the vector (co-located block) of a co-located block which is a block at the same position, belonging to the picture of a different time, of the same view as the current region, or a global parallax vector.

Figure 56:
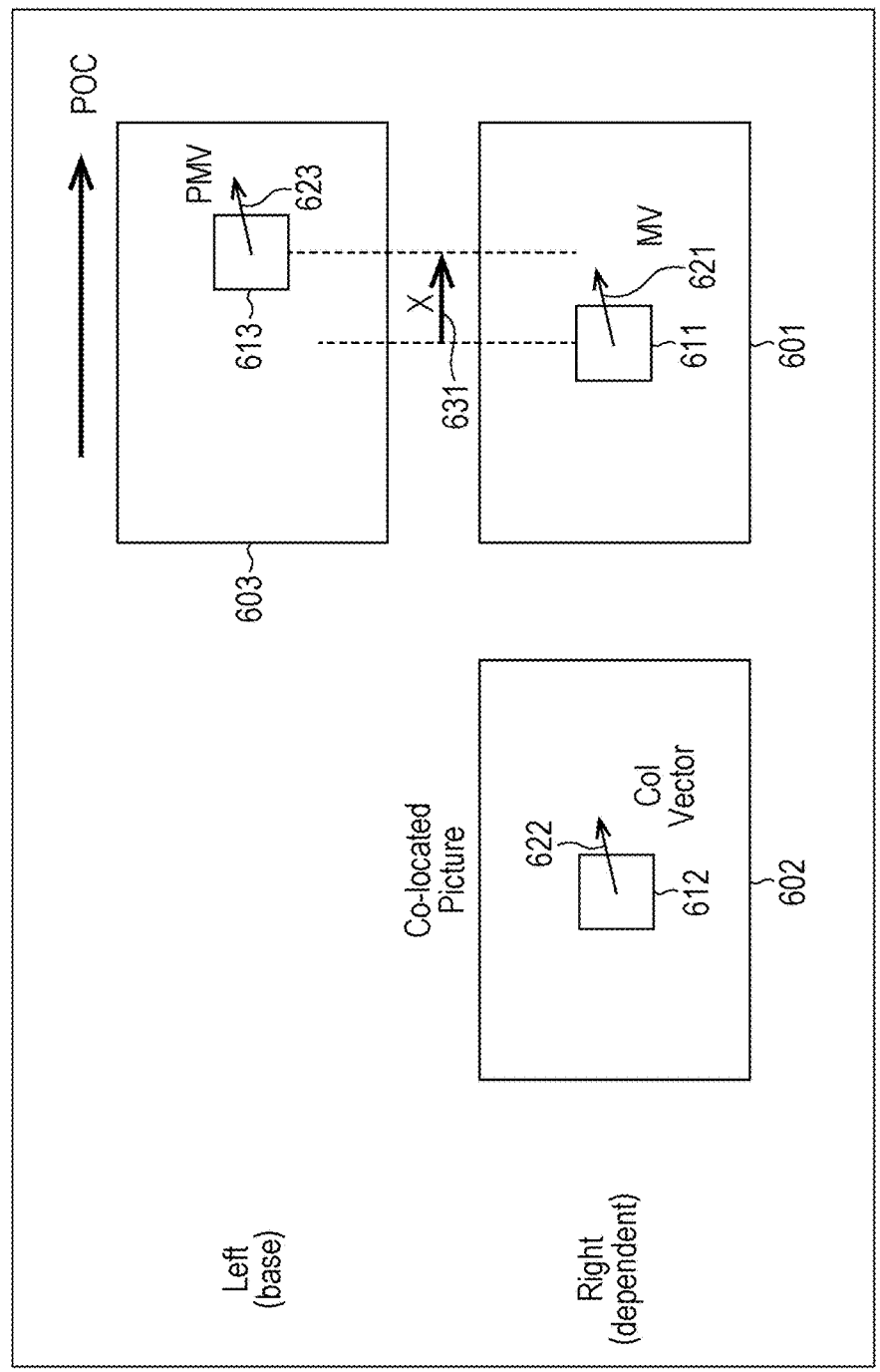
FIG. 56 is a diagram illustrating an example of the way of generating a predictive vector.

For example, as illustrated in FIG. 56, any one (for example, a left-eye image) of the right and left images of a 3D image is used as a base view and the other image (for example, a right-eye image) is used as a dependent view.

When a vector (coding vector) 621 of a current region 611 of a current picture 601 of the dependent view is predicted, a predictive vector may be obtained using a motion vector (co-located vector) 622 of a co-located block 612 at the same position as the current region, of a co-located picture 602 which is a picture of a different time, of the same view as the current region, for example, or a global parallax vector (not illustrated).

For example, a vector 623 of a block 613 at a position shifted by the co-located block 622 or the global parallax vector (vector 631) from the same position as the current region 11 of a picture 603 of the base view of the same time as the current picture 601 may be used as a predictive vector (PMV) of a coding vector (MV) 621. Moreover, the co-located block 622 or the global parallax vector may be used as the predictive vector of the coding vector (MV) 621.

By using the same order in both an encoding-side device and a decoding-side device, the same prediction can be performed in both the encoding side and the decoding side.

Information indicating which one of the co-located block and the global parallax vector will be used, information on the co-located block or the global parallax vector, and the like may be explicitly designated and the information thereof may be transmitted from the encoding side to the decoding side. Moreover, the information on a shift amount computing method may be transmitted from the encoding side to the decoding side.

By doing so, the image encoding device and the image decoding device can generate a predictive vector from blocks aligned similarly between views. Therefore, it is possible to improve the prediction accuracy of the predicted image and to improve the encoding efficiency.

[Global Parallax Vector]

Next, the global parallax vector will be described. The global parallax vector is a representative parallax vector that is global (for each of predetermined units such as pictures, slices, LCUs, or CUs, for example). For example, the global parallax vector generated for each picture indicates a parallax amount between views. A method of generating the global parallax vector is optional.

A specific example of the global parallax vector is disclosed in Junghak Nam, Hyomin Choi, Sunmi Yoo, Woong Lim, Donggyu Sim, "3D-HEVC-CE3 result on KWU's advanced motion and disparity prediction method based on global disparity," INTERNATIONAL ORGANISATION FOR STANDARDISATION ORGANISATION INTERNATIONALE DE NORMALISATION ISO/IEC JTC1/SC29/WG11 CODING OF MOVING PICTURES AND AUDIO, ISO/IEC JTC1/SC29/WG11 MPEG2011/M23620, February 2012, San Jose, Calif.

Figure 57:
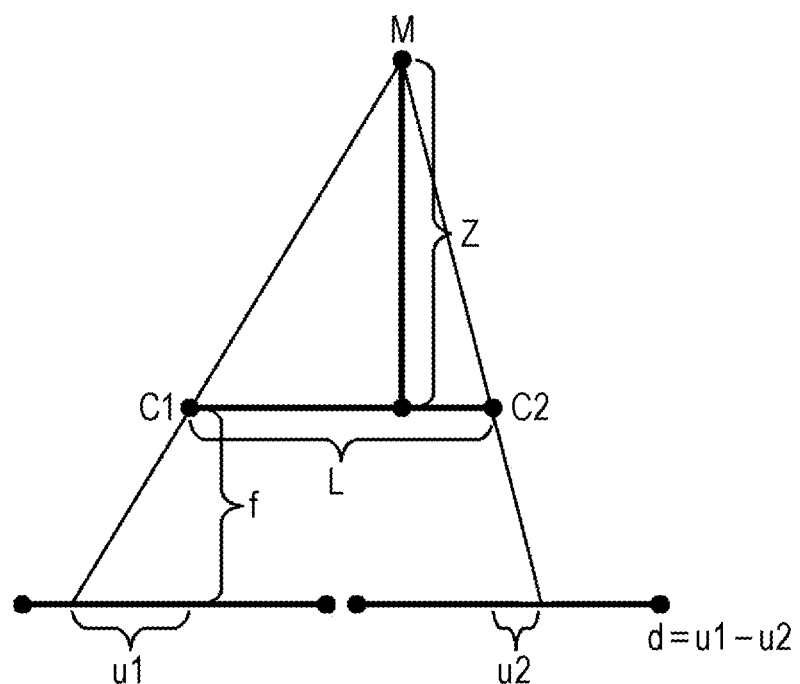
FIG. 57 is a diagram for describing a parallax and a depth.

FIG. 57 is a diagram for describing a parallax and a depth.

As illustrated in FIG. 57, when a color image of a subject M is captured by a camera c1 disposed at a position C1 and a camera c2 disposed at a position C2, a depth Z which is a distance of the subject M in the depth direction from the camera c1 (camera c2) is defined by Expression (1) below.

$$Z=(L/d)\times f \qquad (1)$$

"L" is the distance (hereinafter, referred to as an inter-camera distance) in the horizontal direction between the positions C1 and C2. Moreover, "d" is a value (that is, a parallax (disparity)) obtained by subtracting a distance u2 in the horizontal direction from the center of the color image, of the position of the subject M on the color image captured by the camera c2 from a distance u1 in the horizontal direction from the center of the color image, of the position of the subject M on the color image captured by the camera c1. Further, "f" is a focal distance of the camera c1, and in Expression (1), it is assumed that the focal distances of the cameras c1 and c2 are the same.

That is, the parallax d is defined by Expression (2) below.

[Mathematical formula 1]

$$d = \frac{f}{z} \cdot L \qquad (2)$$

As illustrated in Expression (1) or (2), the parallax d and the depth Z can be converted uniquely. Thus, in the present specification, an image indicating the parallax d of the 2-view color image captured by the cameras c1 and c2 and an image indicating the depth Z will be collectively referred to as a depth image (parallax image).

The depth image (parallax image) may be an image that indicates the parallax d or the depth Z. A normalized value of the parallax d, a normalized value of a reciprocal 1/Z of the depth Z, or the like rather than the parallax d or the depth Z itself may be employed as the pixel value of the depth image (parallax image).

The depth Z can be obtained by Expression (3) below.

[Mathematical formula 2]

$$z = \frac{1}{\frac{d}{255} \cdot \left(\frac{1}{z_{near}} - \frac{1}{z_{far}}\right) + \frac{1}{z_{far}}} \qquad (3)$$

In Expression (3), $Z_{far}$ is the largest value of the depth Z, and $Z_{near}$ is the smallest value of the depth Z. The largest value $Z_{far}$ and the smallest value $Z_{near}$ may be set for one screen unit or may be set for a plurality of screen units.

As described above, in the present specification, by taking the fact that the parallax d and the depth Z can be converted uniquely into consideration, an image of which the pixel value is a normalized value I of the parallax d and an image of which the pixel value is a normalized value y of the reciprocal 1/Z of the depth Z will be collectively referred to a depth image (parallax image). In this example, although a color format of the depth image (parallax image) is YUV420 or YUV400, another color format may be used.

When the information of the value I or y itself rather than the pixel value of the depth image (parallax image) is focused on, the value I or y is used as depth information (parallax information). Further, one that maps the value I or y is used as a depth map (parallax map).

[Generation of Predictive Vector]

The predictive vector is generated according to a method corresponding to properties of both a coding vector and a co-located vector, for example, as in the table illustrated in FIG. 58.

For example, as illustrated on the sixth row from the bottom of the table of FIG. 58, when both the coding vector and the co-located vector are motion vectors, the co-located vector is used as a predictive vector candidate.

Moreover, for example, as illustrated on the second row from the bottom of the table of FIG. 58, when both the coding vector and the co-located vector are parallax vectors (inter-view vectors), the co-located vector is used as a predictive vector candidate.

In contrast, for example, as illustrated on the fifth row from the bottom of the table of FIG. 58, when the coding vector is a motion vector and the co-located vector is a parallax vector (inter-view vector), a motion vector of a base view of a block shifted by a co-located vector is used as a predictive vector candidate.

Moreover, for example, as illustrated on the fourth row from the bottom of the table of FIG. 58, when the coding vector is a motion vector and the co-located block is an intra mode, a motion vector of a base view of a block shifted by a global parallax vector is used as a predictive vector candidate.

Further, for example, as illustrated on the third row from the bottom of the table of FIG. 58, when the coding vector is a parallax vector (inter-view vector) and the co-located vector is a motion vector, the global parallax vector is used as a predictive vector candidate.

Further, for example, as illustrated on the first row from the bottom of the table of FIG. 58, when the coding vector is a parallax vector (inter-view vector) and the co-located block is an intra mode, the global parallax vector is used as a predictive vector candidate.

By increasing the number of methods for generating the candidates for predictive vectors, it is possible to improve the prediction accuracy of the predictive vector and to improve the encoding efficiency.

[Image Encoding Device]

In this case, the configuration example of the image encoding device is the same as that of the image encoding device 400 illustrated in FIGS. 35 to 38, and the description thereof will not be provided.

[Flow of Process]

Moreover, the motion prediction/compensation process of this case is performed in the same manner as that described with reference to the flowchart of FIG. 39. Moreover, the vector prediction process of this case is performed in the same manner as that described with reference to the flowchart of FIG. 40. Thus, the description of these processes will not be provided.

Figure 59:
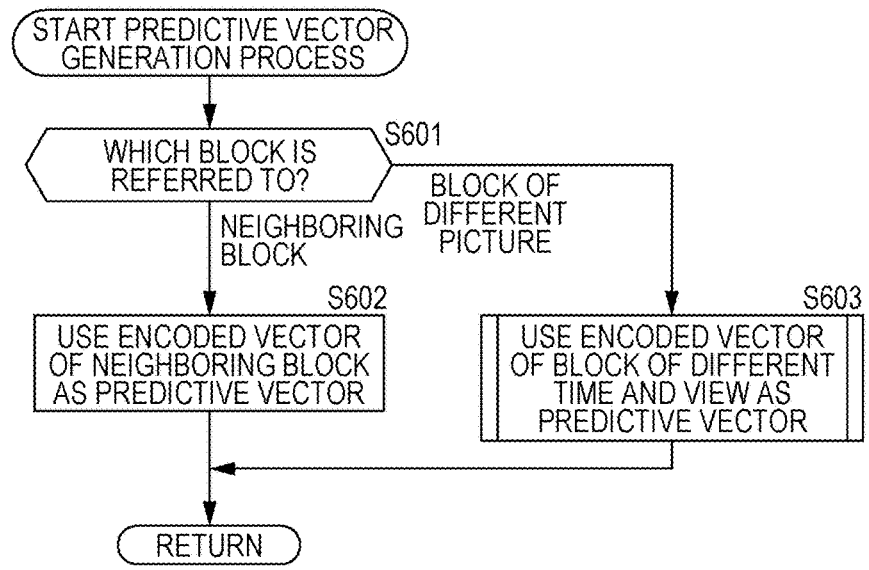
FIG. 59 is a flowchart for describing an example of the flow of a predictive vector generation process.

An example of the flow of the predictive vector generation process of this case will be described with reference to the flowchart of FIG. 59.

When the predictive vector generation process starts, in step S601, the selector 458 determines which block is to be referred to.

When it is determined that the neighboring block is to be referred to, the flow proceeds to step S602. In step S602, the neighboring block-based predictive vector generating unit 456 uses an encoded vector of the neighboring block as a predictive vector. When the process of step S602 ends, the predictive vector generation process ends, and the flow returns to the flowchart of FIG. 40.

Moreover, when it is determined in step S601 that a block of a different picture is selected as a reference destination, the flow proceeds to step S603. In step S603, the different picture-based predictive vector generating unit 457 uses an encoded vector of a block of a different time/view as a predictive vector. When the process of step S603 ends, the predictive vector generation process ends and the flow returns to the flowchart of FIG. 40.

Figure 60:
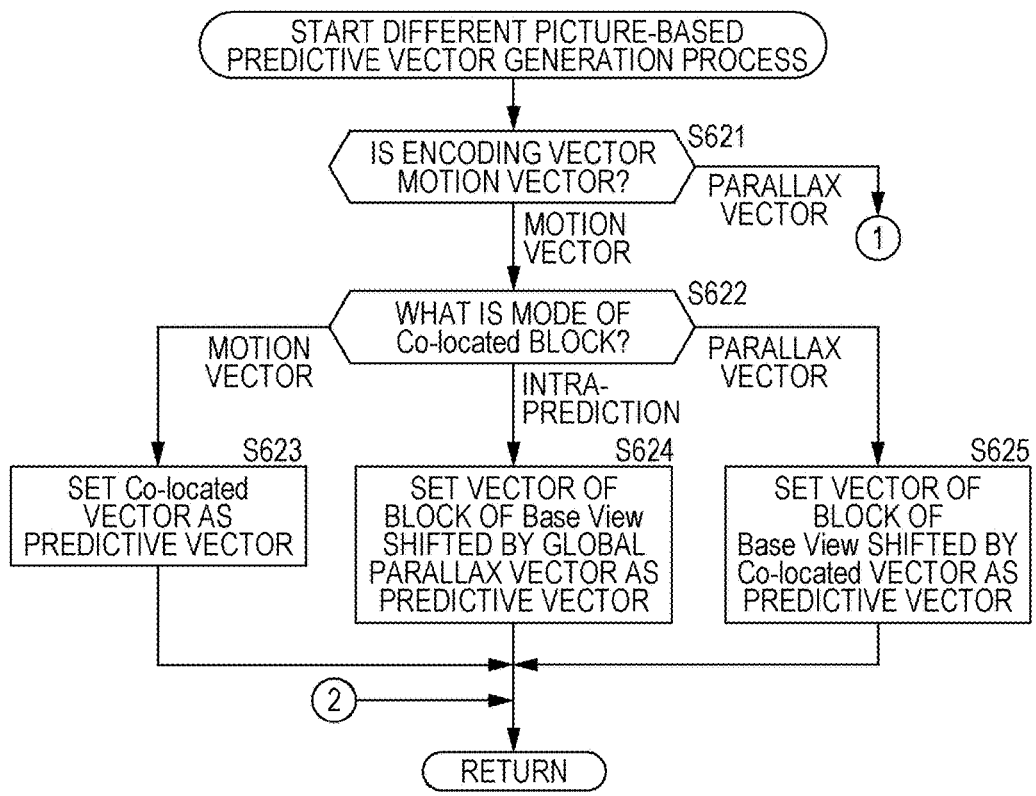
FIG. 60 is a flowchart for describing an example of the flow of a different picture-based predictive vector generation process.

Next, an example of the flow of the different picture-based predictive vector generation process executed in step S603 of FIG. 59 will be described with reference to the flowcharts of FIGS. 60 and 61.

When the different picture-based predictive vector generation process starts, in step S621, the parallax vector determining unit 471 determines whether the coding vector is a motion vector. When it is determined that the coding vector is a motion vector, the flow proceeds to step S622.

In step S622, the parallax vector determining unit 471 determines the mode of the co-located block. When it is determined that the mode of the co-located block is a motion vector, the flow proceeds to step S623.

In step S623, the intra-view reference vector generating unit 473 sets the co-located vector as the predictive vector. When the process of step S623 ends, the different picture-based predictive vector generation process ends, and the flow returns to the flowchart of FIG. 59.

Moreover, when it is determined in step S622 that the mode of the co-located block is an intra-prediction, the flow proceeds to step S624.

In step S624, the inter-view reference vector generating unit 472 obtains a global parallax vector and sets a vector of a block of a base view shifted by the global parallax vector as a predictive vector. When the process of step S624 ends, the different picture-based predictive vector generation process ends and the flow returns to the flowchart of FIG. 59.

Moreover, when it is determined in step S622 that the mode of the co-located block is a parallax vector, the flow proceeds to step S625.

In step S625, the inter-view reference vector generating unit 472 sets a vector of a block of a base view shifted by the co-located vector as a predictive vector. When the process of step S625 ends, the different picture-based predictive vector generation process ends, and the flow returns to the flowchart of FIG. 59.

Figure 61:
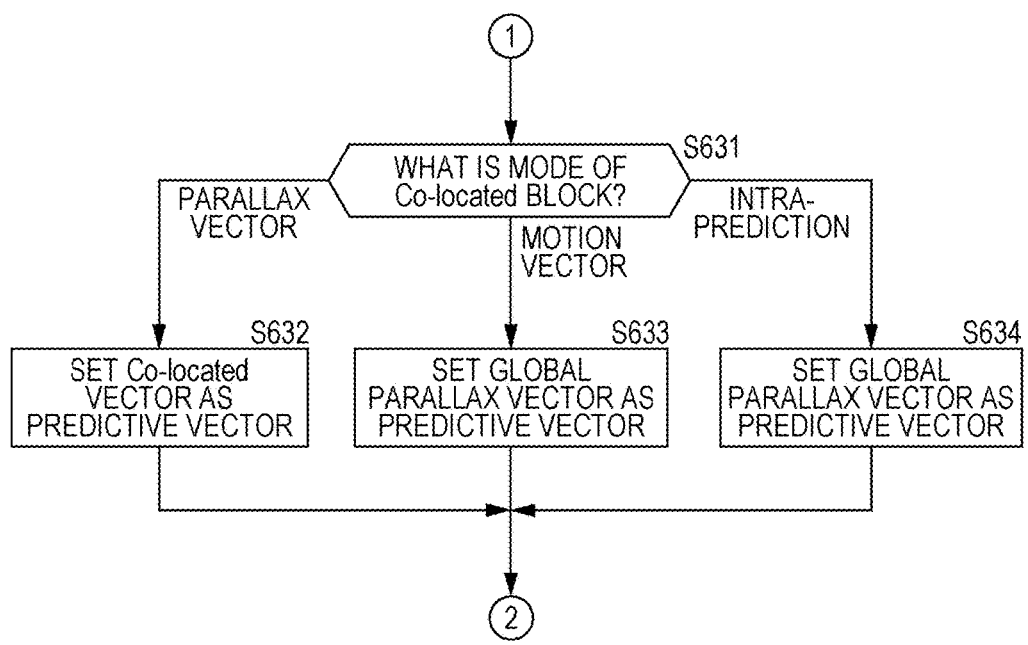
FIG. 61 is a flowchart continued from FIG. 60, for describing an example of the flow of a different picture-based predictive vector generation process.

Moreover, when it is determined in step S621 that the coding vector is a parallax vector, the flow proceeds to the flowchart of FIG. 61.

In step S631 of FIG. 61, the parallax vector determining unit 471 determines the mode of the co-located block. When it is determined that the mode of the co-located block is a parallax vector, the flow proceeds to step S632.

In step S632, the intra-view reference vector generating unit 473 sets the co-located vector as the predictive vector. When the process of step S632 ends, the different picture-based predictive vector generation process ends, and the flow returns to the flowchart of FIG. 59.

Moreover, when it is determined in step S631 that the mode of the co-located block is a motion vector, the flow proceeds to step S634. In step S634, the inter-view reference vector generating unit 472 sets the global parallax vector as the predictive vector. When the process of step S634 ends, the different picture-based predictive vector generation process ends, and the flow returns to the flowchart of FIG. 59.

Further, when it is determined in step S631 that the mode of the co-located block is an intra-prediction, the flow proceeds to step S635. In step S635, the inter-view reference vector generating unit 472 sets the global parallax vector as the predictive vector. When the process of step S635 ends, the different picture-based predictive vector generation process ends, and the flow returns to the flowchart of FIG. 59.

By executing the respective processes in the above-described manner, the image encoding device of this case can generate a predictive vector using the co-located block and the global parallax vector. Due to this, the image encoding device can improve the prediction accuracy of the predictive vector and improve the encoding efficiency.

[Image Decoding Device]

Next, an image decoding device corresponding to the image encoding device of this case will be described. A configuration example of the image decoding device of this case is the same as that of the image decoding device 500 illustrated in FIGS. 45 to 48 similarly to the case of the image encoding device, and the description thereof will not be provided.

[Flow of Process]

Next, the flow of various processes executed by the image decoding device of this case will be described. In this case, the image decoding device performs basically the same process as the image encoding device. That is, the motion compensation process is executed in the same manner as that described with reference to the flowchart of FIG. 49. Moreover, the vector decoding process is executed in the same manner as that described with reference to the flowchart of FIG. 50.

The predictive vector generation process is executed in the same manner as that (that is, that executed by the image encoding device) described with reference to the flowchart of FIG. 59.

However, in this case, the selector 551 performs the process of step S601. Moreover, in step S602, the neighboring block-based predictive vector generating unit 552 uses a decoded vector of the neighboring block as a predictive vector. Further, in step S603, the different picture-based predictive vector generating unit 553 uses a decoded vector of a block of a different time/view as the predictive vector.

Moreover, the different picture-based predictive vector generation process is executed in the same manner as that (that is, that executed by the image encoding device) described with reference to the flowcharts of FIGS. 60 and 61.

However, in this case, the parallax vector determining unit 571 performs the processes of steps S621, S622, and S631, the intra-view reference vector generating unit 573 performs the processes of steps S623 and S632, and the inter-view reference vector generating unit 572 executes the processes of steps S624, S625, S634, and S635.

By executing the respective processes in this manner, the image decoding device of this case can generate the predictive vector using the co-located block and the global parallax vector similarly to the image encoding device. Due to this, the image decoding device can improve the prediction accuracy of the predictive vector and improve the encoding efficiency.

6. Sixth Embodiment

[Type of Reference Image]

For example, in the case of HEVC, a reference image has two types which are a short reference picture and a long reference picture. Since the short reference picture is a picture that is temporally near the encoding picture, a scaling process based on the temporal distance is performed on the predictive vector. In contrast, since the long reference picture is a picture that is temporally distant from the encoding picture, scaling on the predictive vector does not create meaning, and thus, is not performed.

By using these reference pictures appropriately according to a motion of an image or the like, it is possible to further decrease the coding rate.

Although the types (the short reference picture or the long reference picture) of the reference pictures of the coding vector and the predictive vector are different, the predictive vector is set to be available.

When the types of the reference pictures of the coding vector and the predictive vector are different, it is expected that the correlation of these vectors is low. Thus, there is a possibility that the encoding efficiency decreases if the vectors are included in a vector candidate list. For example, there is a possibility that a vector having higher correlation is relegated toward the rear of the candidate list and the coding rate of the index for designating the vector increases. Moreover, for example, there is a possibility that a vector having higher correlation is relegated toward the rear of the candidate list, excluded from the candidate list, and cannot be designated.

Thus, when the types (the short reference picture or the long reference picture) of the reference picture of the coding vector and the predictive vector are different, the predictive vector is set to be not available.

Since the property of a vector that refers to the short reference picture is different from the property of a vector that refers to the long reference picture, it is expected that correlation is low. Thus, by excluding the vectors from the candidate vector in this case, it is possible to improve the encoding efficiency.

Figure 62:
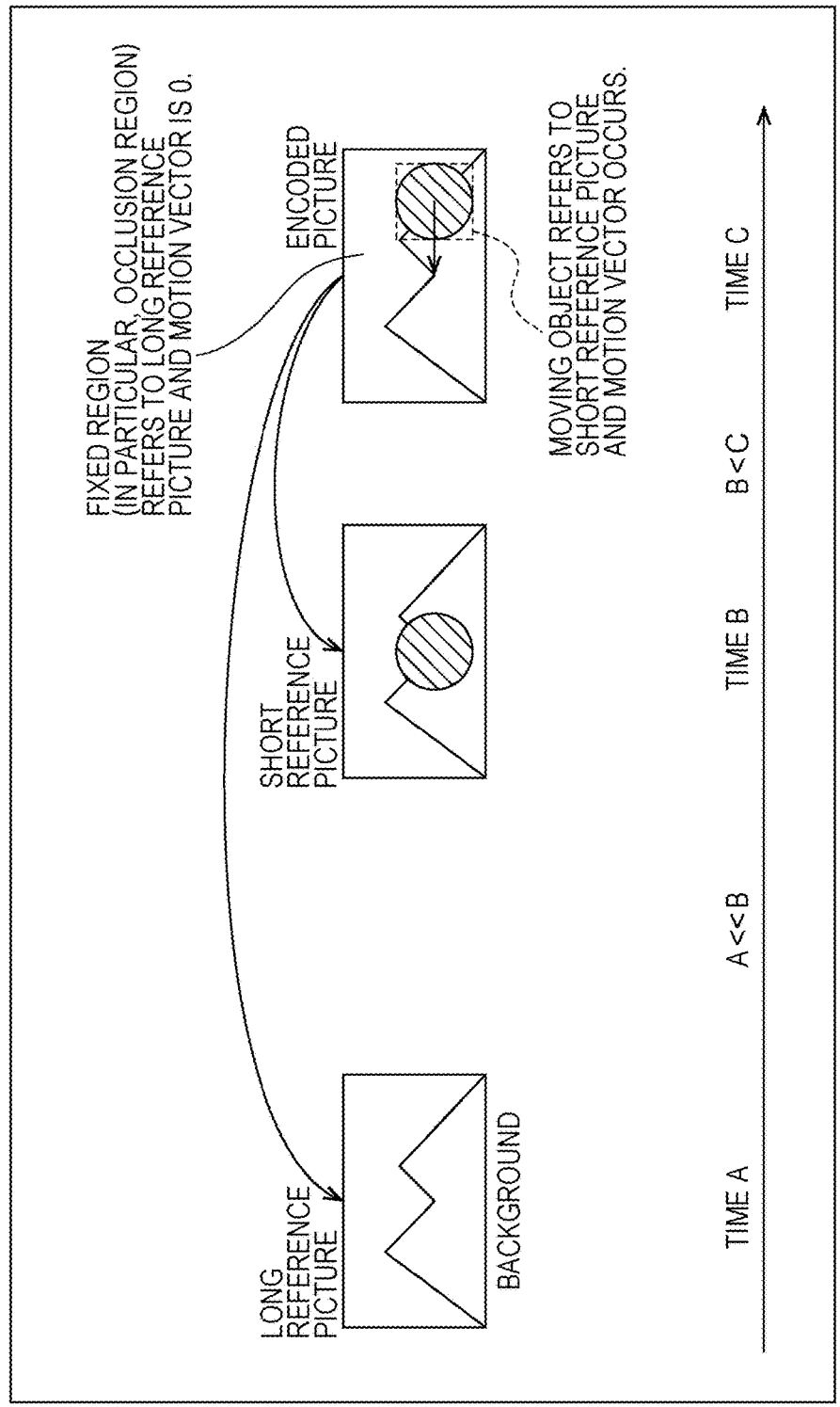
FIG. 62 is a diagram for describing an example of the aspect of a reference image for a fixed background application.

For example, FIG. 62 is a diagram for describing an example of the aspect of a reference image of a fixed background application. In the case of such a moving image (fixed background application) that a moving object is present on the front side of a background image of a still image, since the background (particularly, an occlusion region) which is a fixed region refers to a long reference picture, the motion vector tends to be 0. In contrast, since the moving object on the front side refers to a short reference picture, the motion vector occurs. If the types of reference pictures are different in this manner, the correlation of motion vectors is low (A of FIG. 64). Therefore, as described above, when the types of the reference pictures of the coding vector and the predictive vector are different, by excluding the vectors from the candidate vector, it is possible to improve the encoding efficiency.

Figure 63:
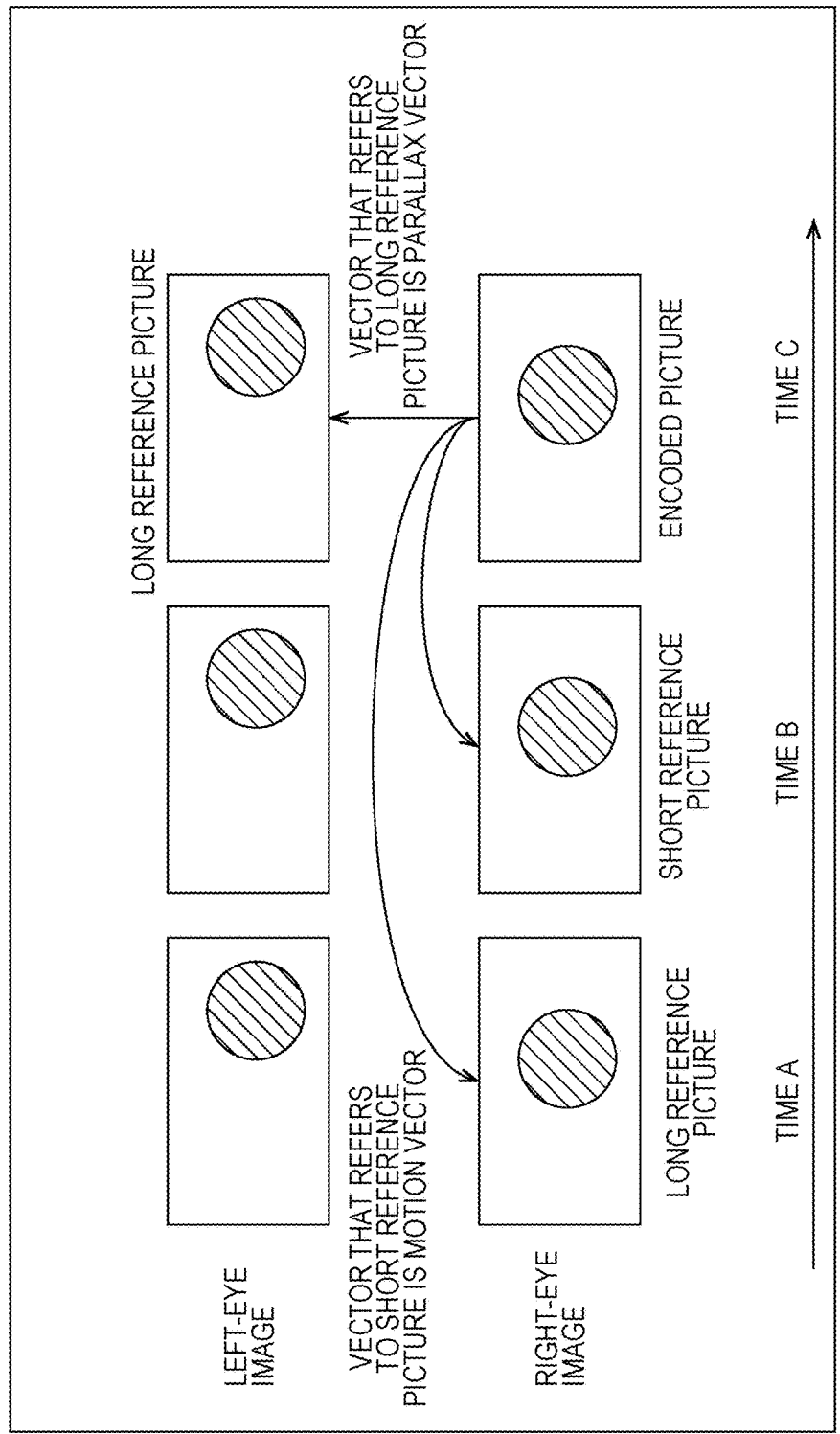
FIG. 63 is a diagram for describing an example of the aspect of a reference image for a stereo application.

Moreover, for example, FIG. 63 is a diagram for describing an example of the aspect of a reference image of a stereo application. In the case of such a moving image (stereo application) that an image (left-eye image) for the left eye and an image (right-eye image) for the right eye are prepared for stereoscopic view, when the dependent view (in this example, the right-eye image) is encoded, the base view (in this example, the left-eye image) is designated as a long reference picture, and an encoded picture of the dependent view is designated as a short reference picture.

When the dependent view is referred to, scaling can be performed since the frame IDs of a reference destination and a reference source are different. However, when the base view is referred to, the frame IDs of the reference destination and the reference source are identical. Thus, during the scaling, the denominator may become 0, and the scaling is difficult. Therefore, in HEVC or the like, the base view is designated as a long reference picture in which the scaling is not performed.

Therefore, in the case of the stereo application, a vector that refers to the long reference picture becomes a parallax vector and a vector that refers to the short reference picture becomes a motion vector. Thus, the correlation of motion (parallax) vectors is low between picture types (B of FIG. 64). Therefore, as described above, when the types of the reference pictures of the coding vector and the predictive vector are different, by excluding the vectors from the candidate vector, the encoding efficiency can be improved.

In the following description, the block (CU, PU, or the like) of a processing target is referred to as an encoding block (or current) block. Moreover, a block that is temporally near the encoding block (that is, a co-located block of a picture that is temporally near a picture (current picture) in which the encoding block is present) is referred to as a temporal correlation block. Further, a block that is spatially near the encoding block (that is, a block that is adjacent to the encoding block in a current picture or a block positioned near the encoding block) is referred to as a neighboring block.

Figure 65:
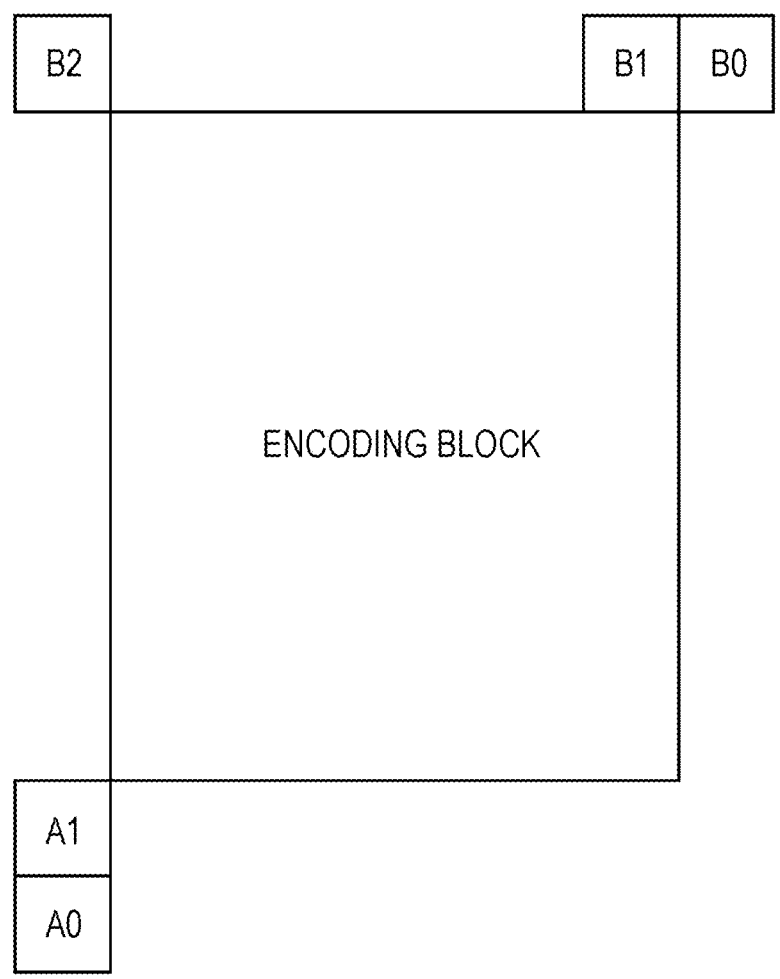
FIG. 65 is a diagram for describing an example of a neighboring block.

FIG. 65 illustrates an example of a neighboring block. The blocks at positions A0 and A1 are neighboring blocks of the encoding block (current block) and are also referred to as left blocks. Moreover, the blocks at positions B0, B1, and B2 are neighboring blocks of the encoding block (current block) and are also referred to as upper blocks.

[Summary of Handling of Motion (Parallax) Vector]

FIG. 66 is a diagram for describing an example of handling of a temporal correlation block and a neighboring block. In vector prediction, whether a motion (parallax) vector of a temporal correlation block will be included in a candidate vector and whether scaling will be performed are determined as in the table illustrated in A of FIG. 66.

That is, for example, when the type of a reference image of the encoding block is identical to the type of a reference image of a temporal correlation block (that is, when both reference images are short reference images or long reference images), a motion (parallax) vector of the temporal correlation block is used as a candidate. When the types of both reference images are not identical, the vectors are excluded from the candidate. Further, when both the reference image of the encoding block and the reference image of the temporal correlation block are short reference images, scaling of the motion (parallax) vector of the temporal correlation block is performed. When both reference images are long reference images, scaling of the motion (parallax) vector of the temporal correlation block is not performed.

Moreover, in vector prediction, whether a motion (parallax) vector of a neighboring block will be included in a candidate vector and whether scaling will be performed are determined as in the table illustrated in B of FIG. 66. That is, this is the same as the case of the temporal correlation block.

That is, for example, when the type of the reference image of the encoding block is identical to the type of the reference image of the neighboring block (that is, when both reference images are short reference images or long reference images), the motion (parallax) vector of the neighboring block is used as a candidate. When the types of both reference images are not identical, the vectors are excluded from the candidate. Further, when both the reference image of the encoding block and the reference image of the neighboring block are short reference images, scaling of the motion (parallax) vector of the neighboring block is performed. When both reference images are long reference images, scaling of the motion (parallax) vector of the neighboring block is not performed.

[Flow of Process During Encoding]

An example of the flow of the process during encoding for realizing such control will be described below. Such control can be realized by the image encoding device 400 (FIG. 37) described in the third embodiment.

The encoding process of the image encoding device 400 is performed in the same manner as that (first embodiment) described with reference to the flowchart of FIG. 20.

Figure 67:
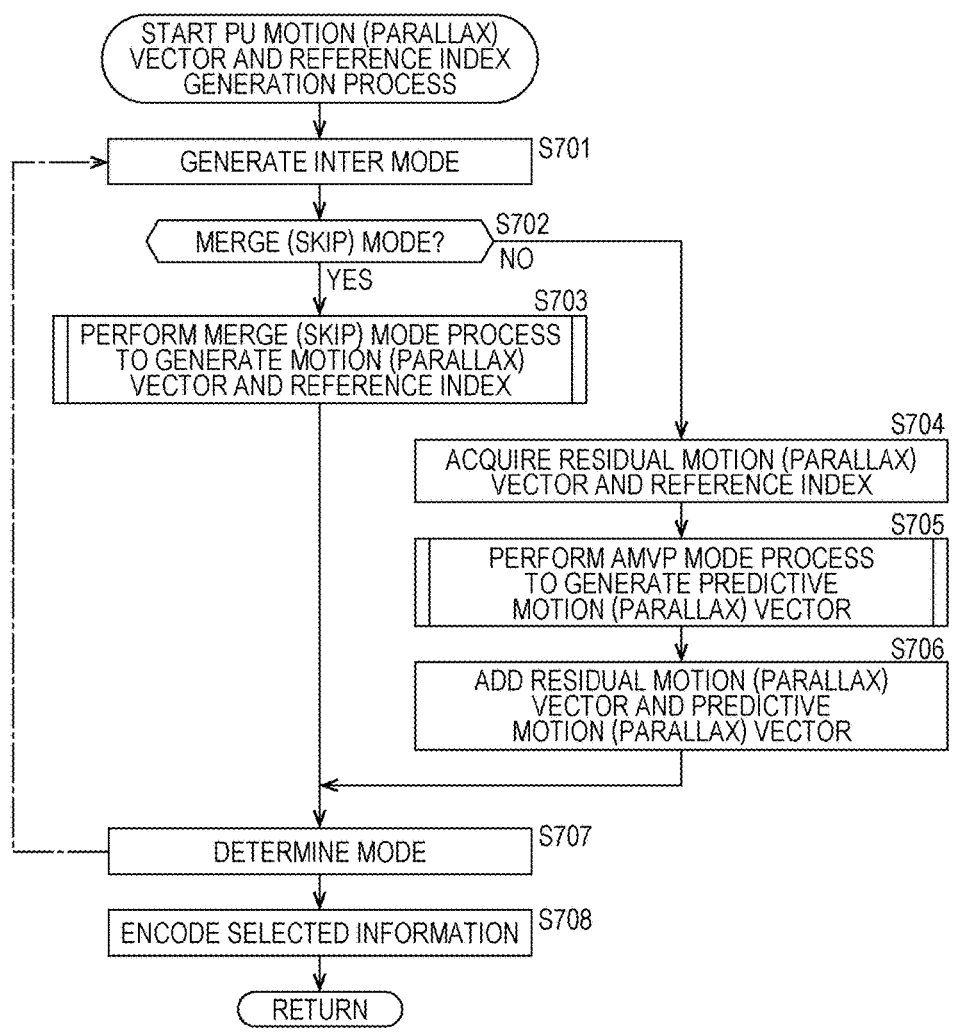
FIG. 67 is a flowchart for describing an example of the flow of a PU motion (parallax) vector and reference index generation process.

An example of the flow of a PU motion (parallax) vector and reference index generation process executed by the motion prediction/compensation unit 415 as the process corresponding to the inter-motion prediction process executed in step S104 of FIG. 20 will be described with reference to the flowchart of FIG. 67.

In step S701, the inter-mode generating unit 431 (FIG. 38) generates an inter mode. In step S702, the inter-mode generating unit 431 determines whether the inter mode is a merge (skip) mode.

When it is determined that the inter mode is the merge (skip) mode, the flow proceeds to step S703. In step S703, the reference index determining unit 432 and the vector predicting unit 434 performs the process of the merge (skip) mode to generate a motion (parallax) vector and a reference index. When the process of step S703 ends, the flow proceeds to step S707.

Moreover, when it is determined in step S702 that the inter mode is not the merge (skip) mode, the process proceeds to step S704. In step S704, the vector predicting unit 433 acquires a residual motion (parallax) vector and a reference index. In step S705, the vector predicting unit 433 performs the process of the AMVP mode to generate a predictive motion (parallax) vector. In step S706, the mode determining unit 435 adds the residual motion (parallax) vector and the predictive motion (parallax) vector.

In step S707, the mode determining unit 435 returns to step S701 before all modes are processed and determines an optimal mode when all modes have been processed.

In step S708, the lossless encoding unit 106 encodes the selected information. When the process of step S708 ends, the flow returns to the flowchart of FIG. 20.

Next, an example of the flow of the merge (skip) mode process executed in step S703 of FIG. 67 will be described with reference to the flowchart of FIG. 68.

When the process starts, in step S711, the reference index determining unit 432 creates a candidate motion (parallax) vector and a reference index from spatially neighboring blocks.

In step S712, the reference index determining unit 432 generates a reference index for temporal correlation blocks.

In step S713, the vector predicting unit 434 generates a candidate motion (parallax) vector from temporal correlation blocks.

In step S714, the vector predicting unit 434 generates a candidate list of motion (parallax) vectors and reference indexes. The number of elements of this list is referred to as Y.

In step S715, the vector predicting unit 434 sets a largest number X of the candidate list.

In step S716, the vector predicting unit 434 determines whether the number Y of elements of the list is smaller than the largest number X of the candidate list (Y<X). When it is determined that the number Y of elements of the list is smaller than the largest number X of the candidate list (Y<X), the flow proceeds to step S717.

In step S717, the vector predicting unit 434 combines the respective elements of the candidate list to generate a new motion (parallax) vector and a new reference index.

In step S718, the vector predicting unit 434 updates the candidate list. The number of elements of the list in this case is referred to as Y'.

In step S719, the vector predicting unit 434 determines whether the number Y' of elements of the list is smaller than the largest number X of the candidate list (Y'<X). When it is determined that the number Y' of elements of the list is smaller than the largest number X of the candidate list (Y'<X), the flow proceeds to step S720.

In step S720, the vector predicting unit 434 generates a new zero motion (parallax) vector and a new zero reference index. When the process of step S720 ends, the flow proceeds to step S721.

Moreover, when it is determined in step S716 that the number Y of elements of the list is greater than the largest number X of the candidate list (not Y<X), the flow proceeds to step S721. Moreover, when it is determined in step S719 that the number Y' of elements of the list is greater than the largest number X of the candidate list (not Y'<X), the flow proceeds to step S721.

In step S721, the vector predicting unit 434 generates an element index of the candidate list.

In step S722, the vector predicting unit 434 acquires a motion (parallax) vector and a reference index indicated by the element index. When the process of step S722 ends, the flow returns to the flowchart of FIG. 67.

Next, an example of the flow of a process of generating candidate motion (parallax) vectors from a temporal correlation block executed in step S713 of FIG. 68 will be described with reference to the flowchart of FIG. 69.

When the process starts, in step S731, the vector predicting unit 434 generates an index that designates a temporal correlation picture.

In step S732, the vector predicting unit 434 determines a temporal correlation picture.

In step S733, the vector predicting unit 434 selects a bottom-right block of an encoding PU (encoding block) present in the temporal correlation picture.

In step S734, the vector predicting unit 434 determines whether the bottom-right block is an intra mode or not available. When it is determined that the bottom-right block is an intra mode or not available, the flow proceeds to step S735.

In step S735, the vector predicting unit 434 selects a central block of an encoding PU present in the temporal correlation picture.

In step S736, the vector predicting unit 434 determines whether the central block is an intra mode or not available. When it is determined that the central block is an intra mode or not available, the flow proceeds to step S737.

In step S737, the vector predicting unit 434 excludes the motion (parallax) vector of the temporal correlation block from the candidate. When the process of step S737 ends, the flow returns to the flowchart of FIG. 68.

Moreover, when it is determined in step S734 that the bottom-right block is neither an intra mode or not available, the flow proceeds to step S738. Similarly, when it is determined that the central block is neither an intra mode or not available, the flow proceeds to step S738.

In step S738, the vector predicting unit 434 determines a motion (parallax) vector and a reference index of the temporal correlation block.

In step S739, the vector predicting unit 434 determines the presence of the scaling process for the motion (parallax) vector of the temporal correlation block and the presence of a candidate.

In step S740, the vector predicting unit 434 determines whether the motion (parallax) vector of the temporal correlation block is to be excluded from the candidate based on the determination result of step S739.

When it is determined that the motion (parallax) vector is to be excluded from the candidate, the flow returns to step S737. Moreover, when it is determined in step S740 that the motion (parallax) vector is not to be excluded from the candidate (to be included in the candidate), the flow proceeds to step S741.

In step S741, the vector predicting unit 434 determines whether scaling is necessary for the motion (parallax) vector of the temporal correlation block based on the determination result of step S739.

When it is determined that scaling is necessary, the flow proceeds to step S742. In step S742, the vector predicting unit 434 performs a scaling process for the motion (parallax) vector of the temporal correlation block. When the process of step S742 ends, the flow returns to the flowchart of FIG. 68.

Figure 68:
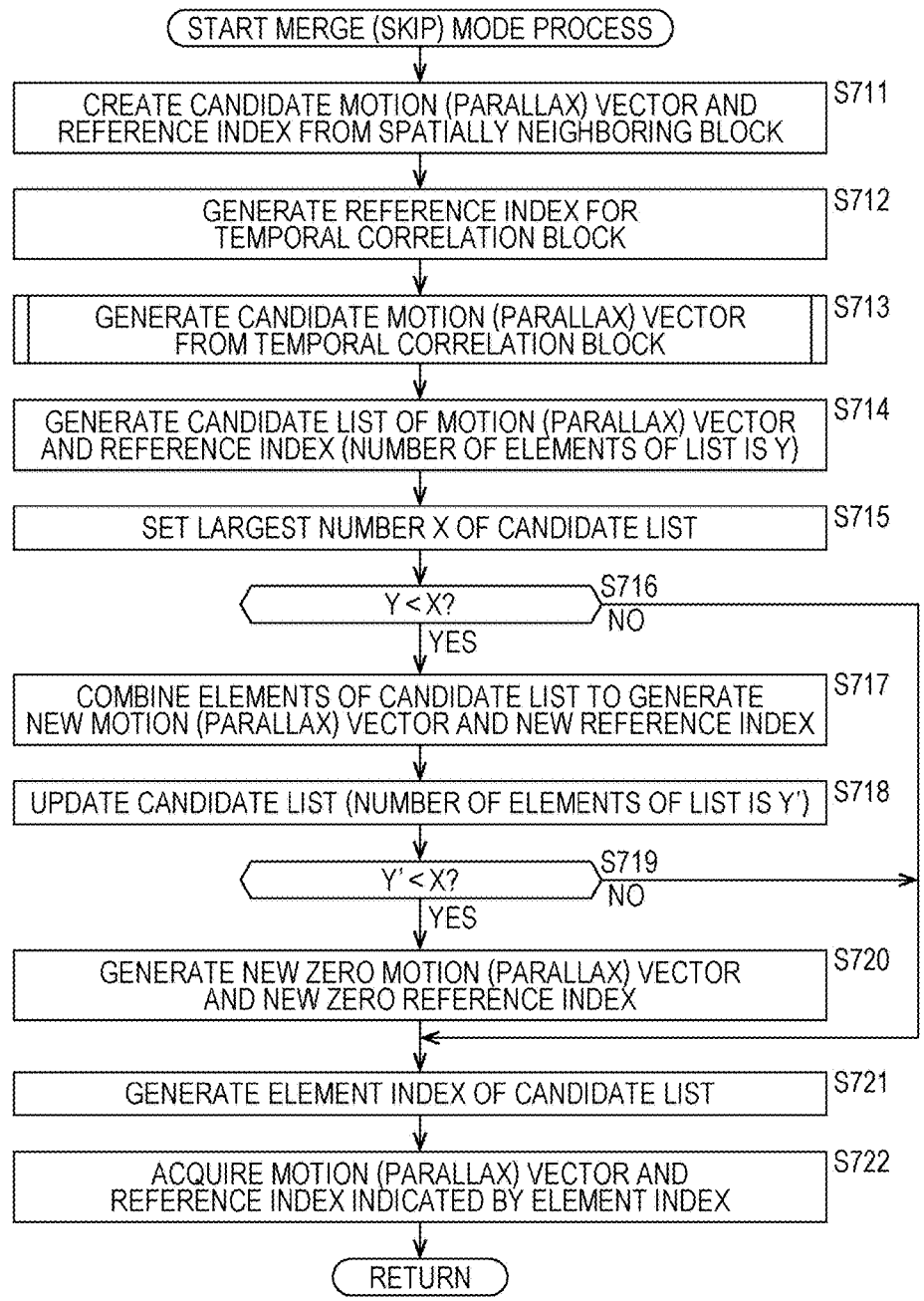
FIG. 68 is a flowchart for describing an example of the flow of a merge (skip) mode process.

Moreover, when it is determined in step S741 that scaling is not necessary, the flow returns to the flowchart of FIG. 68.

Next, an example of the flow of a process of determining the presence of a scaling process for the motion (parallax) vector of the temporal correlation block and the presence of the candidate, executed in step S739 of FIG. 69 will be described with reference to the flowchart of FIG. 70.

When the process starts, in step S751, the vector predicting unit 434 determines whether the reference image of the encoding block is a short reference image or a long reference image.

In step S752, the vector predicting unit 434 determines whether the reference image of the temporal correlation block is a short reference image or a long reference image.

In step S753, the vector predicting unit 434 determines whether the reference image of the encoding block is a long reference image based on the determination result of step S751.

When it is determined that the reference image of the encoding block is a long reference image, the flow proceeds to step S754. In step S754, the vector predicting unit 434 determines whether the reference image of the temporal correlation block is a long reference image based on the determination result of step S752.

When it is determined that the reference image of the temporal correlation block is a long reference image, the flow proceeds to step S755. In this case, the motion (parallax) vectors of the encoding block and the temporal correlation block are long reference images. Thus, in step S755, the vector predicting unit 434 includes the motion (parallax) vector of the temporal correlation block into the candidate and sets the scaling to be not necessary. When the process of step S755 ends, the flow returns to the flowchart of FIG. 69.

Figure 69:
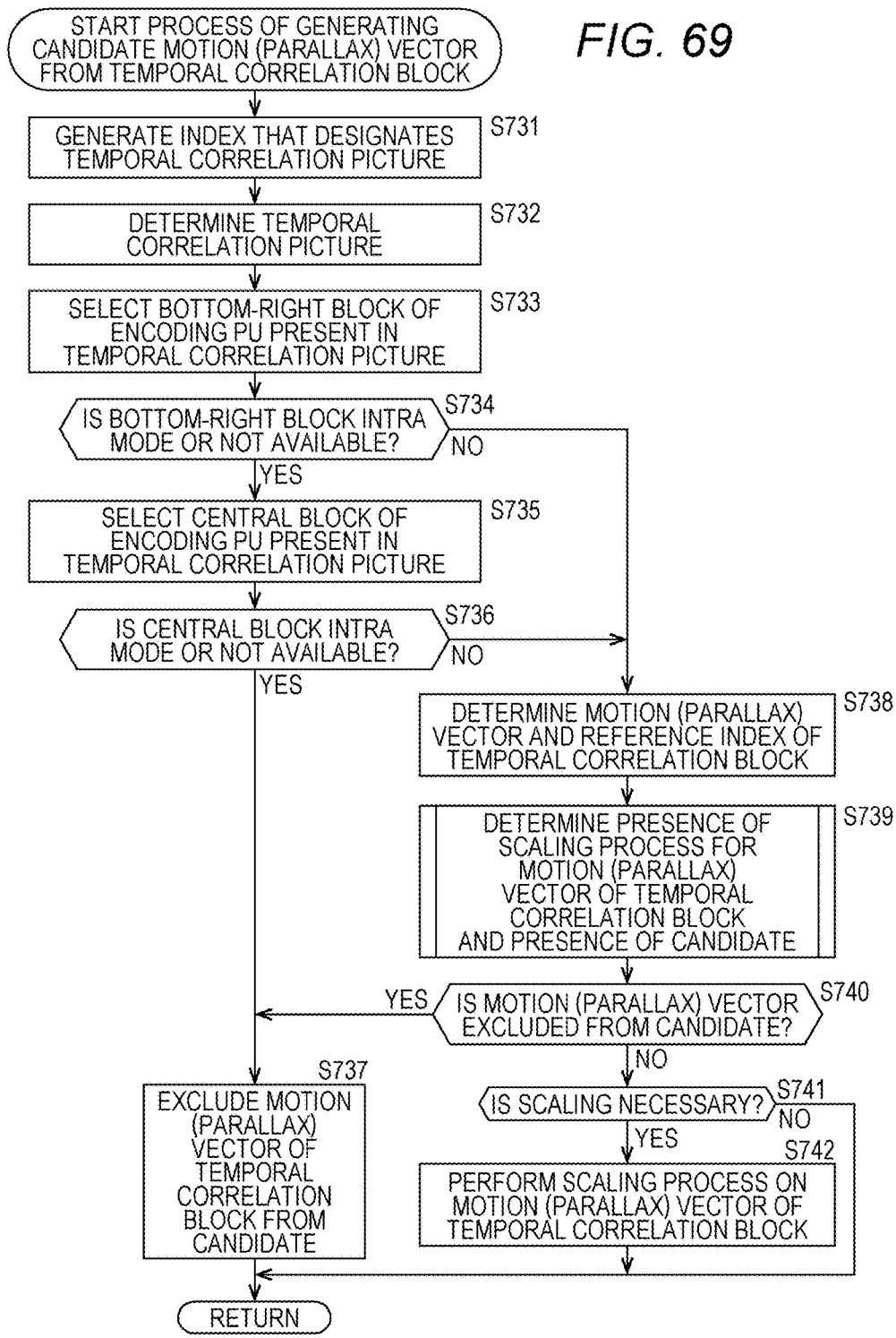
FIG. 69 is a flowchart for describing an example of the flow of a process of generating candidate motion (parallax) vectors from a temporal correlation block.
Figure 70:
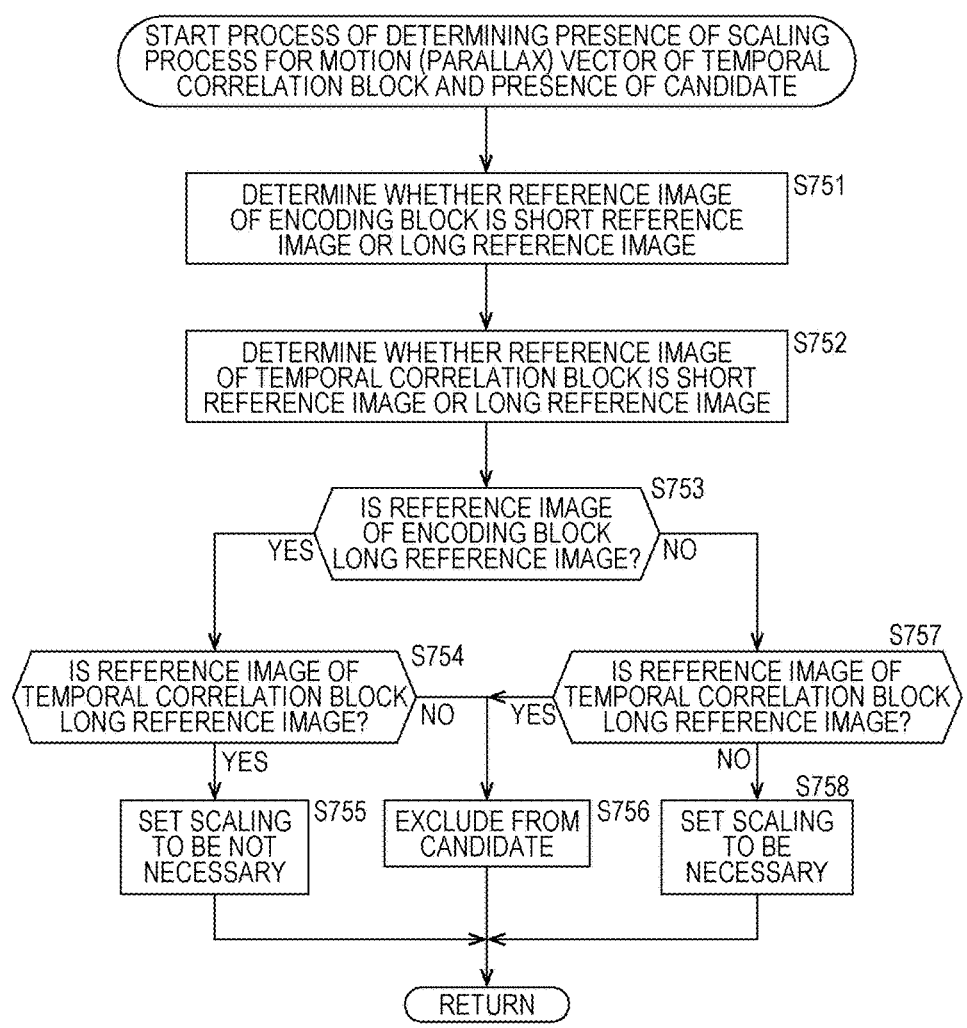
FIG. 70 is a flowchart for describing an example of the flow of a process of determining the presence of a scaling process for a motion (parallax) vector of a temporal correlation block and the presence of a candidate.

Moreover, when it is determined in step S754 of FIG. 70 that the reference image of the temporal correlation block is a short reference image, the flow proceeds to step S756. In this case, the types of the motion (parallax) vectors of the encoding block and the temporal correlation block are not identical. Thus, in step S756, the vector predicting unit 434 sets the motion (parallax) vector of the temporal correlation block to be excluded from the candidate. When the process of step S756 ends, the flow returns to the flowchart of FIG. 69.

Further, when it is determined in step S753 of FIG. 70 that the reference image of the encoding block is a short reference image, the flow proceeds to step S757. In step S757, the vector predicting unit 434 determines whether the reference image of the temporal correlation block is a long reference image based on the determination result of step S752.

When it is determined that the reference image of the temporal correlation block is a long reference image, the flow returns to step S756. That is, in this case, when the types of the motion (parallax) vectors of the encoding block and the temporal correlation block are not identical, the motion (parallax) vector of the temporal correlation block is set to be excluded from the candidate.

Moreover, when it is determined in step S757 that the reference image of the temporal correlation block is a short reference image, the flow proceeds to step S758. In this case, the motion (parallax) vectors of the encoding block and the temporal correlation block are short reference images. Thus, in step S758, the vector predicting unit 434 includes the motion (parallax) vector of the temporal correlation block into the candidate and sets the scaling to be necessary. When the process of step S758 ends, the flow returns to the flowchart of FIG. 69.

Next, an example of the flow of the AMVP mode process executed in step S705 of FIG. 67 will be described with reference to the flowchart of FIG. 71.

When the process starts, in step S761, the vector predicting unit 433 (FIG. 38) generates a candidate motion (parallax) vector from a spatially neighboring block.

In step S762, the vector predicting unit 433 generates a candidate list of motion (parallax) vectors. The number of elements of this candidate list is referred to as A.

In step S763, the vector predicting unit 433 determines whether the number A of elements of the candidate list is smaller than 2 (A<2).

When it is determined that the number A of elements of the candidate list is smaller than 2 (A<2), the flow proceeds to step S764. In step S764, the vector predicting unit 433 generates a candidate motion (parallax) vector from the temporal correlation block. This process is as the same as that described with reference to the flowchart of FIG. 69, and the description thereof will not be provided.

In step S765, the vector predicting unit 433 generates a candidate list of motion (parallax) vectors and reference indexes. The number of elements of this candidate list is referred to as A'.

In step S766, the vector predicting unit 433 determines whether the number A' of elements of the candidate list is smaller than 2 (A'<2).

When it is determined that the number A' of elements of the candidate list is smaller than 2 (A'<2), the flow proceeds to step S767. In step S767, the vector predicting unit 433 generates a new zero motion (parallax) vector and a new zero reference index. When the process of step S767 ends, the flow proceeds to step S768.

Moreover, when it is determined in step S763 that the number A of elements of the candidate list is greater than 2 (not A<2), the flow proceeds to step S768. Further, when it is determined in step S766 that the number A' of elements of the candidate list is greater than 2 (not A<2), the flow proceeds to step S768.

In step S768, the vector predicting unit 433 generates an element index (flag) of the candidate list.

In step S769, the vector predicting unit 433 acquires a motion (parallax) vector indicated by the element index. When the process of step S769 ends, the flow returns to the flowchart of FIG. 67.

Next, an example of the flow of a process of generating a candidate motion (parallax) vector from a spatially neighboring block executed in step S761 of FIG. 71 will be described with reference to the flowchart of FIG. 72.

When the process starts, the vector predicting unit 433 generates a candidate motion (parallax) vector from the left block in step S771.

In step S772, the vector predicting unit 433 generates a candidate motion (parallax) vector from the upper block.

Figure 71:
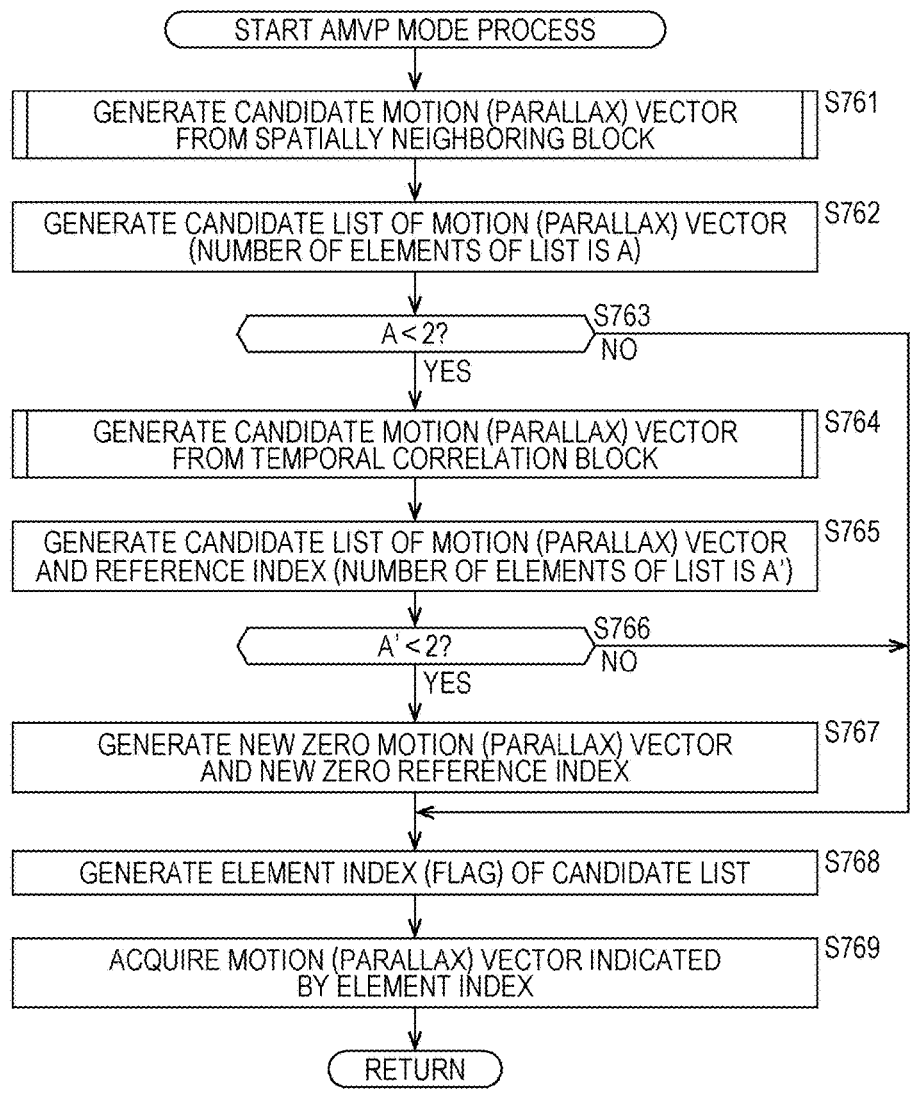
FIG. 71 is a flowchart for describing an example of the flow of an AMVP mode process.

When the process of step S722 ends, the flow returns to the flowchart of FIG. 71.

Next, an example of the flow of a process of generating a candidate motion (parallax) vector from the left block executed in step S771 of FIG. 72 will be described with reference to the flowcharts of FIGS. 73 and 74.

When the process starts, the vector predicting unit 433 selects the block at the position A0 in step S781.

In step S782, the vector predicting unit 433 determines whether the block at the position A0 is an intra mode or not available.

When it is determined that the block at the position A0 is neither an intra mode or not available, the flow proceeds to step S783. In step S783, the vector predicting unit 433 determines whether the block at the position A0 refers to the same reference image as the encoding block.

When it is determined that the block at the position A0 refers to the same reference image as the encoding block, the flow proceeds to step S784. In step S784, the vector predicting unit 433 uses the motion (parallax) vector of the block at the position A0 as the candidate. When the process of step S784 ends, the flow returns to the flowchart of FIG. 72.

Figure 73:
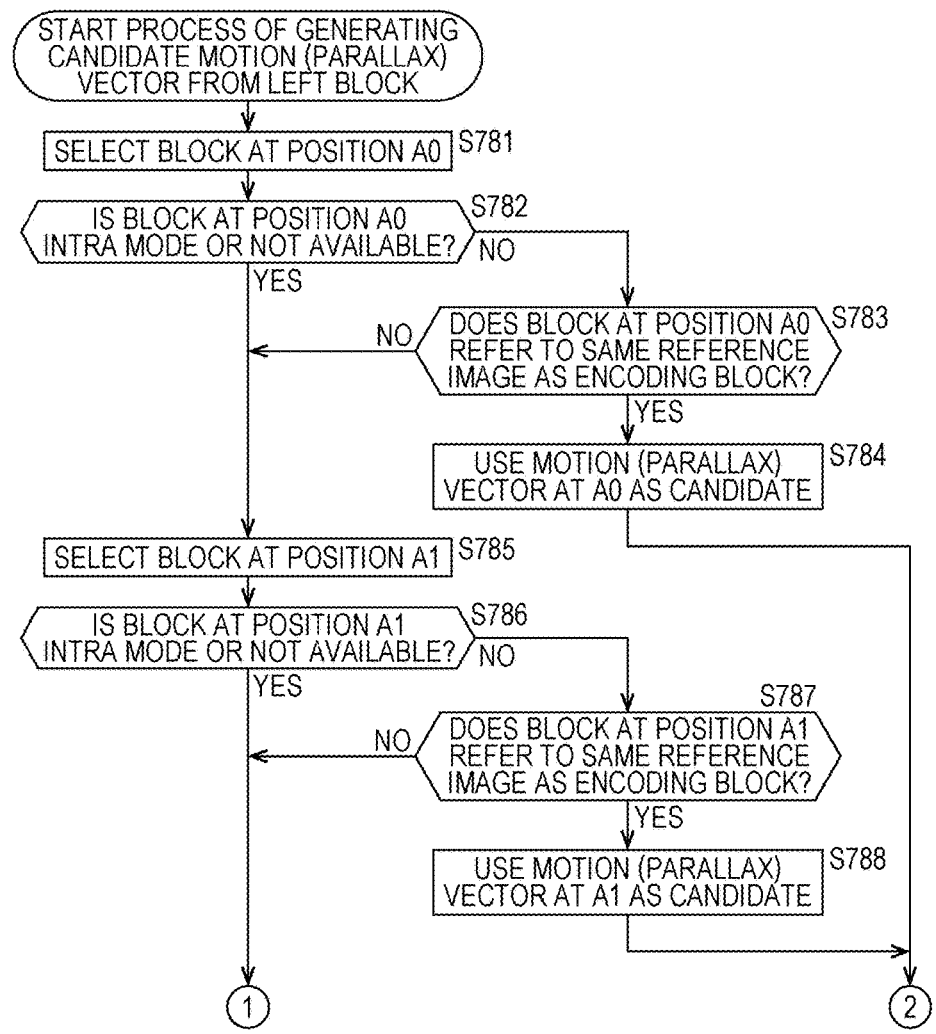
FIG. 73 is a flowchart for describing an example of the flow of a process of generating candidate motion (parallax) vectors from blocks on the left side.

Moreover, when it is determined in step S782 of FIG. 73 that the block at the position A0 is an intra mode or not available, the flow proceeds to step S785. Moreover, when it is determined in step S783 that the block at the position A0 refers to a reference image different from that of the encoding block, the flow proceeds to step S785.

In step S785, the vector predicting unit 433 selects a block at the position A1.

In step S786, the vector predicting unit 433 determines whether the block at the position A1 is an intra mode or not available.

When it is determined that the block at the position A1 is an intra mode or not available, the flow proceeds to step S787. In step S787, the vector predicting unit 433 determines whether the block at the position A1 refers to the same reference image as the encoding block.

When it is determined that the block at the position A1 refers to the same reference image as the encoding block, the flow proceeds to step S788. In step S788, the vector predicting unit 433 uses the motion (parallax) vector of the block at the position A1 as the candidate. When the process of step S788 ends, the flow returns to the flowchart of FIG. 72.

Figure 74:
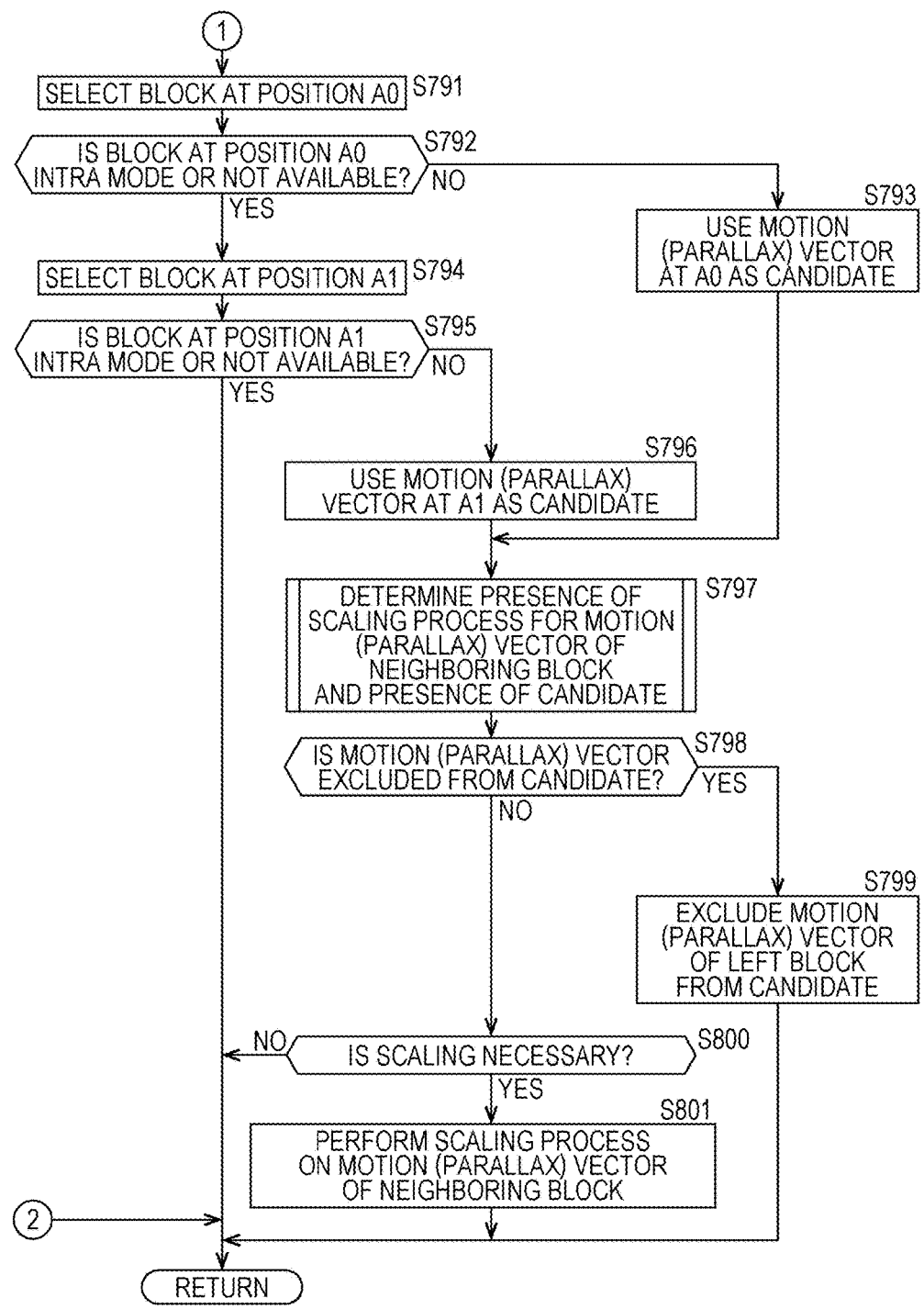
FIG. 74 is a flowchart continued from FIG. 73, for describing an example of the flow of a process of generating candidate motion (parallax) vectors from blocks on the left side.

Moreover, when it is determined in step S786 of FIG. 73 that the block at the position A1 is an intra mode or not available, the flow proceeds to step S791 of FIG. 74. Moreover, when it is determined in step S787 of FIG. 73 that the block at the position A1 refers to a reference image different from that of the encoding block, the flow proceeds to step S791 of FIG. 74.

In step S791 of FIG. 74, the vector predicting unit 433 selects a block at the position A0.

In step S792, the vector predicting unit 433 determines whether the block at the position A0 is an intra mode or not available.

When it is determined that the block at the position A0 is neither an intra mode or not available, the flow proceeds to step S793. In step S793, the vector predicting unit 433 uses the motion (parallax) vector of the block at the position A0 as the candidate. When the process of step S793 ends, the flow proceeds to step S797.

Moreover, when it is determined in step S792 of FIG. 74 that the block at the position A0 is an intra mode or not available, the flow proceeds to step S794.

In step S794, the vector predicting unit 433 selects a block at the position A1.

In step S795, the vector predicting unit 433 determines whether the block at the position A1 is an intra mode or not available.

Figure 72:
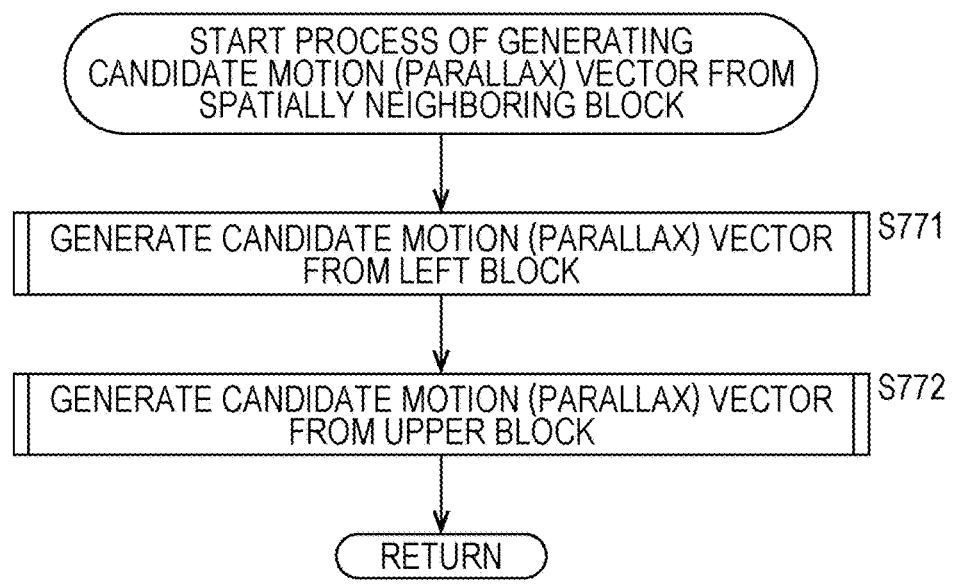
FIG. 72 is a flowchart for describing an example of the flow of a process of generating candidate motion (parallax) vectors from spatially neighboring blocks.

When it is determined that the block at the position A0 is an intra mode or not available, the flow returns to the flowchart of FIG. 72.

Moreover, when it is determined in step S795 of FIG. 74 that the block at the position A1 is neither an intra mode or not available, the flow returns to step S796. In step S796, the vector predicting unit 433 uses the motion (parallax) vector of the block at the position A1 as the candidate. When the process of step S796 ends, the flow proceeds to step S797.

In step S797, the vector predicting unit 433 determines the presence of a scaling process for the motion (parallax) vector of the neighboring block and the presence of the candidate.

In step S798, the vector predicting unit 433 determines whether the motion (parallax) vector of the neighboring block is to be excluded from the candidate based on the determination result of step S797.

When it is determined that the motion (parallax) vector is to be excluded from the candidate, the flow proceeds to step S799. In step S799, the vector predicting unit 433 excludes the motion (parallax) vector of the left block from the candidate. When the process of step S799 ends, the flow returns to the flowchart of FIG. 72.

Moreover, when it is determined in step S798 of FIG. 74 that the motion (parallax) vector is not to be excluded from the candidate (to be included in the candidate), the flow proceeds to step S800.

In step S800, the vector predicting unit 433 determines whether scaling is necessary for the motion (parallax) vector of the neighboring block based on the determination result of step S797.

When it is determined that scaling is necessary, the flow proceeds to step S801. In step S801, the vector predicting unit 433 performs a scaling process for the motion (parallax) vector of the neighboring block. When the process of step S801 ends, the flow returns to the flowchart of FIG. 72.

Moreover, when it is determined in step S800 of FIG. 74 that scaling is not necessary, the flow returns to the flowchart of FIG. 72.

Next, an example of the flow of a process of determining the presence of a scaling process for the motion (parallax) vector of the neighboring block and the presence of the candidate, executed in step S797 of FIG. 74 will be described with reference to the flowchart of FIG. 75.

When the process starts, in step S811, the vector predicting unit 433 determines whether the reference image of the encoding block is a short reference image or a long reference image.

In step S812, the vector predicting unit 433 determines whether the reference image of the neighboring block is a short reference image or a long reference image.

In step S813, the vector predicting unit 433 determines whether the reference image of the encoding block is a long reference image based on the determination result of step S811.

When it is determined that the reference image of the encoding block is a long reference image, the flow proceeds to step S814. In step S814, the vector predicting unit 433 determines whether the reference image of the neighboring block is a long reference image based on the determination result of step S812.

When it is determined that the reference image of the neighboring block is a long reference image, the flow proceeds to step S815. In this case, the motion (parallax) vectors of the encoding block and the neighboring block are long reference images. Thus, in step S815, the vector predicting unit 433 includes the motion (parallax) vector of the neighboring block into the candidate and sets the scaling to be not necessary. When the process of step S815 ends, the flow returns to the flowchart of FIG. 74.

Figure 75:
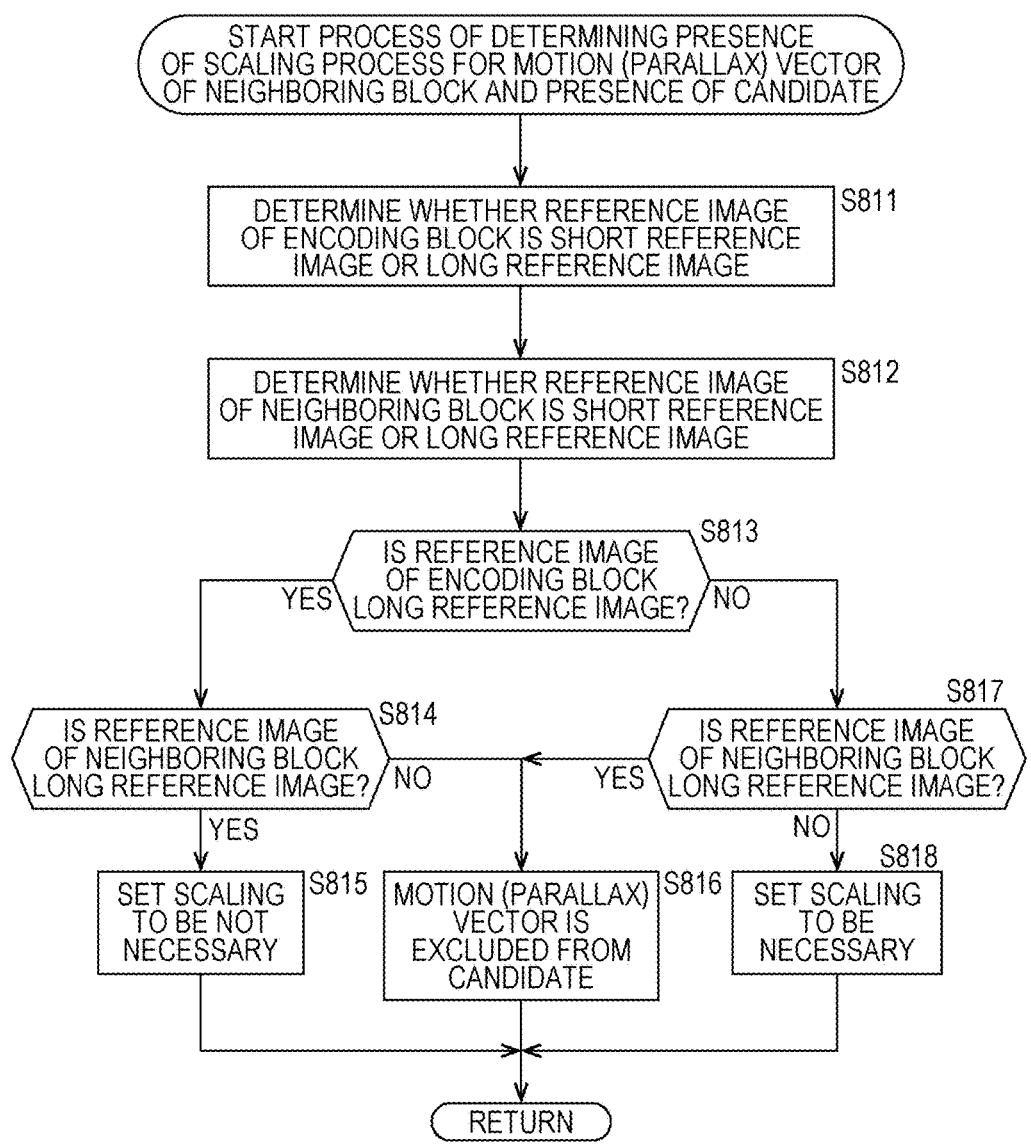
FIG. 75 is a flowchart for describing an example of the flow of a process of determining the presence of a scaling process for a motion (parallax) vector of a neighboring block and the presence of a candidate.

Moreover, when it is determined in step S814 of FIG. 75 that the reference image of the neighboring block is a short reference image, the flow proceeds to step S816. In this case, the types of the motion (parallax) vectors of the encoding block and the neighboring block are not identical. Thus, in step S816, the vector predicting unit 433 sets the motion (parallax) vector of the neighboring block to be excluded from the candidate. When the process of step S816 ends, the flow returns to the flowchart of FIG. 74.

Further, when it is determined in step S813 of FIG. 75 that the reference image of the encoding block is a short reference image, the flow proceeds to step S817. In step S817, the vector predicting unit 433 determines whether the reference image of the neighboring block is a long reference image based on the determination result of step S812.

When it is determined that the reference image of the neighboring block is a long reference image, the flow returns to step S816. That is, in this case, since the types of the motion (parallax) vectors of the encoding block and the neighboring block are not identical, the motion (parallax) vector of the neighboring block is set to be excluded from the candidate.

Moreover, when it is determined in step S817 that the reference image of the neighboring block is a short reference image, the flow proceeds to step S818. In this case, the motion (parallax) vectors of the encoding block and the neighboring block are short reference images. Therefore, in step S818, the vector predicting unit 433 includes the motion (parallax) vector of the neighboring block into the candidate and sets the scaling to be necessary. When the process of step S818 ends, the flow returns to the flowchart of FIG. 74.

Next, an example of the flow of a process of generating a candidate motion (parallax) vector from the upper block, executed in step S772 of FIG. 72 will be described with reference to the flowcharts of FIGS. 76 and 77.

When the process starts, the vector predicting unit 433 selects a block at the position B0 in step S821.

In step S822, the vector predicting unit 433 determines whether the block at the position B0 is an intra mode or not available.

When it is determined that the block at the position B0 is neither an intra mode or not available, the flow proceeds to step S823. In step S823, the vector predicting unit 433 determines whether the block at the position B0 refers to the same reference image as the encoding block.

When it is determined that the block at the position B0 refers to the same reference image as the encoding block, the flow proceeds to step S824. In step S824, the vector predicting unit 433 uses the motion (parallax) vector of the block at the position B0 as the candidate. When the process of step S824 ends, the flow returns to the flowchart of FIG. 72.

Figure 76:
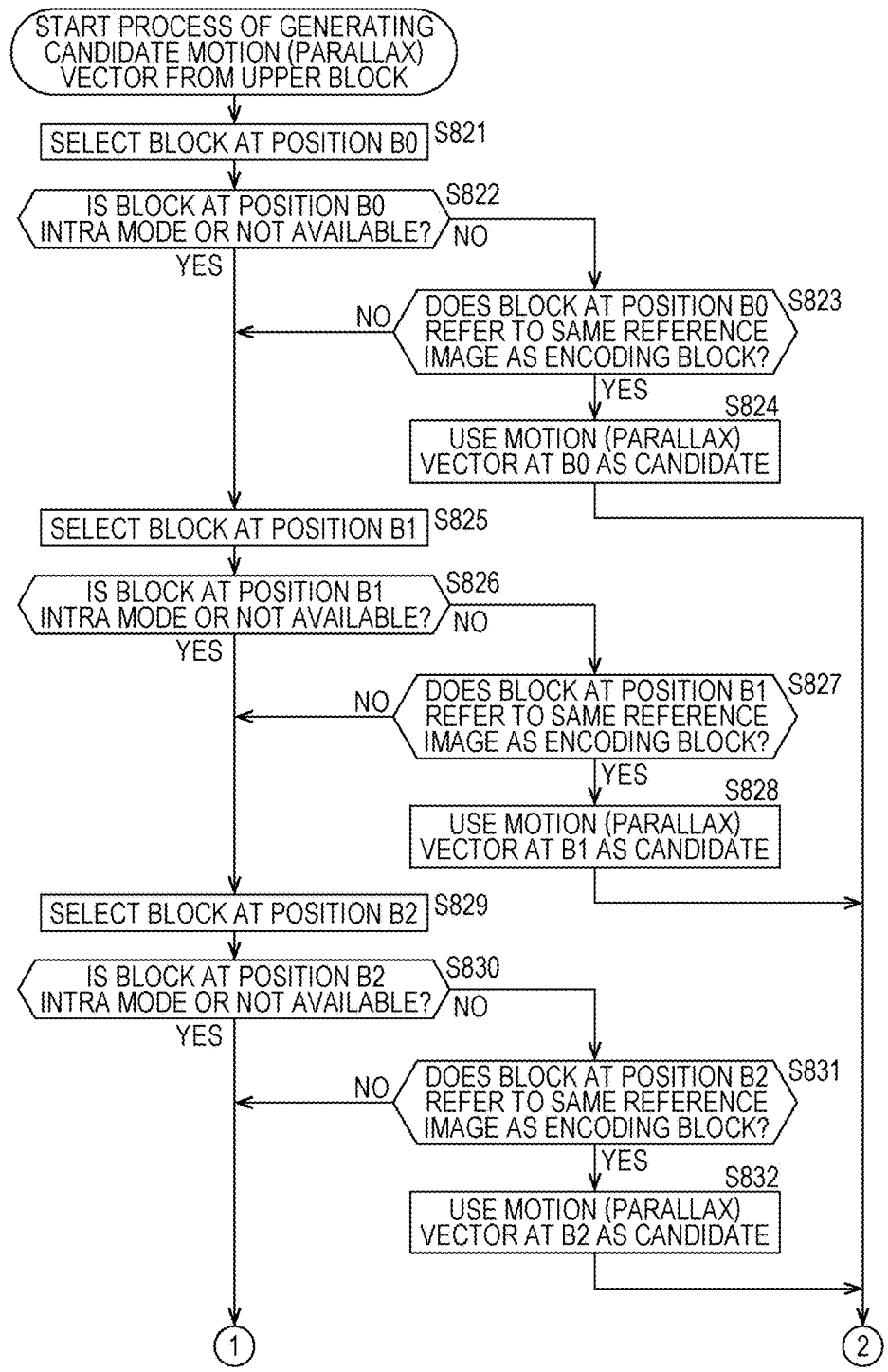
FIG. 76 is a flowchart for describing an example of the flow of a process of generating candidate motion (parallax) vectors from blocks on the upper side.

Moreover, when it is determined in step S822 of FIG. 76 that the block at the position B0 is an intra mode or not available, the flow proceeds to step S825. Moreover, when it is determined in step S823 that the block at the position B0 refers to a reference image different from that of the encoding block, the flow proceeds to step S825.

In step S825, the vector predicting unit 433 selects a block at the position B1.

In step S826, the vector predicting unit 433 determines whether the block at the position B1 is an intra mode or not available.

When it is determined that the block at the position B1 is neither an intra mode or not available, the flow proceeds to step S827. In step S827, the vector predicting unit 433 determines whether the block at the position B1 refers to the same reference image as the encoding block.

When it is determined that the block at the position B1 refers to the same reference image as the encoding block, the flow proceeds to step S828. In step S828, the vector predicting unit 433 uses the motion (parallax) vector of the block at the position B1 as the candidate. When the process of step S828 ends, the flow returns to the flowchart of FIG. 72.

Moreover, when it is determined in step S826 of FIG. 76 that the block at the position B1 is an intra mode or not available, the flow proceeds to step S829. Moreover, when it is determined in step S827 that the block at the position B1 refers to a reference image different from that of the encoding block, the flow proceeds to step S829.

In step S829, the vector predicting unit 433 selects a block at the position B2.

In step S830, the vector predicting unit 433 determines whether the block at the position B2 is an intra mode or not available.

When it is determined that the block at the position B2 is neither an intra mode or not available, the flow proceeds to step S831. In step S831, the vector predicting unit 433 determines whether the block at the position B2 refers to the same reference image as the encoding block.

When it is determined that the block at the position B2 refers to the same reference image as the encoding block, the flow proceeds to step S832. In step S832, the vector predicting unit 433 uses the motion (parallax) vector of the block at the position B2 as the candidate. When the process of step S832 ends, the flow returns to the flowchart of FIG. 72.

Figure 77:
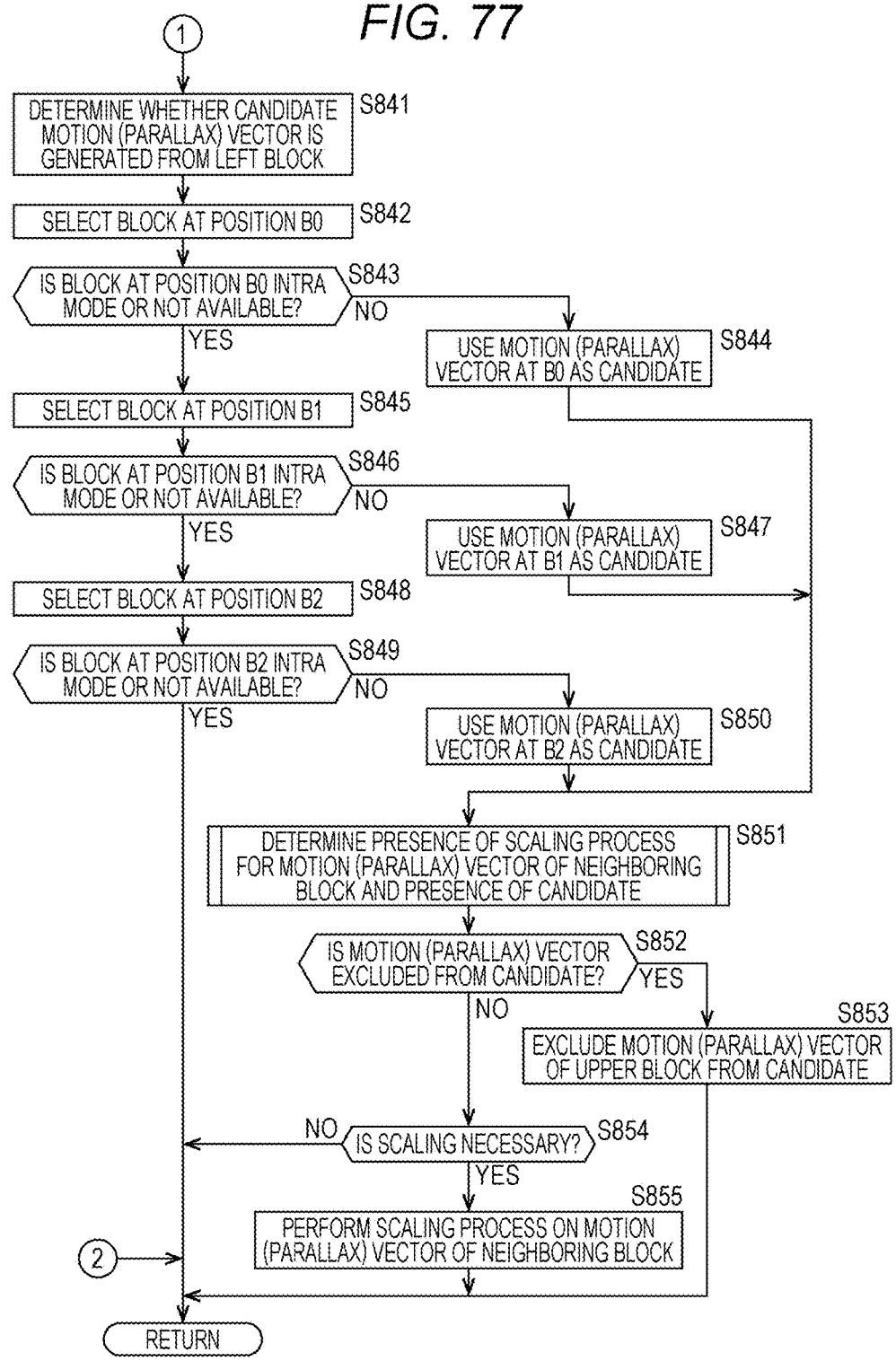
FIG. 77 is a flowchart continued from FIG. 76, for describing an example of the flow of a process of generating candidate motion (parallax) vectors from blocks on the upper side.

Moreover, when it is determined in step S830 of FIG. 76 that the block at the position B2 is an intra mode or not available, the flow proceeds to step S841 of FIG. 77. Moreover, when it is determined in step S831 of FIG. 76 that the block at the position B2 refers to a reference image different from that of the encoding block, the flow proceeds to step S841 of FIG. 77.

In step S841 of FIG. 77, the vector predicting unit 433 determines whether a candidate motion (parallax) vector is generated from the left block.

In step S842, the vector predicting unit 433 selects a block at the position B0.

In step S843, the vector predicting unit 433 determines whether the block at the position B0 is an intra mode or not available.

When it is determined that the block at the position B0 is neither an intra mode or not available, the flow proceeds to step S844. In step S844, the vector predicting unit 433 uses the motion (parallax) vector of the block at the position B0 as the candidate. When the process of step S844 ends, the flow proceeds to step S851.

Moreover, when it is determined in step S843 that the block at the position B0 is an intra mode or not available, the flow proceeds to step S845.

In step S845, the vector predicting unit 433 selects a block at the position B1.

In step S846, the vector predicting unit 433 determines whether the block at the position B1 is an intra mode or not available.

When it is determined that the block at the position B1 is neither an intra mode or not available, the flow proceeds to step S847. In step S847, the vector predicting unit 433 uses the motion (parallax) vector of the block at the position B1 as the candidate. When the process of step S847 ends, the flow proceeds to step S851.

Moreover, when it is determined in step S846 that the block at the position B1 is an intra mode or not available, the flow proceeds to step S848.

In step S848, the vector predicting unit 433 selects a block at the position B2.

In step S849, the vector predicting unit 433 determines whether the block at the position B2 is an intra mode or not available.

When it is determined in step S849 that the block at the position B2 is an intra mode or not available, the flow returns to the flowchart of FIG. 72.

Moreover, when it is determined that the block at the position B2 is neither an intra mode or not available, the flow proceeds to step S850. In step S850, the vector predicting unit 433 uses the motion (parallax) vector of the block at the position B2 as the candidate. When the process of step S850 ends, the flow proceeds to step S851.

In step S851, the vector predicting unit 433 determines the presence of a scaling process for the motion (parallax) vector of the neighboring block and the presence of the candidate. Since this process is performed in the same manner as that described with reference to the flowchart of FIG. 75, the description thereof will not be provided. In this case, when the process of the flowchart of FIG. 75 ends, the flow returns to the flowchart of FIG. 77 rather than the flowchart of FIG. 74.

In step S852, the vector predicting unit 433 determines whether the motion (parallax) vector of the neighboring block is to be excluded from the candidate based on the determination result of step S851.

When it is determined that the motion (parallax) vector is to be excluded from the candidate, the flow proceeds to step S853. In step S853, the vector predicting unit 433 excludes the motion (parallax) vector of the upper block from the candidate. When the process of step S853 ends, the flow returns to the flowchart of FIG. 72.

Moreover, when it is determined in step S852 of FIG. 77 that the motion (parallax) vector is not to be excluded from the candidate (to be included in the candidate), the flow proceeds to step S854.

In step S854, the vector predicting unit 433 determines whether scaling is necessary for the motion (parallax) vector of the neighboring block based on the determination result of step S851.

When it is determined that scaling is necessary, the flow proceeds to step S855. In step S855, the vector predicting unit 433 performs a scaling process for the motion (parallax) vector of the neighboring block. When the process of step S855 ends, the flow returns to the flowchart of FIG. 72.

Moreover, when it is determined in step S854 of FIG. 77 that scaling is not necessary, the flow returns to the flowchart of FIG. 72.

By executing the respective processes in the above-described manner, the image encoding device 400 can suppress a decrease in the encoding efficiency.

[Flow of Process During Decoding]

In order to correctly decode the encoded data obtained by encoding in the above-described manner, prediction may be performed on the decoding side as the same method as the encoding side. That is, on the decoding side, when the types (short reference picture or long reference picture) of the reference pictures of the encoding vector and the predictive vector are different, the predictive vector is set to be not available.

That is, for example, when the type of a reference image of the encoding block is identical to the type of a reference image of a temporal correlation block (that is, when both reference images are short reference images or long reference images), a motion (parallax) vector of the temporal correlation block is used as a candidate. When the types of both reference images are not identical, the vectors are excluded from the candidate. Further, when both the reference image of the encoding block and the reference image of the temporal correlation block are short reference images, scaling of the motion (parallax) vector of the temporal correlation block is performed. When both reference images are long reference images, scaling of the motion (parallax) vector of the temporal correlation block is not performed.

Moreover, for example, when the type of the reference image of the encoding block is identical to the type of the reference image of the neighboring block (that is, when both reference images are short reference images or long reference images), the motion (parallax) vector of the neighboring block is used as a candidate. When the types of both reference images are not identical, the vectors are excluded from the candidate. Further, when both the reference image of the encoding block and the reference image of the neighboring block are short reference images, scaling of the motion (parallax) vector of the neighboring block is performed. When both reference images are long reference images, scaling of the motion (parallax) vector of the neighboring block is not performed.

By doing so, it is possible to suppress a decrease in the encoding efficiency.

An example of the flow of the process during encoding for realizing such control will be described below. Such control can be realized by the image decoding device 500 (FIG. 47) described in the fourth embodiment.

The decoding process of the image decoding device 500 is performed in the same manner as that (the second embodiment) described with reference to the flowchart of FIG. 33. Moreover, the prediction process of step S305 of FIG. 33 is performed in the same manner as that described with reference to the flowchart of FIG. 34.

An example of the flow of a PU motion (parallax) vector and reference index generation process executed by the motion compensation unit 512 as the process corresponding to the motion parallax compensation process executed in step S334 of FIG. 34 will be described with reference to the flowchart of FIG. 78.

This process is performed basically in the same manner as that of the process (FIG. 67) on the encoding side. However, since the prediction mode is determined on the encoding side, a device on the decoding side may perform the process of the used prediction mode only.

When the process starts, in step S861, the lossless decoding unit 302 decodes a prediction mode supplied from the encoding side.

In step S862, the mode determining unit 531 determines whether the prediction mode is a merge (skip) mode.

When it is determined that the prediction mode is a merge (skip) mode, the flow proceeds to step S863. In step S863, the reference index determining unit 532 and the vector decoding unit 534 performs the process of the merge (skip) mode to generate a motion (parallax) vector and a reference index. When the process of step S863 ends, the flow returns to the flowchart of FIG. 34.

Figure 78:
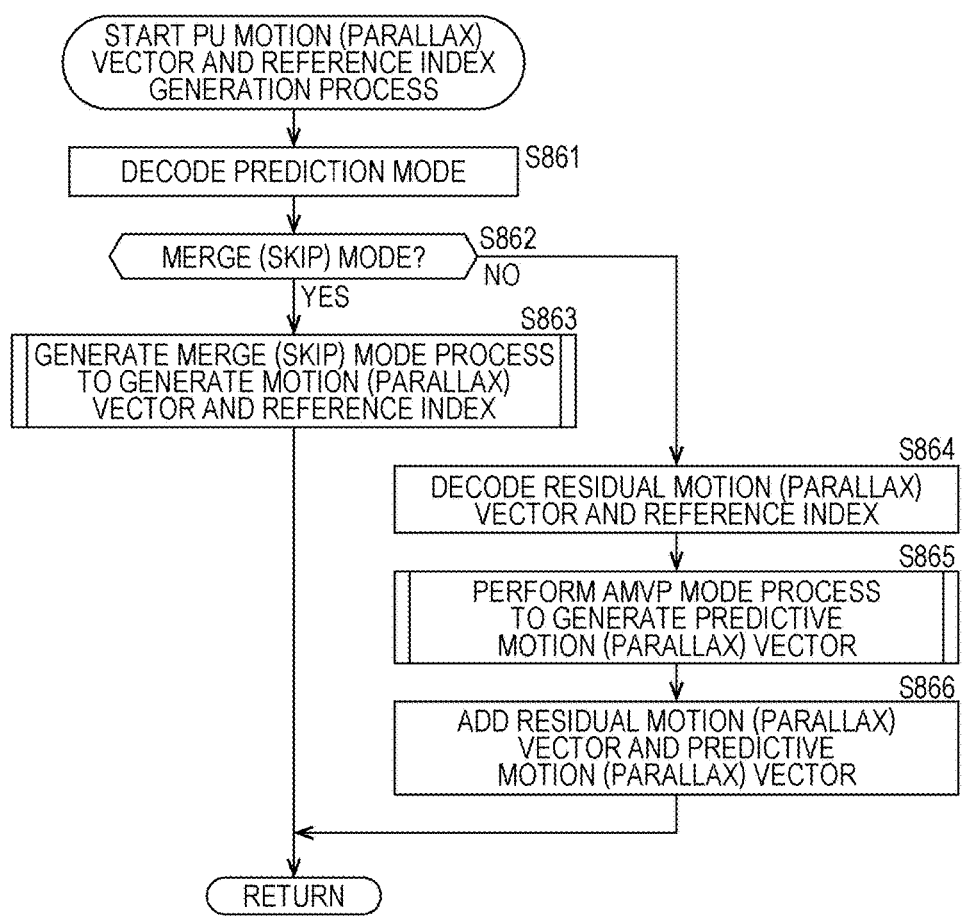
FIG. 78 is a flowchart for describing an example of the flow of a PU motion (parallax) vector and reference index generation process.

Moreover, when it is determined in step S862 of FIG. 78 that the prediction mode is not a merge (skip) mode, the flow proceeds to step S863. In step S864, the vector decoding unit 533 acquires a residual motion (parallax) vector and a reference index. In step S865, the vector decoding unit 533 performs the process of the AMVP mode to generate a predictive motion (parallax) vector. In step S866, the vector decoding unit 533 adds the residual motion (parallax) vector and the predictive motion (parallax) vector. When the process of step S866 ends, the flow returns to the flowchart of FIG. 34.

Figure 79:
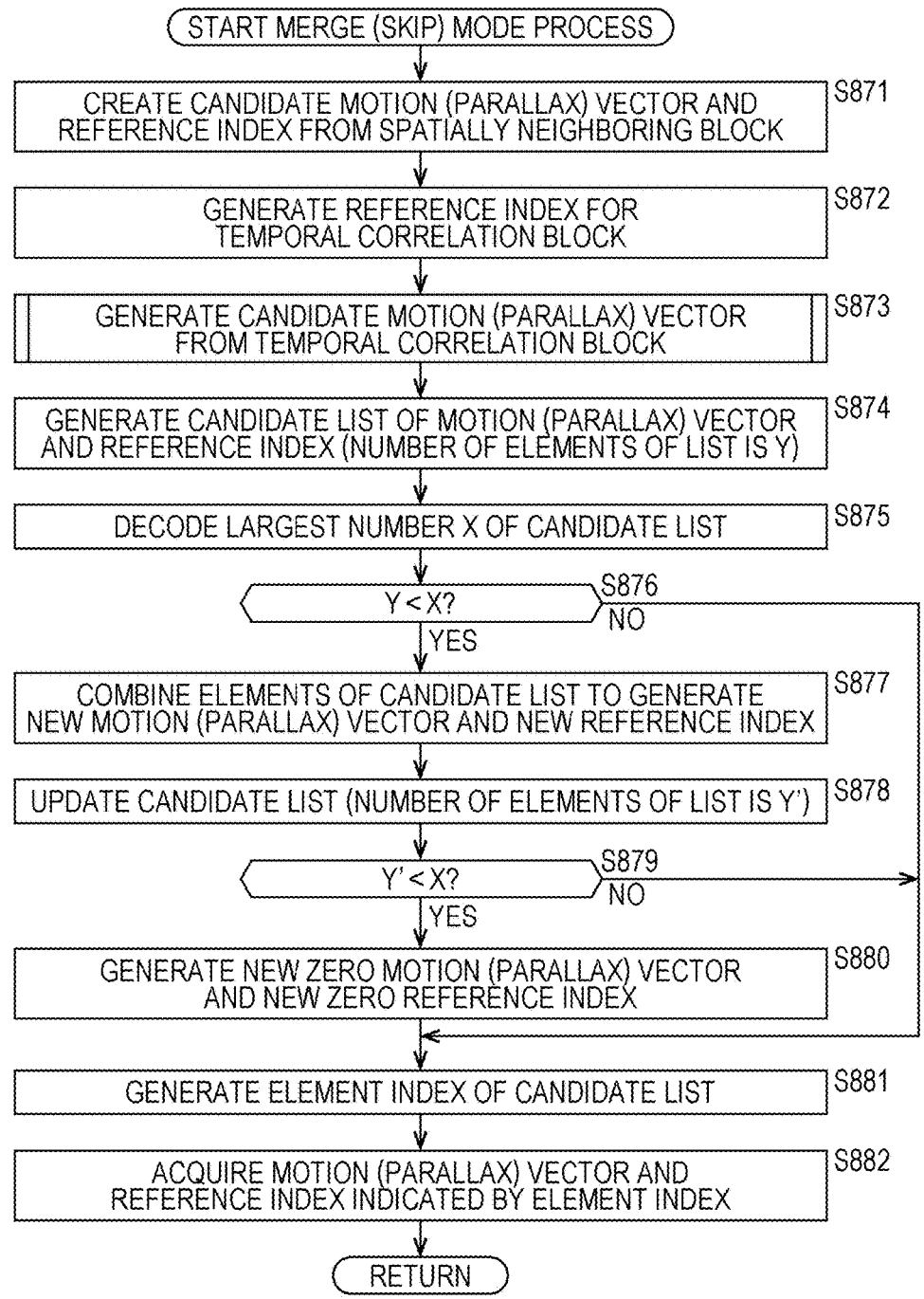
FIG. 79 is a flowchart for describing an example of the flow of a merge (skip) mode process.

Next, an example of the flow of the merge (skip) mode process executed in step S863 of FIG. 78 will be described with reference to the flowchart of FIG. 79. This process is performed basically in the same manner as the process (FIG. 68) on the encoding side.

The respective processes of steps S871 to S874 are executed in the same manner as the respective processes of steps S711 to S714 of FIG. 68. However, the processes of steps S871 and S872 are performed by the reference index determining unit 532, and the processes of steps S873 and S874 are performed by the vector decoding unit 534.

In step S875, the vector decoding unit 534 decodes the largest value X of the candidate list.

The processes of steps S876 to S880 are executed in the same manner as the processes of steps S716 to S720 of FIG. 68. However, these processes are executed by the vector decoding unit 534.

In step S881, the vector decoding unit 534 decodes the element index of the candidate list. In step S882, the vector decoding unit 534 acquires the motion (parallax) vector and the reference index indicated by the element index. When the process of step S882 ends, the flow returns to the flowchart of FIG. 78.

Next, an example of the flow of a process of generating a candidate motion (parallax) vector from the temporal correlation block executed in step S873 of FIG. 79 will be described with reference to the flowchart of FIG. 80. This process is performed basically in the same manner as the process (FIG. 69) on the encoding side.

When the process starts, the vector decoding unit 534 decodes the index indicating the temporal correlation picture in step S891.

The processes of steps S892 to S902 are performed in the same manner as the processes of steps S732 to S742 of FIG. 69. However, these processes are executed by the vector decoding unit 534.

Figure 80:
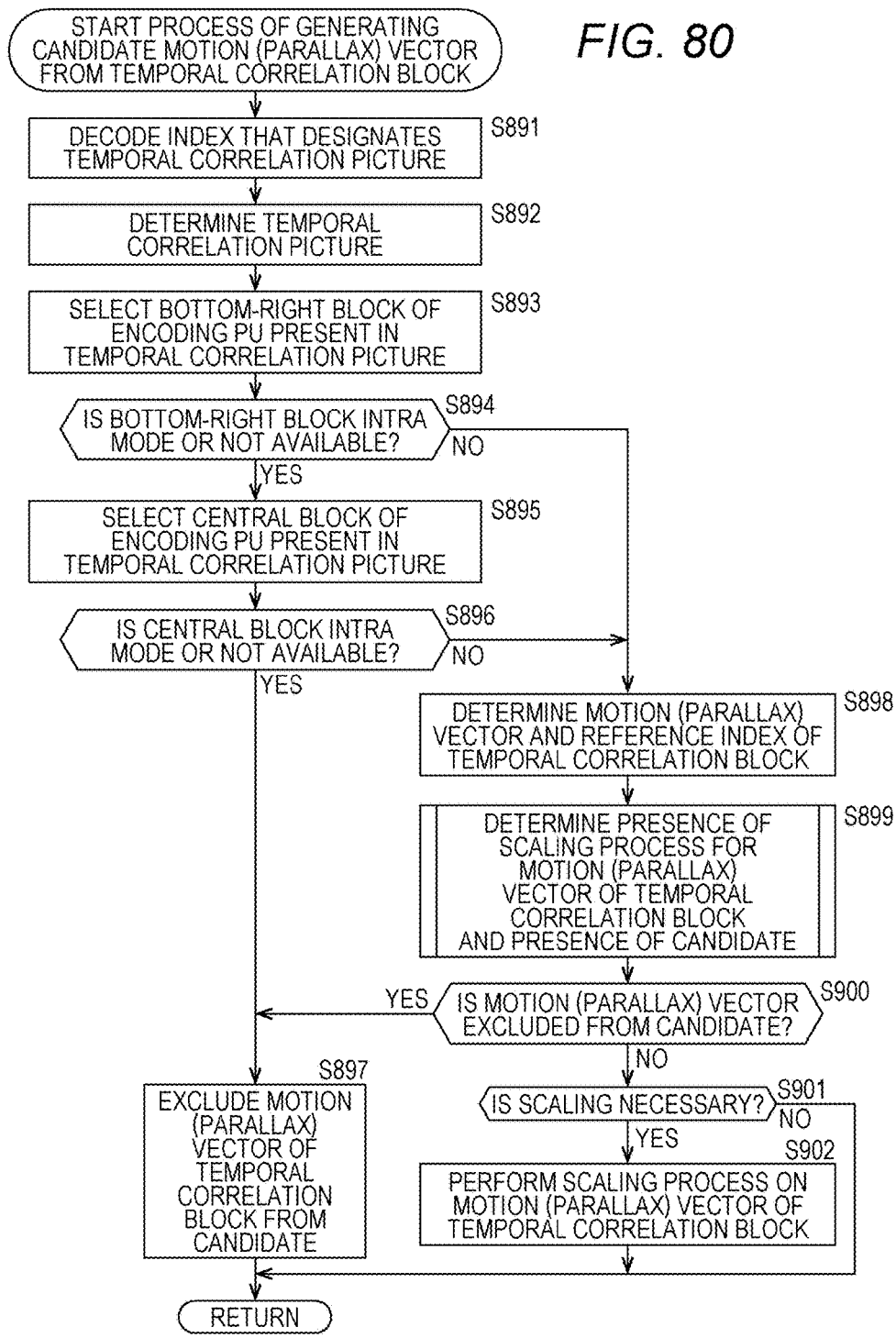
FIG. 80 is a flowchart for describing an example of the flow of a process of generating candidate motion (parallax) vectors from a temporal correlation block.

The process of determining the presence of a scaling process for the motion (parallax) vector of the temporal correlation block and the presence of the candidate executed in step S899 of FIG. 80 is executed in the same manner as that described with reference to the flowchart of FIG. 70, and the description thereof will not be provided. However, in this case, the process is executed by the vector decoding unit 534, and when the process of the flowchart of FIG. 70 ends, the flow returns to the flowchart of FIG. 80.

Next, an example of the flow of the AMVP mode process executed in step S865 of FIG. 78 will be described with reference to the flowchart of FIG. 81. This process is performed basically in the same manner as the process (FIG. 71) on the decoding side. The processes of steps S911 to S917 are executed in the same manner as the processes of steps S761 to S767 of FIG. 71. However, these processes are executed by the vector decoding unit 533.

In step S918, the vector decoding unit 533 decodes the element index (flag) of the candidate list. In step S919, the vector decoding unit 533 acquires the motion (parallax) vector indicated by the element index. When the process of step S919 ends, the flow returns to the flowchart of FIG. 78.

Figure 81:
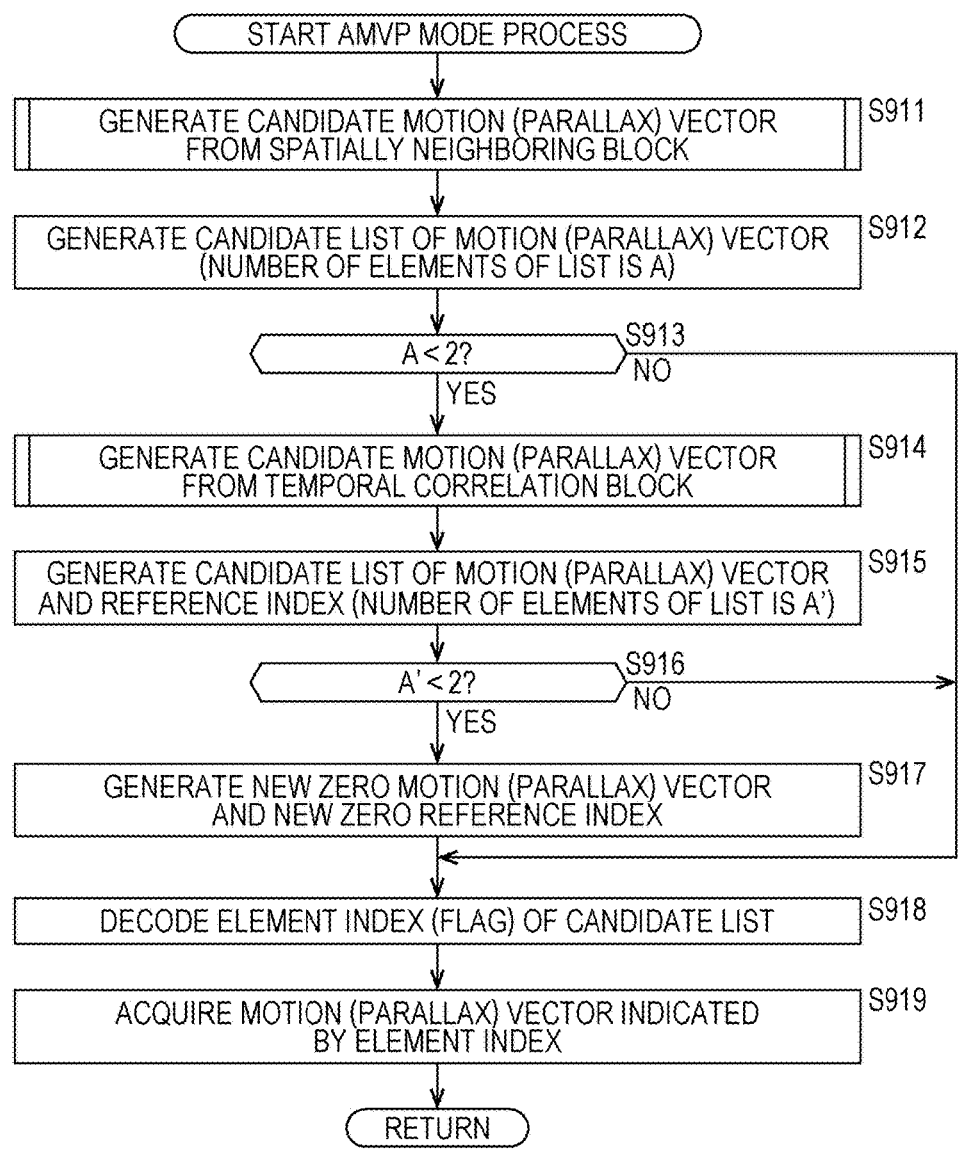
FIG. 81 is a flowchart for describing an example of the flow of an AMVP mode process.

The process of generating a candidate motion (parallax) vector from a spatially neighboring block executed in step S911 of FIG. 81 is executed in the same manner as that described with reference to the flowcharts of FIGS. 72 to 77, and the description thereof will not be provided. However, in this case, the process is executed by the vector decoding unit 533, and when the process of the flowchart of FIG. 72 ends, the flow returns to the flowchart of FIG. 81.

Moreover, the process of generating a candidate motion (parallax) vector from the temporal correlation block executed in step S914 of FIG. 81 is executed in the same manner as that described with reference to the flowchart of FIG. 80, and the description thereof will not be provided. However, in this case, the process is executed by the vector decoding unit 533, and when the process of the flowchart of FIG. 80 ends, the flow returns to the flowchart of FIG. 81.

By executing the processes in the above-described manner, the image decoding device 500 can correctly decode the encoded data and suppress a decrease in the encoding efficiency.

[Summary of Handling of Motion (Parallax) Vector]

In the above example, when the motion (parallax) vector is generated from the neighboring block in the AMVP mode, the motion (parallax) vector is retrieved in the order of the positions A0 and A1 for the left neighboring block, for example, and the process ends when the motion (parallax) vector is found. Similarly, the motion (parallax) vector is retrieved in the order of the positions B0, B1, and B2 for the upper neighboring block, for example, and the process ends when the motion (parallax) vector is found. In this case, since whether the motion (parallax) vector can be used as the candidate is determined after that, for example, even when the motion (parallax) vector found at a certain position cannot be used as the candidate, retrieving of the motion (parallax) vector at the subsequent positions is not performed.

A method of generating the motion (parallax) vector from the neighboring block is not limited to this. For example, whether the motion (parallax) vector at all positions A0 and A1 or positions B0, B1, and B2 cannot be used as the candidate may be determined. That is, the presence of the candidate is determined for the neighboring blocks at respective positions and the presence of the scaling process is determined collectively at the end.

By doing so, it is possible to determine whether the motion (parallax) vectors at the respective positions are to be included in the candidate although the process becomes more complex than the above-described example. That is, it is possible to retrieve more appropriate candidates and to further improve the encoding efficiency.

FIG. 82 is a diagram for describing an example of handling of a neighboring block. In vector prediction, first, whether a motion (parallax) vector of a neighboring block at each position is to be included in a candidate vector is determined as in the table illustrated in A of FIG. 82.

That is, for example, when the types of the reference image of the encoding block and the reference image of the neighboring block are identical (that is, when both reference images are short reference images or long reference images), the motion (parallax) vector of the temporal correlation block is used as a candidate. When the types of both reference images are not identical, the vectors are excluded from the candidate.

After the candidate is selected, whether scaling is to be performed on the candidate vector is determined as in the table illustrated in B of FIG. 82.

That is, for example, when both the reference image of the encoding block and the reference image of the neighboring block are short reference images, scaling of the motion (parallax) vector of the neighboring block is performed. In other cases, scaling of the motion (parallax) vector of the neighboring block is not performed.

[Flow of Process During Encoding]

An example of the flow of a process of generating a candidate motion (parallax) vector from the left block of this case will be described with reference to the flowcharts of FIGS. 83 and 84. Since the processes described with reference to the flowcharts of FIGS. 67 to 72 are executed in the same manner as the processes of this case, the description of these processes will not be provided.

Figure 83:
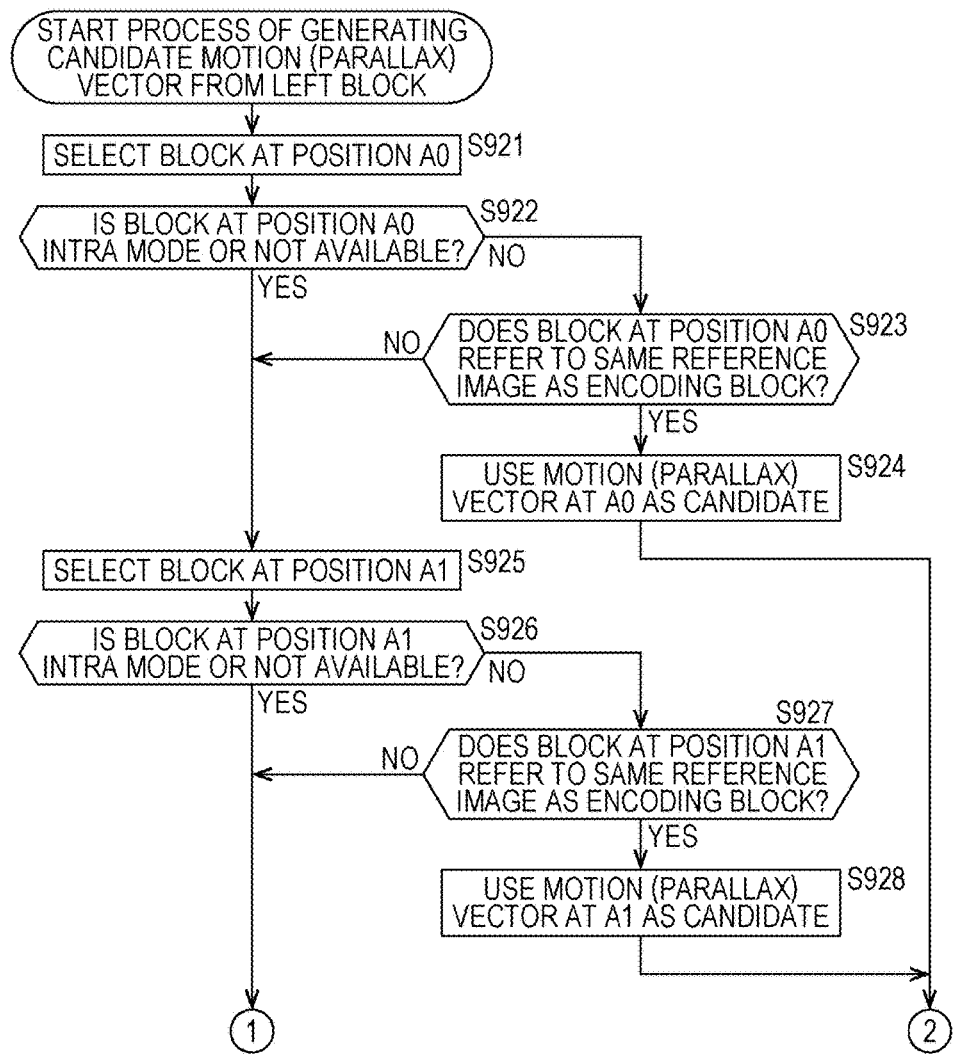
FIG. 83 is a flowchart for describing another example of the flow of a process of generating candidate motion (parallax) vectors from blocks on the left side.

The processes of steps S921 to S928 of FIG. 83 are executed in the same manner as the processes of steps S781 to S788 of FIG. 73. When the process of step S924 or S928 ends, the process of generating the candidate motion (parallax) vector from the left block ends, and the flow returns to the flowchart of FIG. 72. Moreover, when it is determined in step S926 that the block at the position A1 is an intra mode or not available, or when it is determined in step S927 that the block at the position A1 refers to a reference image different from that of the encoding block, the flow proceeds to step S931 of FIG. 84.

Figure 84:
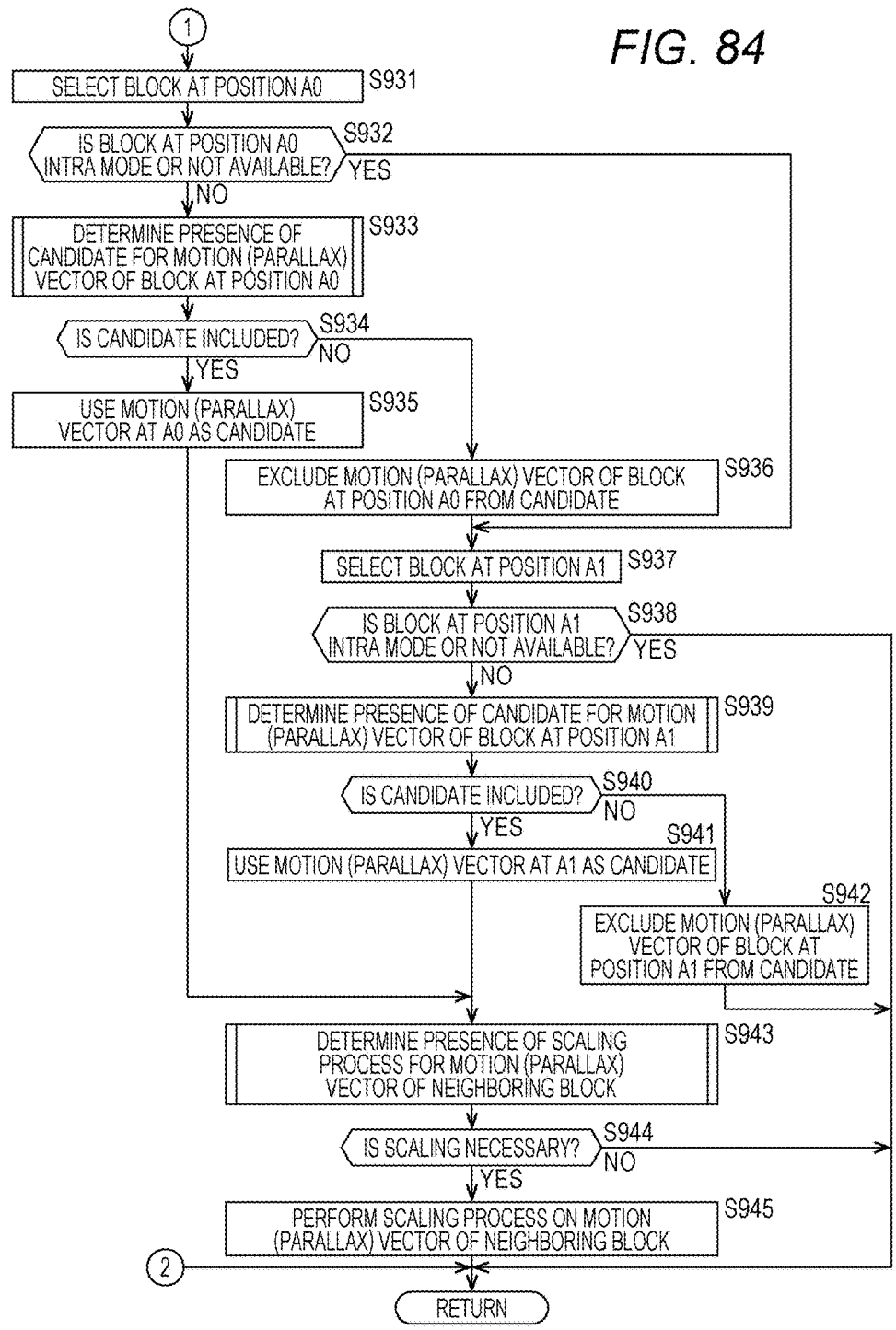
FIG. 84 is a flowchart continued from FIG. 83, for describing another example of the flow of a process of generating candidate motion (parallax) vectors from blocks on the left side.

In step S931 of FIG. 84, the vector predicting unit 433 selects a block at the position A0.

In step S932, the vector predicting unit 433 determines whether the block at the position A0 is an intra mode or not available.

When it is determined that the block at the position A0 is neither an intra mode nor unavailable, the flow proceeds to step S933. In step S933, the vector predicting unit 433 determines the presence of the candidate motion (parallax) vector of the block at the position A0.

In step S934, the vector predicting unit 433 determines whether the candidate is to be included based on the determination result of step S933.

When it is determined that the candidate is to be included, the flow proceeds to step S935. In step S935, the vector predicting unit 433 uses the motion (parallax) vector at the position A0 as the candidate. When the process of step S935 ends, the flow proceeds to step S943.

Moreover, when it is determined in step S934 that the candidate is not to be included, the flow proceeds to step S936. In step S936, the vector predicting unit 433 excludes the motion (parallax) vector of the block at the position A0 from the candidate.

When the process of step S936 ends, the flow proceeds to step S937. Moreover, when it is determined in step S932 that the block at the position A0 is neither intra mode nor unavailable, the flow proceeds to step S937.

In step S937, the vector predicting unit 433 selects a block at the position A1.

In step S938, the vector predicting unit 433 determines whether the block at the position A1 is intra mode or not available. When it is determined that the block at the position A1 is an intra mode or not available, the process of generating the candidate motion (parallax) vector from the left block ends, the flow returns to the flowchart of FIG. 72.

Moreover, when it is determined in step S938 of FIG. 84 that the block at the position A1 is neither intra mode nor unavailable, the flow proceeds to step S939. In step S939, the vector predicting unit 433 determines the presence of the candidate motion (parallax) vector of the block at the position A1.

In step S940, the vector predicting unit 433 determines whether the candidate is to be included based on the determination result of step S939.

When it is determined that the candidate is to be included, the flow proceeds to step S941. In step S941, the vector predicting unit 433 uses the motion (parallax) vector at the position A1 as the candidate. When the process of step S941 ends, the flow proceeds to step S943.

Moreover, when it is determined in step S940 that the candidate is not to be included, the flow proceeds to step S942. In step S942, the vector predicting unit 433 excludes the motion (parallax) vector of the block at the position A1 from the candidate. When the process of step S942 ends, the process of generating the candidate motion (parallax) vector from the left block ends, the flow returns to the flowchart of FIG. 72.

In step S943 of FIG. 84, the vector predicting unit 433 determines the presence of the scaling process for the motion (parallax) vector of the neighboring block.

In step S944, the vector predicting unit 433 determines whether scaling is necessary for the motion (parallax) vector of the neighboring block based on the determination result of step S943.

When it is determined that scaling is necessary, the flow proceeds to step S945. In step S945, the vector predicting unit 433 performs a scaling process on the motion (parallax) vector of the neighboring block. When the process of step S945 ends, the flow returns to the flowchart of FIG. 72.

Moreover, when it is determined in step S944 of FIG. 84 that scaling is not necessary, the flow returns to the flowchart of FIG. 72.

Next, an example of the flow of a process of determining the presence of a candidate motion (parallax) vector of the neighboring block executed in steps S933 and S939 of FIG. 84 will be described with reference to the flowchart of FIG. 85.

Figure 85:
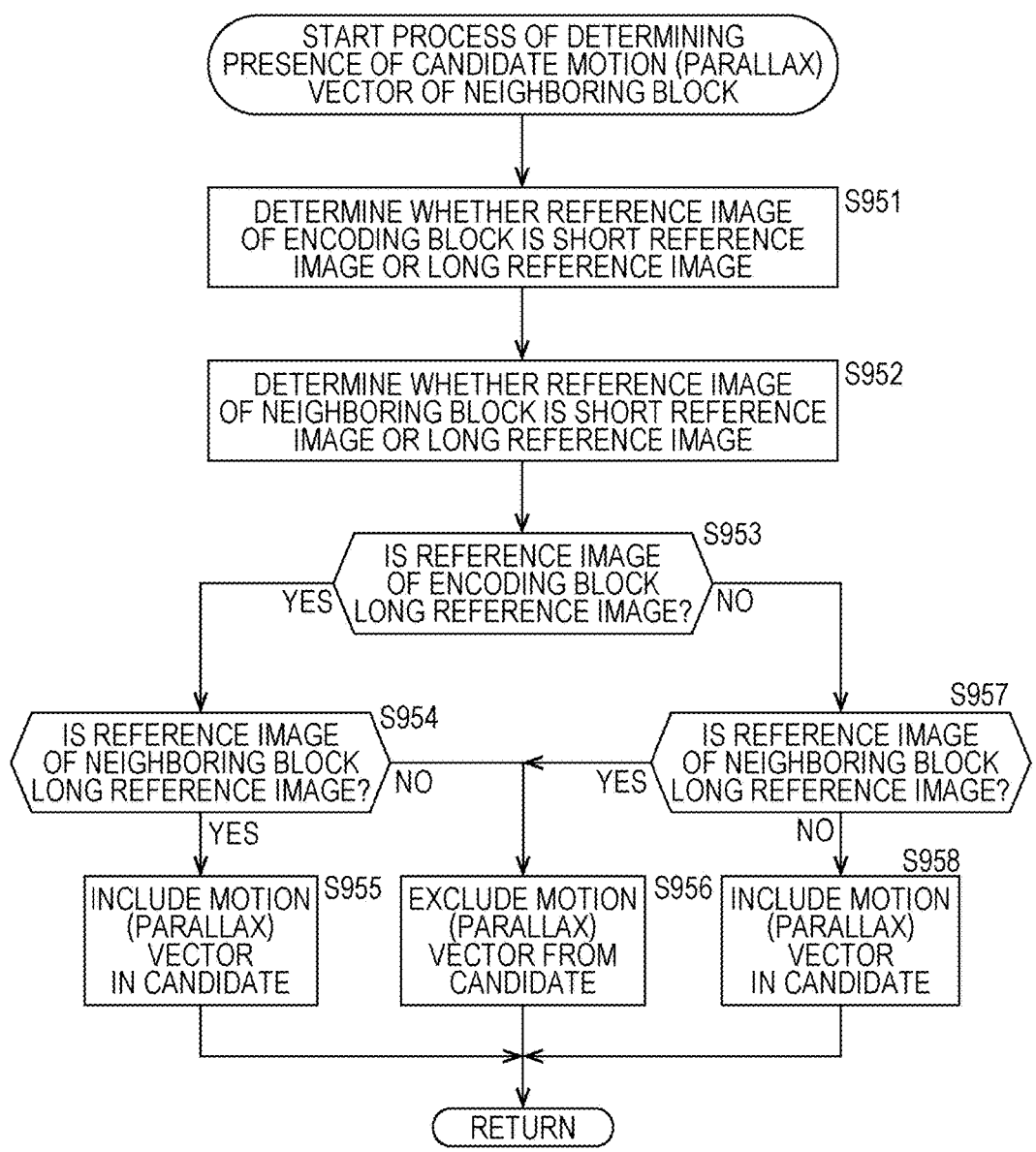
FIG. 85 is a flowchart for describing an example of the flow of a process of determining the presence of a candidate motion (parallax) vector for a neighboring block.

The processes of steps S951 to S954 and S957 of FIG. 85 are executed in the same manner as the processes of steps S811 to S814 and S817 of FIG. 75.

When it is determined in step S953 that the reference image of the encoding block is a long reference image and it is determined in step S954 that the reference image of the neighboring block is a long reference image, the vector predicting unit 433 sets the motion (parallax) vector of the neighboring block (the block at the position A0 or A1) is to be included in the candidate in step S955.

Moreover, when it is determined in step S953 that the reference image of the encoding block is a long reference image and it is determined in step S954 that the reference image of the neighboring block is a short reference image, or when it is determined in step S953 that the reference image of the encoding block is a short reference image and it is determined in step S957 that the reference image of the neighboring block is a long reference image, since the types of the reference images of the encoding block and the neighboring block are different, the vector predicting unit 433 sets the motion (parallax) vector of the neighboring block (the block at the position A0 or A1) to be excluded from the candidate in step S956.

Further, when it is determined in step S953 that the reference image of the encoding block is a short reference image and it is determined in step S957 that the reference image of the neighboring block is a short reference image, the vector predicting unit 433 sets the motion (parallax) vector of the neighboring block (the block at the position A0 or A1) to be included in the candidate in step S958.

When the process of step S955, S956, or S958 ends, the flow returns to the flowchart of FIG. 84.

Next, an example of the flow of a process of determining the presence of a scaling process for the motion (parallax) vector of the neighboring block executed in step S943 of FIG. 84 will be described with reference to the flowchart of FIG. 86.

Figure 86:
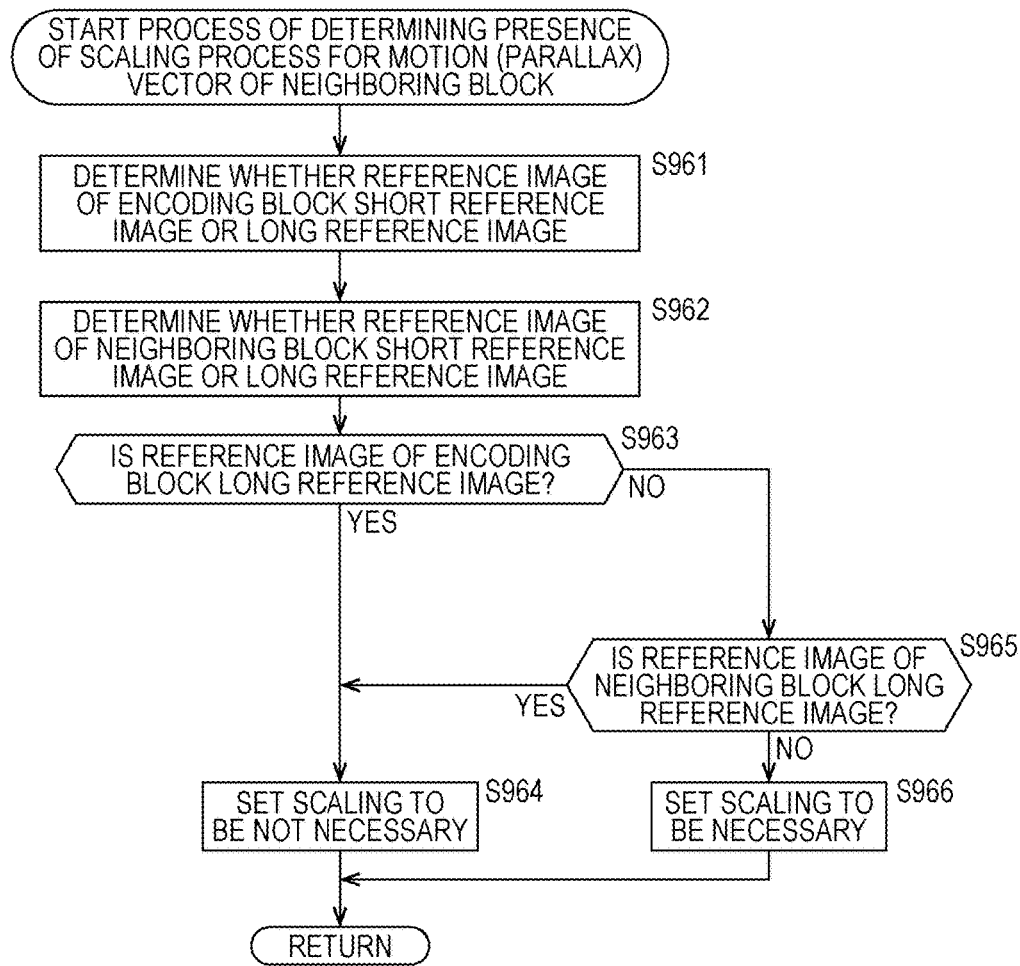
FIG. 86 is a flowchart for describing another example of the flow of a process of determining the presence of a scaling process for a motion (parallax) vector of a neighboring block and the presence of a candidate.

The processes of steps S961 to S963 and S965 of FIG. 86 are performed in the same manner as the processes of steps S811 to S813 and S817 of FIG. 75.

When it is determined in step S963 that the reference image of the encoding block is a long reference image, or when it is determined in step S963 that the reference image of the encoding block is a short reference image and it is determined in step S965 that the reference image of the neighboring block is a long reference image, the flow proceeds to step S964. That is, when it is determined that at least one of the reference image of the encoding block and the reference image of the neighboring block is a long reference image, the flow proceeds to step S964.

In step S964, the vector predicting unit 433 sets the scaling to be not necessary. When the process of step S964 ends, the flow returns to the flowchart of FIG. 84.

Moreover, when it is determined in step S963 of FIG. 86 that the reference image of the encoding block is a short reference image and it is determined in step S965 that the reference image of the neighboring block is a short reference image (that is, when it is determined that both reference images of the encoding block and the neighboring block are short reference images), the flow proceeds to step S966.

In step S966, the vector predicting unit 433 sets the scaling to be necessary. When the process of step S966 ends, the flow returns to the flowchart of FIG. 84.

Next, an example of the flow of a process of generating a candidate motion (parallax) vector from the upper block will be described with reference to the flowcharts of FIGS. 87 to 89.

Figure 87:
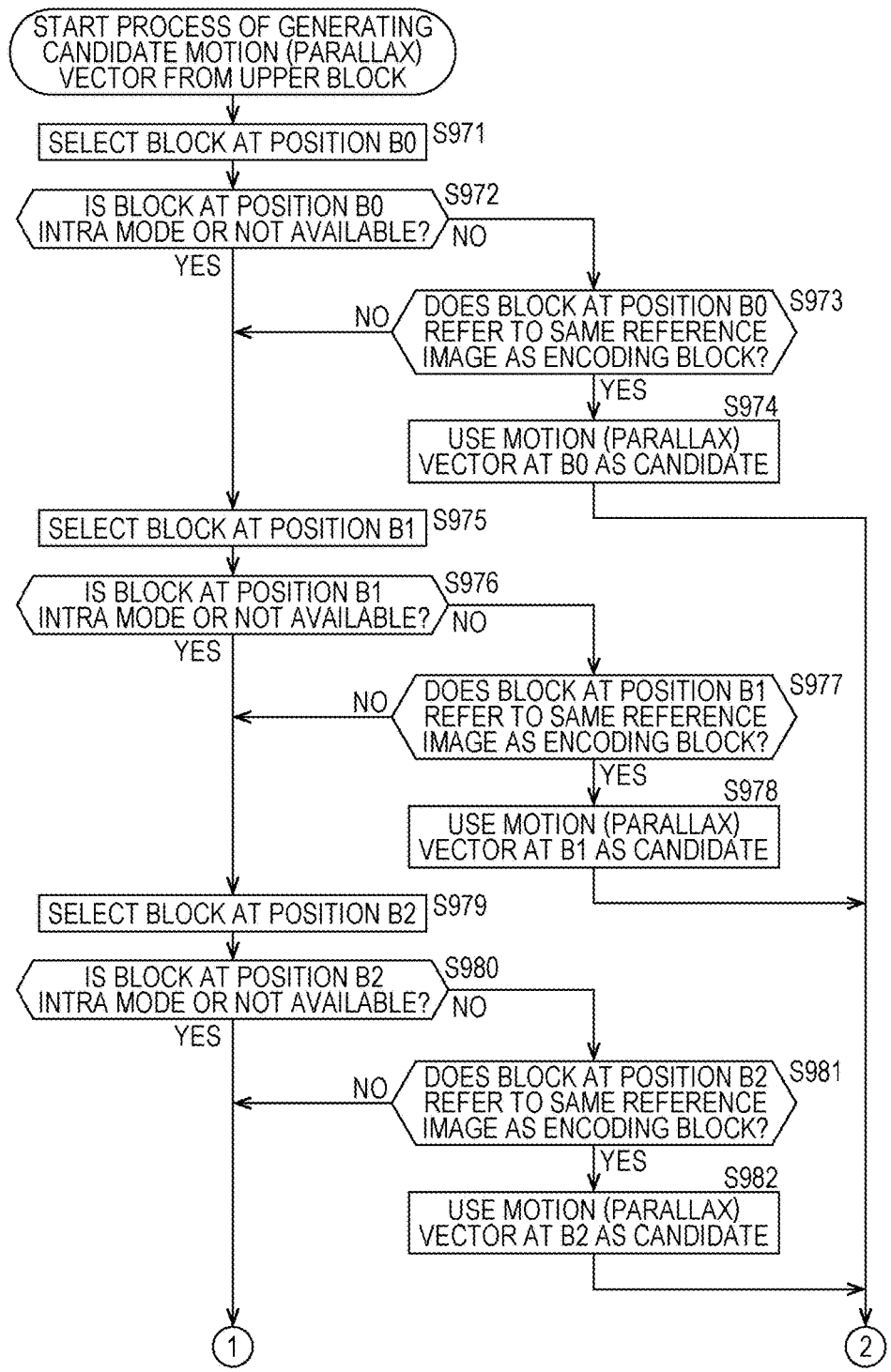
FIG. 87 is a flowchart for describing another example of the flow of a process of generating candidate motion (parallax) vectors from blocks on the upper side.

The processes of steps S971 to S982 of FIG. 87 are executed in the same manner as the processes of steps S821 to S832 of FIG. 76. When the process of step S974, S978, or S982 ends, the flow proceeds to step S1017 of FIG. 89. Moreover, when it is determined in step S980 that the block at the position B2 is an intra mode or not available, or when it is determined in step S981 that the block at the position B2 refers to a reference image different from that of the encoding block, the flow proceeds to step S991 of FIG. 88.

Figure 88:
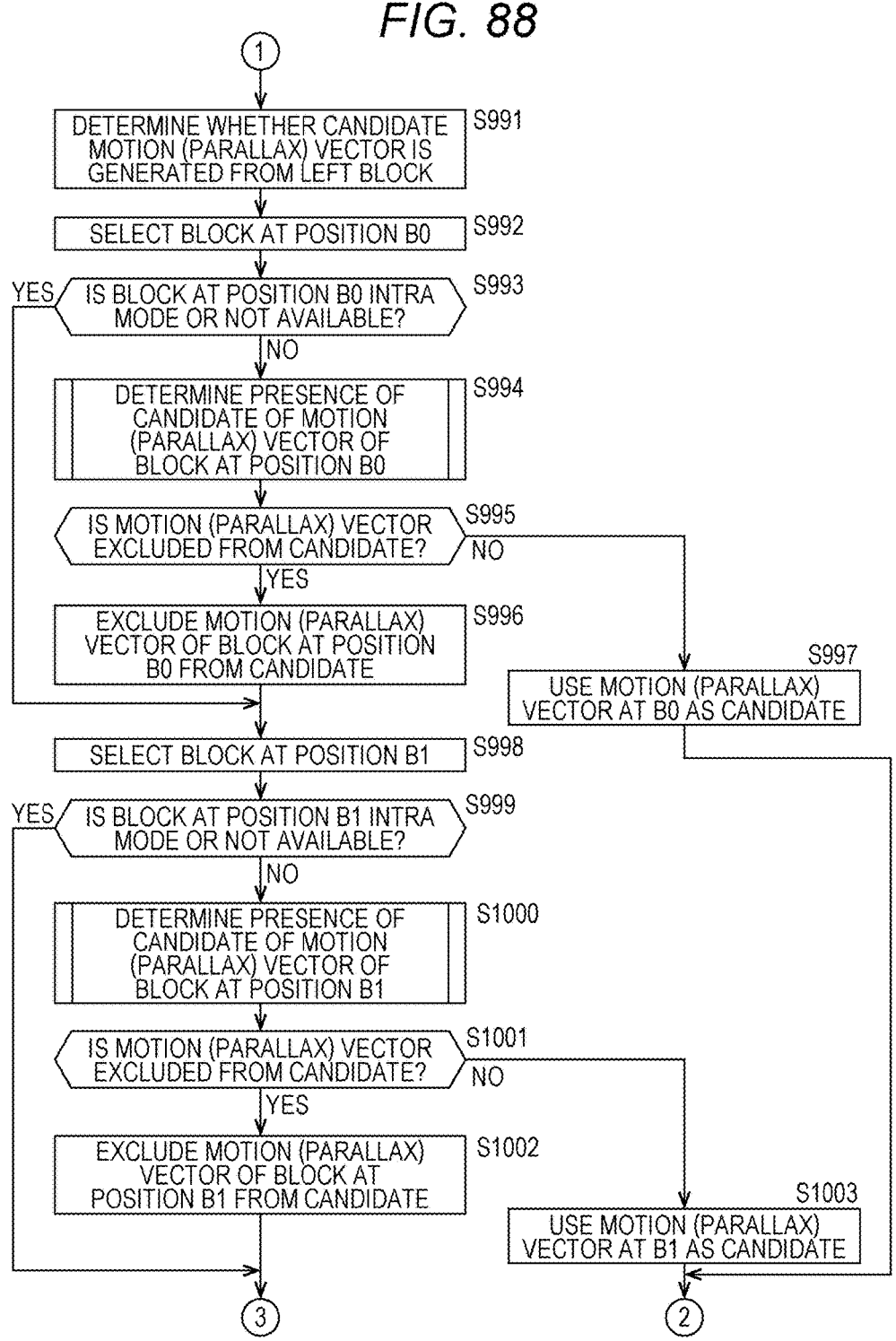
FIG. 88 is a flowchart continued from FIG. 87, for describing another example of the flow of a process of generating candidate motion (parallax) vectors from blocks on the upper side.

In step S991 of FIG. 88, the vector predicting unit 433 determines whether a candidate motion (parallax) vector is generated from the left block.

In step S992, the vector predicting unit 433 selects a block at the position B0.

In step S993, the vector predicting unit 433 determines whether the block at the position B0 is an intra mode or not available.

When it is determined that the block at the position B0 is neither an intra mode nor unavailable, the flow proceeds to step S994. In step S994, the vector predicting unit 433 determines the presence of the candidate motion (parallax) vector of the block at the position B0. Since this process is performed in the same manner as that described with reference to the flowchart of FIG. 85, the description thereof will not be provided.

In step S995, the vector predicting unit 433 determines whether the candidate is to be excluded based on the determination result of step S994.

When the motion (parallax) vector is to be excluded from the candidate, the flow proceeds to step S996. In step S996, the vector predicting unit 433 excludes the motion (parallax) vector of the block at the position B0 from the candidate. When the process of step S996 ends, the flow proceeds to step S998.

Moreover, when it is determined in step S995 that the motion (parallax) vector is not to be excluded from the candidate, the flow proceeds to step S997. In step S997, the vector predicting unit 433 uses the motion (parallax) vector of the block at the position B0 as the candidate. When the process of step S997 ends, the flow proceeds to step S1017 of FIG. 89.

Moreover, when it is determined in step S993 that the block at the position B0 is an intra mode or not available, the flow proceeds to step S998.

In step S998, the vector predicting unit 433 selects a block at the position B1.

In step S999, the vector predicting unit 433 determines whether the block at the position B1 is an intra mode or not available.

When it is determined that the block at the position B1 is neither an intra mode nor unavailable, the flow proceeds to step S1000. In step S1000, the vector predicting unit 433 determines the presence of the candidate motion (parallax) vector of the block at the position B1. Since this process is performed in the same manner as that described with reference to the flowchart of FIG. 85, the description thereof will not be provided.

In step S1001, the vector predicting unit 433 determines whether the candidate is to be excluded based on the determination result of step S1000.

When the motion (parallax) vector is to be excluded from the candidate, the flow proceeds to step S1002. In step S1002, the vector predicting unit 433 excludes the motion (parallax) vector of the block at the position B1 from the candidate. When the process of step S1002 ends, the flow proceeds to step S1011 of FIG. 89.

Moreover, when it is determined in step S1001 of FIG. 88 that the motion (parallax) vector is not to be excluded from the candidate, the flow proceeds to step S1003. In step S1003, the vector predicting unit 433 uses the motion (parallax) vector of the block at the position B1 as the candidate. When the process of step S1003 ends, the flow proceeds to step S1017 of FIG. 89.

Figure 89:
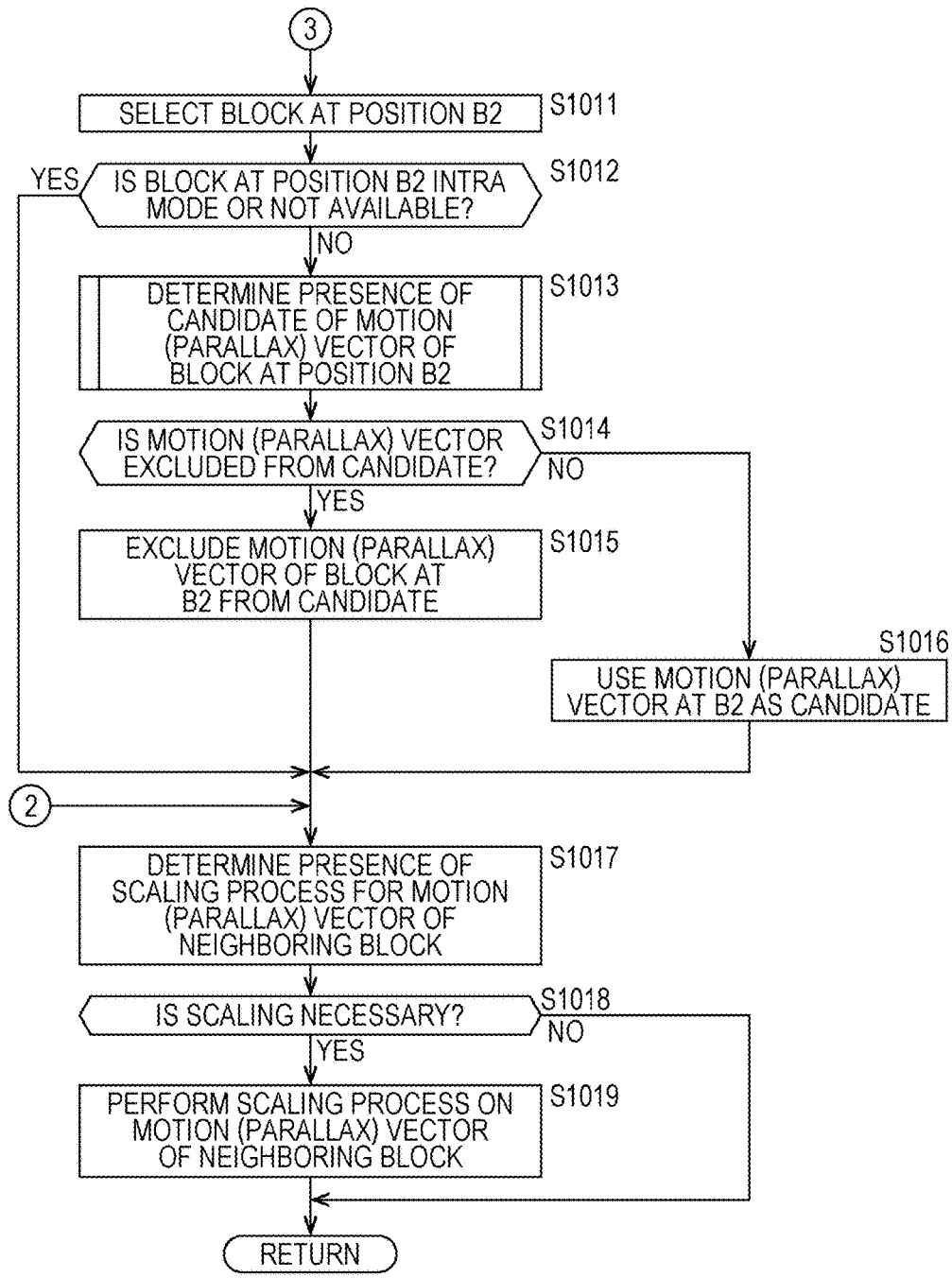
FIG. 89 is a flowchart continued from FIG. 88, for describing another example of the flow of a process of generating candidate motion (parallax) vectors from blocks on the upper side.

Moreover, when it is determined in step S999 that the block at the position B1 is an intra mode or not available, the flow proceeds to step S1011 of FIG. 89.

In step S1011 of FIG. 89, the vector predicting unit 433 selects a block at the position B2.

In step S1012, the vector predicting unit 433 determines whether the block at the position B2 is an intra mode or not available.

When it is determined that the block at the position B2 is neither an intra mode nor unavailable, the flow proceeds to step S1013. In step S1013, the vector predicting unit 433 determines the presence of the candidate motion (parallax) vector of the block at the position B2. Since this process is performed in the same manner as that described with reference to the flowchart of FIG. 85, the description thereof will not be provided.

In step S1014, the vector predicting unit 433 determines whether the candidate is to be excluded based on the determination result of step S1013.

When the motion (parallax) vector is to be excluded from the candidate, the flow proceeds to step S1015. In step S1015, the vector predicting unit 433 excludes the motion (parallax) vector of the block at the position B2 from the candidate. When the process of step S1015 ends, the flow proceeds to step S1017.

Moreover, when it is determined in step S1014 that the motion (parallax) vector is not to be excluded from the candidate, the flow proceeds to step S1016. In step S1016, the vector predicting unit 433 uses the motion (parallax) vector of the block at the position B2 as the candidate. When the process of step S1016 ends, the flow proceeds to step S1017.

In step S1017, the vector predicting unit 433 determines the presence of the scaling process for the motion (parallax) vector of the neighboring block. Since this process is performed in the same manner as that described with reference to the flowchart of FIG. 86, the description thereof will not be provided.

In step S1018, the vector predicting unit 433 determines whether scaling is necessary for the motion (parallax) vector of the neighboring block based on the determination result of step S1017.

When it is determined that scaling is necessary, the flow proceeds to step S1019. In step S1019, the vector predicting unit 433 performs a scaling process on the motion (parallax) vector of the neighboring block. When the process of step S1019 ends, the flow returns to the flowchart of FIG. 72.

Moreover, when it is determined in step S1018 of FIG. 89 that scaling is not necessary, the flow returns to the flowchart of FIG. 72.

By executing the respective processes in the above-described manner, the image encoding device 400 can suppress a decrease in the encoding efficiency.

Since the image decoding device 500 performs these processes in the same manner as the image encoding device 400 described above, the description thereof will not be provided. Due to this, the image decoding device 500 can correctly decode the encoded data and suppress a decrease in the encoding efficiency.

[Summary of Handling of Motion (Parallax) Vector]

In the above, a first example has been described with reference to FIGS. 66 to 81, and a second example has been described with reference to FIGS. 82 to 89.

Besides these examples, for example, in the first example, when both the reference image of the encoding block and the reference image of the neighboring block are long reference images, the motion (parallax) vector of the neighboring block may be used as the candidate only when the encoding block and the neighboring block refer to the same reference images. When the encoding block and the neighboring block refer to different reference images, the motion (parallax) vector of the neighboring block may be excluded from the candidate, and the retrieving process may not be provided.

As described above, the long reference image is applied to a fixed region such as a background image and an image of a different view. Thus, even when both the reference image of the encoding block and the reference image of the neighboring block are such long reference images, if the reference images are different images, it is expected that the reference images have low correlation. That is, it is expected that the correlation between the motion (parallax) vectors of the encoding block and the neighboring block are low.

Thus, by excluding a pattern (a case where both reference images of the encoding block and the neighboring block are long reference images and both images are different images) in which it is expected that such correlation is low from candidate vectors, it is possible to further suppress a decrease in the encoding efficiency. Moreover, by not providing the process of determining the presence of the candidate and the presence of scaling, it is possible to decrease processing load.

FIG. 90 is a diagram for describing another example of handling of a temporal correlation block and a neighboring block. In vector prediction, whether the motion (parallax) vector of the temporal correlation block is to be included into the candidate vector and whether scaling is to be performed are determined as in the table illustrated in A of FIG. 90.

That is, this is the same as the case of A of FIG. 66.

Moreover, in vector prediction, whether the motion (parallax) vector of the neighboring block is to be included in the candidate vector and whether scaling is to be performed are determined as in the table illustrated in B of FIG. 90.

That is, for example, when both reference images of the encoding block and the neighboring block are long reference images, and the motion (parallax) vector of the neighboring block is used as the candidate only when the reference images are the same. Further, when these reference images are different, the motion (parallax) vector of the neighboring block is excluded from the candidate, and the process of determining the presence of the candidate and the presence of scaling is not provided.

When both the reference image of the encoding block and the reference image of the neighboring block are short reference images, scaling of the motion (parallax) vector of the neighboring block is performed. When both reference images are long reference images, scaling of the motion (parallax) vector of the neighboring block is not performed.

[Flow of Process During Encoding]

An example of the flow of a process of generating a candidate motion (parallax) vector from the left block of this case will be described with reference to the flowcharts of FIGS. 91 and 92. Since the processes described with reference to the flowcharts of FIGS. 67 to 72 are executed in the same manner as the processes of this case, the description of these processes will not be provided.

Figure 91:
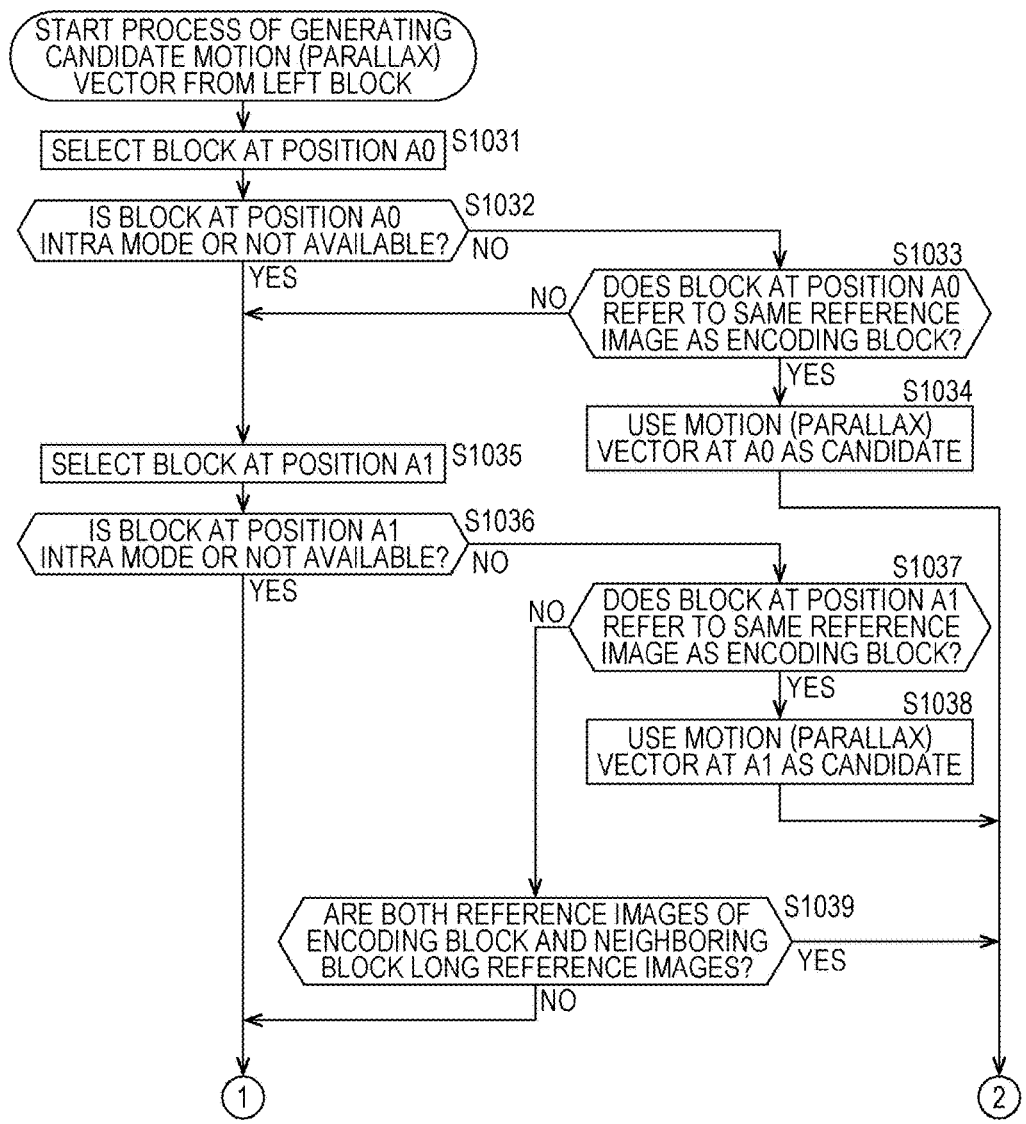
FIG. 91 is a flowchart for describing still another example of the flow of a process of generating candidate motion (parallax) vectors from blocks on the left side.

The processes of steps S1031 to S1038 of FIG. 91 are executed basically in the same manner as the processes of steps S781 to S788 of FIG. 73. When the process of step S1034 or S1038 ends, the process of generating the candidate motion (parallax) vector from the left block ends, and the flow returns to the flowchart of FIG. 72. Moreover, when it is determined in step S1035 that the block at the position A1 is an intra mode or not available, the flow proceeds to step S1041 of FIG. 92.

However, when it is determined in step S1037 of FIG. 91 that the block at the position A1 refers to a reference image different from that of the encoding block, the flow proceeds to step S1039.

In step S1039, the vector predicting unit 433 determines whether both the reference images of the encoding block and the neighboring block are long reference images.

When it is determined that both reference images of the encoding block and the neighboring block are long reference images, the process of generating a candidate motion (parallax) vector from the left block ends, and the flow returns to the flowchart of FIG. 72.

Figure 92:
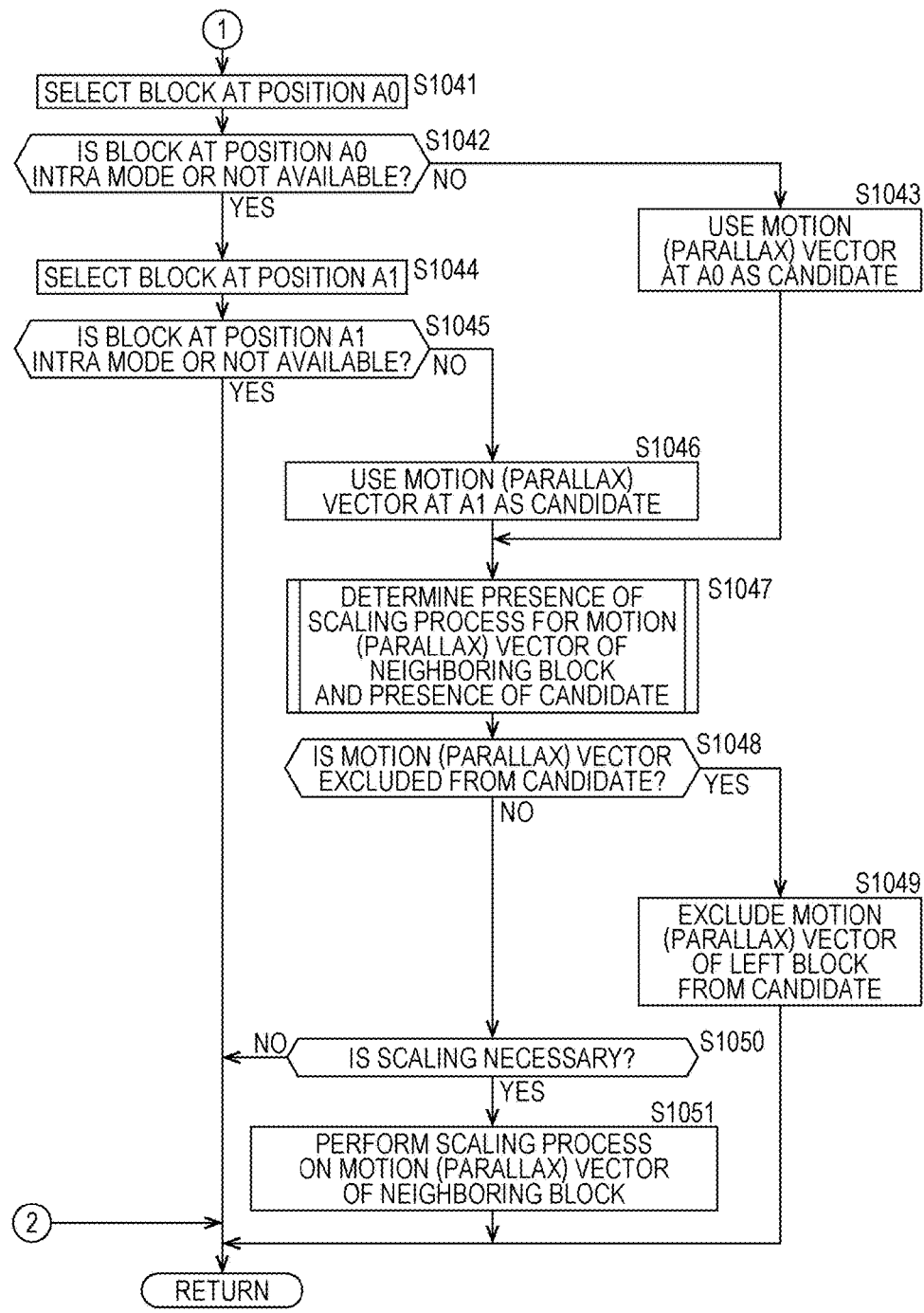
FIG. 92 is a flowchart continued from FIG. 91, for describing still another example of the flow of a process of generating candidate motion (parallax) vectors from blocks on the left side.

Moreover, when it is determined that at least one of the reference images of the encoding block and the neighboring block is a short reference image, the flow proceeds to step S1041 of FIG. 92.

The processes of steps S1041 to S1051 of FIG. 92 are executed in the same manner as the processes of steps S791 to S799 of FIG. 74.

That is, when it is determined that both reference images of the encoding block and the neighboring block are long reference images, all processes of the flowchart of FIG. 92 are not provided. Thus, it is possible to decrease processing load.

Next, an example of the flow of a process of generating a candidate motion (parallax) vector from the upper block of this case will be described with reference to the flowcharts of FIGS. 93 and 94.

Figure 93:
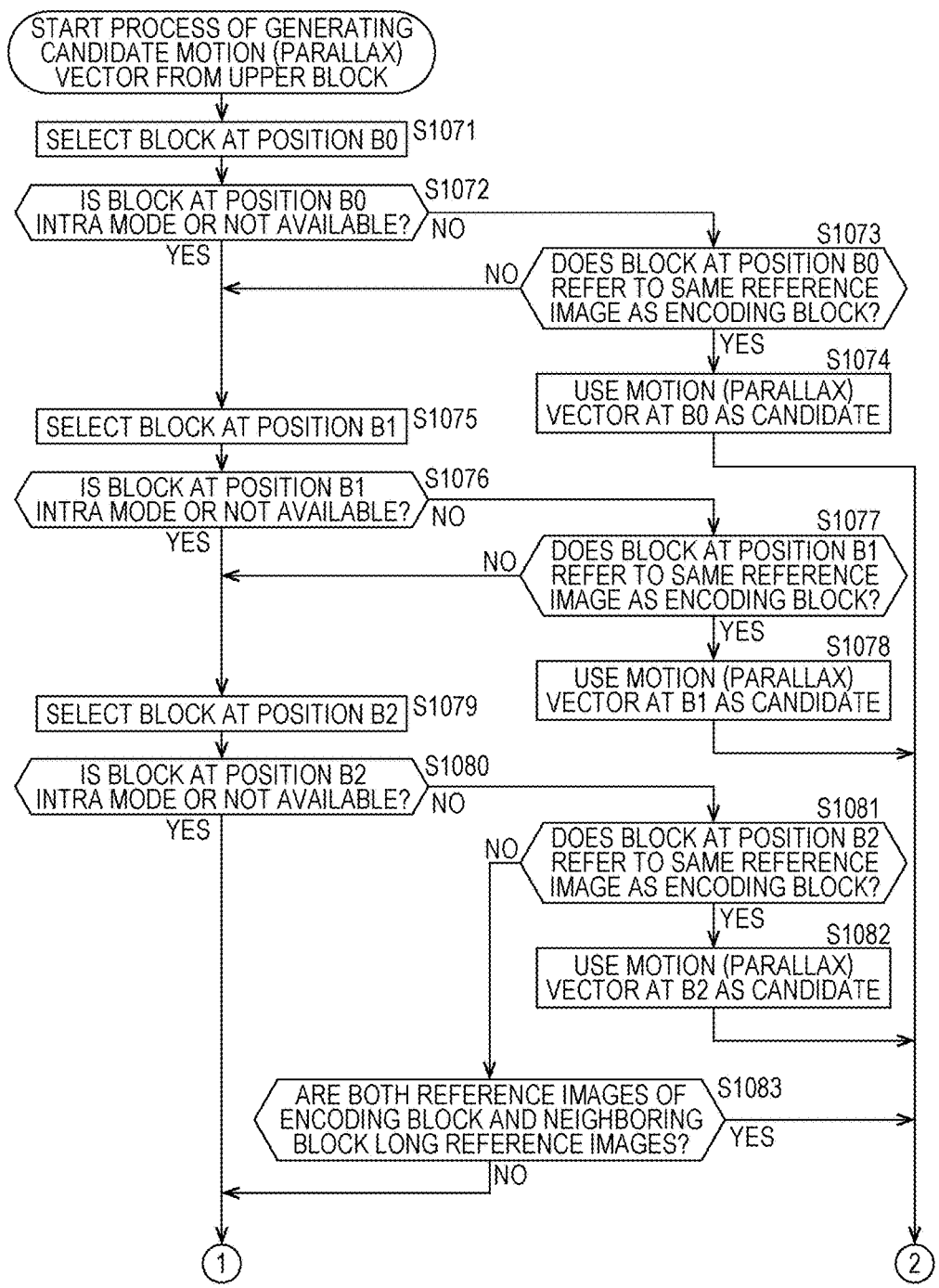
FIG. 93 is a flowchart for describing still another example of the flow of a process of generating candidate motion (parallax) vectors from blocks on the upper side.

The processes of steps S1071 to S1082 of FIG. 93 are executed basically in the same manner as the processes of steps S821 to S832 of FIG. 76. When the process of step S1074, S1078, or S1082 ends, the process of generating a candidate motion (parallax) vector from the upper block ends, and the flow returns to the flowchart of FIG. 72. Moreover, when it is determined in step S1080 that the block at the position B2 is an intra mode or not available, the flow proceeds to step S1091 of FIG. 94.

However, when it is determined in step S1081 of FIG. 93 that the block at the position B2 refers to a reference image different from that of the encoding block, the flow proceeds to step S1083.

In step S1083, the vector predicting unit 433 determines whether both reference images of the encoding block and the neighboring block are long reference images.

When it is determined that both reference images of the encoding block and the neighboring block are long reference images, the process of generating a candidate motion (parallax) vector from the upper block ends, the flow returns to the flowchart of FIG. 72.

Figure 94:
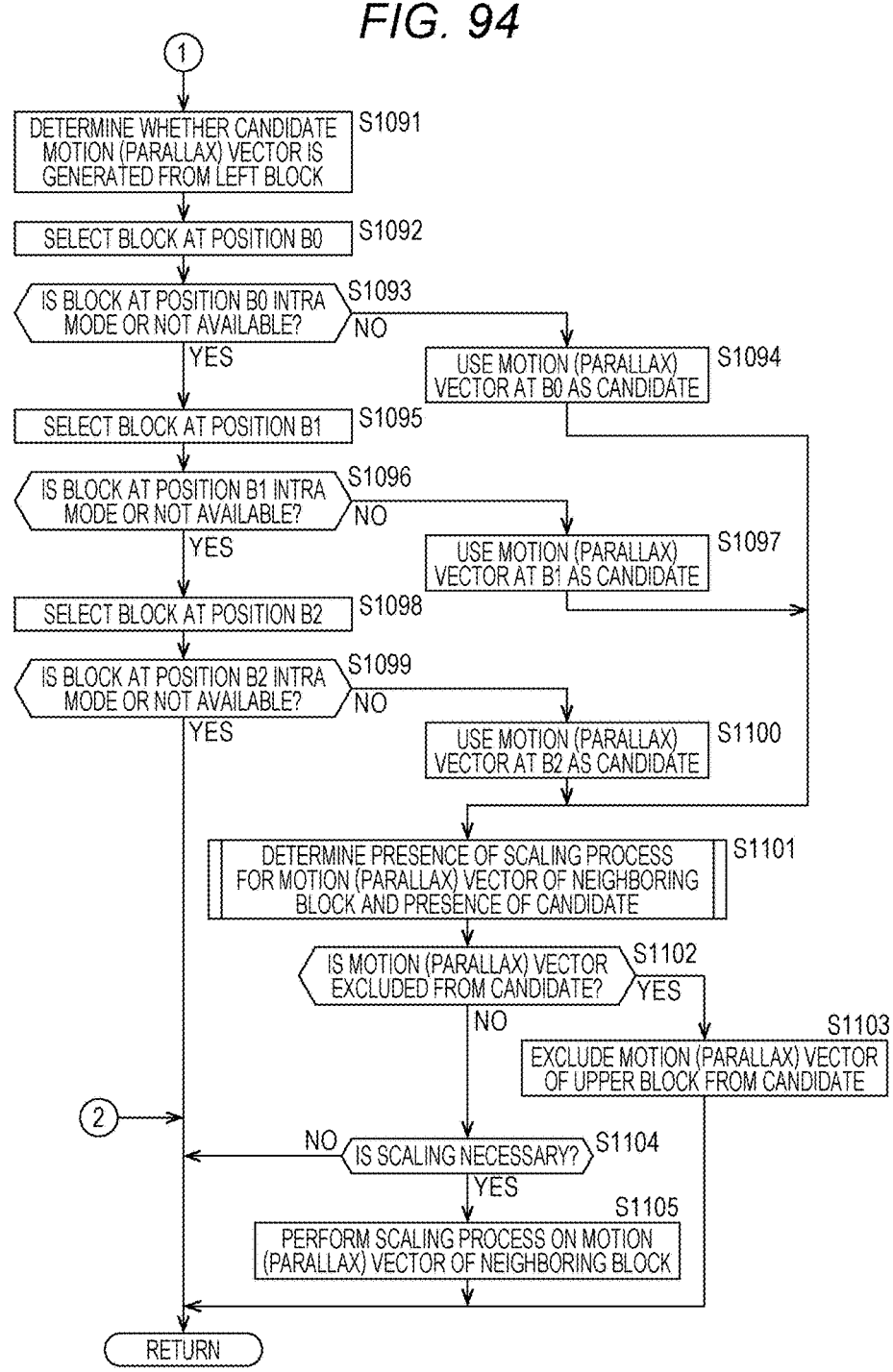
FIG. 94 is a flowchart continued from FIG. 93, for describing still another example of the flow of a process of generating candidate motion (parallax) vectors from blocks on the upper side.

Moreover, when it is determined that at least one of the reference images of the encoding block and the neighboring block is a short reference image, the flow proceeds to step S1091 of FIG. 94.

The processes of steps S1091 to S1105 of FIG. 94 are executed in the same manner as the processes of steps S841 to S855 of FIG. 77.

That is, when it is determined that both reference images of the encoding block and the neighboring block are long reference images, all processes of the flowchart of FIG. 94 are not provided. Thus, it is possible to decrease processing load.

The series of processes can be applied to multi-view image encoding and decoding (multi-view encoder and decoder). That is, the encoding efficiency can be improved when multi-view encoding and decoding are performed. The series of processes can be applied to layer image encoding (space scalability) and layer image decoding (multilayer encoder and decoder). That is, the encoding efficiency can be improved when layer image encoding and decoding are performed.

Moreover, the series of processes can be applied to a so-called 2D image of a mono-view image (1-view).

The present technique can be applied to an image information encoding device and an image decoding method that are used when image information (a bit stream) which has been compressed by orthogonal transform such as discrete cosine transform and motion compensation as in the case of MPEG, H. 26x, and the like is received via a network medium such as satellite broadcasting, a cable TV, the Internet, or a cellular phone. Moreover, the present technique can be applied to an image encoding device and an image decoding device that are used when the image information (a bit stream) is processed on a storage medium such as an optical or magnetic disk, or a flash memory. Further, the present technique can be applied to a motion prediction compensating device included in the image encoding device, the image decoding device, and the like.

7. Seventh Embodiment

[Computer]

The above-described series of processes can be executed not only by hardware but also by software. When the series of processes are executed by software, a program included in the software is installed in a computer. Here, the computer may be a computer integrated into an exclusive hardware or a general-purpose personal computer which can execute various functions by installing various programs in the computer.

Figure 95:
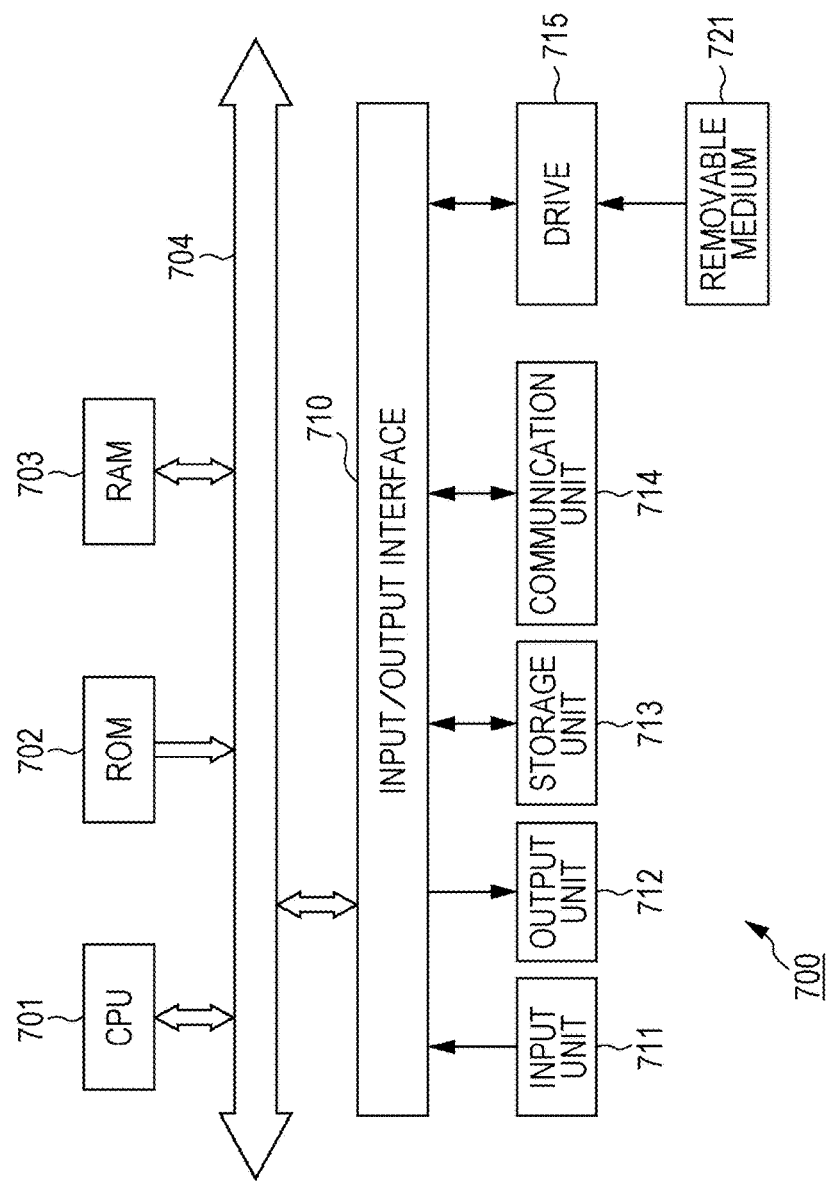
FIG. 95 is a block diagram illustrating a main configuration example of a personal computer.

In FIG. 95, a CPU (Central Processing Unit) 701 of a personal computer 700 executes various processes according to a program stored in a ROM (Read Only Memory) 702 or a program loaded from a storage unit 713 into a RAM (Random Access Memory) 703. Data necessary for the CPU 701 to execute the various processes is also appropriately stored in the RAM 703.

The CPU 701, the ROM 702, and the RAM 703 are connected to one another via a bus 704. An input/output interface 710 is also connected to the bus 704.

An input unit 711 formed of a keyboard, a mouse and the like, an output unit 712 formed of a display formed of a CRT (Cathode Ray Tube) and an LCD (Liquid Crystal Display), a speaker, and the like, the storage unit 713 formed of a hard disk and the like, and a communication unit 714 formed of a modem and the like are connected to the input/output interface 710. The communication unit 714 performs a communication process via a network including the Internet.

A drive 715 is connected to the input/output interface 710 as needed, a removable medium 721 such as a magnetic disc, an optical disc, a magneto-optical disc, and a semiconductor memory is appropriately mounted thereon, and a computer program read from the medium is installed on the storage unit 713 as necessary.

When the series of processes is executed by software, a program included in the software is installed via a network or a recording medium.

The recording medium is composed not only of the removable medium 721 including the magnetic disc (including a flexible disc), the optical disc (including a CD-ROM (Compact Disc-Read Only Memory) and a DVD (Digital Versatile Disc)), the magneto-optical disc (including an MD (Mini Disc)), and the semiconductor memory, in which the program is recorded, distributed to a user for distributing the program separately from an apparatus main body but also of the ROM 702 in which the program is recorded and the hard disc included in the storage unit 713 distributed to the user in a state being embedded in advance in the apparatus main body as illustrated in FIG. 95, for example.

The program executed by the computer may be a program executing processing in a time-sequential manner in accordance with the procedures described in this specification and may be a program executing the processing in a parallel manner or at necessary times such as in response to calls.

Here, in this specification, the steps that describe the program recorded in the recording medium includes not only processing which is executed in time-sequential manner in accordance with described procedures but also processing which is executed in parallel and/or separately even if it is not always executed in time-sequential manner.

In this specification, the term "system" is used to imply an apparatus as a whole, which includes a plurality of devices (apparatuses).

In the above description, the configuration described as one apparatus (or processor) may be split into a plurality of apparatuses (or processors). Alternatively, the configuration described as a plurality of apparatuses (or processors) may be integrated into a single apparatus (or processor). Moreover, a configuration other than those discussed above may be included in the above-described configuration of each apparatus (or each processor). If the configuration and the operation of a system as a whole is substantially the same, part of the configuration of an apparatus (or processor) may be added to the configuration of another apparatus (or another processor). The embodiments of the present disclosure are not limited to the above-described embodiments, but various modifications can be made in a range not departing from the gist of the present disclosure.

8. Eighth Embodiment

The image encoding device and the image decoding device according to the above-described embodiments can be applied to various electronic apparatuses such as a transmitter or a receiver that distributes signals on cable broadcasting (such as satellite broadcasting or a cable TV) or on the Internet and distributes signals to a terminal by cellular communication, a recording device that records images on a medium such as an optical disc, a magnetic disk, or a flash memory, or a reproducing device that reproduces images from these storage media. Four application examples will be described below.

[First Application Example: Television Apparatus]

Figure 96:
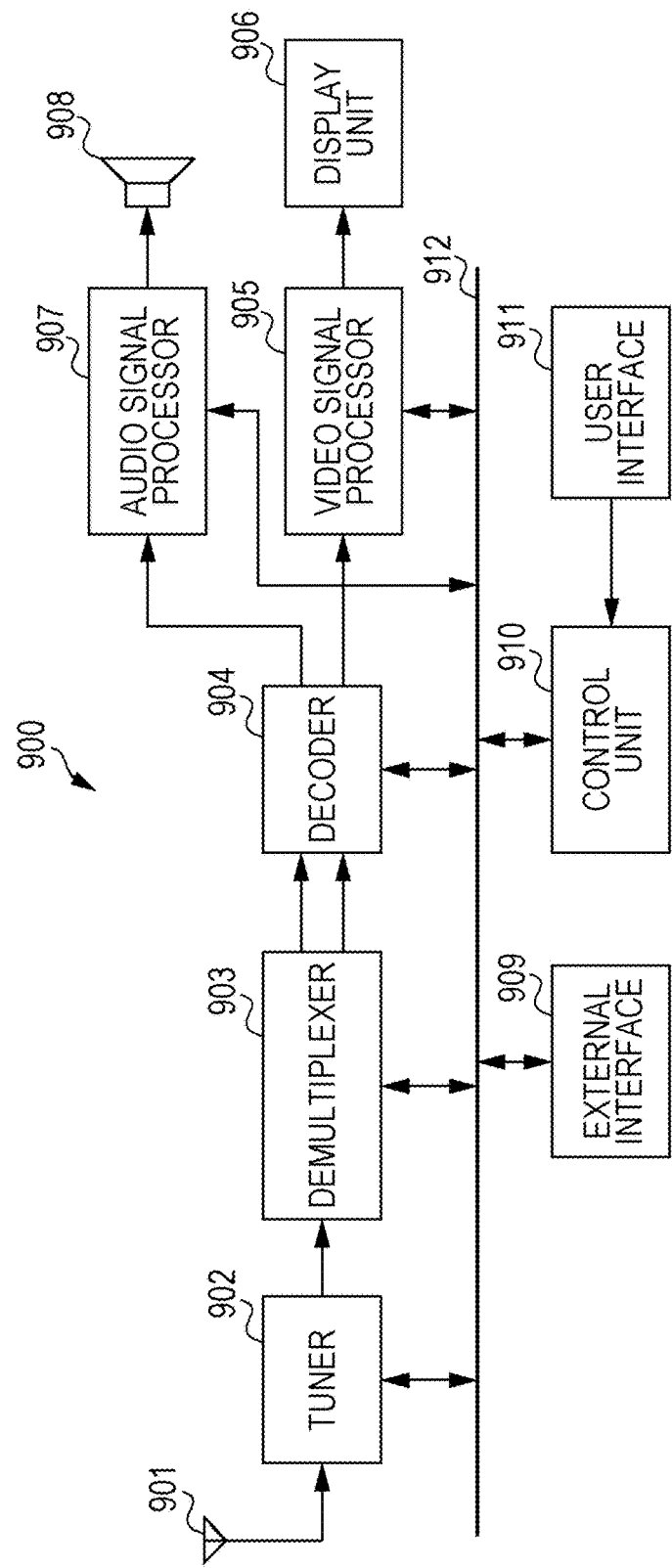
FIG. 96 is a block diagram illustrating an example of a schematic configuration of a television apparatus.

FIG. 96 illustrates an example of a schematic configuration of a television apparatus to which the above-described embodiment is applied. A television apparatus 900 includes an antenna 901, a tuner 902, a demultiplexer 903, a decoder 904, a video signal processor 905, a display unit 906, an audio signal processor 907, a speaker 908, an external interface 909, a control unit 910, a user interface 911, and a bus 912.

The tuner 902 extracts a signal of a desired channel from a broadcast signal received via the antenna 901 and demodulates the extracted signal. Then, the tuner 902 outputs an encoded bit stream obtained by demodulation to the demultiplexer 903. That is, the tuner 902 serves as transmitting means in the television apparatus 900, which receives the encoded stream in which the image is encoded.

The demultiplexer 903 separates a video stream and an audio stream of a program to be watched from the encoded bit stream and outputs each separated stream to the decoder 904. Moreover, the demultiplexer 903 extracts auxiliary data such as EPG (Electronic Program Guide) from the encoded bit stream and supplies the extracted data to the control unit 910. The demultiplexer 903 may descramble when the encoded bit stream is scrambled.

The decoder 904 decodes the video stream and the audio stream input from the demultiplexer 903. Then, the decoder 904 outputs video data generated by a decoding process to the video signal processor 905. Moreover, the decoder 904 outputs audio data generated by the decoding process to the audio signal processor 907.

The video signal processor 905 reproduces the video data input from the decoder 904 and allows the display unit 906 to display video. The video signal processor 905 may also allow the display unit 906 to display an application screen supplied via the network. The video signal processor 905 may also perform an additional process such as noise removal, for example, to the video data according to setting. Further, the video signal processor 905 may generate a GUI (Graphical User Interface) image such as a menu, a button, and a cursor, for example, and superimpose the generated image on an output image.

The display unit 906 is driven by a drive signal supplied from the video signal processor 905 to display the video or image on a video screen of a display device (for example, a liquid crystal display, a plasma display, an OELD (Organic ElectroLuminescence Display (organic EL display) and the like).

The audio signal processor 907 performs a reproducing process such as D/A conversion and amplification on the audio data input from the decoder 904 and allows the speaker 908 to output the audio. The audio signal processor 907 may also perform an additional process such as the noise removal to the audio data.

The external interface 909 is the interface for connecting the television apparatus 900 and an external device or the network. For example, the video stream or the audio stream received via the external interface 909 may be decoded by the decoder 904. That is, the external interface 909 also serves as the transmitting means in the television apparatus 900, which receives the encoded stream in which the image is encoded.

The control unit 910 includes a processor such as a CPU and a memory such as a RAM and a ROM. The memory stores the program executed by the CPU, program data, the EPG data, data obtained via the network and the like. The program stored in the memory is read by the CPU at startup of the television apparatus 900 to be executed, for example. The CPU controls operation of the television apparatus 900 according to an operation signal input from the user interface 911, for example, by executing the program.

The user interface 911 is connected to the control unit 910. The user interface 911 includes a button and a switch for the user to operate the television apparatus 900, a receiver of a remote control signal and the like, for example. The user interface 911 detects the operation input by the user via the components to generate the operation signal and outputs the generated operation signal to the control unit 910.

The bus 912 connects the tuner 902, the demultiplexer 903, the decoder 904, the video signal processor 905, the audio signal processor 907, the external interface 909, and the control unit 910 to one another.

In the television apparatus 900 configured in this manner, the decoder 904 has the functions of the image decoding device 50 according to the above-described embodiment. Therefore, when images are decoded in the television apparatus 900, a decrease in the encoding efficiency can be suppressed.

[Second Application Example: Mobile Phone]

Figure 97:
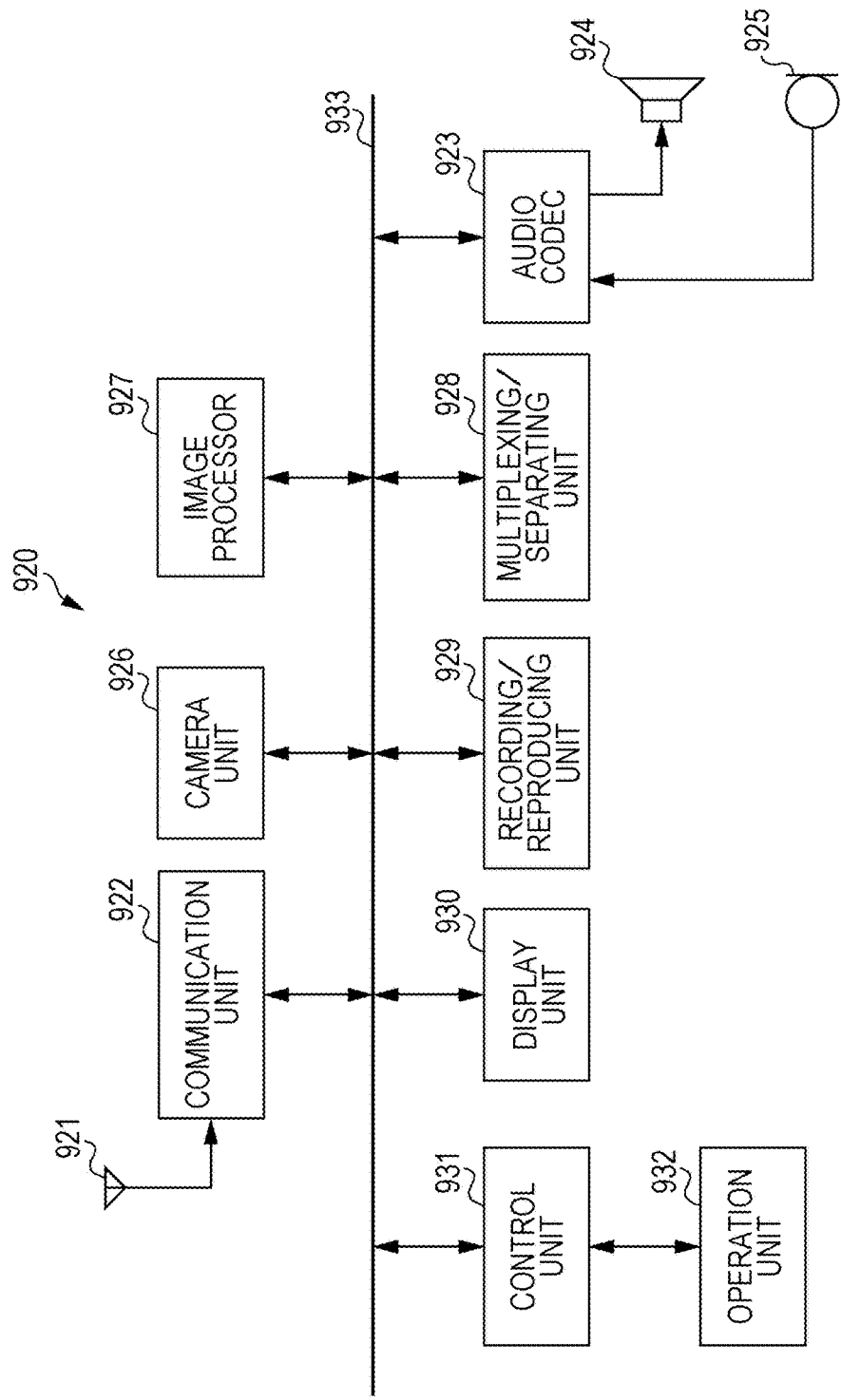
FIG. 97 is a block diagram illustrating an example of a schematic configuration of a mobile phone.

FIG. 97 illustrates an example of a schematic configuration of a mobile phone to which the above-described embodiment is applied. A mobile phone 920 includes an antenna 921, a communication unit 922, an audio codec 923, a speaker 924, a microphone 925, a camera unit 926, an image processor 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processor 927, the multiplexing/separating unit 928, the recording/reproducing unit 929, the display unit 930, and the control unit 931 to one another.

The mobile phone 920 performs operation such as transmission/reception of an audio signal, transmission/reception of an e-mail or image data, image taking, and recording of data in various operation modes including an audio communication mode, a data communication mode, an imaging mode, and a television-phone mode.

In the audio communication mode, an analog audio signal generated by the microphone 925 is supplied to the audio codec 923. The audio codec 923 converts the analog audio signal to the audio data and A/D converts the converted audio data to compress. Then, the audio codec 923 outputs the compressed audio data to the communication unit 922. The communication unit 922 encodes and modulates the audio data to generate a transmission signal. Then, the communication unit 922 transmits the generated transmission signal to a base station (not illustrated) via the antenna 921. Moreover, the communication unit 922 amplifies a wireless signal received via the antenna 921 and applies frequency conversion to the same to obtain a reception signal. Then, the communication unit 922 generates the audio data by demodulating and decoding the reception signal and outputs the generated audio data to the audio codec 923. The audio codec 923 expands the audio data and D/A converts the same to generate the analog audio signal. Then, the audio codec 923 supplies the generated audio signal to the speaker 924 to output the audio.

In the data communication mode, for example, the control unit 931 generates character data composing the e-mail according to the operation by the user via the operation unit 932. Moreover, the control unit 931 allows the display unit 930 to display characters. The control unit 931 generates e-mail data according to a transmission instruction from the user via the operation unit 932 to output the generated e-mail data to the communication unit 922. The communication unit 922 encodes and modulates the e-mail data to generate the transmission signal. Then, the communication unit 922 transmits the generated transmission signal to the base station (not illustrated) via the antenna 921. Moreover, the communication unit 922 amplifies the wireless signal received via the antenna 921 and applies the frequency conversion to the same to obtain the reception signal. Then, the communication unit 922 demodulates and decodes the reception signal to restore the e-mail data and outputs the restored e-mail data to the control unit 931. The control unit 931 allows the display unit 930 to display contents of the e-mail data and allows the storage medium of the recording/reproducing unit 929 to store the e-mail data.

The recording/reproducing unit 929 includes an arbitrary readable/writable storage medium. For example, the storage medium may be a built-in storage medium such as the RAM and the flash memory and may be an externally-mounted storage medium such as the hard disc, the magnetic disc, the magneto-optical disc, the optical disc, a USB (Unallocated Space Bitmap) memory, and a memory card.

In the imaging mode, for example, the camera unit 926 takes an image of an object to generate the image data and outputs the generated image data to the image processor 927. The image processor 927 encodes the image data input from the camera unit 926 and stores the encoded stream in the storage medium of the recording/reproducing unit 929.

Moreover, in the television-phone mode, for example, the multiplexing/separating unit 928 multiplexes the video stream encoded by the image processor 927 and the audio stream input from the audio codec 923 and outputs the multiplexed stream to the communication unit 922. The communication unit 922 encodes and modulates the stream to generate the transmission signal. Then, the communication unit 922 transmits the generated transmission signal to the base station (not illustrated) via the antenna 921. Moreover, the communication unit 922 amplifies the wireless signal received via the antenna 921 and applies the frequency conversion to the same to obtain the reception signal. The transmission signal and the reception signal may include the encoded bit stream. Then, the communication unit 922 restores the stream by demodulating and decoding the reception signal and outputs the restored stream to the multiplexing/separating unit 928. The multiplexing/separating unit 928 separates the video stream and the audio stream from the input stream and outputs the video stream and the audio stream to the image processor 927 and the audio codec 923, respectively. The image processor 927 decodes the video stream to generate the video data. The video data is supplied to the display unit 930 and a series of images is displayed by the display unit 930. The audio codec 923 expands the audio stream and D/A converts the same to generate the analog audio signal. Then, the audio codec 923 supplies the generated audio signal to the speaker 924 to output the audio.

In the mobile phone 920 configured in this manner, the image processor 927 has the functions of the image encoding device 10 and the image decoding device 50 according to the above-described embodiment. Therefore, when images are encoded and decoded in the mobile phone 920, a decrease in the encoding efficiency can be suppressed.

[Third Application Example: Recording/Reproducing Apparatus]

Figure 98:
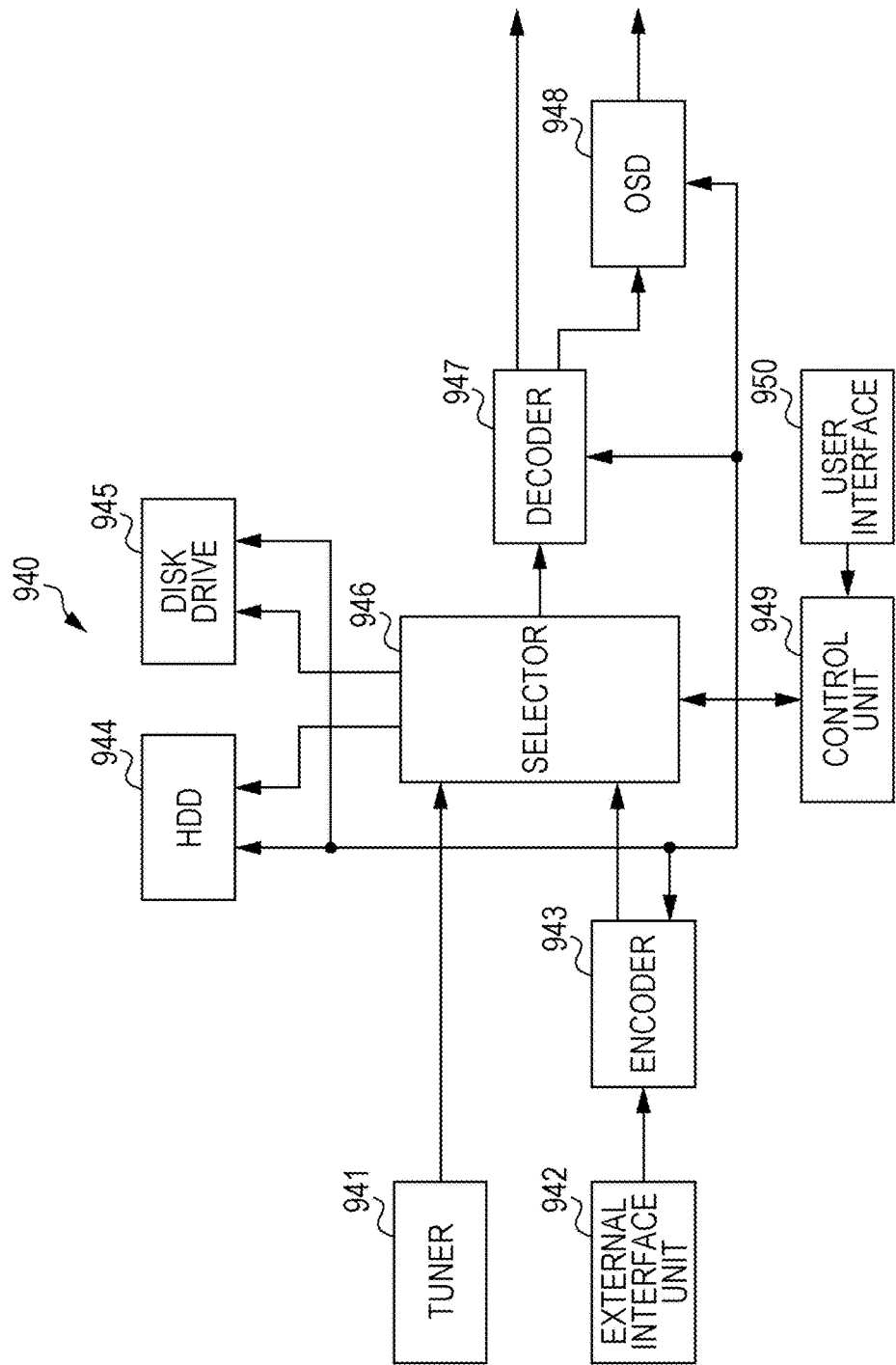
FIG. 98 is a block diagram illustrating an example of a schematic configuration of a recording/reproducing apparatus.

FIG. 98 illustrates an example of a schematic configuration of the recording/reproducing apparatus to which the above-described embodiment is applied. The recording/reproducing apparatus 940 encodes the audio data and the video data of a received broadcast program and records the encoded data on the recording medium, for example. Moreover, the recording/reproducing apparatus 940 may encode the audio data and the video data obtained from another apparatus and record the encoded data on the recording medium, for example. Moreover, the recording/reproducing apparatus 940 reproduces the data recorded on the recording medium by a monitor and the speaker according to the instruction of the user. In this case, the recording/reproducing apparatus 940 decodes the audio data and the video data.

The recording/reproducing apparatus 940 includes a tuner 941, an external interface 942, an encoder 943, a HDD (Hard Disk Drive) 944, a disc drive 945, a selector 946, a decoder 947, an OSD (On-Screen Display) 948, a control unit 949, and a user interface 950.

The tuner 941 extracts a signal of a desired channel from the broadcast signal received via an antenna (not illustrated) and demodulates the extracted signal. Then, the tuner 941 outputs the encoded bit stream obtained by the demodulation to the selector 946. That is, the tuner 941 serves as the transmitting means in the recording/reproducing apparatus 940.

The external interface 942 is the interface for connecting the recording/reproducing apparatus 940 and the external device or the network. The external interface 942 may be an IEEE1394 interface, a network interface, a USB interface, a flash memory interface and the like, for example. For example, the video data and the audio data received via the external interface 942 are input to the encoder 943. That is, the external interface 942 serves as the transmitting means in the recording/reproducing apparatus 940.

The encoder 943 encodes the video data and the audio data when the video data and the audio data input from the external interface 942 are not encoded. Then, the encoder 943 outputs the encoded bit stream to the selector 946.

The HDD 944 records the encoded bit stream in which content data such as the video and the audio are compressed, various programs and other data on an internal hard disc. The HDD 944 reads the data from the hard disc when reproducing the video and the audio.

The disc drive 945 records and reads the data on and from the mounted recording medium. The recording medium mounted on the disc drive 945 may be the DVD disc (DVD-Video, DVD-RAM, DVD-R, DVD-RW, DVD+R, DVD+RW and the like), a Blu-ray (registered trademark) disc and the like, for example.

The selector 946 selects the encoded bit stream input from the tuner 941 or the encoder 943 and outputs the selected encoded bit stream to the HDD 944 or the disc drive 945 when recording the video and the audio. Moreover, the selector 946 outputs the encoded bit stream input from the HDD 944 or the disc drive 945 to the decoder 947 when reproducing the video and the audio.

The decoder 947 decodes the encoded bit stream to generate the video data and the audio data. Then, the decoder 947 outputs the generated video data to the OSD 948. Moreover, the decoder 904 outputs the generated audio data to an external speaker.

The OSD 948 reproduces the video data input from the decoder 947 to display the video. The OSD 948 may also superimpose the GUI image such as the menu, the button, and the cursor, for example, on the displayed video.

The control unit 949 includes the processor such as the CPU and the memory such as the RAM and ROM. The memory stores the program executed by the CPU, the program data and the like. The program stored in the memory is read by the CPU to be executed at startup of the recording/reproducing apparatus 940, for example. The CPU controls operation of the recording/reproducing apparatus 940 according to an operation signal input from the user interface 950, for example, by executing the program.

The user interface 950 is connected to the control unit 949. The user interface 950 includes a button and a switch for the user to operate the recording/reproducing apparatus 940 and a receiver of a remote control signal, for example. The user interface 950 detects operation by the user via the components to generate the operation signal and outputs the generated operation signal to the control unit 949.

In the recording/reproducing apparatus 940 configured in this manner, the encoder 943 has the functions of the image encoding device 10 according to the above-described embodiment. Moreover, the decoder 947 has the functions of the image decoding device 50 according to the above-described embodiment. Therefore, when images are encoded and decoded in the recording/reproducing apparatus 940, a decreased in the encoding efficiency can be suppressed.

[Fourth Application Example: Imaging Apparatus]

Figure 99:
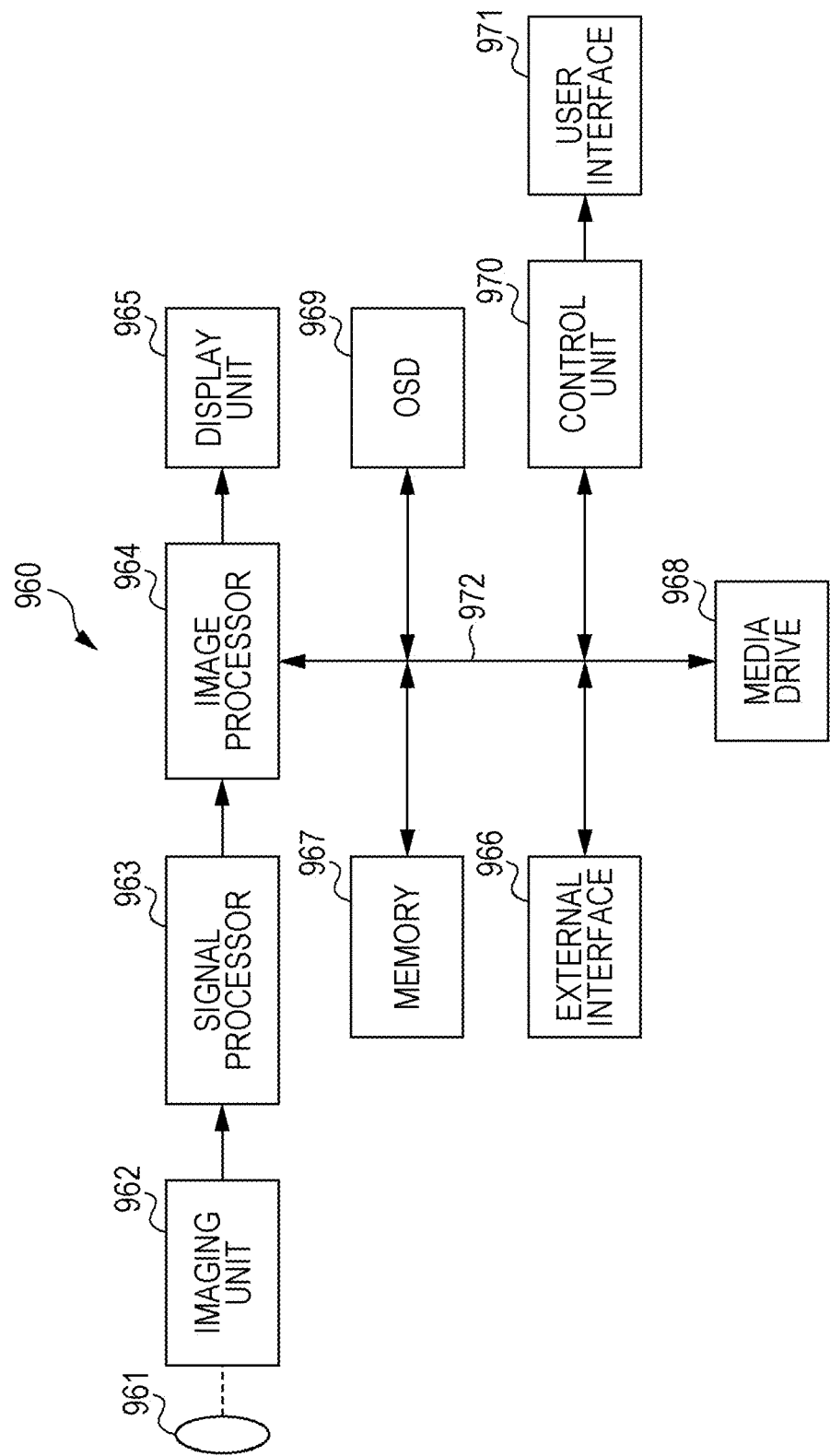
FIG. 99 is a block diagram illustrating an example of a schematic configuration of an imaging apparatus.

FIG. 99 illustrates an example of a schematic configuration of an imaging apparatus to which the above-described embodiment is applied. An imaging apparatus 960 images an object to generate the image, encodes the image data and records the encoded data on a recording medium.

The imaging apparatus 960 includes an optical block 961, an imaging unit 962, a signal processor 963, an image processor 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processor 963. The display unit 965 is connected to the image processor 964. The user interface 971 is connected to the control unit 970. The bus 972 connects the image processor 964, the external interface 966, the memory 967, the media drive 968, the OSD 969, and the control unit 970 to one another.

The optical block 961 includes a focus lens, a diaphragm mechanism, and the like. The optical block 961 forms an optical image of the object on an imaging surface of the imaging unit 962. The imaging unit 962 includes an image sensor such as a CCD (charge coupled device) and a CMOS (complementary metal oxide semiconductor) and converts the optical image formed on the imaging surface to an image signal as an electric signal by photoelectric conversion. Then, the imaging unit 962 outputs the image signal to the signal processor 963.

The signal processor 963 performs various camera signal processes such as knee correction, gamma correction, and color correction on the image signal input from the imaging unit 962. The signal processor 963 outputs the image data after the camera signal process to the image processor 964.

The image processor 964 encodes the image data input from the signal processor 963 to generate the encoded data. Then, the image processor 964 outputs the generated encoded data to the external interface 966 or the media drive 968. Moreover, the image processor 964 decodes the encoded data input from the external interface 966 or the media drive 968 to generate the image data. Then, the image processor 964 outputs the generated image data to the display unit 965. The image processor 964 may also output the image data input from the signal processor 963 to the display unit 965 to display the image. The image processor 964 may also superimpose data for display obtained from the OSD 969 on the image output to the display unit 965.

The OSD 969 generates the GUI image such as the menu, the button, and the cursor, for example, and outputs the generated image to the image processor 964.

The external interface 966 is configured as an USB input/output terminal, for example. The external interface 966 connects the imaging apparatus 960 and a printer when printing the image, for example. Moreover, a drive is connected to the external interface 966 as necessary. The removable medium such as the magnetic disc and the optical disc is mounted on the drive, for example, and the program read from the removable medium may be installed on the imaging apparatus 960. Further, the external interface 966 may be configured as a network interface connected to the network such as a LAN and the Internet. That is, the external interface 966 serves as the transmitting means in the imaging apparatus 960.

The recording medium mounted on the media drive 968 may be an arbitrary readable/writable removable medium such as the magnetic disc, the magneto-optical disc, the optical disc, and the semiconductor memory, for example. Moreover, the recording medium may be fixedly mounted on the media drive 968 to form a non-portable storage unit such as a built-in hard disc drive or SSD (Solid State Drive), for example.

The control unit 970 includes the processor such as the CPU and the memory such as the RAM and the ROM. The memory stores the program executed by the CPU and the program data. The program stored in the memory is read by the CPU to be executed at startup of the imaging apparatus 960, for example. The CPU controls operation of the imaging apparatus 960 according to the operation signal input from the user interface 971, for example, by executing the program.

The user interface 971 is connected to the control unit 970. The user interface 971 includes a button, a switch and the like for the user to operate the imaging apparatus 960, for example. The user interface 971 detects the operation by the user via the components to generate the operation signal and outputs the generated operation signal to the control unit 970.

In the imaging apparatus 960 configured in this manner, the image processor 964 has the functions of the image encoding device 10 and the image decoding device 50 according to the above-described embodiment. Therefore, when images are encoded and decoded in the imaging apparatus 960, a decrease in the encoding efficiency can be suppressed.

In the present specification, an example in which various types of information such as threshold values are multiplexed into headers and are transmitted from the encoding side to the decoding side has been described. However, a method of transmitting these items of information is not limited to this example. For example, these items of information may be transmitted or recorded as separate data associated with the encoded bit stream rather than being multiplexed into the encoded bit stream. Here, the term "associate" means that the image (or part of the image such as a slice and a block) included in the bit stream and information corresponding to the image can be linked with each other at the time of decoding. That is, the information may be transmitted on a transmission line other than that of the image (or bit stream). Moreover, the information may be recorded on another recording medium (or another recording area of the same recording medium) other than that of the image (or bit stream). Further, the information and the image (or bit stream) may be associated with each other in optional units such as a plurality of frames, one frame, or a part of the frame, for example.

While preferred embodiments of the present disclosure have been described in detail with reference to the accompanying drawings, the present disclosure is not limited to the embodiments. Those skilled in the art will readily appreciate that various modifications and changes may be made in the embodiment without departing from the technical spirit as described in the claims. Accordingly, all such modifications and changes are intended to be included within the scope of the present disclosure as defined in the claims.

The present technology may include the following constitutions.

(1) An image processing device including:
  a predictive vector generating unit that generates a predictive vector of a current parallax vector of a current block used in prediction using correlation in a parallax direction using a reference parallax vector referred when generating a predictive motion vector, when encoding the current parallax vector; and
  a difference vector generating unit that generates a difference vector between the current parallax vector and the predictive vector generated by the predictive vector generating unit.

(2) The image processing device according to (1), wherein
  the predictive vector generating unit generates a predictive vector of the current parallax vector using a parallax vector of a co-located block included in a co-located picture of a time different from a current picture of the same view as a current view.

(3) The image processing device according to (2), wherein
  the predictive vector generating unit sets the co-located block to be available when a property of a vector of the current block is identical to a property of a vector of the co-located block.

(4) The image processing device according to (3), wherein
  the property of the vector is a type of a vector, and
  the predictive vector generating unit sets the co-located block to be available when the property of the vector of the current block is a parallax vector and the property of the vector of the co-located block is a parallax vector.

(5) The image processing device according to (3) or (4), wherein
  the predictive motion vector generating unit determines the property of the vector of the current block and the property of the vector of the co-located block using POC (Picture Order Count) that indicates an output order of pictures.

(6) The image processing device according to (5), wherein
  the predictive motion vector generating unit determines the property of the vector of the current block and the property of the vector of the co-located block using the POC of the current picture, the POC of a current reference picture referred from the current picture, the POC of the co-located picture, and the POC of a co-located reference picture referred from the co-located picture.

(7) The image processing device according to (6), wherein the predictive motion vector generating unit determines that the property of the vector of the current block and the property of the vector of the co-located block are parallax vectors when the POC of the current picture is identical to the POC of the current reference picture referred from the current picture and the POC of the co-located picture is identical to the POC of the co-located reference picture referred from the co-located picture.

(8) The image processing device according to any of (2) to (7), wherein the predictive vector generating unit sets the co-located block to be not available when the property of the vector of the current block is different from the property of the vector of the co-located block.

(9) The image processing device according to (8), wherein the property of the vector is a type of a reference picture, and the predictive vector generating unit sets the co-located block to be not available when the type of the reference picture of the current block is different from the type of the reference picture of the co-located block.

(10) The image processing device according to (8) or (9), wherein the property of the vector is a type of a reference picture, and the predictive vector generating unit skips a process of searching a reference index when the type of the reference picture of the current block is a long reference type and the type of the reference picture of the co-located block is a long reference type.

(11) The image processing device according to any of (1) to (10), wherein the predictive vector generating unit generates a predictive vector of the current parallax vector using a parallax vector of a reference block included in a picture of the same time as a current picture of a view different from the current view.

(12) The image processing device according to any of (1) to (11), wherein the predictive vector generating unit scales the reference parallax vector based on a positional relationship between a current picture and a reference picture referred when generating a predictive motion vector to generate a predictive vector of the current parallax vector.

(13) The image processing device according to any of (1) to (12), wherein the predictive vector generating unit generates a predictive vector of the current motion vector using a reference motion vector referred when generating a predictive motion vector, when encoding the current motion vector of the current block used in prediction using correlation in a temporal direction, and the difference vector generating unit generates a difference vector between the current motion vector and the predictive vector generated by the predictive vector generating unit.

(14) The image processing device according to (13), wherein the predictive vector generating unit generates the predictive vector of the current motion vector using a motion vector of the reference block included in a picture of the same time as the current picture of a view different from the current view.

(15) The image processing device according to (13) or (14), wherein the predictive vector generating unit generates a predictive vector of the current motion vector using a motion vector of a reference block included in a picture of a time different from the current picture of the same view as the current view.

(16) The image processing device according to (15), wherein the predictive vector generating unit scales the reference motion vector based on a positional relationship between the current picture and a reference picture referred when generating a predictive motion vector to generate a predictive vector of the current motion vector.

(17) The image processing device according to any of (1) to (16), wherein the predictive vector generating unit generates the predictive vector using a vector of a block located at the same position as the current block in a state where a position of a pixel of a picture of the same time as the current picture of a view different from the current view is shifted.

(18) The image processing device according to (17), wherein the predictive vector generating unit sets a shift amount of the image according to a parallax vector of a neighboring region of the current block.

(19) The image processing device according to (18), wherein the predictive vector generating unit uses a parallax vector in an X-direction, of the neighboring block in which the value of a parallax vector in a Y-direction is not zero as the shift amount.

(20) The image processing device according to (18) or (19), wherein the predictive vector generating unit uses a value calculated from parallax vectors in an X-direction, of a plurality of the neighboring blocks in which the value of a parallax vector in a Y-direction is not zero as the shift amount.

(21) The image processing device according to (20), wherein the predictive vector generating unit uses an average value or a median value of the parallax vectors in the X-direction, of the plurality of the neighboring blocks in which the value of the parallax vector in the Y-direction is not zero as the shift amount of the image.

(22) The image processing device according to any of (17) to (21), wherein the predictive vector generating unit sets the shift amount of the image according to a global parallax vector.

(23) An image processing method of an image processing device, for allowing the image processing device to execute: generating a predictive vector of a current parallax vector of a current block used in prediction using correlation in a parallax direction using a reference parallax vector referred when generating a predictive motion vector, when encoding the current parallax vector; and generating a difference vector between the current parallax vector and the generated predictive vector.

(24) An image processing device including: a predictive vector generating unit that generates a predictive vector of a current parallax vector of a current block used in prediction using correlation in a parallax direction using a reference parallax vector referred when generating a predictive motion vector, when decoding the current parallax vector; and an arithmetic unit that performs an operation of adding the predictive vector generated by the predictive vector generating unit to a difference vector between the current parallax vector and the predictive vector to reconstruct the current parallax vector.

(25) An image processing method of an image processing device, for allowing the image processing device to execute:

generating a predictive vector of a current parallax vector of a current block used in prediction using correlation in a parallax direction using a reference parallax vector referred when generating a predictive motion vector, when decoding the current parallax vector; and performing an operation of adding the generated predictive vector to a difference vector between the current parallax vector and the predictive vector to reconstruct the current parallax vector.

(26) An image processing device including:

a predictive vector generating unit that sets a co-located block to be not available when a type of a reference picture of a current block is different from a type of the reference picture of a co-located block included in a co-located picture of a different time from a current picture when encoding a current motion vector of the current block used in prediction using correlation in a temporal direction and generates a predictive vector of the current motion vector using a reference motion vector referred when generating a predictive motion vector; and a difference vector generating unit that generates a difference vector between the current motion vector and the predictive vector generated by the predictive vector generating unit.

(27) An image processing method of an image processing device, for allowing the image processing device to execute:

setting a co-located block to be not available when a type of a reference picture of a current block is different from a type of the reference picture of a co-located block included in a co-located picture of a different time from a current picture when encoding a current motion vector of the current block used in prediction using correlation in a temporal direction, and generating a predictive vector of the current motion vector using a reference motion vector referred when generating a predictive motion vector; and generating a difference vector between the current motion vector and the generated predictive vector.

REFERENCE SIGNS LIST

100 Image encoding device
115 Motion parallax prediction/compensation unit
121 Multi-view decoded picture buffer
131 Motion parallax vector search unit
132 Predicted image generating unit
133 Encoded information accumulation buffer
134 Selector
135 Spatial correlation predictive vector generating unit
136 Temporal parallax correlation predictive vector generating unit
137 Selector
138 Encoding cost calculating unit
139 Mode determining unit
151 Current region processor
152 Correlation region processor
153 L1-prediction processor
154 L0-prediction processor
155 Scheme-1 processor
156 Scheme-2 processor
157 Scheme-3 processor
158 Scheme-4 processor
159 Predictive vector generating unit
300 Image decoding device
312 Motion parallax compensation unit
321 Decoded multi-view picture buffer
331 Encoded information accumulation buffer
332 Spatial correlation predictive vector generating unit
333 Temporal parallax correlation predictive vector generating unit
334 Selector
335 Arithmetic unit
336 Predicted image generating unit
400 Image encoding device
415 Motion prediction/compensation unit
421 Base view encoder
433, 434 Vector predicting unit
457 Different picture-based predictive vector generating unit
471 Parallax vector determining unit
472 Inter-view reference vector generating unit
473 Intra-view reference vector generating unit
500 Image decoding device
512 Motion compensation unit
521 Base view decoder
533, 534 Vector decoding unit
553 Different picture-based predictive vector generating unit
571 Parallax vector determining unit
572 Inter-view reference vector generating unit
573 Intra-view reference vector generating unit

The invention claimed is:

1. An image processing device comprising:
circuitry configured to operate as:
a predictive motion vector generating unit that:
sets a co-located vector to be not available in a candidate list as a condition that a type of a reference picture of a current block is different from a type of the reference picture of a co-located block included in a co-located picture;
sets the co-located vector to be available and to be scaled in the candidate list as a condition that both the type of the reference picture of the current block and the type of the reference picture of the co-located block are short-term reference pictures;
sets the co-located vector to be available and to be not scaled in the candidate list as a condition that both the type of the reference picture of the current block and the type of the reference picture of the co-located block are long-term reference pictures; and
generates a predictive motion vector of a coding vector of the current block using the candidate list; and
a reconstructing unit that reconstructs the coding vector by using the predictive motion vector generated by the predictive motion vector generating unit.

2. The image processing device according to claim 1, wherein
the predictive motion vector generating unit sets the co-located vector to be not available in the candidate list as a condition that the type of the reference picture of the current block is a long-term reference picture and the type of the reference picture of the co-located block is a short-term reference picture.

3. The image processing device according to claim 1, wherein
the predictive motion vector generating unit sets the co-located vector to be not available in the candidate list as a condition that the type of the reference picture of the current block is a short-term reference picture and the type of the reference picture of the co-located block is a long-term reference picture.

4. The image processing device according to claim 1, wherein
the predictive motion vector generating unit scales the co-located vector based on a positional relationship between the current picture and a reference picture referred to generate the predictive motion vector of the coding vector.

5. The image processing device according to claim 1, wherein
the circuitry comprises a Central Processing Unit (CPU).

6. An image processing method performed by an image processing device, comprising:
setting a co-located vector to be not available in a candidate list as a condition that a type of a reference picture of a current block is different from a type of the reference picture of a co-located block included in a co-located picture;
setting the co-located vector to be available and to be scaled in the candidate list as a condition that both the type of the reference picture of the current block and the type of the reference picture of the co-located block are short-term reference pictures;
setting the co-located vector to be available and to be not scaled in the candidate list as a condition that both the type of the reference picture of the current block and the type of the reference picture of the co-located block are long-term reference pictures;
generating a predictive motion vector of a coding vector of the current block using the candidate list; and
reconstructing the coding vector by using the generated predictive motion vector.

7. The image processing method according to claim 6, wherein
the co-located vector is set to be not available in the candidate list as a condition that the type of the reference picture of the current block is a long-term reference picture and the type of the reference picture of the co-located block is a short-term reference picture.

8. The image processing method according to claim 6, wherein
the co-located vector is set to be not available in the candidate list as a condition that the type of the reference picture of the current block is a short-term reference picture and the type of the reference picture of the co-located block is a long-term reference picture.

9. The image processing method according to claim 6, further comprising:
scaling the co-located vector based on a positional relationship between the current picture and a reference picture referred to generate the predictive motion vector of the coding vector.

10. The image processing device according to claim 1, wherein
the reconstruction unit uses a merge mode to reconstruct the coding vector.

11. The image processing method according to claim 6, wherein
reconstructing comprises using a merge mode to reconstruct the coding vector.

12. The image processing device according to claim 1, wherein
the reconstruction unit uses an AMVP mode to reconstruct the coding vector.

13. The image processing method according to claim 6, wherein
reconstructing comprises using an AMVP mode to reconstruct the coding vector.

14. The image processing device according to claim 1, wherein
the predictive motion vector generating unit sets the co-located vector to be not available by excluding the co-located vector from a candidate vector.

15. The image processing method according to claim 6, wherein
setting the co-located vector to be not available comprises excluding the co-located vector from a candidate vector.

* * * * *